US010001817B2

(12) United States Patent
Zambetti et al.

(10) Patent No.: US 10,001,817 B2
(45) Date of Patent: Jun. 19, 2018

(54) USER INTERFACE FOR MANIPULATING USER INTERFACE OBJECTS WITH MAGNETIC PROPERTIES

(71) Applicant: Apple Inc., Cupertino, CA (US)

(72) Inventors: Nicholas Zambetti, San Francisco, CA (US); Imran Chaudhri, San Francisco, CA (US); Jonathan R. Dascola, San Francisco, CA (US); Alan C. Dye, San Francisco, CA (US); Christopher Patrick Foss, San Francisco, CA (US); Aurelio Guzman, San Jose, CA (US); Chanaka G. Karunamuni, San Jose, CA (US); Duncan Robert Kerr, San Francisco, CA (US); Christopher Wilson, San Francisco, CA (US); Eric Lance Wilson, San Jose, CA (US); Lawrence Y. Yang, San Francisco, CA (US); Gary Ian Butcher, San Jose, CA (US); Nathan De Vries, San Francisco, CA (US); Jonathan P. Ive, San Francisco, CA (US); Nicholas V. King, San Jose, CA (US); Daniel Trent Preston, San Jose, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 14/841,656

(22) Filed: Aug. 31, 2015

(65) Prior Publication Data
US 2015/0370529 A1 Dec. 24, 2015

Related U.S. Application Data

(63) Continuation-in-part of application No. PCT/US2014/053961, filed on Sep. 3, 2014.
(Continued)

(51) Int. Cl.
G06F 1/16 (2006.01)
G06F 3/038 (2013.01)
(Continued)

(52) U.S. Cl.
CPC ............ *G06F 1/1694* (2013.01); *G06F 1/163* (2013.01); *G06F 1/169* (2013.01); *G06F 3/038* (2013.01);
(Continued)

(58) Field of Classification Search
USPC ........................................................ 345/156
See application file for complete search history.

(56) References Cited

U.S. PATENT DOCUMENTS 4,395,134 A 7/1983 Luce
5,088,070 A 2/1992 Shiff
(Continued)

FOREIGN PATENT DOCUMENTS

CN 101241407 B 7/2011
CN 101034328 B 2/2013
(Continued)

OTHER PUBLICATIONS

Final Office Action received for U.S. Appl. No. 14/503,072, dated Sep. 1, 2015, 16 pages.
(Continued)

*Primary Examiner* — Jason C Olson
(74) *Attorney, Agent, or Firm* — Dentons US LLP

(57) ABSTRACT

The present disclosure relates to user interfaces for manipulating user interface objects. A device, including a display and a rotatable input mechanism, is described in relation to manipulating user interface objects. In some examples, the manipulation of the object is a scroll, zoom, or rotate of the
(Continued)

object. In other examples, objects are selected in accordance with simulated magnetic properties.

50 Claims, 94 Drawing Sheets

Related U.S. Application Data

(60) Provisional application No. 61/959,851, filed on Sep. 3, 2013, provisional application No. 61/873,956, filed on Sep. 5, 2013, provisional application No. 61/873,359, filed on Sep. 3, 2013, provisional application No. 61/873,360, filed on Sep. 3, 2013, provisional application No. 62/129,944, filed on Mar. 8, 2015.

(51) Int. Cl.
*G06F 3/0482* (2013.01)
*G06F 3/0484* (2013.01)
*G06F 3/0485* (2013.01)
*G06F 3/0488* (2013.01)
*G06F 3/0362* (2013.01)
*G06F 3/16* (2006.01)

(52) U.S. Cl.
CPC .......... *G06F 3/0362* (2013.01); *G06F 3/0482* (2013.01); *G06F 3/0485* (2013.01); *G06F 3/04845* (2013.01); *G06F 3/04883* (2013.01); *G06F 3/167* (2013.01); *G06F 2203/0381* (2013.01); *G06F 2203/04806* (2013.01)

(56) References Cited

U.S. PATENT DOCUMENTS

| | | | |
|---|---|---|---|
| 5,313,229 A | 5/1994 | Gilligan et al. | |
| 5,477,508 A | 12/1995 | Will | |
| 5,519,393 A | 5/1996 | Brandestini | |
| 5,528,260 A | 6/1996 | Kent | |
| 5,739,775 A | 4/1998 | Brandestini | |
| 5,825,353 A | 10/1998 | Will | |
| 5,852,413 A | 12/1998 | Bacchi et al. | |
| 5,874,961 A | 2/1999 | Bates et al. | |
| 5,903,229 A | 5/1999 | Kishi | |
| 5,940,521 A | 8/1999 | East et al. | |
| 5,982,710 A | 11/1999 | Rawat et al. | |
| 6,157,381 A | 12/2000 | Bates et al. | |
| 6,192,258 B1 | 2/2001 | Kamada et al. | |
| 6,266,098 B1 | 7/2001 | Cove et al. | |
| 6,297,795 B1 | 10/2001 | Kato et al. | |
| 6,300,939 B1 | 10/2001 | Decker et al. | |
| 6,305,234 B1 | 10/2001 | Thies et al. | |
| 6,323,846 B1 | 11/2001 | Westerman et al. | |
| 6,339,438 B1 | 1/2002 | Bates et al. | |
| 6,396,482 B1 | 5/2002 | Griffin et al. | |
| 6,477,117 B1 | 11/2002 | Narayanaswami et al. | |
| 6,525,997 B1 | 2/2003 | Narayanaswami et al. | |
| 6,535,461 B1 | 3/2003 | Karhu | |
| 6,570,557 B1 | 5/2003 | Westerman et al. | |
| 6,647,338 B1 | 11/2003 | Hamberger et al. | |
| 6,661,438 B1 | 12/2003 | Shiraishi et al. | |
| 6,662,023 B1 | 12/2003 | Helle | |
| 6,677,932 B1 | 1/2004 | Westerman | |
| 6,788,220 B2 | 9/2004 | Netzer | |
| 6,809,724 B1 | 10/2004 | Shiraishi et al. | |
| 6,842,169 B2 | 1/2005 | Griffin et al. | |
| 6,967,642 B2 | 11/2005 | SanGiovanni | |
| 6,967,903 B2 | 11/2005 | Guanter | |
| 7,046,230 B2 | 5/2006 | Zadesky et al. | |
| 7,075,513 B2 | 7/2006 | Silfverberg et al. | |
| 7,081,905 B1 | 7/2006 | Raghunath | |
| 7,116,317 B2 | 10/2006 | Gregorio et al. | |
| 7,130,664 B1 | 10/2006 | Williams | |
| 7,143,355 B2 | 11/2006 | Yamaguchi et al. | |
| 7,146,005 B1 | 12/2006 | Anft et al. | |
| 7,168,047 B1 | 1/2007 | Huppi | |
| 7,227,963 B1* | 6/2007 | Yamada | G10H 1/0091 369/4 |
| 7,256,770 B2 | 8/2007 | Hinckley et al. | |
| 7,272,077 B2 | 9/2007 | Nobs | |
| 7,286,063 B2 | 10/2007 | Gauthey et al. | |
| 7,286,119 B2 | 10/2007 | Yamaguchi et al. | |
| 7,317,449 B2 | 1/2008 | Robbins et al. | |
| 7,333,084 B2 | 2/2008 | Griffin | |
| 7,463,239 B2 | 12/2008 | Ledbetter et al. | |
| 7,477,890 B1 | 1/2009 | Narayanaswami | |
| 7,489,303 B1* | 2/2009 | Pryor | B60K 35/00 345/173 |
| 7,499,040 B2 | 3/2009 | Zadesky et al. | |
| 7,506,269 B2 | 3/2009 | Lang | |
| 7,519,468 B2 | 4/2009 | Orr et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,001,488 B1 | 8/2011 | Lam | |
| 8,006,002 B2 | 8/2011 | Kalayjian et al. | |
| 8,009,144 B2 | 8/2011 | Yajima | |
| 8,050,997 B1 | 11/2011 | Nosek et al. | |
| 8,140,996 B2 | 3/2012 | Tomkins | |
| 8,239,784 B2 | 8/2012 | Hotelling et al. | |
| 8,279,180 B2 | 10/2012 | Hotelling et al. | |
| 8,307,306 B2 | 11/2012 | Komatsu | |
| 8,311,727 B2 | 11/2012 | Eckstein et al. | |
| 8,381,135 B2 | 2/2013 | Hotelling et al. | |
| 8,479,122 B2 | 7/2013 | Hotelling et al. | |
| 8,543,081 B2 | 9/2013 | Scott et al. | |
| 8,666,361 B2 | 3/2014 | Chu et al. | |
| 8,675,084 B2 | 3/2014 | Bolton et al. | |
| 8,686,944 B1 | 4/2014 | Charlton et al. | |
| 8,799,816 B2 | 8/2014 | Wells et al. | |
| 8,824,245 B2 | 9/2014 | Lau et al. | |
| 9,007,057 B2 | 4/2015 | Villaret | |
| 9,007,323 B2 | 4/2015 | Araki | |
| 9,104,705 B2 | 8/2015 | Fujinaga | |
| 9,395,867 B2 | 7/2016 | Griffin et al. | |
| 9,395,905 B2 | 7/2016 | Wherry | |
| 2001/0004337 A1 | 6/2001 | Paratte | |
| 2001/0011991 A1 | 8/2001 | Wang et al. | |
| 2002/0015024 A1 | 2/2002 | Westerman et al. | |
| 2002/0030668 A1 | 3/2002 | Hoshino et al. | |
| 2002/0101458 A1 | 8/2002 | SanGiovanni | |
| 2002/0118169 A1 | 8/2002 | Hinckley et al. | |
| 2002/0154150 A1 | 10/2002 | Ogaki et al. | |
| 2002/0171689 A1 | 11/2002 | Fox et al. | |
| 2002/0186621 A1 | 12/2002 | Lai | |
| 2003/0076301 A1* | 4/2003 | Tsuk | G06F 1/1626 345/159 |
| 2003/0115384 A1 | 6/2003 | Sonehara et al. | |
| 2003/0123329 A1 | 7/2003 | Guanter et al. | |
| 2003/0189598 A1 | 10/2003 | Lipstein et al. | |
| 2003/0210286 A1 | 11/2003 | Gerpheide et al. | |
| 2004/0013042 A1 | 1/2004 | Farine | |
| 2004/0047244 A1 | 3/2004 | Iino et al. | |
| 2004/0085328 A1 | 5/2004 | Maruyama et al. | |
| 2004/0100479 A1 | 5/2004 | Nakano et al. | |
| 2004/0113819 A1 | 6/2004 | Gauthey et al. | |
| 2004/0130580 A1 | 7/2004 | Howard et al. | |
| 2004/0155907 A1 | 8/2004 | Yamaguchi et al. | |
| 2004/0218472 A1 | 11/2004 | Narayanaswami et al. | |
| 2004/0225613 A1 | 11/2004 | Narayanaswami et al. | |
| 2005/0007884 A1 | 1/2005 | Lorenzato | |
| 2005/0081164 A1 | 4/2005 | Hama et al. | |
| 2005/0097466 A1 | 5/2005 | Levi Montalcini | |
| 2005/0168566 A1 | 8/2005 | Tada et al. | |
| 2005/0187873 A1 | 8/2005 | Labrou et al. | |
| 2005/0190059 A1 | 9/2005 | Wehrenberg | |
| 2005/0191159 A1 | 9/2005 | Benko | |
| 2005/0209051 A1 | 9/2005 | Santomassimo et al. | |

(56) References Cited

U.S. PATENT DOCUMENTS

| | | |
|---|---|---|
| 2005/0215848 A1 | 9/2005 | Lorenzato et al. |
| 2005/0259077 A1 | 11/2005 | Adams et al. |
| 2006/0007129 A1 | 1/2006 | Pletikosa et al. |
| 2006/0017692 A1 | 1/2006 | Wehrenberg et al. |
| 2006/0020904 A1 | 1/2006 | Aaltonen et al. |
| 2006/0026535 A1 | 2/2006 | Hotelling et al. |
| 2006/0026536 A1 | 2/2006 | Hotelling et al. |
| 2006/0028444 A1 | 2/2006 | Hinckley et al. |
| 2006/0033724 A1 | 2/2006 | Chaudhri et al. |
| 2006/0092177 A1 | 5/2006 | Blasko et al. |
| 2006/0112350 A1 | 5/2006 | Kato |
| 2006/0181506 A1 | 8/2006 | Fyke |
| 2006/0197753 A1 | 9/2006 | Hotelling |
| 2006/0268019 A1 | 11/2006 | Wang et al. |
| 2006/0268020 A1 | 11/2006 | Han |
| 2006/0294025 A1 | 12/2006 | Mengerink |
| 2007/0063995 A1 | 3/2007 | Bailey et al. |
| 2007/0070090 A1 | 3/2007 | Debettencourt et al. |
| 2007/0085841 A1* | 4/2007 | Tsuk .................. G06F 3/03547 345/173 |
| 2007/0120819 A1 | 5/2007 | Young et al. |
| 2007/0135043 A1 | 6/2007 | Hayes et al. |
| 2007/0209017 A1 | 9/2007 | Gupta et al. |
| 2007/0211042 A1 | 9/2007 | Kim et al. |
| 2007/0226646 A1 | 9/2007 | Nagiyama et al. |
| 2007/0236475 A1 | 10/2007 | Wherry |
| 2007/0242569 A1 | 10/2007 | Inoue et al. |
| 2007/0296711 A1 | 12/2007 | Yee et al. |
| 2008/0004084 A1 | 1/2008 | Park |
| 2008/0123473 A1 | 5/2008 | Ozawa et al. |
| 2008/0148177 A1 | 6/2008 | Lang et al. |
| 2008/0155461 A1 | 6/2008 | Ozaki |
| 2008/0155475 A1 | 6/2008 | Duhig |
| 2008/0165140 A1 | 7/2008 | Christie et al. |
| 2008/0168382 A1 | 7/2008 | Louch et al. |
| 2008/0257701 A1 | 10/2008 | Wlotzka |
| 2008/0288880 A1 | 11/2008 | Reponen et al. |
| 2008/0320391 A1 | 12/2008 | Lemay et al. |
| 2009/0015550 A1 | 1/2009 | Koski |
| 2009/0036165 A1 | 2/2009 | Brede |
| 2009/0050465 A1 | 2/2009 | Asada et al. |
| 2009/0059730 A1 | 3/2009 | Lyons et al. |
| 2009/0109069 A1 | 4/2009 | Takasaki et al. |
| 2009/0156255 A1 | 6/2009 | Shin et al. |
| 2009/0196124 A1 | 8/2009 | Mooring et al. |
| 2009/0199130 A1 | 8/2009 | Tsern et al. |
| 2009/0205041 A1 | 8/2009 | Michalske |
| 2009/0244015 A1 | 10/2009 | Sengupta et al. |
| 2010/0029327 A1 | 2/2010 | Jee |
| 2010/0058223 A1 | 3/2010 | Price et al. |
| 2010/0058240 A1 | 3/2010 | Bull et al. |
| 2010/0082481 A1 | 4/2010 | Lin et al. |
| 2010/0093400 A1 | 4/2010 | Ju et al. |
| 2010/0128570 A1 | 5/2010 | Smith et al. |
| 2010/0169097 A1 | 7/2010 | Nachman et al. |
| 2010/0220562 A1 | 9/2010 | Hozumi et al. |
| 2010/0223145 A1 | 9/2010 | Dragt |
| 2010/0259481 A1 | 10/2010 | Oh et al. |
| 2010/0267362 A1 | 10/2010 | Smith et al. |
| 2010/0269038 A1 | 10/2010 | Tsuda |
| 2010/0271340 A1 | 10/2010 | Nagashima et al. |
| 2010/0271342 A1 | 10/2010 | Nagashima et al. |
| 2010/0271343 A1 | 10/2010 | Nagashima et al. |
| 2010/0277126 A1 | 11/2010 | Naeimi et al. |
| 2010/0315417 A1 | 12/2010 | Cho et al. |
| 2010/0325575 A1 | 12/2010 | Platzer et al. |
| 2010/0331145 A1 | 12/2010 | Lakovic et al. |
| 2011/0006980 A1 | 1/2011 | Taniguchi et al. |
| 2011/0014956 A1 | 1/2011 | Lee et al. |
| 2011/0022472 A1 | 1/2011 | Zon et al. |
| 2011/0025311 A1 | 2/2011 | Chauvin et al. |
| 2011/0088086 A1 | 4/2011 | Swink et al. |
| 2011/0099509 A1 | 4/2011 | Horagai |
| 2011/0131494 A1 | 6/2011 | Ono et al. |
| 2011/0131531 A1 | 6/2011 | Russell et al. |
| 2011/0157046 A1 | 6/2011 | Lee et al. |
| 2011/0164042 A1 | 7/2011 | Chaudhri |
| 2011/0167262 A1 | 7/2011 | Ross et al. |
| 2011/0187355 A1 | 8/2011 | Dixon et al. |
| 2011/0251892 A1 | 10/2011 | Laracey et al. |
| 2011/0296312 A1 | 12/2011 | Boyer et al. |
| 2012/0044267 A1 | 2/2012 | Fino et al. |
| 2012/0066638 A1 | 3/2012 | Ohri et al. |
| 2012/0089507 A1 | 4/2012 | Zhang et al. |
| 2012/0092383 A1 | 4/2012 | Hysek et al. |
| 2012/0099406 A1 | 4/2012 | Lau et al. |
| 2012/0159380 A1 | 6/2012 | Kocienda et al. |
| 2012/0174005 A1 | 7/2012 | Deutsch et al. |
| 2012/0197743 A1 | 8/2012 | Grigg et al. |
| 2012/0258684 A1 | 10/2012 | Franz et al. |
| 2012/0290449 A1 | 11/2012 | Mullen et al. |
| 2012/0310760 A1 | 12/2012 | Phillips et al. |
| 2012/0322370 A1 | 12/2012 | Lee |
| 2012/0322371 A1 | 12/2012 | Lee |
| 2012/0324390 A1 | 12/2012 | Tao et al. |
| 2013/0063364 A1 | 3/2013 | Moore |
| 2013/0085931 A1 | 4/2013 | Runyan |
| 2013/0097566 A1 | 4/2013 | Berglund |
| 2013/0103519 A1 | 4/2013 | Kountotsis et al. |
| 2013/0110719 A1 | 5/2013 | Carter et al. |
| 2013/0142016 A1 | 6/2013 | Pozzo Di Borgo et al. |
| 2013/0143512 A1 | 6/2013 | Hernandez et al. |
| 2013/0145292 A1 | 6/2013 | Cohen et al. |
| 2013/0176020 A1 | 7/2013 | Chauvin et al. |
| 2013/0205939 A1 | 8/2013 | Meerovitsch |
| 2013/0218517 A1 | 8/2013 | Ausserlechner |
| 2013/0225118 A1 | 8/2013 | Jang et al. |
| 2013/0244615 A1 | 9/2013 | Miller et al. |
| 2013/0295872 A1 | 11/2013 | Guday et al. |
| 2013/0303087 A1 | 11/2013 | Hauser et al. |
| 2013/0304651 A1 | 11/2013 | Smith et al. |
| 2013/0332358 A1 | 12/2013 | Zhao |
| 2013/0332364 A1 | 12/2013 | Templeton et al. |
| 2014/0028688 A1 | 1/2014 | Houjou et al. |
| 2014/0028735 A1 | 1/2014 | Williams et al. |
| 2014/0058935 A1 | 2/2014 | Mijares |
| 2014/0068751 A1 | 3/2014 | Last et al. |
| 2014/0074716 A1 | 3/2014 | Ni |
| 2014/0101056 A1 | 4/2014 | Wendling |
| 2014/0122331 A1 | 5/2014 | Vaish et al. |
| 2014/0129441 A1 | 5/2014 | Blanco et al. |
| 2014/0137020 A1 | 5/2014 | Sharma et al. |
| 2014/0143145 A1 | 5/2014 | Kortina et al. |
| 2014/0143678 A1* | 5/2014 | Mistry .................. G06F 3/017 715/746 |
| 2014/0155031 A1 | 6/2014 | Lee et al. |
| 2014/0253487 A1 | 9/2014 | Bezinge et al. |
| 2014/0258935 A1 | 9/2014 | Nishida et al. |
| 2014/0260776 A1 | 9/2014 | Burleson |
| 2014/0279442 A1 | 9/2014 | Luoma et al. |
| 2014/0279556 A1 | 9/2014 | Priebatsch et al. |
| 2014/0282214 A1 | 9/2014 | Shirzadi et al. |
| 2014/0347289 A1 | 11/2014 | Suh et al. |
| 2015/0277559 A1 | 10/2015 | Vescovi et al. |
| 2015/0378447 A1* | 12/2015 | Nagano .................. G06F 1/1626 700/85 |
| 2016/0034133 A1 | 2/2016 | Wilson et al. |
| 2016/0034166 A1 | 2/2016 | Wilson et al. |
| 2016/0034167 A1 | 2/2016 | Wilson et al. |
| 2016/0062466 A1 | 3/2016 | Moussette et al. |
| 2016/0063828 A1 | 3/2016 | Moussette et al. |
| 2016/0098016 A1 | 4/2016 | Ely et al. |
| 2016/0170598 A1 | 6/2016 | Zambetti et al. |
| 2016/0170624 A1 | 6/2016 | Zambetti et al. |
| 2016/0170625 A1 | 6/2016 | Zambetti et al. |
| 2016/0202866 A1 | 7/2016 | Zambetti et al. |
| 2016/0209939 A1 | 7/2016 | Zambetti et al. |
| 2016/0231883 A1 | 8/2016 | Zambetti et al. |
| 2016/0259535 A1 | 9/2016 | Fleizach et al. |
| 2016/0269540 A1 | 9/2016 | Butcher et al. |

(56) References Cited

U.S. PATENT DOCUMENTS

| | | | |
|---|---|---|---|
| 2016/0327911 | A1* | 11/2016 | Eim .................. G06F 1/163 |
| 2017/0315716 | A1 | 11/2017 | Zambetti et al. |

FOREIGN PATENT DOCUMENTS

| | | |
|---|---|---|
| CN | 103460164 A | 12/2013 |
| EP | 1052566 A1 | 11/2000 |
| EP | 1168149 A2 | 1/2002 |
| EP | 1850213 A2 | 10/2007 |
| EP | 2207084 A2 | 7/2010 |
| EP | 2302492 A2 | 3/2011 |
| EP | 2385451 A1 | 11/2011 |
| EP | 2551784 A1 | 1/2013 |
| EP | 2725537 A1 | 4/2014 |
| EP | 2733598 A2 | 5/2014 |
| JP | 55-80084 A | 6/1980 |
| JP | 2000-305760 A | 11/2000 |
| JP | 2001-202178 A | 7/2001 |
| JP | 2002-288690 A | 10/2002 |
| JP | 2003-248544 A | 9/2003 |
| JP | 2003-330586 A | 11/2003 |
| JP | 2004-184396 A | 7/2004 |
| JP | 2004-259063 A | 9/2004 |
| JP | 2006-11690 A | 1/2006 |
| JP | 2008-157974 A | 7/2008 |
| JP | 2008-539513 A | 11/2008 |
| JP | 2009-59382 A | 3/2009 |
| JP | 2009-510404 A | 3/2009 |
| JP | 2009-128296 A | 6/2009 |
| JP | 2009-294526 A | 12/2009 |
| JP | 2011-8540 A | 1/2011 |
| JP | 2011-90640 A | 5/2011 |
| JP | 2011-96043 A | 5/2011 |
| JP | 2011-530738 A | 12/2011 |
| JP | 2013-114844 A | 6/2013 |
| KR | 10-0630154 B1 | 9/2006 |
| KR | 10-2011-0093090 A | 8/2011 |
| KR | 10-2011-0114294 A | 10/2011 |
| KR | 10-2012-0079707 A | 7/2012 |
| KR | 10-2013-0027017 A | 3/2013 |
| TW | D122820 S | 5/2008 |
| WO | 1996/19872 A1 | 6/1996 |
| WO | 0169369 A1 | 9/2001 |
| WO | 2006/037545 A2 | 4/2006 |
| WO | 2009/026508 A1 | 2/2009 |
| WO | 2010/039337 A2 | 4/2010 |
| WO | 2010/150768 A1 | 12/2010 |
| WO | 2012080020 A1 | 6/2012 |
| WO | 2013/023224 A2 | 2/2013 |
| WO | 2013/097895 A1 | 7/2013 |
| WO | 2013/114844 A1 | 8/2013 |
| WO | 2013/135270 A1 | 9/2013 |
| WO | 2013/169842 A2 | 11/2013 |
| WO | 2013/169849 A2 | 11/2013 |
| WO | 2014/078965 A1 | 5/2014 |
| WO | 2014/105276 A1 | 7/2014 |

OTHER PUBLICATIONS

Non Final Office Action received for U.S. Appl. No. 14/503,072, dated Jan. 26, 2015, 12 pages.
Non Final Office Action received for U.S. Appl. No. 14/503,296, dated Jan. 30, 2015, 16 pages.
Non-Final Office Action received for U.S. Appl. No. 14/503,372, dated Dec. 5, 2014, 11 pages.
Non-Final Office Action received for U.S. Appl. No. 14/503,381, dated May 13, 2015, 13 pages.
Non-Final Office Action received for U.S. Appl. No. 14/599,425, dated Mar. 17, 2015, 16 pages.
Office Action received for Australian Patent Application No. 2015100734, dated Jul. 29, 2015, 5 pages.
Kamijo, Noboru, "Next Generation Mobile System—WatchPad1. 5", Available at "http://researcher.ibm.com/researcher/view_group_subpage.php?id=5617", retrieved on Jul. 4, 2015, 2 pages.
Lemay et al., U.S. Appl. No. 60/936,562, filed Jun. 20, 2007, titled "Portable Multifunction Device, Method, and Graphical User Interface for Playing Online Videos", 61 pages.
NDTV, "Sony SmartWatch 2 Launched in India for Rs. 14,990", available at "http://gadgets.ndtv.com/others/news/sony-smartwatch-2-launched-in-india-for-rs-14990-420319", Sep. 18, 2013, 4 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2014/053958, dated Feb. 19, 2015, 10 pages.
International Search Report and Written Opinion received for PCT Patent Application No. PCT/US2015/019321, dated Jun. 3, 2015, 11 pages.
Apple, "iPhone User's Guide", 2007, 137 pages.
"i Phone User Guide for iOS 7.1 Software", available online at <https://manuals.info.apple.com/MANUALS/1000/MA1681/en_US/iphone_ios7_user_guide.pdf> retrived on Aug. 10, 2015, 162 pages.
Headset Button Controller v7.3 APK Full APP Download for Andriod, Blackberry, iPhone, Jan. 27, 2014, 11 pages.
Colt, Sam, "Here's One Way Apple's Smartwatch Could Be Better Than Anything Else", Business Insider, Aug. 21, 2014, pp. 1-4.
International Search Report and Written Opinion received for PCT Patent Application No. PCT/US2015/019322, dated Jun. 18, 2015, 16 pages.
Final Office Action received for U.S. Appl. No. 14/503,296, dated Jul. 2, 2015, 7 pages.
Yang et al., "U.S Appl. No. 62/006,211, filed Jun. 1, 2014, titled Displaying Options, Assigning Notification, Ignoring Messages, and Simultaneous User Interface Displays in a Messaging Application", 254 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/019298, dated Jul. 13, 2015, 17 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2015/032474, dated Aug. 19, 2015, 8 pages.
International Search Report and Written Opinion received for PCT Patent Application No. PCT/US2015/019317, dated Aug. 25, 2015, 24 pages.
Fuji Film, "Taking Pictures Remotely : Free iPhone/Android App Fuji Film Camera Remote", Available at <http://app.fujifilm-dsc.com/en/camera_remote/guide05.html>, Apr. 22, 2014, 3 pages.
Playmemories Camera Apps, "PlayMemories Camera Apps Help Guide", Available at <https://www.playmemoriescameraapps.com/portal/manual/IS9104-NPIA09014_00-F00002/en/index.html>, 2012, 3 pages.
Techsmith, "Snagit 11—Snagit 11.4 Help", Available at <http://assets.techsmith.com/Downloads/ua-tutorials-snagit-11/Snagit_11.pdf>, Jan. 2014, 146 pages.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.

(56) References Cited

OTHER PUBLICATIONS

Frakes, Dan, "How to Get Started with Airplay", Macworld, May 2013, 8 pages.
Shankland, Stephen, "Chrome OS Gets 'OK Google' Voice Search Control", available online at http://www.cnet.com/news/chrome-os-gets-ok-google-voice-search-control/, May 21, 2014, 4 page.
Invitation to Pay Additional Fees received for PCT Patent Application No. PCT/US2016/019637, dated Jun. 1, 2016, 6 pages.
Notice of Allowance received for Taiwanese Patent Application No. 103130518, dated May 19, 2016, 2 pages (Official Copy only). (See Communication under 37 CFR § 1.98(a) (3)).
Office Action and Search Report received for Danish Patent Application No. PA 201670118, dated Jul. 1, 2016, 7 pages.
Office Action received for Taiwanese Patent Application No. 103130520, dated May 23, 2016, 38 pages (15 pages of English Translation and 23 pages of Official Copy).
International Preliminary Report on Patentability received for PCT Patent Application No. PCT/US2014/053961, dated Jul. 21, 2016, 24 pages.
Written Opinion received for PCT Patent Application No. PCT/US2014/053961, dated Jul. 11, 2016, 22 pages.
"Watchpad 1.5 demo", YouTube.com, Online Available at <https://www.youtube.com/watch?v=7xjvVbeUn80>, Uploaded on Jun. 20, 2010, 2 pages.
Non-Final Office Action received for U.S. Appl. No. 15/049,058, dated Nov. 16, 2016, 19 pages.
Non-Final Office Action received for U.S. Appl. No. 15/049,064, dated Oct. 27, 2016, 15 pages.
Non-Final Office Action received for U.S. Appl. No. 15/049,049, dated Nov. 9, 2016, 13 pages.
Notice of Allowance received for Taiwanese Patent Application No. 103130519, dated Oct. 27, 2016, 3 pages (Official Copy only) (see attached 37 CFR § 1.98(a) (3)).
Office Action received for Australian Patent Application No. 2014315234, dated Nov. 2, 2016, 3 pages.
Office Action received for Australian Patent Application No. 2014315319, dated Oct. 17, 2016, 3 pages.
Office Action received for Australian Patent Application No. 2014315325, dated Nov. 3, 2016, 3 pages.
Office Action received for Taiwanese Patent Application No. 103130520, dated Sep. 29, 2016, 39 pages (16 pages of English Translation and 23 pages of Official Copy).
International Search Report and Written Opinion received for PCT Patent Application No. PCT/US2016/019637, dated Aug. 18, 2016, 18 pages.
International Search Report received for PCT Patent Application No. PCT/US2014/053961, dated Jul. 11, 2016, 10 pages.
Final Office Action received for U.S. Appl. No. 15/049,064, dated Feb. 27, 2017, 13 pages.
Office Action received for Danish Patent Application No. PA201670118, dated Oct. 25, 2016, 3 pages.
Notice of Allowance received for Danish Patent Application No. PA201670118, dated Mar. 30, 2017, 2 pages.
Office Action received for Japanese Patent Application No. 2016-537947, dated Feb. 24, 2017, 6 pages (3 pages of English Translation and 3 pages of Official Copy).
Advisory Action received for U.S. Appl. No. 15/049,064, dated May 10, 2017, 3 Pages.
Final Office Action received for U.S. Appl. No. 15/049,058, dated May 8, 2017, 21 pages.
Notice of Allowance received for Australian Patent Application No. 2014315325, dated Apr. 19, 2017, 3 Pages.
Office Action received for Japanese Patent Application No. 2016-537945, dated Apr. 7, 2017, 6 pages (3 pages of English Translation and 3 pages of Official Copy).
Office Action received for Taiwanese Patent Application No. 103130520, dated Apr. 17, 2017, 8 pages (3 pages of English Translation and 5 pages of Official Copy).

"The Interview With a Key Person. IBM and Citizen met and Applied Linux to a Watch", ASCII Corporation, vol. 25, No. 12, Consecutive vol. 294, Dec. 1, 2001, pp. 137-143.
Final Office Action received for U.S. Appl. No. 15/049,049, dated May 23, 2017, 23 pages.
Wikipedia, "Rotary encoder", https://zh.wikipedia.org/wiki/%E6%97%8B%E8%BD%89%E7%B7%A8%E7%A2%BC%E5%99%A8%, Retrieved on May 17, 2017, 17 pages (10 pages of English Translation and 7 pages of Official Copy).
Office Action received for Australian Patent Application No. 2014315234, dated Apr. 19, 2017, 4 pages.
Office Action received for Taiwanese Patent Application No. 103130520, dated Oct. 1, 2015, 58 pages (22 pages of English translation and 36 pages of Official copy).
Office Action received for Taiwan Patent Application No. 103130519.0, dated Mar. 25, 2016, 14 pages( 6 pages of English Translation and 8 pages of Official Copy).
International Preliminary Report on Patentability received for PCT Patent Application No. PCT/US2014/053951, dated Mar. 17, 2016, 9 pages.
International Preliminary Report on Patentability received for PCT Patent Application No. PCT/US2014/053958, dated Mar. 17, 2016, 8 pages.
Invitation to Pay Additional Fees received for PCT Application No. PCT/US2014/053961, dated Aug. 3, 2015, 6 pages.
Office Action received for Korean Patent Application No. 10-2016-7008474, dated Dec. 28, 2016, 10 pages (4 pages of English Translation and 6 pages of Official Copy).
Office Action received for Korean Patent Application No. 10-2016-7008488, dated Jan. 12, 2017, 14 pages (6 pages of English Translation and 8 pages of Official Copy).
Office Action received for Korean Patent Application No. 10-2016-7008682, dated Dec. 30, 2016, 11 pages (4 pages of English Translation 7 pages of Official Copy).
Office Action received for Danish Patent Application No. PA201670118, dated Feb. 2, 2017, 2 pages.
Notice of Allowance received for Japanese Patent Application No. 2016-537947, dated Jun. 5, 2017, 3 pages. (Official Copy only) {See Communication under 37 CFR § 1.98(a) (3)}.
Office Action received for Danish Patent Application No. PA201770181, dated Jun. 13, 2017, 6 pages.
Office Action received for European Patent Application No. 14772494.2, dated Jun. 20, 2017, 7 pages.
Brinkmann, Martin, "How to Zoom in Firefox", Ghacks, Available at <https://web.archive.org/web/20130804034728/https://www.ghacks.net/2009/02/23/how-to-zoom-in-firefox/>, Feb. 23, 2009, 11 pages.
Non-Final Office Action received for U.S. Appl. No. 15/049,049 dated Dec. 15, 2017, 23 pages.
Office Action received for European Patent Application No. 14771688.0, dated Nov. 30, 2017, 15 pages.
Office Action received for Korean Patent Application No. 10-2016-7008488, dated Nov. 27, 2017, 6 pages (3 page of English Translation and 3 pages of Official Copy).
Office Action received for Korean Patent Application No. 10-2016-7008474, dated Nov. 27, 2017, 6 pages (2 page of English Translation and 4 pages of Official Copy).
Office Action received for Korean Patent Application No. 10-2016-7008682, dated Nov. 27, 2017, 7 pages (3 page of English Translation and 4 pages of Official Copy).
Office Action received for Danish Patent Application No. PA201770181, dated Jan. 3, 2018, 2 pages.
IBM, "watchpad 1.5", Online Available at <web.archive.org/web/20011205071448/http://www.trl.ibm.com/projects/ngm/index_e.htm>, Oct. 11, 2001, 2 pages.
Office Action received for Australian Patent Application No. 2014315319, dated Aug. 3, 2017, 3 pages.
Raghunath, et al., "User Interfaces for Applications on a Wrist Watch", Journal of Personal and Ubiquitous Computing, vol. 6, Feb. 2002, pp. 17-30.
Advisory Action received for U.S. Appl. No. 15/049,058, dated Oct. 18, 2017, 3 pages.

(56) References Cited

OTHER PUBLICATIONS

International Preliminary Report on Patentability received for PCT Patent Application No. PCT/US2016/019637, dated Sep. 21, 2017, 12 pages.
Notice of Allowance received for Australian Patent Application No. 2014315319, dated Oct. 12, 2017, 3 pages.
Notice of Allowance received for U.S. Appl. No. 15/049,064, dated Jul. 18, 2017, 24 pages.
Office Action received for Australian Patent Application No. 2014315234, dated Jul. 12, 2017, 4 pages.
Office Action received for European Patent Application No. 14772002.3, dated Jul. 4, 2017, 8 pages.
Office Action received for Japanese Patent Application No. 2016-537948, dated Jun. 9, 2017, 10 pages (5 pages of English Translation and 5 pages of Official Copy).
Decision to Grant received for Danish Patent Application No. PA201770181, dated Mar. 7, 2018, 2 pages.
Office Action received for Australian Patent Application No. 2018200998, dated Mar. 9, 2018, 5 pages.
Office Action received for Korean Patent Application No. 10-2018-7002695, dated Feb. 27, 2018, 12 pages (5 pages of English Translation and 7 pages of Official Copy).
Office Action received for Korean Patent Application No. 10-2016-7008682, dated Feb. 8, 2018, 7 pages (3 pages of English Translation and 4 pages of Official Copy).

\* cited by examiner

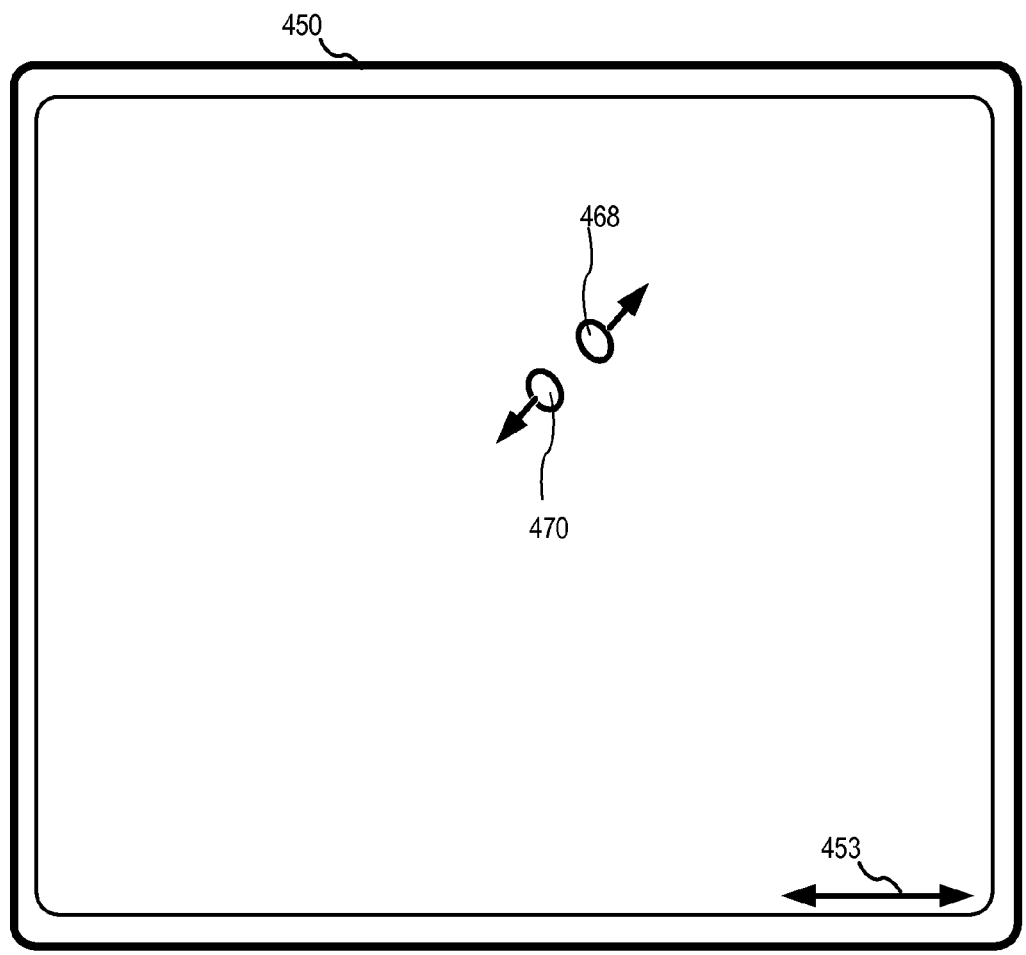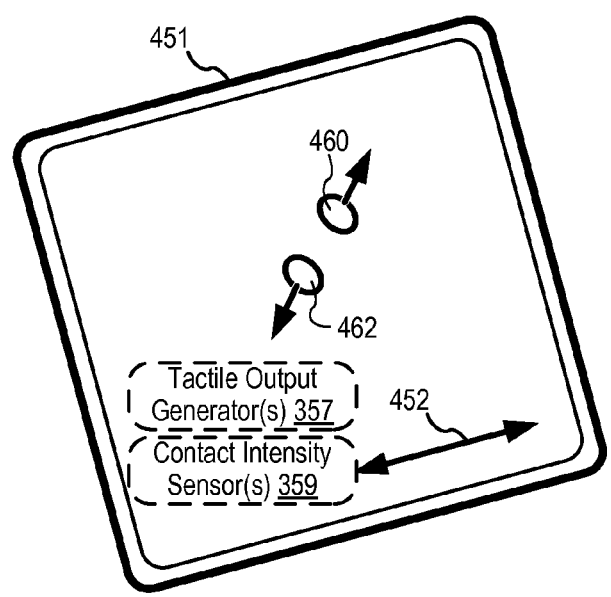
FIG. 4B

900

---

902
Display an object in accordance with a value of a characteristic of the object, the value being within a range of values of the characteristic.

↓

904
Receive a user input request, the user input request representing rotation of the rotatable input mechanism.

↓

906
In response to receiving the user input request, determining whether the user input request causes the value of the characteristic of the object to transition into range of a zone of an anchor, the anchor having a start value, an intermediate value, and an end value within the range of values of the characteristic, and the zone of the anchor being between the start value and the end value

↓

908
In accordance with a determination that the user input request causes the value of the characteristic of the object to transition into range of the zone of the anchor:

910
Update the value of the characteristic of the object based on the intermediate value of the anchor.

↓

912
Update display of the object in accordance with the updated value of the characteristic of the object.

1102
Display an object, wherein the object is associated with a first marker having a first value and a second marker having a second value, and wherein a value of a characteristic of the object is based on the first value of the first marker.

↓

1104
Receive user input representing rotation of the rotatable input mechanism.

↓

1106
In response to receiving the user input representing rotation of the rotatable input mechanism, determine whether an attribute of the user input exceeds a threshold value.

↓

1108
In accordance with a determination that the attribute of the user input exceeds the threshold value, update the value of the characteristic of the object based on the second value of the second marker.

↓

1110
Update display of the object in accordance with the updated value of the characteristic of the object.

Receive a user input representing a rotation of the rotatable input mechanism

5204

Identify a rotational attribute of the user input

5206

Determine an audio characteristic based on the identified rotational attribute

5208

Output audio with the audio characteristic

USER INTERFACE FOR MANIPULATING USER INTERFACE OBJECTS WITH MAGNETIC PROPERTIES

CLAIM OF PRIORITY

This application is a continuation-in-part of International Patent Application Number PCT/US2014/053961, filed Sep. 3, 2014, entitled "USER INTERFACE FOR MANIPULATING USER INTERFACE OBJECTS WITH MAGNETIC PROPERTIES" which claims priority to: U.S. Provisional Patent Application Ser. No. 61/873,356, filed Sep. 3, 2013, entitled "CROWN INPUT FOR A WEARABLE ELECTRONIC DEVICE"; U.S. Provisional Patent Application Ser. No. 61/873,359, filed Sep. 3, 2013, entitled "USER INTERFACE OBJECT MANIPULATIONS IN A USER INTERFACE"; U.S. Provisional Patent Application Ser. No. 61/959,851, filed Sep. 3, 2013, entitled "USER INTERFACE FOR MANIPULATING USER INTERFACE OBJECTS"; and U.S. Provisional Patent Application Ser. No. 61/873,360, filed Sep. 3, 2013, entitled "USER INTERFACE FOR MANIPULATING USER INTERFACE OBJECTS WITH MAGNETIC PROPERTIES"; and claims priority to U.S. Provisional Patent Application Ser. No. 62/129,944, filed Mar. 8, 2015, entitled "USER INTERFACE FOR MANIPULATING USER INTERFACE OBJECTS WITH MAGNETIC PROPERTIES"; each of which is hereby incorporated by reference in its entirety for all purposes.

FIELD

The present disclosure relates generally to computer user interfaces, and more specifically to manipulating user interface objects using a rotatable input mechanism.

BACKGROUND

Advanced personal electronic devices can have small form factors. Use of such personal electronic devices involves manipulation of user interface objects on display screens which also have small form factors that complement the design of the personal electronic devices.

Exemplary manipulations that users can perform on personal electronic devices include navigating a hierarchy, selecting a user interface object, adjusting the position, zoom, and rotation of user interface objects, or otherwise manipulating user interface objects. Exemplary user interface objects include documents, digital images, video, text, icons, and maps.

BRIEF SUMMARY

Some techniques for manipulating user interface objects using reduced-size touch-sensitive displays, however, are generally cumbersome and inefficient. For example, it may be difficult for the user to precisely scroll a document object to a scroll position within a range of potential scroll positions that properly aligns the desired content with the viewable display. For another example, it may be difficult for the user to precisely change the magnification of an image object to a desired zoom size within a range of potential zoom size. For another example, it may be difficult to for the user select a particular user interface object. Existing techniques require more time than necessary when the user attempts to perform tasks, wasting user time and device energy. This latter consideration is particularly important in battery-operated devices. Thus, existing methods for manipulating user interface objects on reduced-size touch-sensitive displays can be inefficient and provide less precision than is preferable.

Accordingly, there is a need for electronic devices with faster, more efficient, and more precise methods and interfaces for manipulating user interface objects. Such methods and interfaces optionally complement or replace conventional methods for manipulating user interface objects. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices for manipulating user interface objects are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device is user-wearable. In some embodiments, the device has a touch-sensitive display (also known as a "touch screen" or "touch screen display"). In some embodiments, the device has a display and a touch-sensitive surface. In some embodiments, the device has a rotatable input mechanism. In some embodiments, the device has a graphical user interface (GUI), one or more processors, memory and one or more modules, programs or sets of instructions stored in the memory for performing multiple functions. In some embodiments, the user interacts with the GUI primarily through rotation of the rotatable input mechanism and gestures on the touch-sensitive surface. Executable instructions for performing these functions may be included in a computer readable storage medium or other computer program product configured for execution by one or more processors.

In accordance with some embodiments, a method is performed at an electronic device with a display and a rotatable input mechanism. The method includes: receiving a user input representing a rotation of the rotatable input mechanism; identifying a rotational attribute of the user input; determining an audio characteristic based on the identified rotational attribute; and outputting audio with the audio characteristic.

In accordance with some embodiments, a non-transitory computer-readable storage medium comprising one or more programs for execution by one or more processors of an electronic device, the one or more programs including instructions which, when executed by the one or more processors, cause the electronic device to: receive a user input representing a rotation of the rotatable input mechanism; identify a rotational attribute of the user input; determine an audio characteristic based on the identified rotational attribute; and output audio with the audio characteristic.

In accordance with some embodiments, an electronic device comprises one or more processors; memory; a display and a rotatable input mechanism each coupled to the one or more processors and memory; and one or more programs stored in memory. The one or more programs including instructions for: receiving a user input representing a rotation of the rotatable input mechanism; identifying a rotational attribute of the user input; determining an audio characteristic based on the identified rotational attribute; and outputting audio with the audio characteristic.

In accordance with some embodiments, an electronic device comprises means for receiving a user input representing a rotation of a rotatable input mechanism; means for identifying a rotational attribute of the user input; means for determining an audio characteristic based on the identified rotational attribute; and means for outputting audio with the audio characteristic.

In accordance with some embodiments, an electronic device comprises a display unit; a rotatable input mechanism; and a processing unit coupled to the display unit and the rotatable input mechanism. The processing unit configured to: receive a user input representing a rotation of the rotatable input mechanism; identify a rotational attribute of the user input; determine an audio characteristic based on the identified rotational attribute; and output audio with the audio characteristic.

In accordance with some embodiments, a method is performed at an electronic device with a touch-sensitive display and a rotatable input mechanism. The method includes: receiving a first user input representing a rotation of the rotatable input mechanism; determining whether a second user input representing a contact on the touch-sensitive display is received while receiving the second user input representing the rotation of the rotatable input mechanism; in accordance with a determination that the second user input representing the contact on the touch-sensitive display is received while receiving the second user input representing the rotation of the rotatable input mechanism, performing a first contextual action based on the rotation of the rotatable input mechanism; and in accordance with a determination that the second user input representing the contact on the touch-sensitive display is not received while receiving the second user input representing the rotation of the rotatable input mechanism, performing a second action different than the first contextual action based on the rotation of the rotatable input mechanism.

In accordance with some embodiments, an electronic device comprises one or more processors; memory; a touch-sensitive display and a rotatable input mechanism each coupled to the one or more processors and memory: and one or more programs stored in memory. The one or more programs including instructions for: receiving a first user input representing a rotation of the rotatable input mechanism; determining whether a second user input representing a contact on the touch-sensitive display is received while receiving the second user input representing the rotation of the rotatable input mechanism; in accordance with a determination that the second user input representing the contact on the touch-sensitive display is received while receiving the second user input representing the rotation of the rotatable input mechanism, performing a first contextual action based on the rotation of the rotatable input mechanism; and in accordance with a determination that the second user input representing the contact on the touch-sensitive display is not received while receiving the second user input representing the rotation of the rotatable input mechanism, performing a second action different than the first contextual action based on the rotation of the rotatable input mechanism.

In accordance with some embodiments, an electronic device comprises means for receiving a first user input representing a rotation of the rotatable input mechanism; means for determining whether a second user input representing a contact on the touch-sensitive display is received while receiving the second user input representing the rotation of the rotatable input mechanism; in accordance with a determination that the second user input representing the contact on the touch-sensitive display is received while receiving the second user input representing the rotation of the rotatable input mechanism, means for performing a first contextual action based on the rotation of the rotatable input mechanism; and in accordance with a determination that the second user input representing the contact on the touch-sensitive display is not received while receiving the second user input representing the rotation of the rotatable input mechanism, means for performing a second action different than the first contextual action based on the rotation of the rotatable input mechanism.

In accordance with some embodiments, an electronic device comprises a touch-sensitive display unit; a rotatable input mechanism; a processing unit coupled to the touch-sensitive display unit and the rotatable input mechanism. The processing unit configured to: receive a first user input representing a rotation of the rotatable input mechanism; determine whether a second user input representing a contact on the touch-sensitive display unit is received while receiving the second user input representing the rotation of the rotatable input mechanism; in accordance with a determination that the second user input representing the contact on the touch-sensitive display unit is received while receiving the second user input representing the rotation of the rotatable input mechanism, perform a first contextual action based on the rotation of the rotatable input mechanism; and in accordance with a determination that the second user input representing the contact on the touch-sensitive display unit is not received while receiving the second user input representing the rotation of the rotatable input mechanism, perform a second action different than the first contextual action based on the rotation of the rotatable input mechanism.

In accordance with some embodiments, a non-transitory computer-readable storage medium comprising one or more programs for execution by one or more processors of an electronic device, the one or more programs including instructions which, when executed by the one or more processors, cause the electronic device to: receive a first user input representing a rotation of the rotatable input mechanism; determine whether a second user input representing a contact on the touch-sensitive display unit is received while receiving the second user input representing the rotation of the rotatable input mechanism; in accordance with a determination that the second user input representing the contact on the touch-sensitive display unit is received while receiving the second user input representing the rotation of the rotatable input mechanism, perform a first contextual action based on the rotation of the rotatable input mechanism; and in accordance with a determination that the second user input representing the contact on the touch-sensitive display unit is not received while receiving the second user input representing the rotation of the rotatable input mechanism, perform a second action different than the first contextual action based on the rotation of the rotatable input mechanism.

Thus, devices are provided with faster, more efficient, and more precise methods and interfaces for manipulating user interface objects, thereby increasing the effectiveness, efficiency, and user satisfaction with such devices. Such methods and interfaces may complement or replace conventional methods for manipulating user interface objects.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 9A is a flow diagram illustrating an exemplary process for manipulating a user interface object in accordance with some embodiments.

FIG. 11 is a flow diagram illustrating an exemplary process for manipulating a user interface object in accordance with some embodiments.

FIG. 52 is a flow diagram of an example process for outputting audio in accordance with some embodiments.

DESCRIPTION OF EMBODIMENTS

Figure 1A:
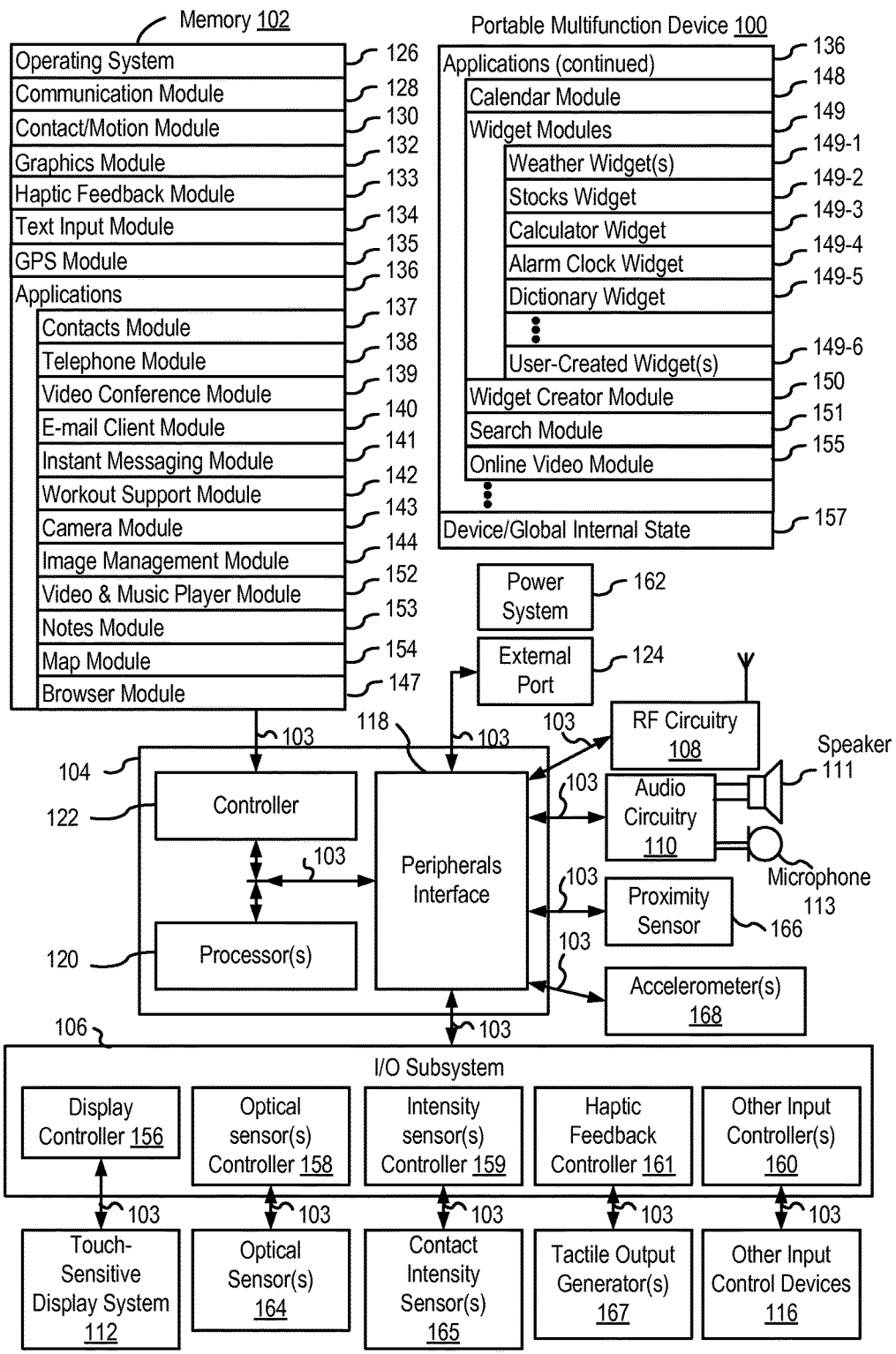
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

There is a need for electronic devices that provide efficient and precise access to manipulate user interface objects. For example, ease of use for scrolling a document, zooming an image, rotating an image, and selecting an option from among a plurality of options contribute to the efficiency of manipulating user interface objects. Such techniques can reduce the cognitive burden on a user who manipulates user interface objects, thereby enhancing productivity. Further, such techniques can reduce processor and battery power otherwise wasted on redundant user inputs.

Below, FIGS. 1A-1B, 2, 3, 4A-4B, and 5A-5D provide a description of exemplary devices for performing the techniques for manipulating user interface objects. FIGS. 6A-6F, 8A-8H, 10A-10E, 13A-13J, 14-21, 23-30, 32-38, 40-45, 48A-48B, 49A-49C, 50A-50C, and 51A-51C illustrate exemplary user interfaces for manipulating user interface objects. The user interfaces in the figures are also used to illustrate the processes described below, including the processes in FIGS. 7, 9A, 9B, 11, 13K, 22, 31, 39, 46, 52, and 53.

Although the following description uses terms first, second, etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 may include one or more computer readable storage mediums. The computer readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web-pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Figure 1B:
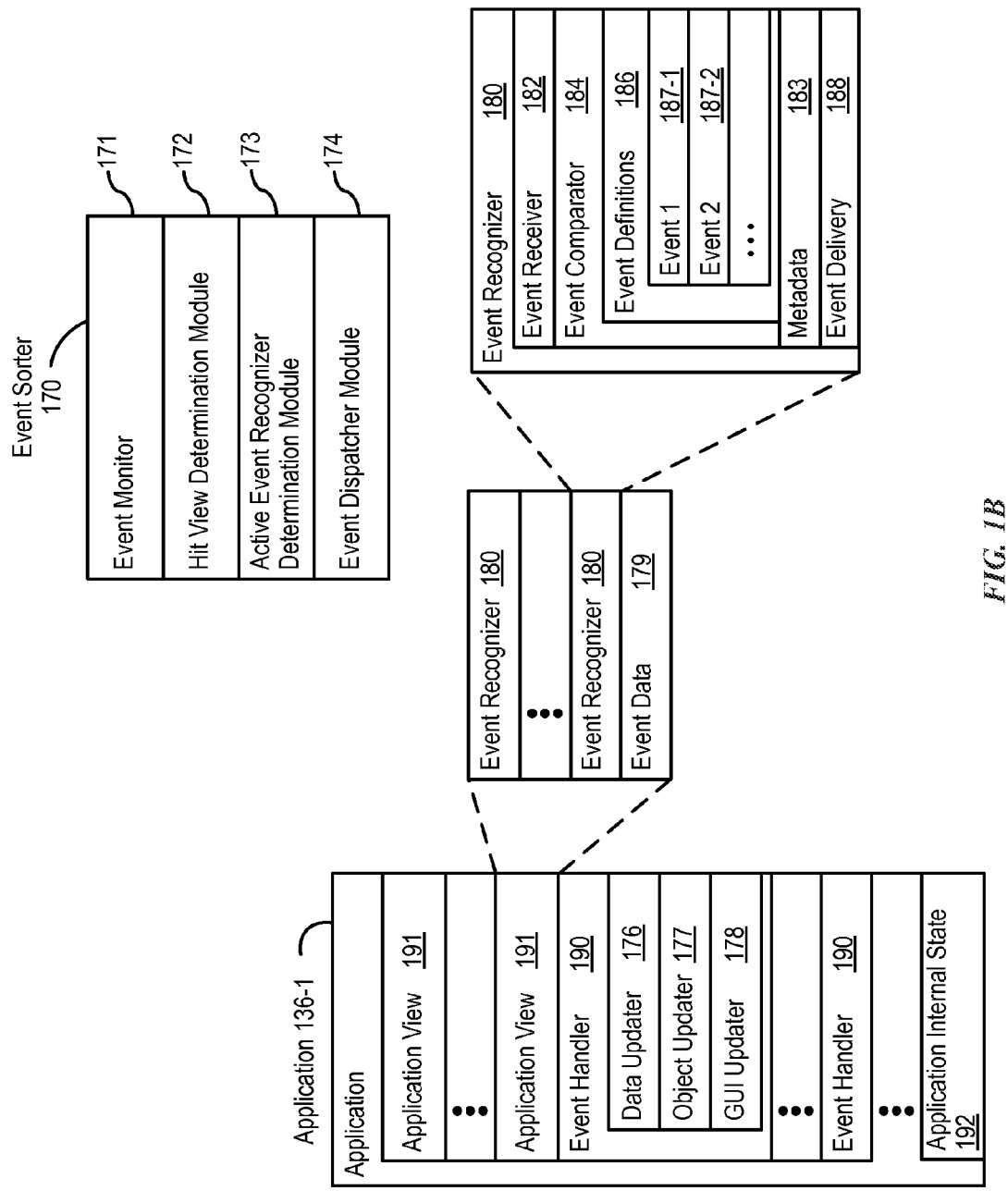
FIG. 1B is a block diagram illustrating exemplary components for event handling in accordance with some embodiments.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
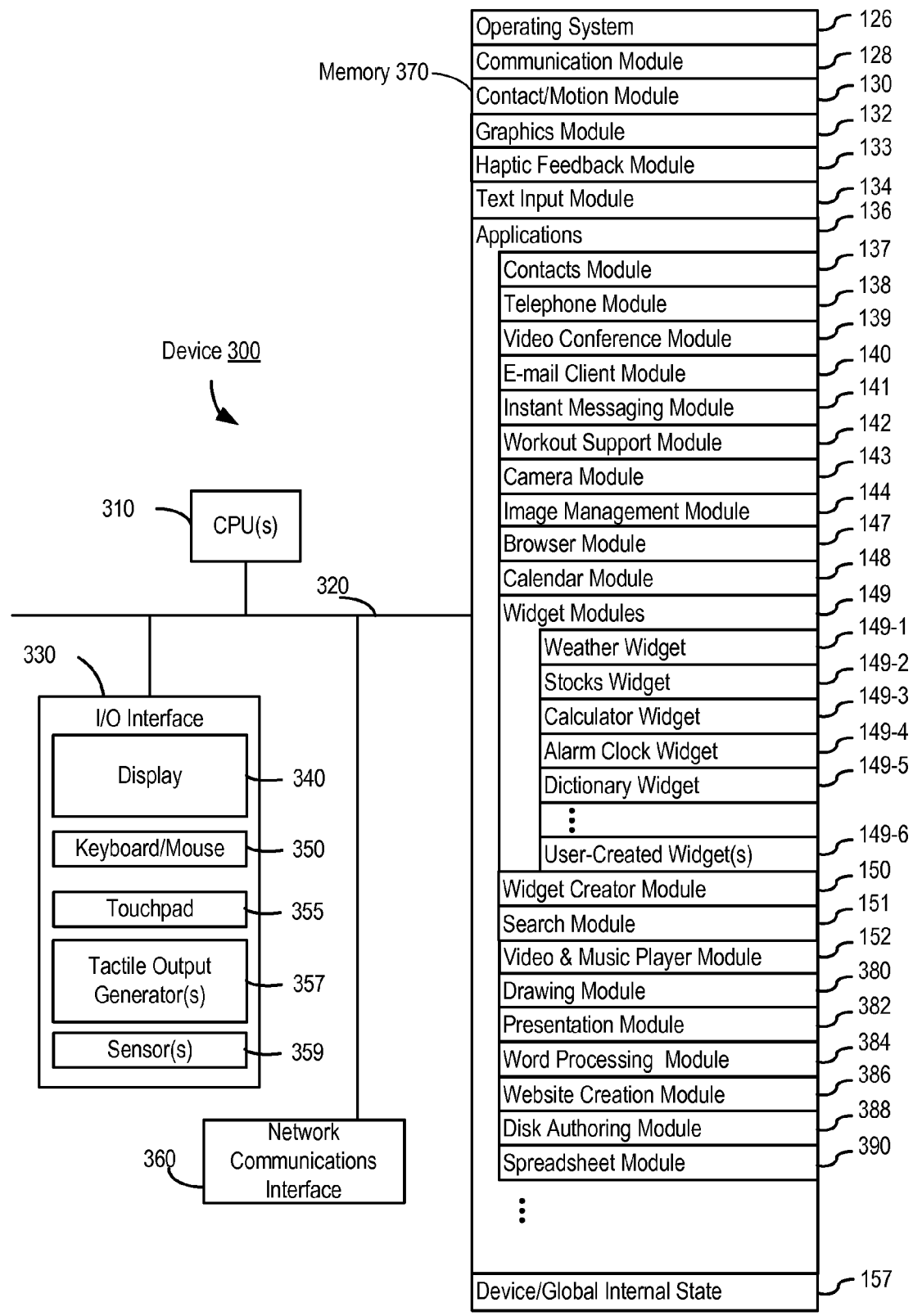
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod® (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module 145;
  music player module 146;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module 145 and music player module 146;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web-pages or portions thereof, as well as attachments and other files linked to web-pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web-page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
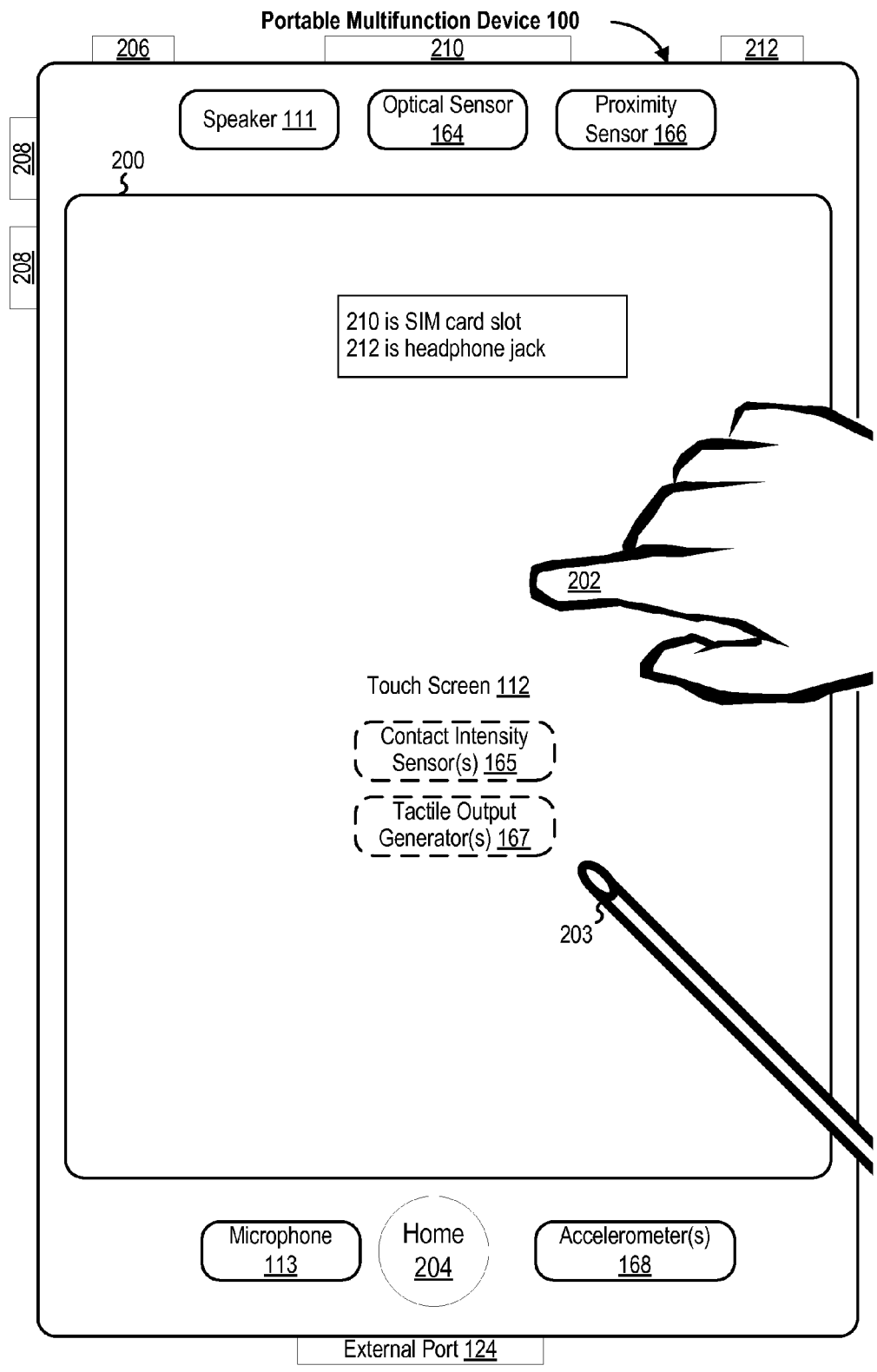
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
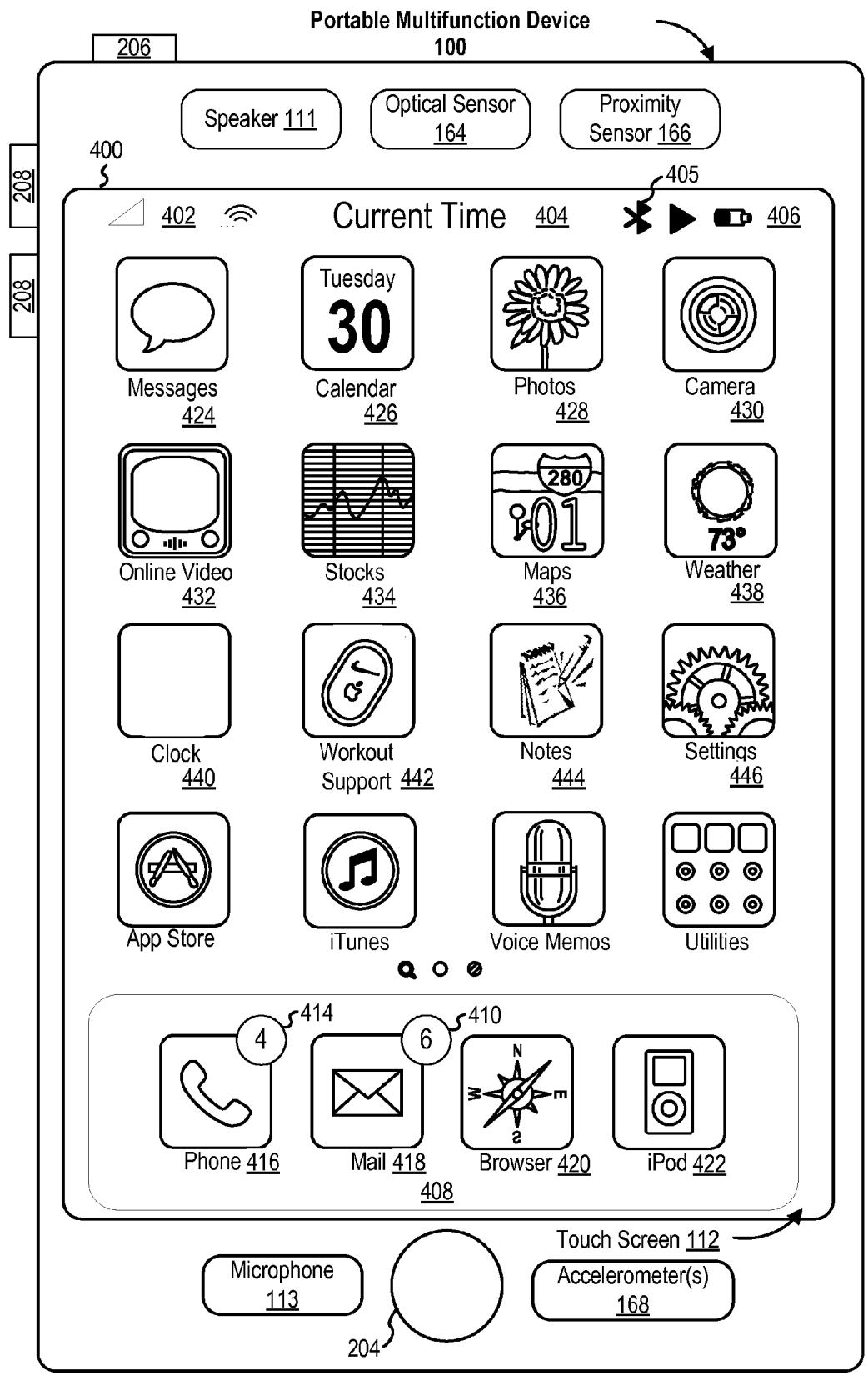
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icons 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
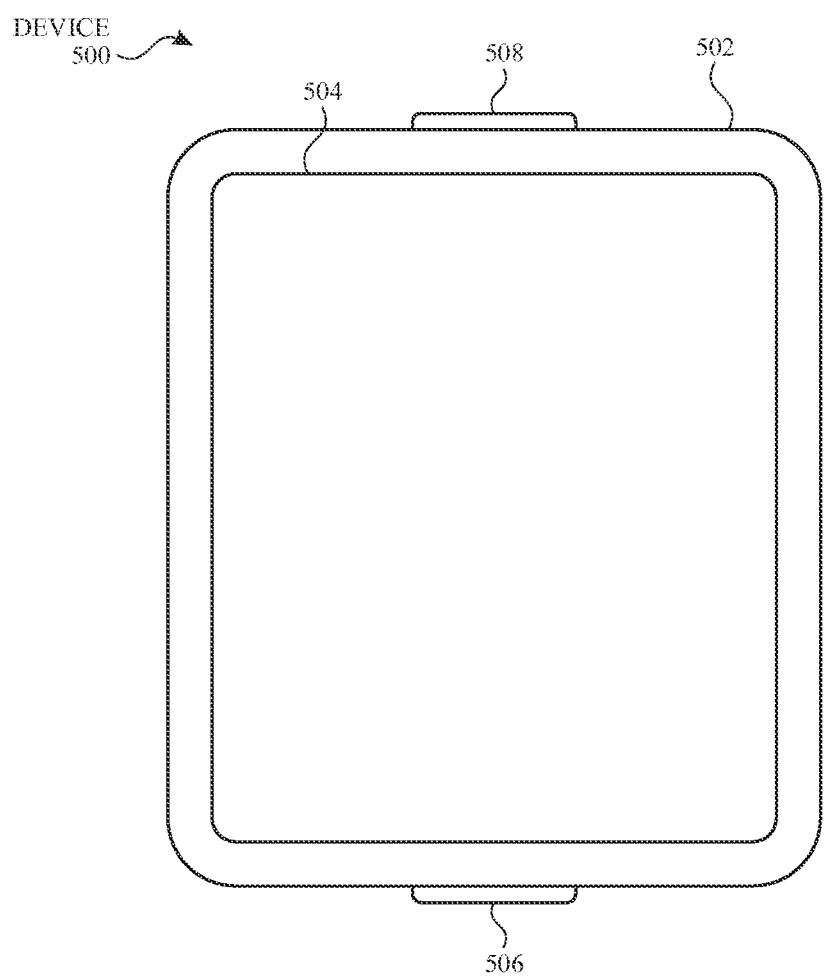
FIG. 5A illustrates a personal electronic device in accordance with some embodiments.

FIG. 5A illustrates exemplary personal electronic device 500. Device 500 includes body 502. In some embodiments, device 500 has touch-sensitive display screen 504. Alternatively, or in addition to touchscreen 504, device 500 has a display and a touch-sensitive surface. In some embodiments, touchscreen 504 (or the touch-sensitive surface) may have one or more intensity sensors for detecting intensity of contacts (e.g. touches) being applied. The one or more intensity sensors of touchscreen 504 (or the touch-sensitive surface) can provide output data that represents the intensity of touches. The user interface of device 500 can respond to touches based on their intensity, meaning that touches of different intensities can invoke different user interface operations on device 500.

In some embodiments, regardless of whether touchscreen 504 (or the touch-sensitive surface) has the above-described intensity sensors, device 500 can optionally communicate with a stylus having a pressure-sensitive tip that detects and provides data regarding the intensity of the stylus's touch on device 500, particularly touchscreen 504.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
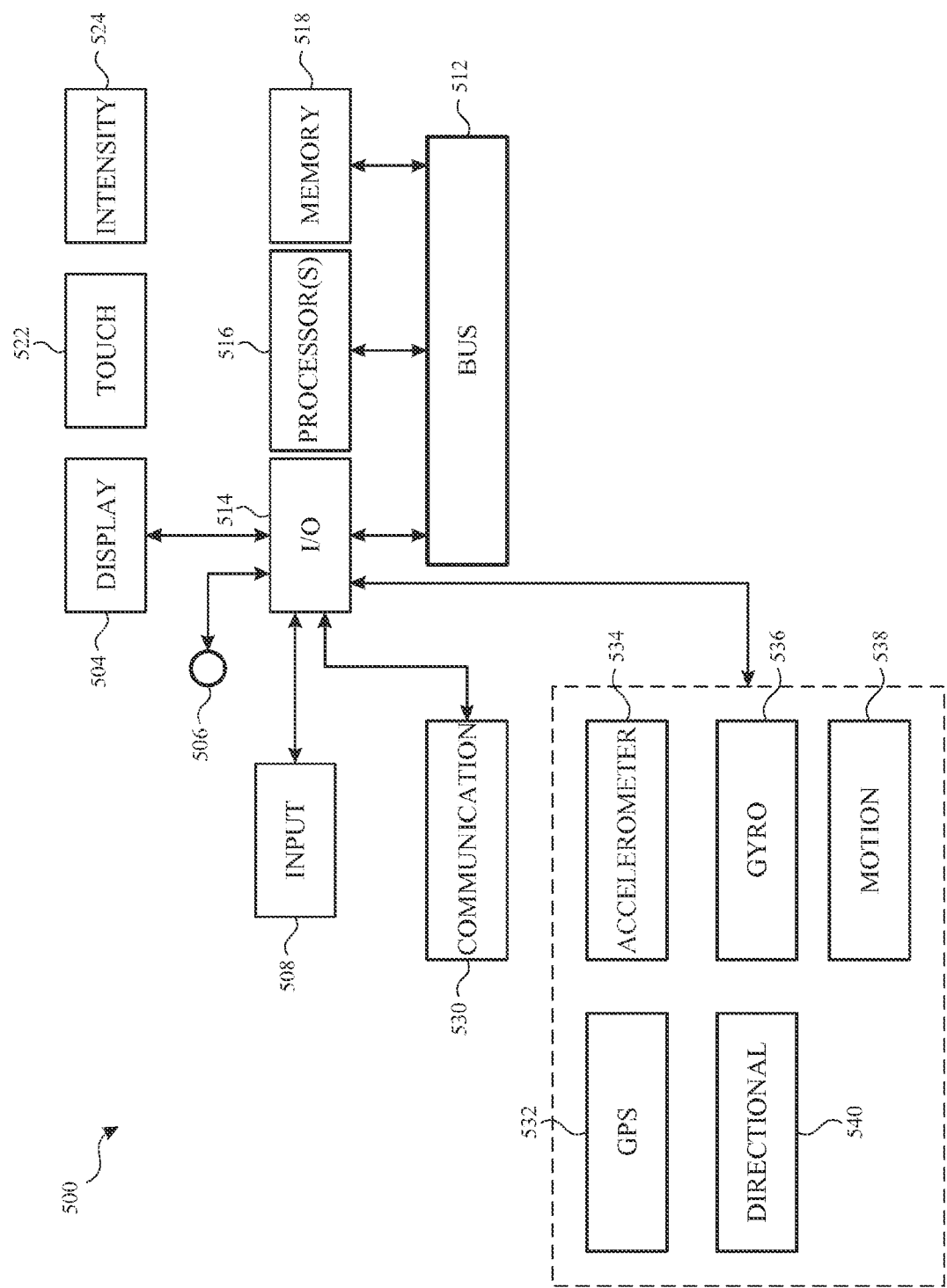
FIG. 5B is a block diagram illustrating a personal electronic device in accordance with some embodiments.

FIG. 5B depicts exemplary personal electronic device 500. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth™, near field communication ("NFC"), cellular and/or other wireless communication techniques. Device 500 can include input mechanisms 506 and/or 508. Input mechanism 506 may be a rotatable input device, for example. Input mechanism 508 may be a button, in some examples.

Input mechanism 508 may be a microphone, in some examples. Computing device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of computing device 500 can be a non-transitory computer readable storage medium, for storing computer-executable instructions, which, when executed by one or more computer processors 516, for example, can cause the computer processors to perform the techniques described above, including the processes of FIGS. 7, 9A, 9B, 11, 13K, 22, 31, 39, and 46. The computer-executable instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer readable storage medium" can be any medium that can tangibly contain or store computer-executable instructions for use by or in connection with the instruction execution system, apparatus, or device. The non-transitory computer readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Computing device 500 is not limited to the components and configuration of FIG. 5B, but can include other or additional components in multiple configurations.

Figure 5C:
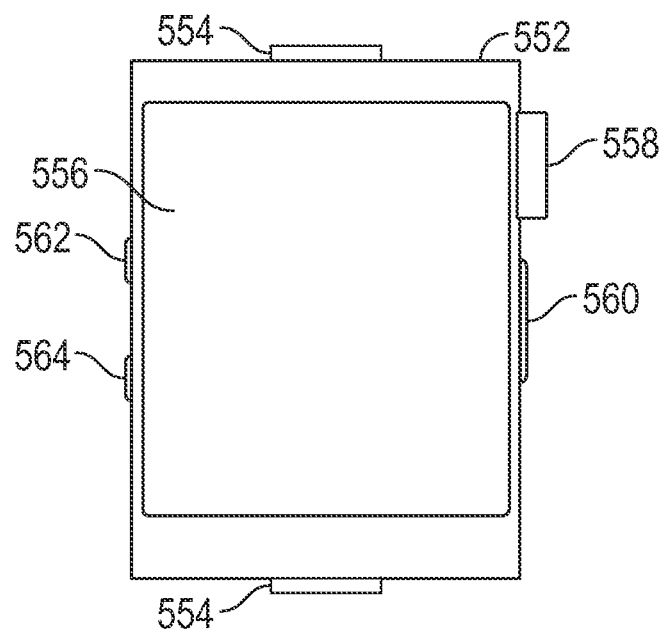
FIG. 5C illustrates an exemplary wearable electronic device according to various examples.

FIG. 5C illustrates exemplary personal electronic device 550. In the illustrated example, device 550 is a watch that generally includes body 552 and strap 554 for affixing device 550 to the body of a user. That is, device 550 is wearable. Body 552 can designed to couple with straps 554. Device 550 can have touch-sensitive display screen (hereafter touchscreen) 556 and crown 558. Device 550 can also have buttons 560, 562, and 564.

Conventionally, the term 'crown,' in the context of a watch, refers to the cap atop a stem for winding the watch. In the context of a personal electronic device, the crown can be a physical component of the electronic device, rather than a virtual crown on a touch sensitive display. Crown 558 can be mechanical, meaning that it can be connected to a sensor for converting physical movement of the crown into electrical signals. Crown 558 can rotate in two directions of rotation (e.g., forward and backward). Crown 558 can also be pushed in towards the body of device 550 and/or be pulled away from device 550. Crown 558 can be touch-sensitive, for example, using capacitive touch technologies that can detect whether a user is touching the crown. Moreover, crown 558 can further be rocked in one or more directions or translated along a track along an edge or at least partially around a perimeter of body 552. In some examples, more than one crown 558 can be used. The visual appearance of crown 558 can, but need not, resemble crowns of conventional watches. Buttons 560, 562, and 564, if included, can each be a physical or a touch-sensitive button. That is, the buttons may be, for example, physical buttons or capacitive buttons. Further, body 552, which can include a bezel, may have predetermined regions on the bezel that act as buttons.

Display 556 can include a display device, such as a liquid crystal display (LCD), light-emitting diode (LED) display, organic light-emitting diode (OLED) display, or the like, positioned partially or fully behind or in front of a touch sensor panel implemented using any desired touch sensing technology, such as mutual-capacitance touch sensing, self-capacitance touch sensing, resistive touch sensing, projection scan touch sensing, or the like. Display 556 can allow a user to perform various functions by touching over hovering near the touch sensor panel using one or more fingers or other object.

In some examples, device 550 can further include one or more pressure sensors (not shown) for detecting a force or pressure applied to the display. The force or pressure applied to display 556 can be used as an input to device 550 to perform any desired operation, such as making a selection, entering or exiting a menu, causing the display of additional options/actions, or the like. In some examples, different operations can be performed based on the amount of force or pressure being applied to display 556. The one or more pressure sensors can further be used to determine a position that the force is being applied to display 556.

Figure 5D:
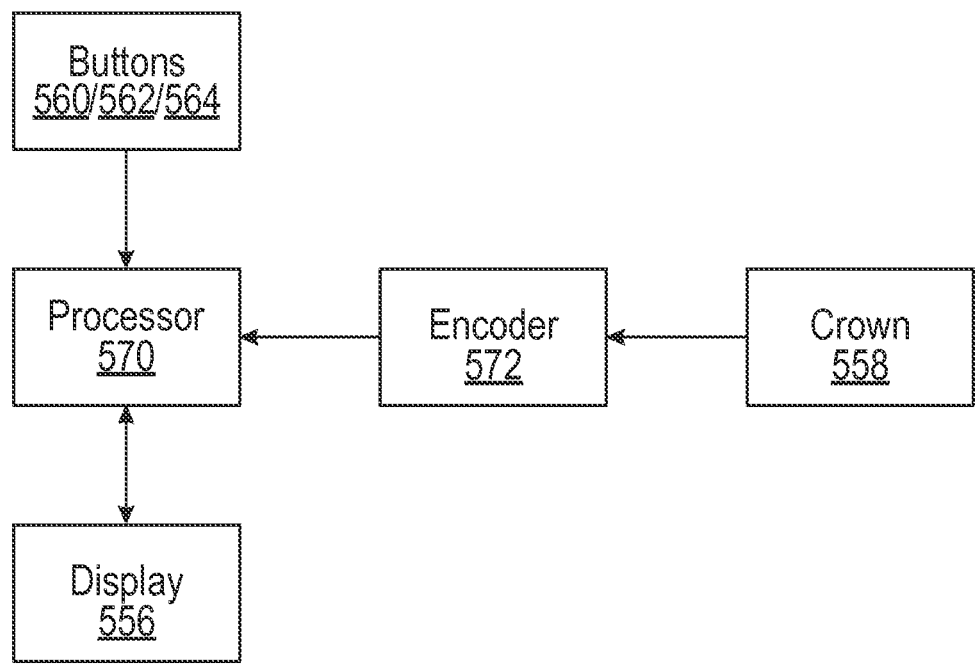
FIG. 5D illustrates a block diagram of an exemplary wearable electronic device according to various examples.

FIG. 5D illustrates a block diagram of some of the components of device 550. As shown, crown 558 can be coupled to encoder 572, which can be configured to monitor a physical state or change of state of crown 558 (e.g., the position of the crown), convert it to an electrical signal (e.g., convert it to an analog or digital signal representation of the position or change in position of crown 558), and provide the signal to processor 570. For instance, in some examples, encoder 572 can be configured to sense the absolute rotational position (e.g., an angle between 0-360°) of crown 558 and output an analog or digital representation of this position to processor 570. Alternatively, in other examples, encoder 572 can be configured to sense a change in rotational position (e.g., a change in rotational angle) of crown 558 over some sampling period and to output an analog or digital representation of the sensed change to processor 570. In these examples, the crown position information can further indicate a direction of rotation of the crown (e.g., a positive value can correspond to one direction and a negative value can correspond to the other). In yet other examples, encoder 572 can be configured to detect a rotation of crown 558 in any desired manner (e.g., velocity, acceleration, or the like) and can provide the crown rotational information to processor 570. In alternative examples, instead of providing information to processor 570, this information can be provided to other components of device 550. While the examples described herein refer to the use of rotational position of crown 558 to control scrolling, scaling, or an objects position, it should be appreciated that any other physical state of crown 558 can be used.

In some examples, the physical state of the crown can control physical attributes of display 556. For example, if crown 558 is in a particular position (e.g., rotated forward), display 556 can have limited z-axis traversal ability. In other words, the physical state of the crown can represent physical modal functionality of display 556. In some examples, a temporal attribute of the physical state of crown 558 can be used as an input to device 550. For example, a fast change in physical state can be interpreted differently than a slow change in physical state.

Processor 570 can be further coupled to receive input signals from buttons 560, 562, and 564, along with touch signals from touch-sensitive display 556. The buttons may be, for example, physical buttons or capacitive buttons. Further, body 552, which can include a bezel, may have predetermined regions on the bezel that act as buttons. Processor 570 can be configured to interpret these input signals and output appropriate display signals to cause an image to be produced by touch-sensitive display 556. While a single processor 570 is shown, it should be appreciated that any number of processors or other computational devices can be used to perform the general functions discussed above.

As used here, the term "affordance" refers to a user-interactive graphical user interface object that may be displayed on the display screen of device 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the third threshold results in a third operation. In some embodiments, a comparison between the characteristic intensity and one or more thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments the contact-detection intensity threshold is zero. In some embodiments the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of devices, user interfaces, and associated processes that may be implemented on a multifunction device, such as devices 100, 300, 500, and/or 550, to improve a user's experience in manipulating user interface objects.

FIGS. 6A-6F illustrate exemplary user interfaces for manipulating user interface objects using an electronic device, in accordance with some embodiments. In some embodiments, the electronic device is device 500. The electronic device has a display (e.g., 112, 340, 504) and a rotatable input mechanism (e.g., 506).

Figure 6A:
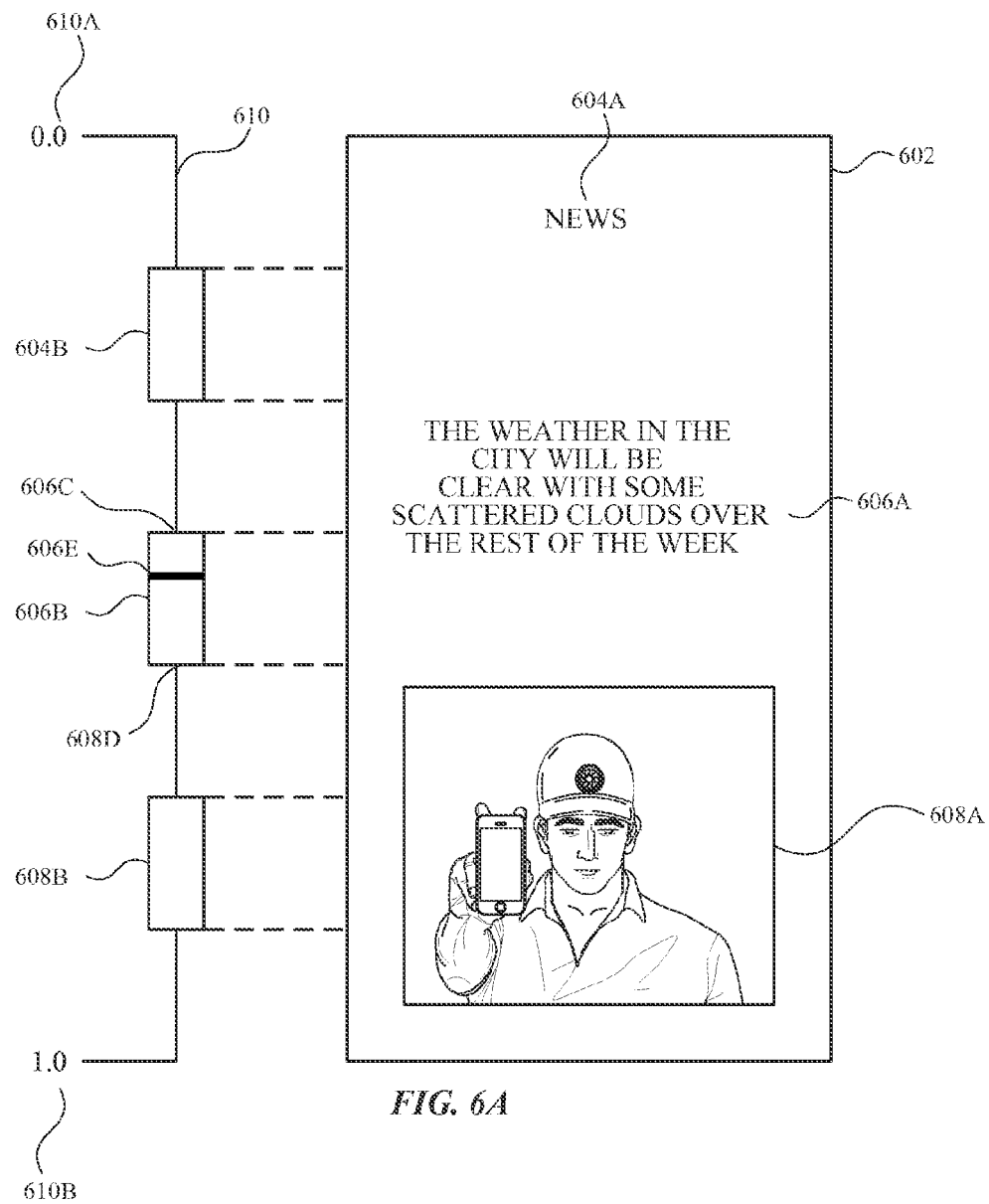
FIGS. 6A-6F illustrate exemplary user interfaces for manipulating a user interface object in accordance with some embodiments.

FIG. 6A illustrates a document 602, which is an example of a user interface object. Document 602 includes a title 604A, a paragraph of body text 606A, and an image 608A. The electronic device is configured to allow a user to scroll through document 602, such that only a portion of the document 602 is visible on the display (e.g., 504) at a particular time. The scroll position of the document is a characteristic of the document. The value of the scroll position of the document changes as the document is scrolled.

The user interface figures described optionally include a series (e.g., 610) that shows the range of the characteristic of the object. These series are typically not part of the displayed user interface, but are provided to aid in the interpretation of the figures. In this example, the scroll position of the document can range from 0.0 to 1.0, as illustrated in the series 610 having a scroll position (e.g., the characteristic) ranging between 0.0 (e.g., 610A) to 1.0 (e.g., 610B).

In this example, the series 610 includes various subsets of the range of the series 610, which modify how the object's characteristic is manipulated by a user. Subset 604B, subset 606B, and subset 608B are illustrated in FIG. 6A. As with the series, subsets illustrated in the figures are typically not part of the displayed user interface, but are provided to aid in the interpretation of the figures. For example, the range of subset 606B is from 606C (e.g., scroll position value of 0.42) to 606D (e.g., scroll position value of 0.56) on the series 610. The scrolling behavior of the document 602 varies when the value of the scroll position of the document 602 is within the range of the subset 606B, as compared to scrolling behavior just prior to entry into the range of subset 606B. In some embodiments, scrolling behavior of the document varies between a first behavior when the scroll position is within the range of any of subsets 604B, 606B, and 608B, as compared to a second behavior when the scroll position is not within any of the subsets. In some embodiments, scrolling behavior is different for each of the subsets 604B, 606B, and 608B as compared to each other and as compared to scrolling behavior when outside any subset.

Figure 6B:
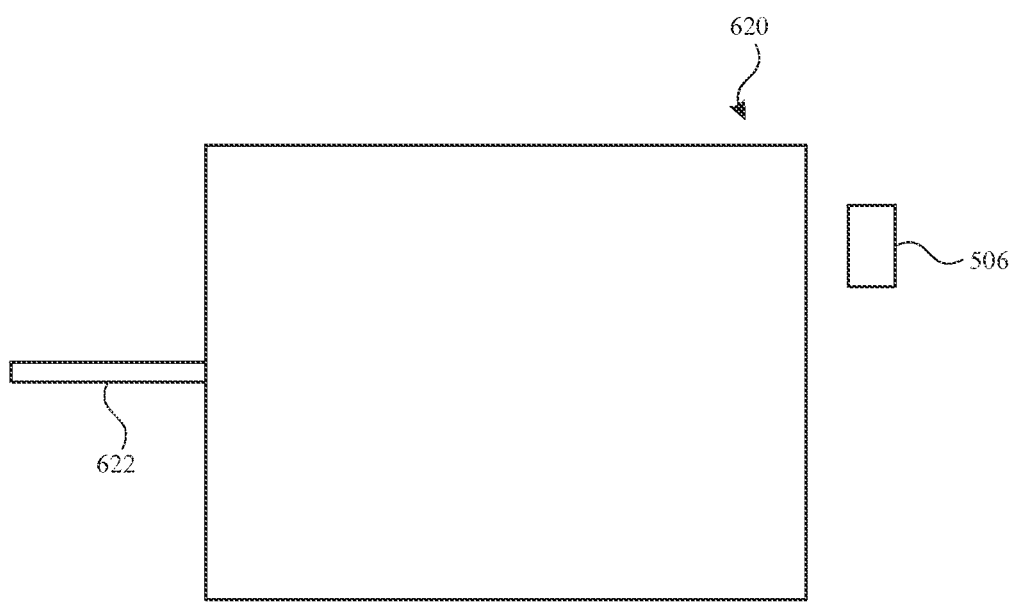

FIG. 6B illustrates a viewable display area 620, a rotatable input mechanism (e.g., 506), and a scroll value indicator 622 of an electronic device (e.g., device 500). The viewable display area 620 encompasses an exemplary area identifying the displayed user interface. For example, display area 620 illustrates the portion of the document 602 that is displayed on the display when the document 602 is scrolled using the rotatable input mechanism 506. The scroll value indicator 622 helps in the interpretation of the figures by illustrating the value of the scroll position of the document 602, as will be described in relation to FIGS. 6C-6E. The scroll value indicator 622 is typically not part of the displayed user interface.

Figure 6C:
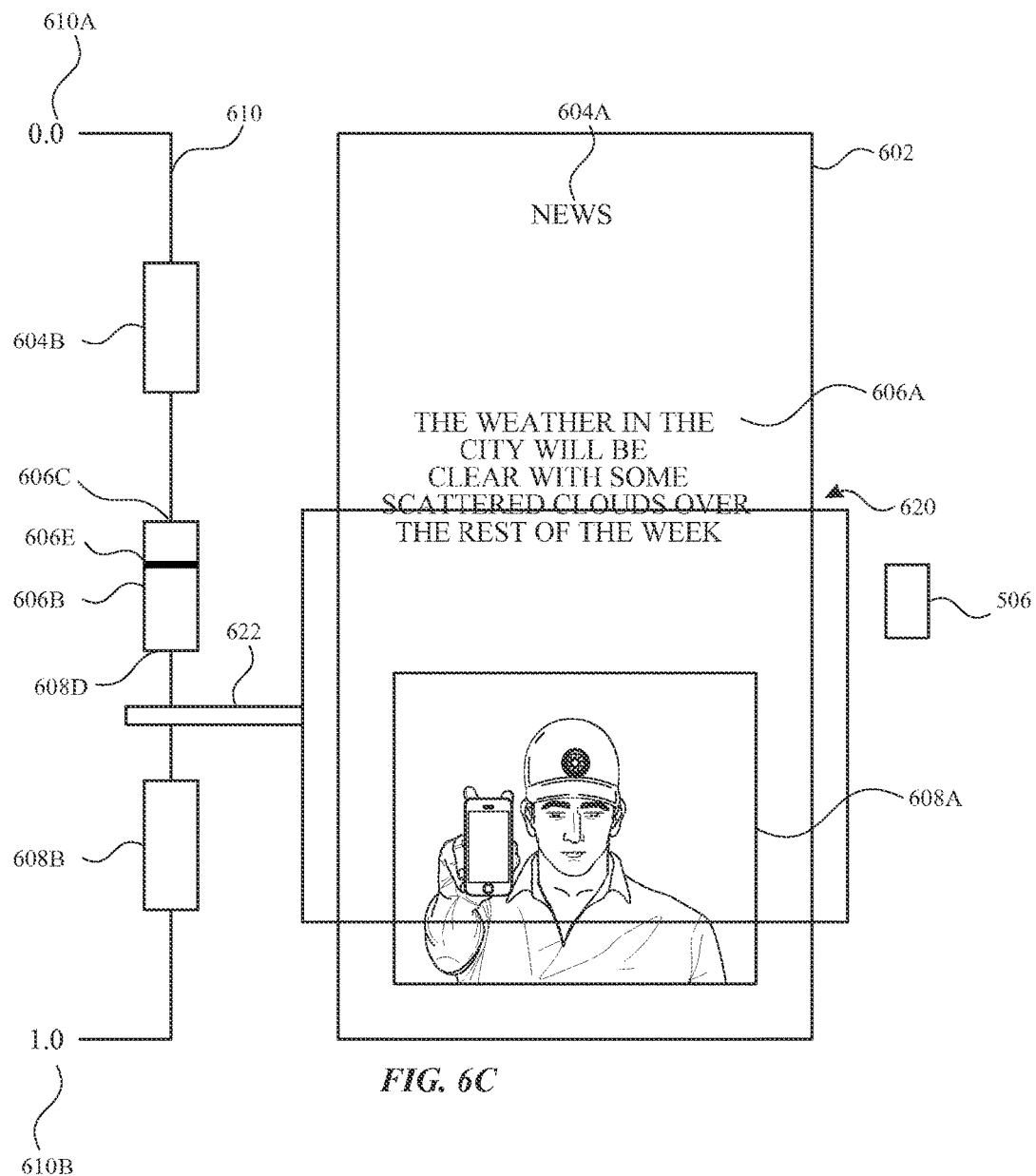

FIG. 6C illustrates the viewable portion of document 602, as illustrated by display area 620. In FIG. 6C, the value of the scroll position of the document is illustrated by scroll value indicator 622 (e.g., scroll position value of 0.63). The device displays, on the display, the object (e.g., document 602) in accordance with a value (e.g., scroll position value of 0.63 in FIG. 6C) of a characteristic (e.g., scroll position) of the object, the value being within a range of values of the characteristic (e.g., within the series 610 ranging from 0.0 to 1.0). In other examples, the characteristic of the object may be, for example, the zoom size (e.g., magnification) of the object or the degree of rotation of the object.

The device receives a user input request, the user input request representing rotation of the rotatable input mechanism (e.g., 506). For example, the user rotates the rotatable input mechanism 506 in order to change the scroll position of the document 602.

The device determines whether the value (e.g., the scroll position value) of the characteristic (e.g., scroll position) of the object (e.g., 602) is within a predetermined subset (e.g., within the range of subset 606B) of the range of values (e.g., 610) of the characteristic.

Figure 6D:
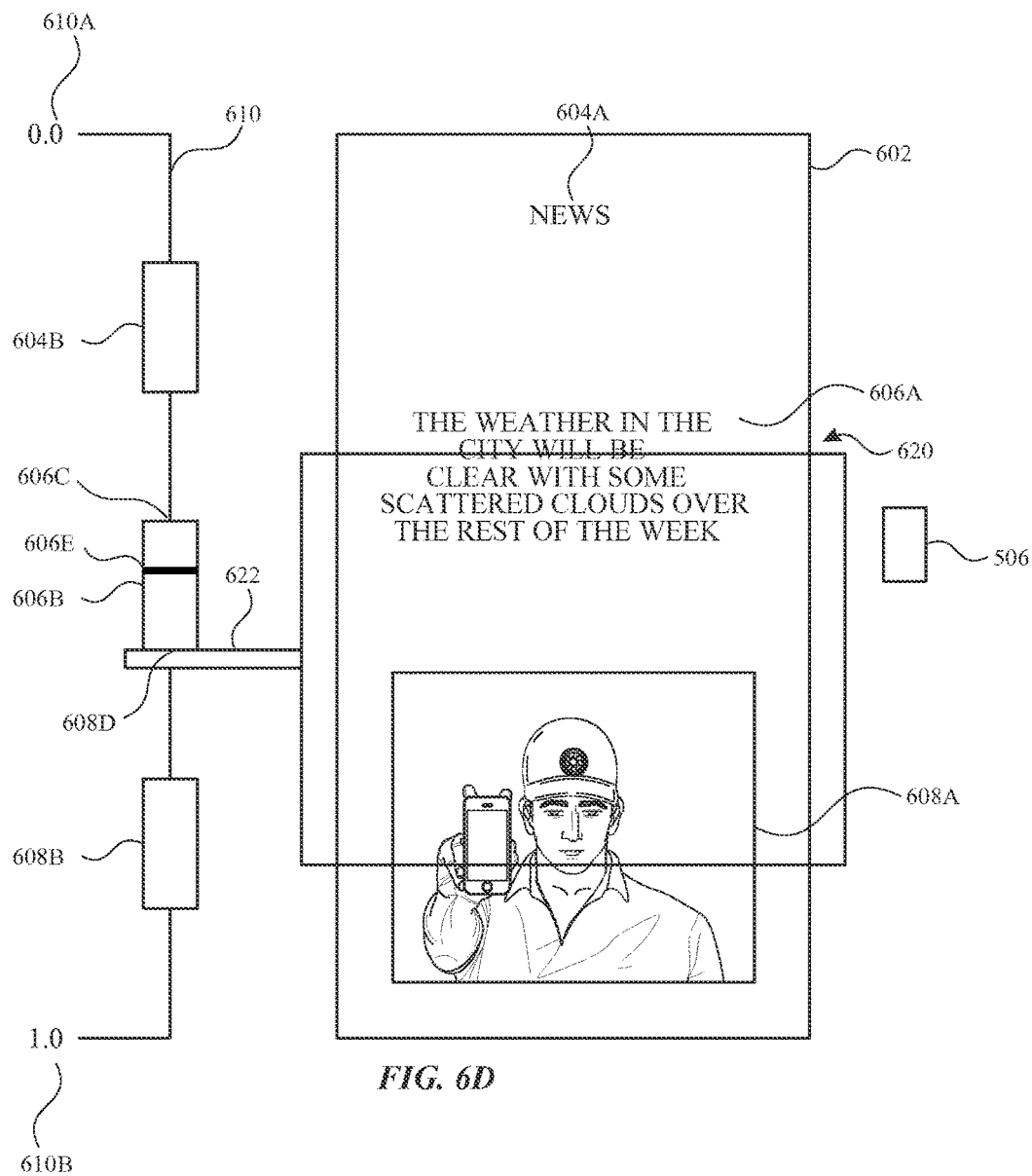

In accordance with a determination that the value (e.g., scroll position value) of the characteristic (e.g., scroll position) of the object (e.g., 602) is not within the predetermined subset of the range of values of the characteristic, the device updates the value (e.g., scroll position value) of the characteristic (e.g., scroll position) of the object within the range of values of the characteristic based on the user input request and in accordance with a second function, as illustrated in FIGS. 6C-6D.

Figure 6E:
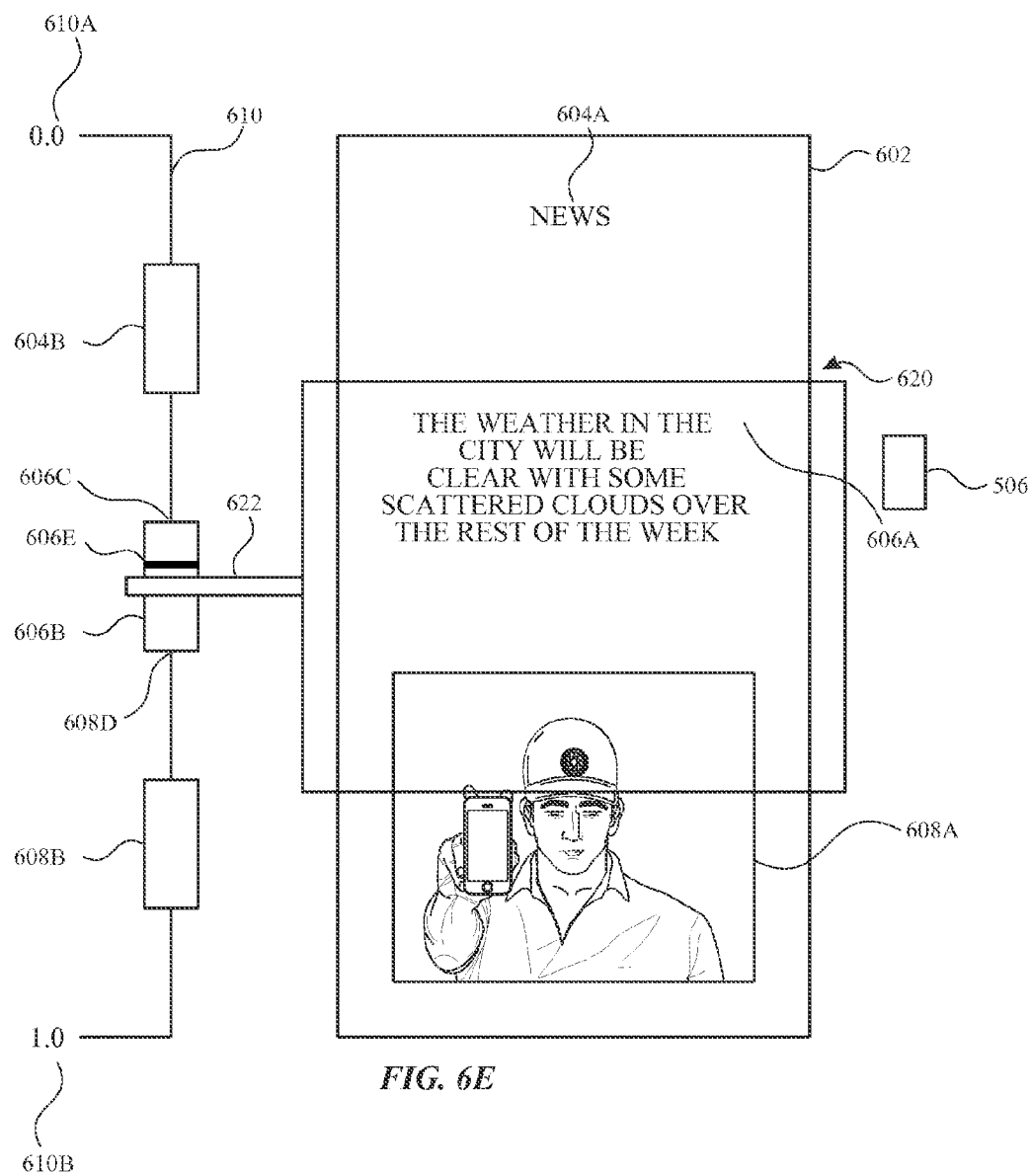

In accordance with a determination that the value (e.g., scroll position value) of the characteristic (e.g., scroll position) of the object (e.g., 602) is within the predetermined subset (e.g., 606B) of the range of values of the characteristic, the device updates the value (e.g., scroll position value) of the characteristic (e.g., scroll position) of the object within the range of values of the characteristic based on the user input request and in accordance with a first function, as illustrated in FIG. 6E. The first function and the second function are different functions.

Thus, as the user rotates the rotatable input mechanism, document 602 begins to scroll on the display. As illustrated in FIGS. 6C-6D, during certain portions of the scroll (e.g., while not within subsets 604B, 606B, and 606C), the scrolling occurs based on the second function. As illustrated in FIG. 6E, during other portions of the scroll (e.g., while within subset 606B), the scrolling occurs based on the first function. For example, a particular rotation of the rotatable input mechanism can be used to scroll through the entire range between subsets 608B and 606B (e.g., starting at scroll position value 0.70 and scrolling from 0.70 to 0.56 based on the second function). However, the same particular rotation of the rotatable input mechanism may only scroll through a portion of the subset 608B (e.g., starting at scroll position value 0.56 and scrolling from 0.56 to 0.53 based on the first function). By reducing the amount that the document is scrolled while within a subset (e.g., 606B), the device provides higher resolution (and therefore more precision) for scrolling through those portions of the document; doing so may also encourage increased user dwell-time on certain portions of the document. In some embodiments, the subsets can be configured to align with particular aspects of the document, such as title 604A, paragraph of body text 606A, and image 608A, in order to more allow for more precise scrolling through those aspects of the document.

Figure 6F:
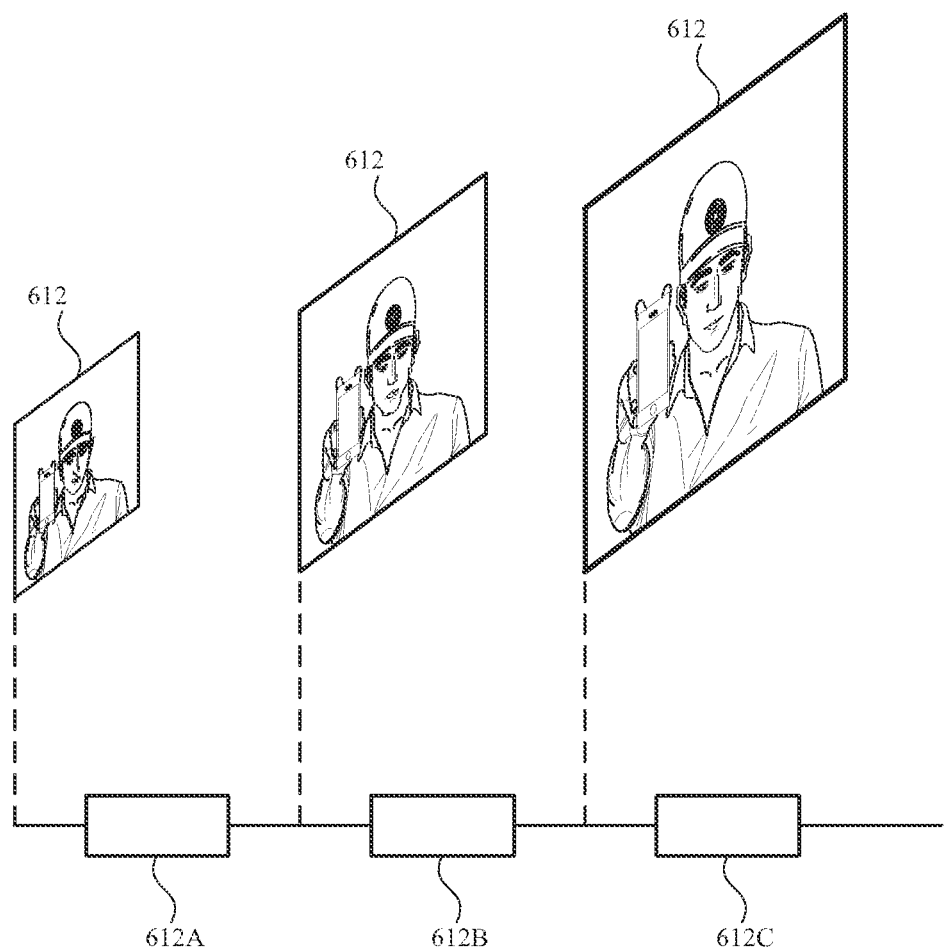

FIG. 6F illustrates manipulating the zoom of an object (e.g., an image 612). The image (e.g., 612) is displayed in accordance with a value (e.g., zoom size value) of a characteristic (e.g., zoom size) of the object, the value being within a range of values of the characteristic (e.g., along series 614). In this example, the subsets 612A, 612B, 612C may be used to speed up the change in the characteristic. Thus, as the user rotates the rotatable input mechanism, the image zooms according to different zoom size values. While the zoom size values are within subsets 612A, 612B, 612C, the progression along series 612 happens quickly (e.g., a slight turn of the rotatable input mechanism changes the zoom of the image significantly). While the zoom size values are not within subsets 612A, 612B, 612C, the progression along series 612 happens slowly (e.g., even a significant turn of the rotatable input mechanism only slight changes the zoom of the image). As a result, the device provides higher resolution (and therefore more precision) for zooming through certain zoom size values.

When the image reaches the minimum (e.g., 0.0) zoom size, the image may shrink to less than the 0.0 level of zoom before returning to the 0.0 level of zoom. This rubberbanding effect provides an indication to the user that the minimum zoom limit has been reached. Similarly, when the image reaches the maximum (e.g., 1.0) zoom size, the image may enlarge beyond the 1.0 level of zoom before returning to the 1.0 level of zoom. This rubberbanding effect provides an indication to the user that the maximum zoom limit has been reached.

In accordance with some embodiments, updating display of the object (e.g., 602, 612) in accordance with the updated value of the characteristic (e.g., scroll position, zoom size) of the object comprises animating the object to reflect the updated value of the characteristic of the object (e.g., animate the document scrolling or animate the object zooming).

In accordance with some embodiments, the predetermined subset of the range of values (e.g., 606B) of the characteristic includes an intermediate value (e.g., 606E), the intermediate value being inclusively within the predetermined subset of the range of values of the characteristic (e.g., a value between and inclusive of the start value and the end value). The first function is based on the intermediate value (e.g., 606E) of the subset of the range of values. Thus, for example, the behavior of the characteristic (e.g., the scroll behavior or zoom behavior), changes based on distance to the intermediate value. In accordance with some embodiments, the intermediate value of the predetermined subset (e.g., 606B) of the range of values of the characteristic is the mid-range value.

In accordance with some embodiments, the first function is based on a difference between the value of the characteristic of the object and the intermediate value. Thus, as an example, the precision with which the document can be scrolled increases as the document is scrolled closer to the center of the predetermined subset and the precision with which the document can be scrolled decreases again as the document is scrolled away from the center of the predetermined subset. For example, while the document scroll position is further from the intermediate value, an incremental rotation of the rotatable input mechanism causes more scrolling than the same incremental rotation of the rotatable input mechanism, while the document scroll position is closer to the intermediate value.

In accordance with some embodiments, the updated value is based on an attribute of the user input request. In accordance with some embodiments, the attribute of the user input request is one or more of angular velocity of the rotatable input mechanism and angular acceleration of the rotatable input mechanism.

In accordance with some embodiments, updating the value (e.g., scroll position value or zoom size value) of the characteristic (e.g., scroll position, zoom size) of the object (e.g., 602, 612) within the range of values of the characteristic based on the user input request and in accordance with the second function comprises: determining whether the value (e.g., scroll position value, zoom size value) of the characteristic (e.g., scroll position, zoom size) of the object is within a second predetermined subset (e.g., 608B) of the range of values of the characteristic, wherein the predetermined subset (e.g., 606B) and the second predetermined subset (e.g., 608B) are different. In accordance with a determination that the value (e.g., scroll position value or zoom size value) of the characteristic (e.g., scroll position, zoom size) of the object is within the second predetermined subset of the range of values of the characteristic, further updating the value of the characteristic of the object within the range of values of the characteristic based on the user input request and in accordance with a third function. The first function, the second function, and the third function are different functions. Thus, in one example, different predetermined subsets can cause varying behaviors. In another example, two or more predetermined subsets may overlap, and their effects combine for the overlapped range.

In accordance with some embodiments, the range of values of the characteristic is along a single dimension (e.g., the range is not a multi-dimension X-Y range). In accordance with some embodiments, the range of values of the characteristic is a linear series.

In accordance with some embodiments, in accordance with a determination that the value (e.g., scroll position value, zoom size value) of the characteristic (e.g., scroll position, zoom size) of the object (e.g., 602, 612) is within the predetermined subset (e.g., 606B, 612B) of the range of values of the characteristic, the device performs a haptic alert at the electronic device, such as a mechanical (e.g., tactile feedback) or audible (e.g., audio file playback) haptic alert.

In accordance with some embodiments, the object is selected from the group consisting of a document and an image. Examples of a document include, but are not limited to: a message, a text message, a text message conversation, an email, a presentation, a spreadsheet, a user editable file (e.g., a word processing file), a user ineditable file (e.g., a PDF file), a webpage, a list of items (e.g., list of contacts, list of music, list of calendar events, list of messages, list of files, list of folders). In accordance with some embodiments, the characteristic of the object is selected from the group consisting of scroll position (e.g., how far up/down or left/right is the object scrolled), zoom size (e.g., how large/small is magnification of the document), and degree of rotation (e.g., how many radians is the object rotated). In accordance with some embodiments, the characteristic of the object is scroll position and the predetermined subset of the range of values of the characteristic is a range of scroll positions. In accordance with some embodiments, the characteristic of the object is zoom size and the predetermined subset of the range of values of the characteristic is a range of zoom sizes.

Figure 7:
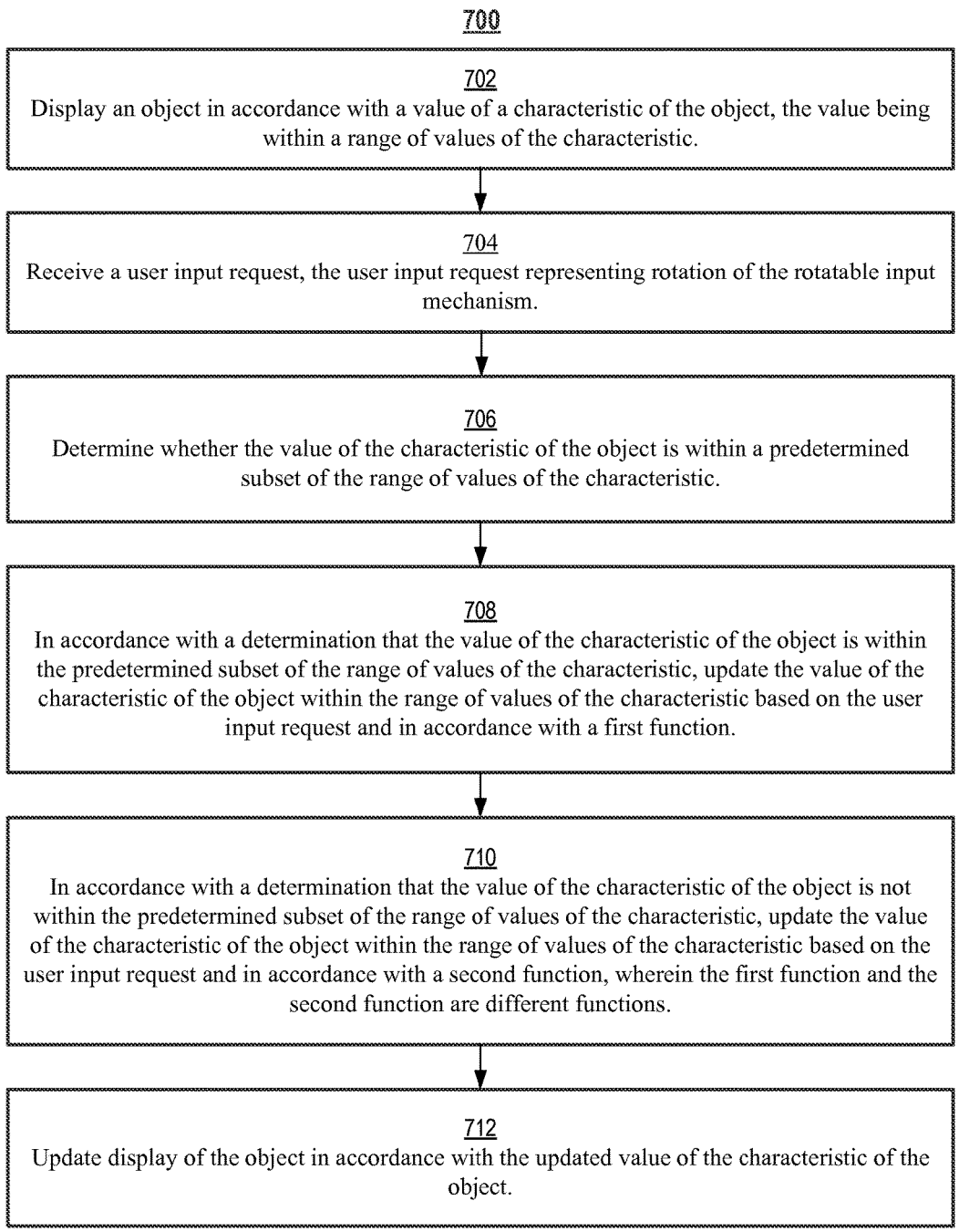
FIG. 7 is a flow diagram illustrating an exemplary process for manipulating a user interface object in accordance with some embodiments.

FIG. 7 is a flow diagram illustrating an exemplary process for manipulating user interface objects in accordance with some embodiments. In some embodiments, method 700 may be performed at an electronic device with a display (e.g., 112, 340, 504) and a rotatable input mechanism (e.g., 506). Some operations in method 700 may be combined, the order of some operations may be changed, and some operations may be omitted. Exemplary devices that may perform method 700 include devices 100, 300, 500, and/or 550 (FIGS. 1A, 3, 5A, and 5C).

Method 700 provides an intuitive way to manipulate user interface objects. The method reduces the cognitive burden on a user when using a device to manipulate a user interface object, such as scrolling, zooming, or rotating an object, thereby creating a more efficient human-machine interface. For battery-operated computing devices, enabling a user to manipulate user interface objects more efficiently conserves power and increases the time between battery charges.

At block 702, an object (e.g., document 602) is displayed in accordance with a value (e.g., scroll position value of 0.63 in FIG. 6C) of a characteristic (e.g., scroll position) of the object (e.g., document 602), the value being within a range of values (e.g., range 0.0 to 1.0 of series 610) of the characteristic (e.g., scroll position).

At block 704, a user input request is received. The user input request represents rotation of the rotatable input mechanism (e.g., 506).

At block 706, it is determined whether the value (e.g., scroll position value or zoom size value) of the characteristic (e.g., scroll position or zoom size) of the object is within a predetermined subset of the range of values of the characteristic (e.g., within 604B, 606B, or 608B).

At block 708, in accordance with a determination that the value (e.g., scroll position value or zoom size value) of the characteristic (e.g., scroll position or zoom size) of the object is within the predetermined subset of the range of values of the characteristic (e.g., indicator 622 is within subset 608D in FIGS. 6D-6E), the value (e.g., scroll position value or zoom size value) of the characteristic (e.g., scroll position or zoom size) of the object is updated within the range of values of the characteristic based on the user input request and in accordance with a first function.

At block 710, in accordance with a determination that the value (e.g., scroll position value or zoom size value) of the characteristic (e.g., scroll position or zoom size) of the object (e.g., document 602) is not within the predetermined subset of the range of values of the characteristic (e.g., indicator 622 is not within any subsets, as in FIG. 6C), updating the value (e.g., scroll position value or zoom size value) of the characteristic of the object within the range of values of the characteristic based on the user input request and in accordance with a second function, wherein the first function and the second function are different functions.

At block 712, display of the object (e.g., document 602) is updated in accordance with the updated value of the characteristic of the object (e.g., to reflect the scroll on the display).

In accordance with some embodiments, updating display of the object (e.g., 602, 612) in accordance with the updated value of the characteristic (e.g., scroll position, zoom size) of the object comprises animating the object to reflect the updated value of the characteristic of the object (e.g., animate the document scrolling or animate the object zooming).

In accordance with some embodiments, the predetermined subset of the range of values (e.g., 606B) of the characteristic includes an intermediate value (e.g., 606E), the intermediate value being inclusively within the predetermined subset of the range of values of the characteristic (e.g., a value between and inclusive of the start value and the end value). The first function is based on the intermediate value (e.g., 606E) of the subset of the range of values. In accordance with some embodiments, the intermediate value of the predetermined subset (e.g., 606B) of the range of values of the characteristic is the mid-range value.

In accordance with some embodiments, the first function is based on a difference between the value of the characteristic of the object and the intermediate value. In accordance with some embodiments, the updated value is based on an attribute of the user input request. In accordance with some embodiments, the attribute of the user input request is one or more of angular velocity of the rotatable input mechanism and angular acceleration of the rotatable input mechanism.

In accordance with some embodiments, updating the value (e.g., scroll position value or zoom size value) of the characteristic (e.g., scroll position, zoom size) of the object (e.g., 602, 612) within the range of values of the characteristic based on the user input request and in accordance with the second function comprises: determining whether the value (e.g., scroll position value, zoom size value) of the characteristic (e.g., scroll position, zoom size) of the object is within a second predetermined subset (e.g., 608B) of the range of values of the characteristic, wherein the predetermined subset (e.g., 606B) and the second predetermined subset (e.g., 608B) are different. In accordance with a determination that the value (e.g., scroll position value or zoom size value) of the characteristic (e.g., scroll position, zoom size) of the object is within the second predetermined subset of the range of values of the characteristic, further updating the value of the characteristic of the object within the range of values of the characteristic based on the user input request and in accordance with a third function. The first function, the second function, and the third function are different functions.

In accordance with some embodiments, the range of values of the characteristic is along a single dimension (e.g., the range is not a multi-dimension X-Y range). In accordance with some embodiments, the range of values of the characteristic is a linear series.

In accordance with some embodiments, in accordance with a determination that the value (e.g., scroll position value, zoom size value) of the characteristic (e.g., scroll position, zoom size) of the object (e.g., 602, 612) is within the predetermined subset (e.g., 606B, 612B) of the range of values of the characteristic, the device performs a haptic alert at the electronic device, such as a mechanical (e.g., tactile feedback) or audible (e.g., audio file playback) haptic alert.

In accordance with some embodiments, the object is selected from the group consisting of a document and an image. Examples of a document include, but are not limited to: a message, a text message, a text message conversation, an email, a presentation, a spreadsheet, a user editable file (e.g., a word processing file), a user ineditable file (e.g., a PDF file), a webpage, a list of items (e.g., list of contacts, list of music, list of calendar events, list of messages, list of files, list of folders). In accordance with some embodiments, the characteristic of the object is selected from the group consisting of scroll position (e.g., how far up/down or left/right is the object scrolled), zoom size (e.g., how large/small is magnification of the document), and degree of rotation (e.g., how many radians is the object rotated). In accordance with some embodiments, the characteristic of the object is scroll position and the predetermined subset of the range of values of the characteristic is a range of scroll positions. In accordance with some embodiments, the characteristic of the object is zoom size and the predetermined subset of the range of values of the characteristic is a range of zoom sizes.

In accordance with some embodiments, analysis of the object is not required to specify the subsets. For example, the subsets may be associated with the object (e.g., embedded in the document) prior to the object being accessed at the device. Such predefined subsets may be manually specified by the author of the object.

The subsets described in relation to FIGS. 6-7 (e.g., 604B, 606B, 608B, 612A, 612B, 612C) have the technical advantage of allowing coarse input to be translated to precise control. Certain portions of documents (or certain zoom sizes, certain degrees of rotation) can be made easier or more difficult to move through or move away from, facilitating the process of directing the user's focus. Further, the subsets of a particular object may have different properties, such as different size of ranges. The subsets can be used to direct the "flow" through a document to allow for curation.

Note that details of the processes described above with respect to method 700 (FIG. 7) are also applicable in an analogous manner to the methods described above and below. For example, method 700 may include one or more of the characteristics of the various methods described above with reference to the processes in FIGS. 9A, 9B, 11, 13K, 22, 31, 39, and 46. For brevity, these details are not repeated below.

It should be understood that the particular order in which the operations in FIG. 11 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of the methods and processes described throughout this description may be incorporated with one another.

FIGS. 8A-8F illustrate exemplary user interfaces for manipulating user interface objects using an electronic device, in accordance with some embodiments. In some embodiments, the electronic device is device 500. The electronic device has a display (e.g., 112, 340, 504) and a rotatable input mechanism (e.g., 506).

Figure 8A:
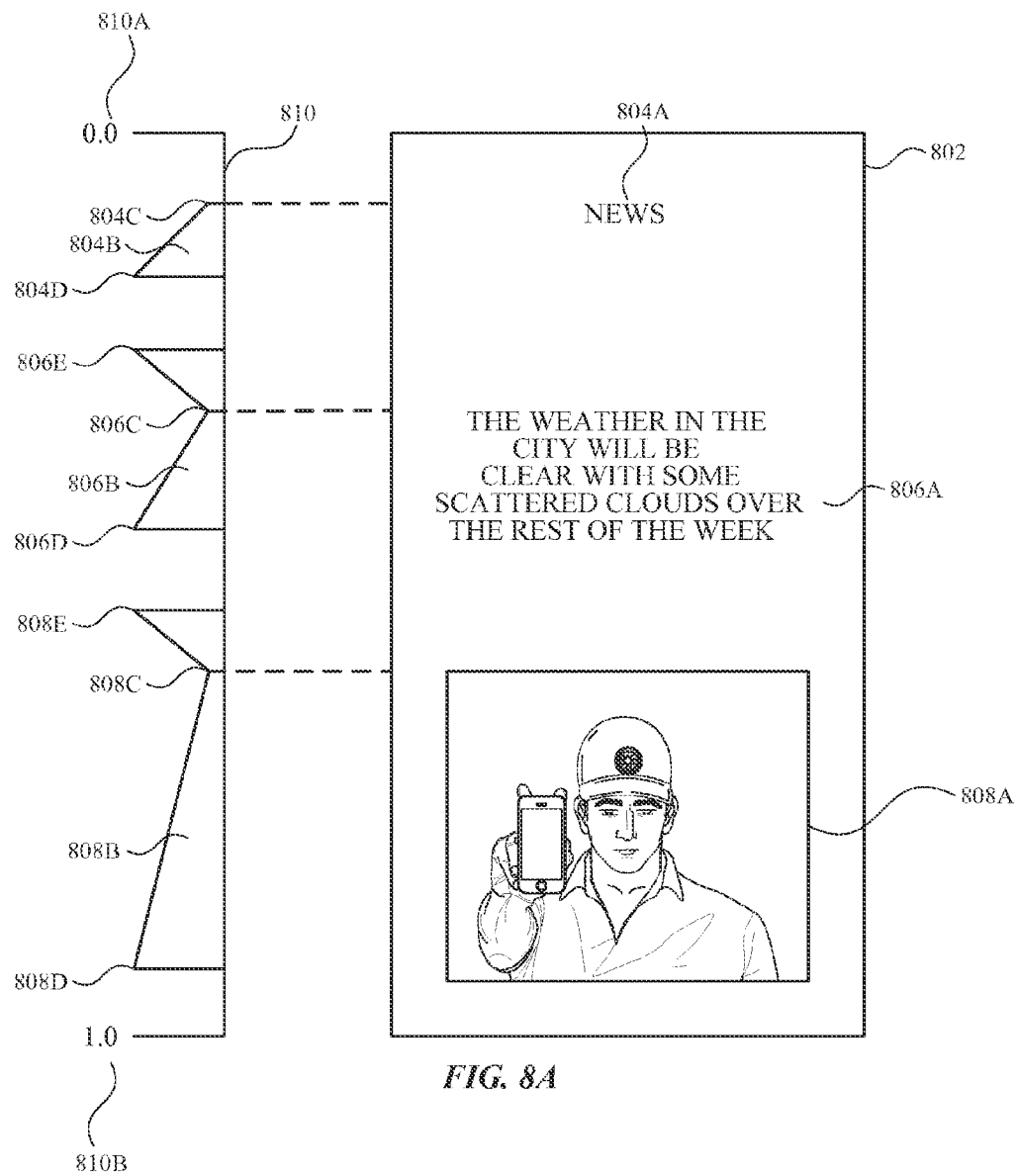
FIGS. 8A-8F illustrate exemplary user interfaces for manipulating a user interface object in accordance with some embodiments.

FIG. 8A illustrates a document 802, which is an example of a user interface object. Document 802 includes a title 804A, a paragraph of body text 806A, and an image 808A. In some embodiments, the electronic device is configured to allow a user to scroll through document 802, such that only a portion of the document 802 is visible on the display (e.g., 504) at a particular time. The scroll position of the document 802 is a characteristic of the document. The value of the scroll position of the document changes as the document is scrolled.

The user interface figures described optionally include a series (e.g., 810) that shows the range of the characteristic of the object. These series are typically not part of the displayed user interface, but are provided to aid in the interpretation of the figures. In this example, the scroll position of the document can range from 0.0 to 1.0, as illustrated in the series 810 having a scroll position (e.g., the characteristic) ranging between 0.0 (e.g., 810A) to 1.0 (e.g., 810B).

In this example, the series 810 includes various anchors within the range of the series 810, which modify how the object's characteristic is manipulated by a user. Anchor 804B, anchor 806B, and anchor 808B are illustrated in FIG. 8A. As with the series, anchors illustrated in the figures are typically not part of the displayed user interface, but are provided to aid in the interpretation of the figures. For example, the zone of anchor 806B is from 806E (e.g., scroll position value of 0.25) to 806D (e.g., scroll position value of 0.45) on the series 810. When the value of the scroll position of the document 802 transitions into the range of the anchor 806B, the document 802 is scrolled to the intermediate value 806C of the anchor 806D, as described in detail below.

Figure 8B:
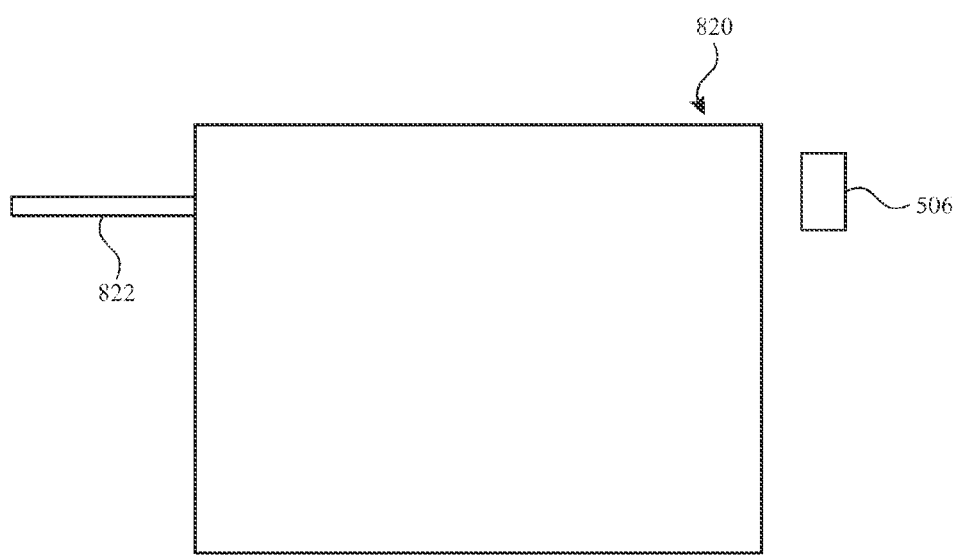

FIG. 8B illustrates a viewable display area 820, a rotatable input mechanism (e.g., 506), and a scroll value indicator 822. The viewable display area 820 encompasses an exemplary area identifying the displayed user interface. For example, display area 820 illustrates the portion of the document 802 that is displayed on the display when the document 802 is scrolled using the rotatable input mechanism 506. The scroll value indicator 822 helps in the interpretation of the figures by illustrating the value of the scroll position of the document 802, as will be described in relation to FIGS. 8C-8E. The scroll value indicator 822 is typically not part of the displayed user interface.

Figure 8C:
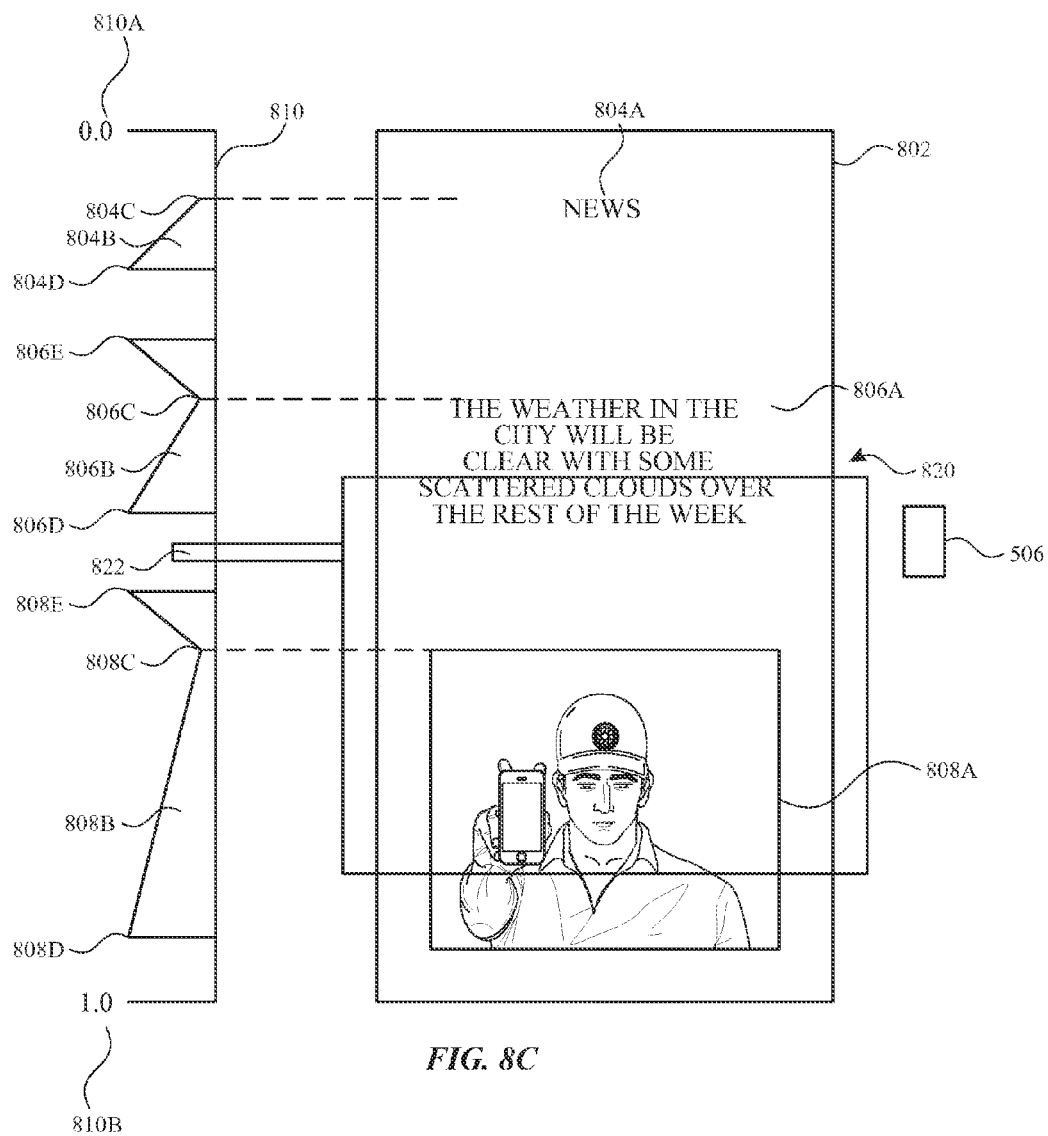

FIG. 8C illustrates the viewable portion of document 802, as illustrated by display area 820. In FIG. 8C, the value of the scroll position of the document is indicated by scroll value indicator 822 (e.g., 0.50). The device displays, on the display, the object (e.g., document 802) in accordance with a value (e.g., 0.50 in FIG. 8C) of a characteristic (e.g., scroll position) of the object, the value being within a range of values of the characteristic (e.g., within the series 810 ranging from 0.0 to 1.0). In other examples, the characteristic of the object may be, for example, the zoom size (e.g., magnification) of the object or the degree of rotation of the object.

The device receives a user input request, the user input request representing rotation of the rotatable input mechanism (e.g., 506). For example, the user rotates the rotatable input mechanism 506 in order to change the scroll position of the document 802.

In response to receiving the user input request, the device determines whether the user input request causes the value (e.g., scroll position value or zoom size value) of the characteristic (e.g., scroll level or zoom size) of the object to transition into range of a zone of an anchor (e.g., 806B). The anchor (e.g., 806B) has a start value (e.g., 806E), an intermediate value (e.g., 806C), and an end value (e.g., 806D) within the range of values of the characteristic. The zone of the anchor is between the start value (e.g., 806E) and the end value (e.g., 806D) of the anchor 806B. The zone of the anchor is the range over which the anchor influences the object, such as by causing it to scroll to the intermediate value (e.g., 806C), as is detailed below.

In accordance with a determination that the user input request causes the value (e.g., scroll position value or zoom size value) of the characteristic (e.g., scroll position or zoom size) of the object (e.g., 802) to transition into range of the zone of the anchor, the device updates the value of the characteristic of the object based on the intermediate value (e.g., 808C) of the anchor. Thus, when the document is being scrolled and the scroll position value of the document enters into range of a particular anchor, the device sets the scroll position value of the document to the intermediate value of that particular anchor. The device also updates display of the object (e.g., 802) in accordance with the updated value of the characteristic of the object. Thus, the device displays the document scrolled to the intermediate value of that anchor.

Figure 8D:
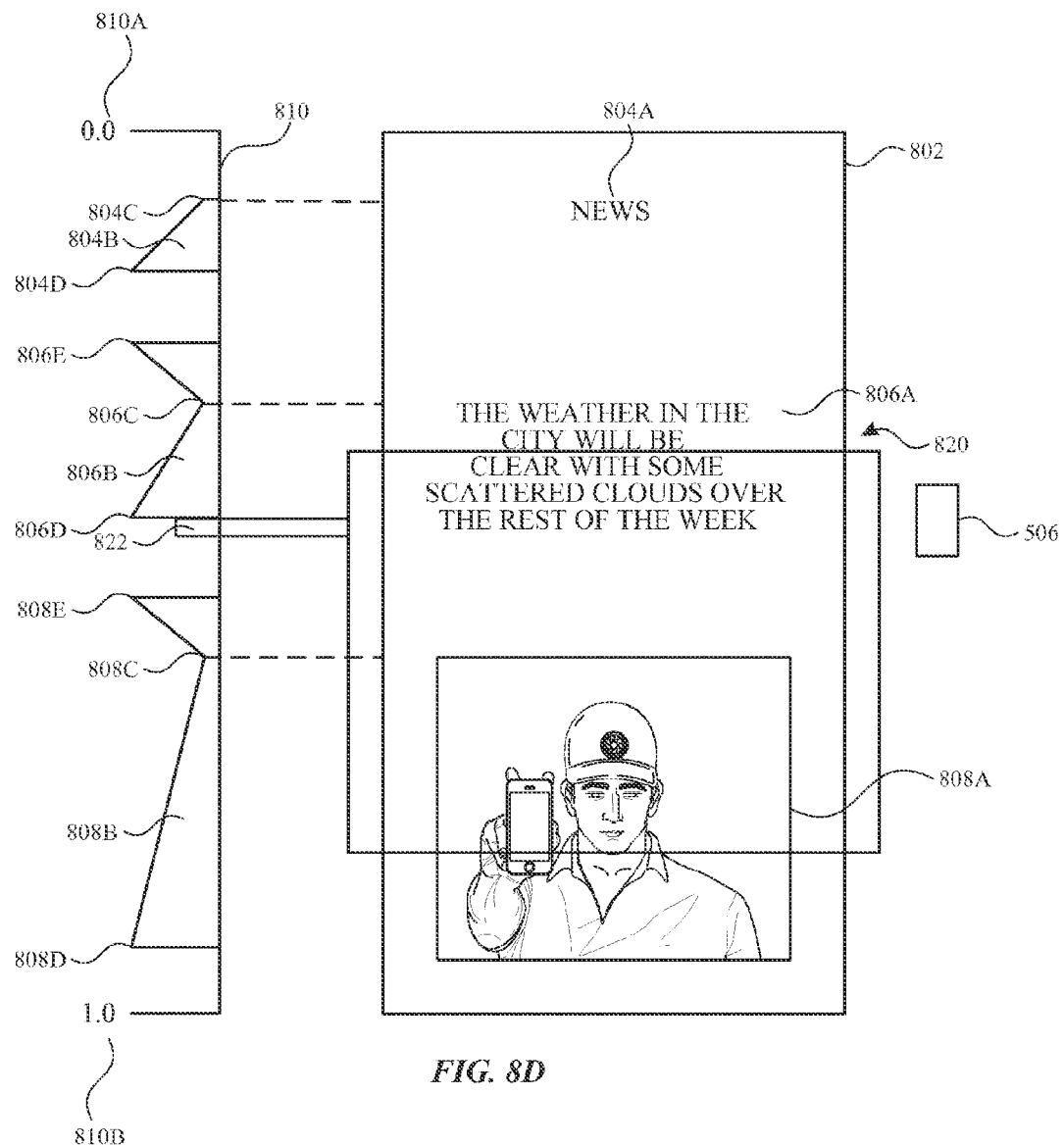
Figure 8E:
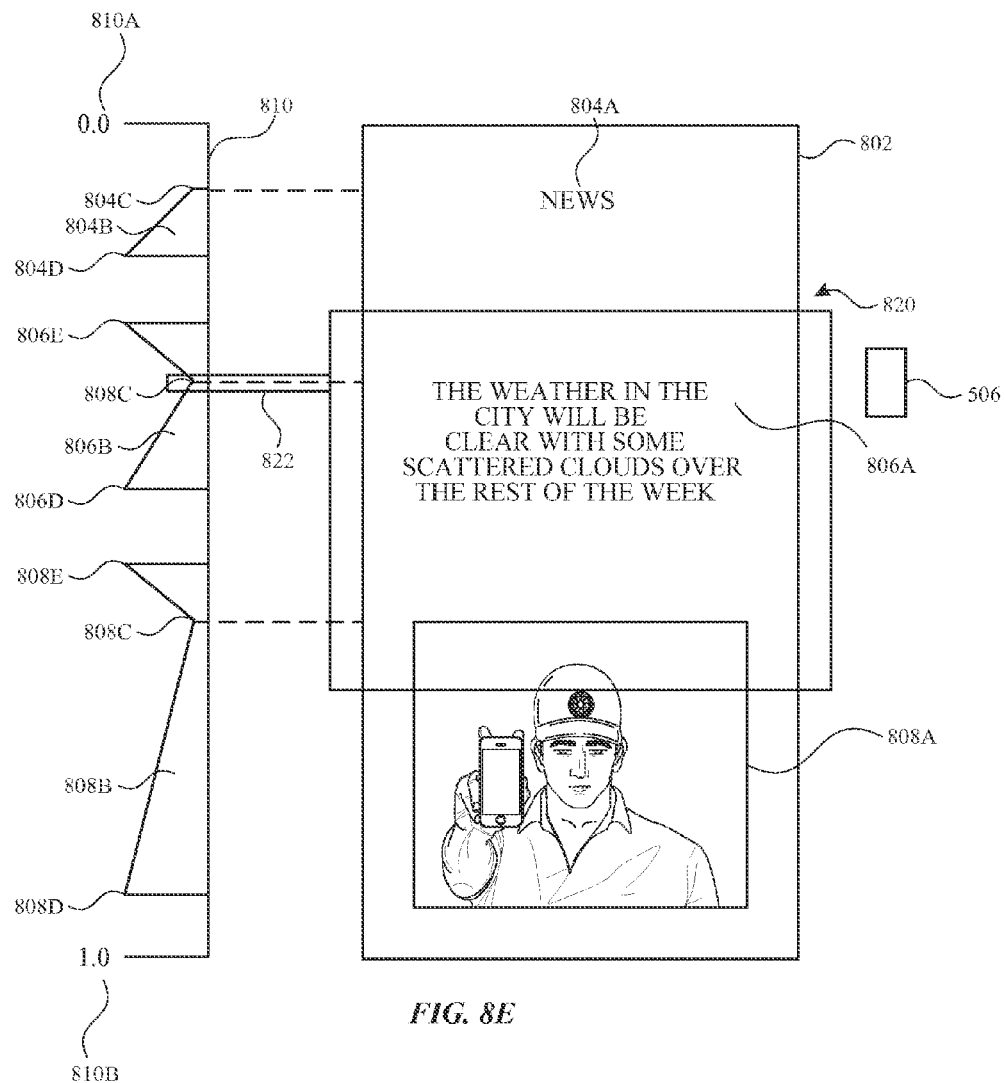

This concept is illustrated in FIGS. 8C-8E. In FIG. 8C, the document 802 is not being scrolled. Once the device receives input at the rotatable input mechanism, the device begins scrolling the document in accordance with the input. In this example, the input indicates to scroll toward the top of the document 802. When the value of the characteristic transitions into range of anchor 806B, as illustrated in FIG. 8D, the device scrolls the document to the intermediate point 806C of the anchor 806D as illustrated in FIG. 8E.

As a result of the anchors, the device simplifies the alignment of contents of the document for the user. When a particular content reaches an anchor, the document automatically scrolls (sometimes referred to as "snapping") to the intermediate point of that anchor. For example, this allows various content in a document to be efficiently aligned with a particular location on the display, facilitate the user's ability to scroll to those particular portions of the content.

Figure 8F:
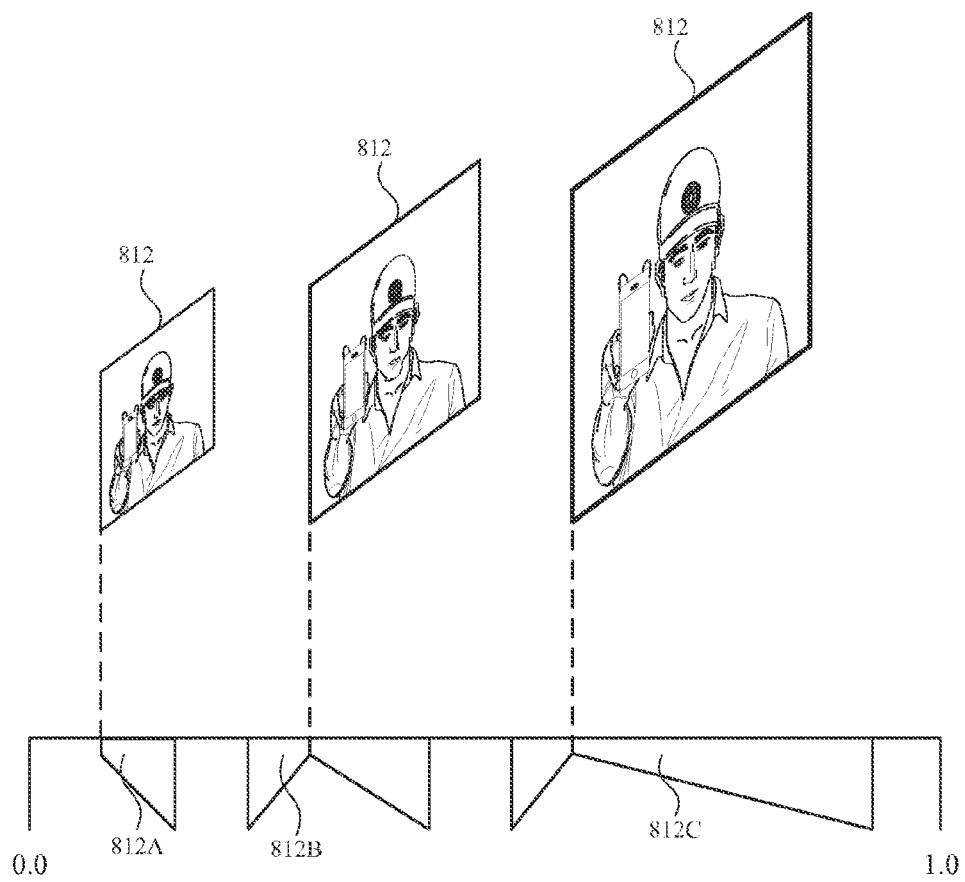

FIG. 8F illustrates manipulating the zoom of an object (e.g., an image 812). The image (e.g., 812) is displayed in accordance with a value (e.g., zoom size value) of a characteristic (e.g., zoom size) of the object, the value being within a range of values of the characteristic (e.g., along series 814). In this example, the anchors 812A, 812B, and 812C may be used to guide the change in the zoom characteristic. Thus, as the user rotates the rotatable input mechanism, the image zooms according to different zoom size values. When the zoom size value transitions into one of anchors 812A, 812B, and 812C, the device automatically changes the zoom of the image to the corresponding intermediate value of the anchor. As a result, the device facilitates access manipulating an object to particular zoom size values. When the image reaches the minimum (e.g., 0.0) zoom size, the image may shrink to less than the 0.0 level of zoom before returning to the 0.0 level of zoom. This rubberbanding effect provides an indication to the user that the minimum zoom limit has been reached. Similarly, when the image reaches the maximum (e.g., 1.0) zoom size, the image may enlarge beyond the 1.0 level of zoom before returning to the 1.0 level of zoom. This rubberbanding effect provides an indication to the user that the maximum zoom limit has been reached.

In accordance with some embodiments, updating display of the object (e.g., 802, 812) in accordance with the updated value of the characteristic (e.g., scroll position, zoom size) of the object comprises animating the object to reflect the updated value of the characteristic of the object (e.g., animate the document scrolling or animate the object zooming). That is, while the value of the characteristic is updated to the value of the intermediate value upon transitioning into the range of the anchor, the user interface may display the updating of scroll (or zoom) position graphically over a period of time via an animation of updating to the scroll (or zoom) position corresponding to the intermediate value. Doing so may reduce the abruptness of the updating.

In accordance with some embodiments (e.g., anchor 806), the intermediate value (e.g., 806C) is not equal to the start value (e.g. 806E) or the end value (e.g., 806D). In accordance with some embodiments (e.g., anchor 804), the intermediate value (e.g., 804C) is equal to the start value (e.g., 804C) or the end value.

In accordance with some embodiments, updating the value of the characteristic of the object based on the intermediate value of the anchor comprises updating the value of the characteristic of the object to be equal to the intermediate value of the anchor (e.g., the device sets the scroll or zoom value to the intermediate point).

In accordance with some embodiments, the start value and the end value are different. In accordance with some embodiments, the intermediate value is not the average of the start value and the end value.

In some embodiments, in accordance with a determination that the user input request causes the value (e.g., scroll position value, zoom size value) of the characteristic (e.g., scroll position, zoom size) of the object to transition into range of the zone of the anchor, the device initiates a duration (e.g., a time period) during which received user input requests to manipulate the characteristic of the object do not affect the displayed characteristic of the object. Thus, once the value of the characteristic of the object falls within the start value and the end value, further user input during a particular time period does not affect the visual display of the object. This is helpful, for example, to give the user time to visually recognize that the object has moved or is moving to an intermediate value of an anchor.

In accordance with some embodiments, the duration is based on the rate of change of the value of the characteristic of the object when the value of the characteristic of the object transitions into range of the zone of the anchor. For example, if a document is being scrolled at a high scroll rate when it transitions into range of an anchor, the duration may be shorter than if the document was scrolled at a low scroll rate.

In some embodiments, in accordance with a determination that the user input request does not cause the value (e.g., scroll position value, zoom size value) of the characteristic (e.g., scroll position, zoom size) of the object to transition into range of the zone of the anchor (e.g., the scroll position/zoom size of the object is between two anchor zones) or into range of a zone of a second anchor (e.g., anchor 808B), the second anchor having a second start value, a second intermediate value, and a second end value, and the second anchor having a zone between the second start value and the second end value, the device updates the value of the characteristic of the object in accordance with the user input (e.g., the device scrolls the document to a stopping point not within the zone of any anchor). The device also updates display of the object in accordance with the updated value of the characteristic of the object (e.g., the device displays the document scrolled according to the stopping point). The device identifies a closest anchor, from among at least the anchor and the second anchor, based on the updated value of the characteristic of the object in accordance with the user input. Subsequently the device updates the value of the characteristic of the object based on the corresponding intermediate value of the identified closest anchor (e.g., set the scroll position value to the intermediate value of the closest anchor, or set the zoom size value to the intermediate value of the closest anchor). The device also updates display of the object in accordance with the subsequently updated value of the characteristic of the object (e.g., display the document scrolled according to the intermediate value of the closest anchor or display the object zoomed according to the intermediate value of the closest anchor).

In accordance with some embodiments, identifying the closest anchor comprises: calculating a difference between the updated value of the characteristic of the object in accordance with the user input request and the intermediate value of the anchor, and calculating a difference between the updated value of the characteristic of the object in accordance with the user input request and the intermediate value of the second anchor.

In accordance with some embodiments, identifying the closest anchor comprises identifying the nearest of the start value and end value of the anchor and the second anchor.

In some embodiments, in accordance with a determination that the user input request causes the value (e.g., scroll position value, zoom size value) of the characteristic (e.g., scroll position, zoom size) of the object to transition into range of the zone of the anchor, the device performs a haptic alert at the electronic device, such as a mechanical or audible (e.g., audio playback) haptic alert.

In accordance with some embodiments, the object is a document and the characteristic of the object is scroll position. Examples of a document include, but are not limited to: a message, a text message, a text message conversation, an email, a presentation, a spreadsheet, a user editable file (e.g., a word processing file), a user ineditable file (e.g., a PDF file), a webpage, a list of items (e.g., list of contacts, list of music, list of calendar events, list of messages, list of files, list of folders). The device analyzes at least a portion of the document, wherein analyzing at least the portion of the document comprises identifying locations within the document.

In accordance with some embodiments, the locations within the document include one or more of: one or more page boundaries of at least the portion of the document, one or more paragraph boundaries of at least the portion of the document, and one or more keyword locations of at least the portion of the document. The device assigns anchors to some or all of the identified page boundaries, paragraph boundaries, and keyword locations of the document.

In accordance with some embodiments, the device accesses a first set of anchor points (e.g., anchor points indicate where anchors should go, such as at paragraphs and images), assigns respective anchors to the first set of anchor points, detects a change in value of the characteristic of the object (e.g., the document has been scrolled). In response to detecting the change in the value of the characteristic of the object, the device accesses a second set of anchor points (e.g., the document has scrolled and more anchors are required) and assigns respective anchors to the second set of anchor points, wherein the first set of anchor points and the second set of anchor points are different.

In accordance with some embodiments, the manipulation of the object is affected by both anchors and by subsets, as described above. The device determines whether the user input causes the value (e.g., scroll position value, zoom size value) of the characteristic (e.g., scroll position, zoom size) of the object to transition into range of the zone of the anchor, the device determines whether the value of the characteristic of the object is also within a predetermined subset of the range of values of the characteristic. In accordance with a determination that the value of the characteristic of the object is within the predetermined subset of the range of values of the characteristic, calculating the value of the characteristic of the object within the range of values of the characteristic based on the user input request and in accordance with a first function. In accordance with a determination that the value of the characteristic of the object is not within the predetermined subset of the range of values of the characteristic, calculating the value of the characteristic of the object within the range of values of the characteristic based on the user input request and in accordance with a second function, wherein the first function and the second function are different functions.

In accordance with some embodiments, the object is a document or an image. Examples of a document include, but are not limited to: a message, a text message, a text message conversation, an email, a presentation, a spreadsheet, a user editable file (e.g., a word processing file), a user ineditable file (e.g., a PDF file), a webpage, a list of items (e.g., list of contacts, list of music, list of calendar events, list of messages, list of files, list of folders). In accordance with some embodiments, the characteristic of the object is scroll position (e.g., how far up/down is the object scrolled), zoom size (e.g., how large/small is the document zoomed), and degree of rotation (e.g., how many radians is the object rotated).

FIG. 9A is a flow diagram illustrating an exemplary process for manipulating user interface objects in accordance with some embodiments. In some embodiments, method 900 may be performed at an electronic device with a display (e.g., 112, 340, 504) and a rotatable input mechanism (e.g., 506). Some operations in method 900 may be combined, the order of some operations may be changed, and some operations may be omitted. Exemplary devices that may perform method 900 include devices 100, 300, 500, and/or 550 (FIGS. 1A, 3, 5A, and 5C).

Method 900 provides an intuitive way to manipulate user interface objects. The method reduces the cognitive burden on a user when using a device to manipulate a user interface object, such as scrolling, zooming, or rotating an object, thereby creating a more efficient human-machine interface. For battery-operated computing devices, enabling a user to manipulate user interface objects more efficiently conserves power and increases the time between battery charges.

At block 902, an object (e.g., document 802, image 812) is displayed in accordance with a value of a characteristic (e.g., scroll position in FIGS. 8C-8E, zoom size in FIG. 8F) of the object, the value being within a range of values (e.g., 0.0 to 1.0) of the characteristic.

At block 904, a user input request is received, the user input request representing rotation of the rotatable input mechanism (e.g., 506).

At block 906, in response to receiving the user input request, it is determined whether the user input request causes the value (e.g., scroll position value or zoom size value) of the characteristic (e.g., scroll position or zoom size) of the object to transition into range of a zone of an anchor (e.g., anchor 806B, anchor 812B), the anchor having a start value (e.g., at 806E), an intermediate value (e.g., at 806C), and an end value (e.g., at 806D) within the range of values of the characteristic, and the zone of the anchor being between the start value and the end value.

At block 908, in accordance with a determination that the user input request causes the value of the characteristic of the object to transition into range of the zone of the anchor (e.g., 822 enters the zone of anchor 806B, as illustrated in FIG. 8D), blocks 910 and 912 are performed.

At block 910, the value of the characteristic of the object is updated based on the intermediate value of the anchor (e.g., the scroll position value is set equal to the intermediate value 806C).

At block 912, display of the object is updated in accordance with the updated value of the characteristic of the object (e.g., the display of document 802 is updated to reflect the updated scroll position value, as illustrated in FIG. 8E)

In accordance with some embodiments, updating display of the object (e.g., 802, 812) in accordance with the updated value of the characteristic (e.g., scroll position, zoom size) of the object comprises animating the object to reflect the updated value of the characteristic of the object (e.g., animate the document scrolling or animate the object zooming).

In accordance with some embodiments (e.g., anchor 806), the intermediate value (e.g., 806C) is not equal to the start value (e.g. 806E) or the end value (e.g., 806D). In accordance with some embodiments (e.g., anchor 804), the intermediate value (e.g., 804C) is equal to the start value (e.g., 804C) or the end value.

In accordance with some embodiments, updating the value of the characteristic of the object based on the intermediate value of the anchor comprises updating the value of the characteristic of the object to be equal to the intermediate value of the anchor (e.g., the device sets the scroll or zoom value to the intermediate point).

In accordance with some embodiments, the start value and the end value are different. In accordance with some embodiments, the intermediate value is not the average of the start value and the end value.

In some embodiments, in accordance with a determination that the user input request causes the value (e.g., scroll position value, zoom size value) of the characteristic (e.g., scroll position, zoom size) of the object to transition into range of the zone of the anchor, the device initiates a duration (e.g., a time period) during which received user input requests to manipulate the characteristic of the object do not affect the displayed characteristic of the object.

In accordance with some embodiments, the duration is based on the rate of change of the value of the characteristic of the object when the value of the characteristic of the object transitions into range of the zone of the anchor.

In some embodiments, in accordance with a determination that the user input request does not cause the value (e.g., scroll position value, zoom size value) of the characteristic (e.g., scroll position, zoom size) of the object to transition into range of the zone of the anchor (e.g., the scroll position/zoom size of the object is between two anchor zones) or into range of a zone of a second anchor (e.g., anchor 808B), the second anchor having a second start value, a second intermediate value, and a second end value, and the second anchor having a zone between the second start value and the second end value, the device updates the value of the characteristic of the object in accordance with the user input (e.g., the device scrolls the document to a stopping point not within the zone of any anchor). The device also updates display of the object in accordance with the updated value of the characteristic of the object (e.g., the device displays the document scrolled according to the stopping point). The device identifies a closest anchor, from among at least the anchor and the second anchor, based on the updated value of the characteristic of the object in accordance with the user input. Subsequently the device updates the value of the characteristic of the object based on the corresponding intermediate value of the identified closest anchor (e.g., set the scroll position value to the intermediate value of the closest anchor, or set the zoom size value to the intermediate value of the closest anchor). The device also updates display of the object in accordance with the subsequently updated value of the characteristic of the object (e.g., display the document scrolled according to the intermediate value of the closest anchor or display the object zoomed according to the intermediate value of the closest anchor).

In accordance with some embodiments, identifying the closest anchor comprises: calculating a difference between the updated value of the characteristic of the object in accordance with the user input request and the intermediate value of the anchor, and calculating a difference between the updated value of the characteristic of the object in accordance with the user input request and the intermediate value of the second anchor.

In accordance with some embodiments, identifying the closest anchor comprises identifying the nearest of the start value and end value of the anchor and the second anchor.

In some embodiments, in accordance with a determination that the user input request causes the value (e.g., scroll position value, zoom size value) of the characteristic (e.g., scroll position, zoom size) of the object to transition into range of the zone of the anchor, the device performs a haptic alert at the electronic device, such as a mechanical or audible (e.g., audio playback) haptic alert.

In accordance with some embodiments, the object (e.g., 802) is a document and the characteristic of the object is scroll position. Examples of a document include, but are not limited to: a message, a text message, a text message conversation, an email, a presentation, a spreadsheet, a user editable file (e.g., a word processing file), a user ineditable file (e.g., a PDF file), a webpage, a list of items (e.g., list of contacts, list of music, list of calendar events, list of messages, list of files, list of folders). The device analyzes at least a portion of the document, wherein analyzing at least the portion of the document comprises identifying locations within the document.

In accordance with some embodiments, the locations within the document include one or more of: one or more page boundaries of at least the portion of the document, one or more paragraph boundaries of at least the portion of the document, and one or more keyword locations of at least the portion of the document. The device assigns anchors to some or all of the identified page boundaries, paragraph boundaries, and keyword locations of the document.

In accordance with some embodiments, the device accesses a first set of anchor points (e.g., anchor points indicate where anchors should go, such as at paragraphs and images), assigns respective anchors to the first set of anchor points, detects a change in value of the characteristic of the object (e.g., the document has been scrolled). In response to detecting the change in the value of the characteristic of the object, the device accesses a second set of anchor points (e.g., the document has scrolled and more anchors are required) and assigns respective anchors to the second set of anchor points, wherein the first set of anchor points and the second set of anchor points are different.

In accordance with some embodiments, the manipulation of the object is affected by both anchors and by subsets, as described above. The device determines whether the user input causes the value (e.g., scroll position value, zoom size value) of the characteristic (e.g., scroll position, zoom size) of the object to transition into range of the zone of the anchor, the device determines whether the value of the characteristic of the object is also within a predetermined subset of the range of values of the characteristic. In accordance with a determination that the value of the characteristic of the object is within the predetermined subset of the range of values of the characteristic, calculating the value of the characteristic of the object within the range of values of the characteristic based on the user input request and in accordance with a first function. In accordance with a determination that the value of the characteristic of the object is not within the predetermined subset of the range of values of the characteristic, calculating the value of the characteristic of the object within the range of values of the characteristic based on the user input request and in accordance with a second function, wherein the first function and the second function are different functions.

In accordance with some embodiments, the object is a document or an image. Examples of a document include, but are not limited to: a message, a text message, a text message conversation, an email, a presentation, a spreadsheet, a user editable file (e.g., a word processing file), a user ineditable file (e.g., a PDF file), a webpage, a list of items (e.g., list of contacts, list of music, list of calendar events, list of messages, list of files, list of folders). In accordance with some embodiments, the characteristic of the object is scroll position (e.g., how far up/down is the object scrolled), zoom size (e.g., how large/small is the document zoomed), and degree of rotation (e.g., how many radians is the object rotated).

In accordance with some embodiments, analysis of the object is not required to specify the anchors. For example, the anchors may be associated with the object (e.g., embedded in the document) prior to the object being accessed at the device. Such predefined anchors may be manually specified by the author of the object.

The anchors described in relation to FIGS. 8 and 9A (e.g., 804B, 806B, 808B, 812A, 812B, 814C) have the technical advantage of allowing coarse input to be translated to precise control. Certain portions of documents (or certain zoom sizes, certain degrees of rotation) can be made easier or more difficult to move to, facilitating the process of directing the user's focus. Further, the anchors of a particular object may have different properties, such as different size of ranges. The anchors can be used to direct the "flow" through a document to allow for curation.

Note that details of the processes described above with respect to method 900 (FIG. 9A) are also applicable in an analogous manner to the methods described above and below. For example, method 900 may include one or more of the characteristics of the various methods described above with reference to the processes in FIGS. 7, 9B, 11, 13K, 22, 31, 39, and 46. For brevity, these details are not repeated below.

It should be understood that the particular order in which the operations in FIG. 11 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of the methods and processes described throughout this description may be incorporated with one another.

Figure 8G:
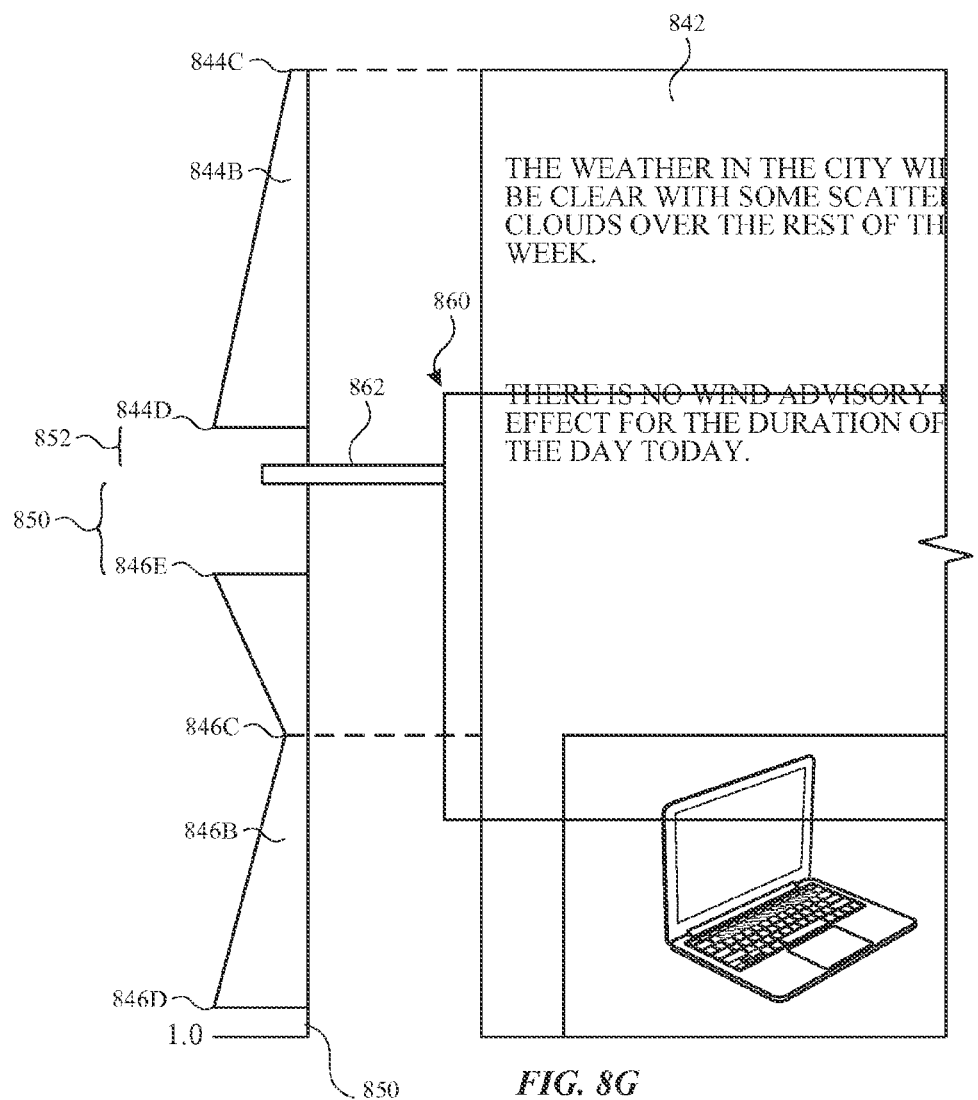
FIGS. 8G-8H illustrate exemplary user interfaces for manipulating a user interface object in accordance with some embodiments.
Figure 8H:
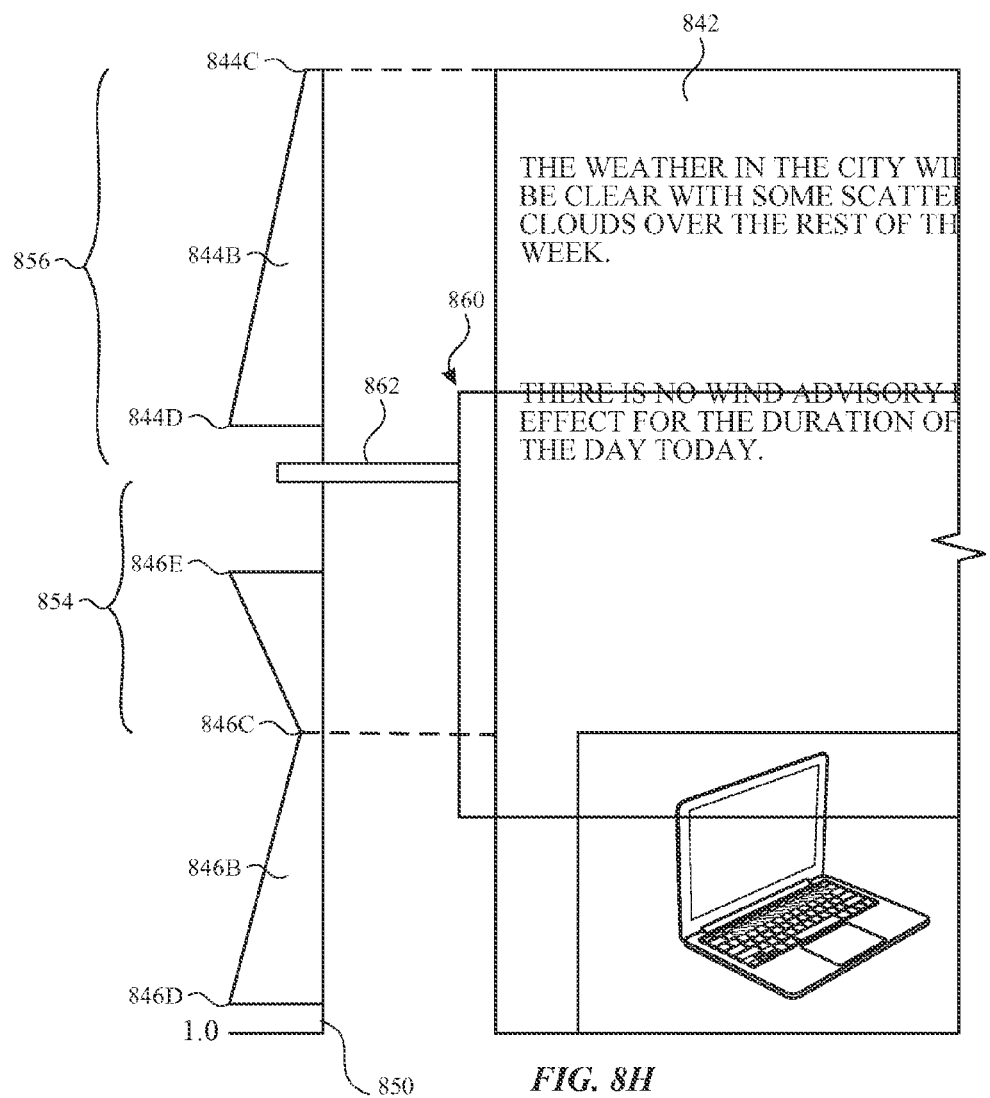

In a separate embodiment, FIGS. 8G-8H illustrate exemplary user interfaces for manipulating user interface objects using an electronic device. In some embodiments, the electronic device is device 500. The electronic device has a display (e.g., 112, 340, 504) and a rotatable input mechanism (e.g., 506).

FIGS. 8G-8H illustrate a document 842, which is an example of a user interface object. In some embodiments, the electronic device is configured to allow a user to scroll through document 842, such that only a portion of the document 842 is visible on the display (e.g., 504) at a particular time. The scroll position of the document 842 is a characteristic of the document. The value of the scroll position of the document changes as the document is scrolled.

The user interface figures described optionally include a series (e.g., 850) that shows the range of the characteristic of the object. These series are typically not part of the displayed user interface, but are provided to aid in the interpretation of the figures. In this example, the scroll position of the document can range from 0.0 to 1.0.

In this example, the series 850 includes various anchors within the range of the series 850, which modify how the object's characteristic is manipulated by a user. Anchor 844B, anchor 846B are illustrated in FIG. 8G. As with the series, anchors illustrated in the figures are typically not part of the displayed user interface, but are provided to aid in the interpretation of the figures. The zone of anchor 844B is from 844E (e.g., scroll position value of 0.30) to 844D (e.g. 0.50) on the series 850. The zone of anchor 846B is from 846E (e.g., value of 0.60) to 846D (e.g., value of 0.95) on the series 850. When the value of the scroll position of the document 842 reaches a steady state (i.e., the document stops scrolling), the device scrolls the document 842 to the intermediate value of the nearest anchor, as described in detail below. This aligns the document 842 on the display (e.g., 504) for the user's ease of viewing.

FIGS. 8G-8H also illustrate a viewable display area 860 and a scroll value indicator 862. The viewable display area 860 encompasses an exemplary area identifying the displayed user interface. For example, display area 860 illustrates the portion of the document 842 that is displayed on the display when the document 842 is scrolled using a rotatable input mechanism (e.g., 506). The scroll value indicator 862 helps in the interpretation of the figures by illustrating the value of the scroll position of the document 842. The scroll value indicator 862 is typically not part of the displayed user interface.

FIG. 8G illustrates a viewable portion of document 842, as illustrated by display area 860. The device displays, on the display, the object (e.g., document 802) in accordance with a value of a characteristic (e.g., scroll position) of the object, the value being within a range of values of the characteristic (e.g., within the series 850 ranging from 0.0 to 1.0). In other examples, the characteristic of the object may be, for example, the zoom size (e.g., magnification) of the object or the degree of rotation of the object.

The device receives a user input request, the user input request representing rotation of the rotatable input mechanism (e.g., 506). For example, the user rotates the rotatable input mechanism 506 in order to change the scroll position of the document 842.

In response to receiving the user input request, the device updates the value (e.g., scroll position value, zoom size value) of the characteristic (e.g., scroll position, zoom size) of the object within the range of values of the characteristic based on the user input request, and the device updates the display of the object in accordance with the updated value of the characteristic of the object. In the example of FIGS. 8G-8H, the device has scrolled the document and the document has stopped scrolling. The value of the scroll position of the document is illustrated by scroll value indicator 862 (e.g., scroll position value of 0.53). Thus, when the device receives the user input, the device scrolls the document 842 to the updated scroll position value (e.g., 0.53). In some examples, the document 842 reaches a steady state and stops scrolling once it reaches the updated scroll position value.

The device identifies a closest anchor to the updated value (e.g., 0.53) of the characteristic of the object (e.g., once the document stops scrolling), the closest anchor identified from among at least a first anchor (e.g., anchor 844B) having a corresponding intermediate value (e.g., 844C) and a second anchor (e.g., anchor 846B) having a corresponding intermediate value (e.g., 846C).

Subsequently the device updates the value of the characteristic of the object based on the corresponding intermediate value of the identified closest anchor. The device also updates display of the object in accordance with the subsequently updated value of the characteristic of the object. Thus, the device sets the value of the characteristic of the object equal to the intermediate value of the closest anchor and scrolls the document to the intermediate value of the closest anchor. In an example where the characteristic is zoom size, the magnification of the object is change to the intermediate value of the closest anchor.

In accordance with some embodiments, updating display of the object in accordance with the subsequently updated value of the characteristic of the object comprises animating the object to reflect the subsequently updated value of the characteristic of the object. Thus, for example, the scroll of the document 842 from the stopped (steady state) scroll position to the subsequently updated value is animated.

In accordance with some embodiments, the corresponding intermediate value of the identified closest anchor is between the respective start value (e.g., 846E) and the respective end value (e.g., 846D) of the identified closest anchor, exclusive of the start value and end value, such as with anchor 846B.

In accordance with some embodiments, the corresponding intermediate value (e.g., 844C) of the identified closest anchor is equal to the respective start value (e.g., 844C) or the respective end value of the identified closest anchor, such as with anchor 844B.

In accordance with some embodiments, updating the value of the characteristic of the object based on the corresponding intermediate value of the identified closest anchor comprises updating the value of the characteristic of the object to be equal to the corresponding intermediate value of the identified closest anchor.

In accordance with some embodiments, the corresponding start value and the corresponding end value of the identified closest anchor are different. In accordance with some embodiments, the corresponding intermediate value of the identified closest anchor is the average of the corresponding start value and the corresponding end value.

In accordance with some embodiments, subsequent to updating display of the object in accordance with the subsequently updated value of the characteristic of the object, the device initiates a duration (e.g., a time period) during which received user input requests to manipulate the characteristic of the object do not affect the displayed characteristic of the object. This is helpful, for example, to give the user time to visually recognize that the object has moved to an intermediate value of the closest anchor. In accordance with some embodiments, subsequent to the duration, updating display of the object in accordance with user input requests received during the duration.

In accordance with some embodiments, the closest anchor is identified by identifying the closest zone once the document 842 stops scrolling (e.g., reaches a steady state). As illustrated in FIG. 8G, the distance from the subsequently updated value (indicated by the scroll value indicator 862) to the zone of anchor 844B is the distance 852 (e.g., a distance of 0.03), while the distance from the subsequently updated value (indicated by the scroll value indicator 862) to the zone of anchor 846B is the distance 850 (e.g., a distance of 0.07). In this example, anchor 844B is identified as the closest anchor because the distance 852 (e.g., distance of 0.03) is less than the distance 850 (e.g., distance of 0.07). Thus, identifying the closest anchor comprises identifying the nearest of start values and end values of the anchor and the second anchor.

In accordance with some embodiments, the closest anchor is identified by identifying the closest intermediate value once the document 842 stops scrolling (e.g., reaches a steady state). As illustrated in FIG. 8H, the distance from the subsequently updated value (indicated by the scroll value indicator 862) to the intermediate value 844C of anchor 844B is the distance 856 (e.g., a distance of 0.33), while the distance from the subsequently updated value (indicated by the scroll value indicator 862) to the intermediate value 846C of anchor 846B is the distance 854 (e.g., a distance of 0.20). In this example, anchor 844B is identified as the closest anchor because the distance 854 (e.g., distance of 0.20) is less than the distance 856 (e.g., distance of 0.33). For example, the device calculates a difference between the subsequently updated value of the characteristic of the object and the corresponding intermediate value of the first anchor, and calculates a difference between the subsequently updated value of the characteristic of the object and the corresponding intermediate value of the second anchor. The lesser of these values indicates the closest anchor.

In accordance with some embodiments, the device performs a haptic alert at the device (e.g., a mechanical or audible haptic alert) while updating display of the object in accordance with the subsequently updated value of the characteristic of the object. This provides an indicated to the user that the object is transitioning to the nearest anchor.

In accordance with some embodiments, the object is a document and the characteristic of the object is scroll position. Examples of a document include, but are not limited to: a message, a text message, a text message conversation, an email, a presentation, a spreadsheet, a user editable file (e.g., a word processing file), a user ineditable file (e.g., a PDF file), a webpage, a list of items (e.g., list of contacts, list of music, list of calendar events, list of messages, list of files, list of folders). The device analyzes at least a portion of the document, wherein analyzing at least the portion of the document comprises identifying locations within the document. In accordance with some embodiments, the locations within the document include one or more of: one or more page boundaries of at least the portion of the document, one or more paragraph boundaries of at least the portion of the document, and one or more keyword locations of at least the portion of the document. The device assigns anchors to some or all of the identified page boundaries, paragraph boundaries, and keyword locations of the document.

In accordance with some embodiments, the device accesses a first set of anchor points (e.g., anchor points indicate where anchors should go, such as at paragraphs and images). The device assigns respective anchors to the first set of anchor points. The device then detects a change in value of the characteristic of the object (e.g., the document has been scrolled), and in response to detecting the change in the value of the characteristic of the object, the device accesses a second set of anchor points (e.g., the document has scrolled and more anchors are required). The device assigns respective anchors to the second set of anchor points, wherein the first set of anchor points and the second set of anchor points are different. This is helpful, for example, where an object includes many anchor points that require anchors, but device memory is limited and assigning anchors to all the anchor points at one time strains the available device memory.

In accordance with some embodiments, the object is selected from the group consisting of a document and an image. Examples of a document include, but are not limited to: a message, a text message, a text message conversation, an email, a presentation, a spreadsheet, a user editable file (e.g., a word processing file), a user ineditable file (e.g., a PDF file), a webpage, a list of items (e.g., list of contacts, list of music, list of calendar events, list of messages, list of files, list of folders). In accordance with some embodiments, the characteristic of the object is selected from the group consisting of scroll position (e.g., how far up/down is the object scrolled), zoom size (e.g., how large/small is the document zoomed), and degree of rotation (e.g., how many radians is the object rotated).

Figure 9B:
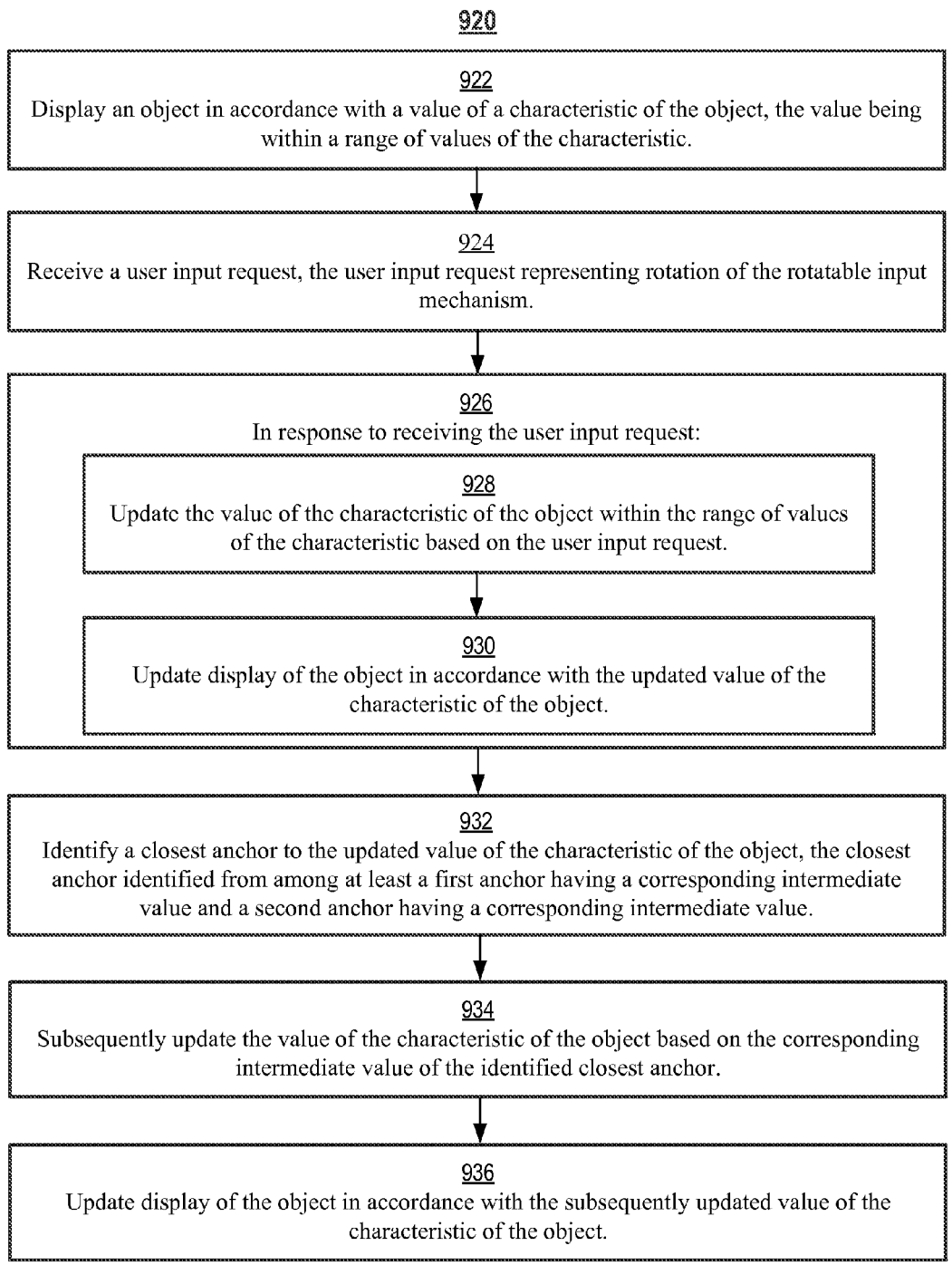
FIG. 9B is a flow diagram illustrating an exemplary process for manipulating a user interface object in accordance with some embodiments.

FIG. 9B is a flow diagram illustrating an exemplary process for manipulating user interface objects in accordance with some embodiments. In some embodiments, method 920 may be performed at an electronic device with a display (e.g., 112, 340, 504) and a rotatable input mechanism (e.g., 506). Some operations in method 920 may be combined, the order of some operations may be changed, and some operations may be omitted. Exemplary devices that may perform method 920 include devices 100, 300, 500, and/or 550 (FIGS. 1A, 3, 5A, and 5C).

Method 920 provides an intuitive way to manipulate user interface objects. The method reduces the cognitive burden on a user when using a device to manipulate a user interface object, such as scrolling, zooming, or rotating an object, thereby creating a more efficient human-machine interface. For battery-operated computing devices, enabling a user to manipulate user interface objects more efficiently conserves power and increases the time between battery charges.

At block 922, an object (e.g. document 842) is displayed in accordance with a value of a characteristic (e.g., scroll position value) of the object, the value being within a range of values (e.g., 0.0 to 1.0) of the characteristic.

At block 924, a user input request is received. The user input request represents rotation of the rotatable input mechanism (e.g., 506).

At block 926, in response to receiving the user input request, blocks 928 and 930 are performed. At block 928, the value of the characteristic of the object (e.g., document 842) is updated within the range of values (e.g., 0.0 to 1.0) of the characteristic based on the user input request. At block 930, display of the object is updated in accordance with the updated value of the characteristic of the object (e.g., the document is scrolled and then reaches a stopped position, which is a steady state).

At block 932, a closest anchor (e.g., anchor 844B or 846B) to the updated value of the characteristic of the object is identified, the closest anchor identified from among at least a first anchor (e.g., 844B) having a corresponding intermediate value (e.g., 844C) and a second anchor (e.g., 846B) having a corresponding intermediate value (e.g., 846C).

At block 934, the value of the characteristic of the object is subsequently updated based on the corresponding intermediate value (e.g., value at 844C or 846C) of the identified closest anchor (e.g., anchor 844B or 846B).

At block 936, display of the object (e.g., document 842) is updated in accordance with the subsequently updated value of the characteristic of the object.

In accordance with some embodiments, updating display of the object in accordance with the subsequently updated value of the characteristic of the object comprises animating the object to reflect the subsequently updated value of the characteristic of the object.

In accordance with some embodiments, the corresponding intermediate value of the identified closest anchor is between the respective start value (e.g., 846E) and the respective end value (e.g., 846D) of the identified closest anchor, exclusive of the start value and end value, such as with anchor 846B.

In accordance with some embodiments, the corresponding intermediate value (e.g., 844C) of the identified closest anchor is equal to the respective start value (e.g., 844C) or the respective end value of the identified closest anchor, such as with anchor 844B.

In accordance with some embodiments, updating the value of the characteristic of the object based on the corresponding intermediate value of the identified closest anchor comprises updating the value of the characteristic of the object to be equal to the corresponding intermediate value of the identified closest anchor.

In accordance with some embodiments, the corresponding start value and the corresponding end value of the identified closest anchor are different. In accordance with some embodiments, the corresponding intermediate value of the identified closest anchor is the average of the corresponding start value and the corresponding end value.

In accordance with some embodiments, subsequent to updating display of the object in accordance with the subsequently updated value of the characteristic of the object, the device initiates a duration (e.g., a time period) during which received user input requests to manipulate the characteristic of the object do not affect the displayed characteristic of the object. In accordance with some embodiments, subsequent to the duration, updating display of the object in accordance with user input requests received during the duration.

In accordance with some embodiments, the closest anchor is identified by identifying the closest zone once the document 842 stops scrolling (e.g., reaches a steady state).

In accordance with some embodiments, the closest anchor is identified by identifying the closest intermediate value once the document 842 stops scrolling (e.g., reaches a steady state).

In accordance with some embodiments, the device performs a haptic alert at the device (e.g., a mechanical or audible haptic alert) while updating display of the object in accordance with the subsequently updated value of the characteristic of the object.

In accordance with some embodiments, the object is a document and the characteristic of the object is scroll position. Examples of a document include, but are not limited to: a message, a text message, a text message conversation, an email, a presentation, a spreadsheet, a user editable file (e.g., a word processing file), a user ineditable file (e.g., a PDF file), a webpage, a list of items (e.g., list of contacts, list of music, list of calendar events, list of messages, list of files, list of folders). The device analyzes at least a portion of the document, wherein analyzing at least the portion of the document comprises identifying locations within the document. In accordance with some embodiments, the locations within the document include one or more of: one or more page boundaries of at least the portion of the document, one or more paragraph boundaries of at least the portion of the document, and one or more keyword locations of at least the portion of the document. The device assigns anchors to some or all of the identified page boundaries, paragraph boundaries, and keyword locations of the document.

In accordance with some embodiments, the device accesses a first set of anchor points (e.g., anchor points indicate where anchors should go, such as at paragraphs and images). The device assigns respective anchors to the first set of anchor points. The device then detects a change in value of the characteristic of the object (e.g., the document has been scrolled), and in response to detecting the change in the value of the characteristic of the object, the device accesses a second set of anchor points (e.g., the document has scrolled and more anchors are required). The device assigns respective anchors to the second set of anchor points, wherein the first set of anchor points and the second set of anchor points are different.

In accordance with some embodiments, the object is selected from the group consisting of a document and an image. Examples of a document include, but are not limited to: a message, a text message, a text message conversation, an email, a presentation, a spreadsheet, a user editable file (e.g., a word processing file), a user ineditable file (e.g., a PDF file), a webpage, a list of items (e.g., list of contacts, list of music, list of calendar events, list of messages, list of files, list of folders). In accordance with some embodiments, the characteristic of the object is selected from the group consisting of scroll position (e.g., how far up/down is the object scrolled), zoom size (e.g., how large/small is the document zoomed), and degree of rotation (e.g., how many radians is the object rotated).

In accordance with some embodiments, analysis of the object is not required to specify the anchors. For example, the anchors may be associated with the object (e.g., embedded in the document) prior to the object being accessed at the device. Such predefined anchors may be manually specified by the author of the object.

The anchors described in relation to FIGS. 8 and 9B (e.g., 844B, 846B) have the technical advantage of allowing coarse input to be translated to precise control. Certain portions of documents (or certain zoom sizes, certain degrees of rotation) can be made easier or more difficult to move to, facilitating the process of directing the user's focus. Further, the anchors of a particular object may have different properties, such as different size of ranges. The anchors can be used to direct the "flow" through a document to allow for curation.

Note that details of the processes described above with respect to method 920 (FIG. 9B) are also applicable in an analogous manner to the methods described above and below. For example, method 920 may include one or more of the characteristics of the various methods described above with reference to the processes in FIGS. 7, 9A, 11, 13K, 22, 31, 39, and 46. For brevity, these details are not repeated below.

It should be understood that the particular order in which the operations in FIG. 11 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of the methods and processes described throughout this description may be incorporated with one another.

FIGS. 10A-10E illustrate exemplary user interfaces for manipulating user interface objects using an electronic device (e.g., 500), in accordance with some embodiments. In some embodiments, the electronic device is device 500. The electronic device has a display (e.g., 112, 340, 504) and a rotatable input mechanism (e.g., 506).

Figure 10A:
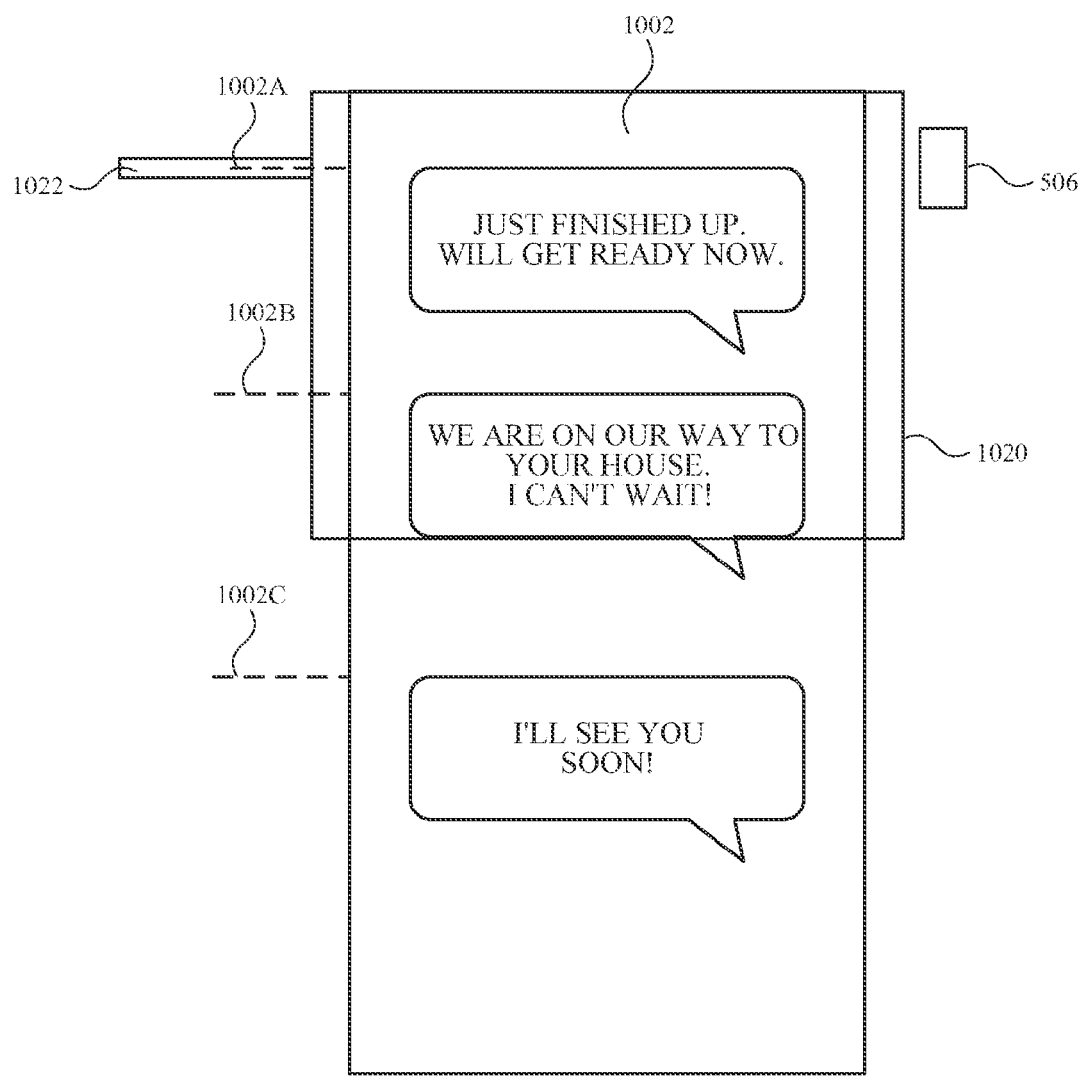
FIGS. 10A-10E illustrate exemplary user interfaces for manipulating a user interface object in accordance with some embodiments.
Figure 10B:
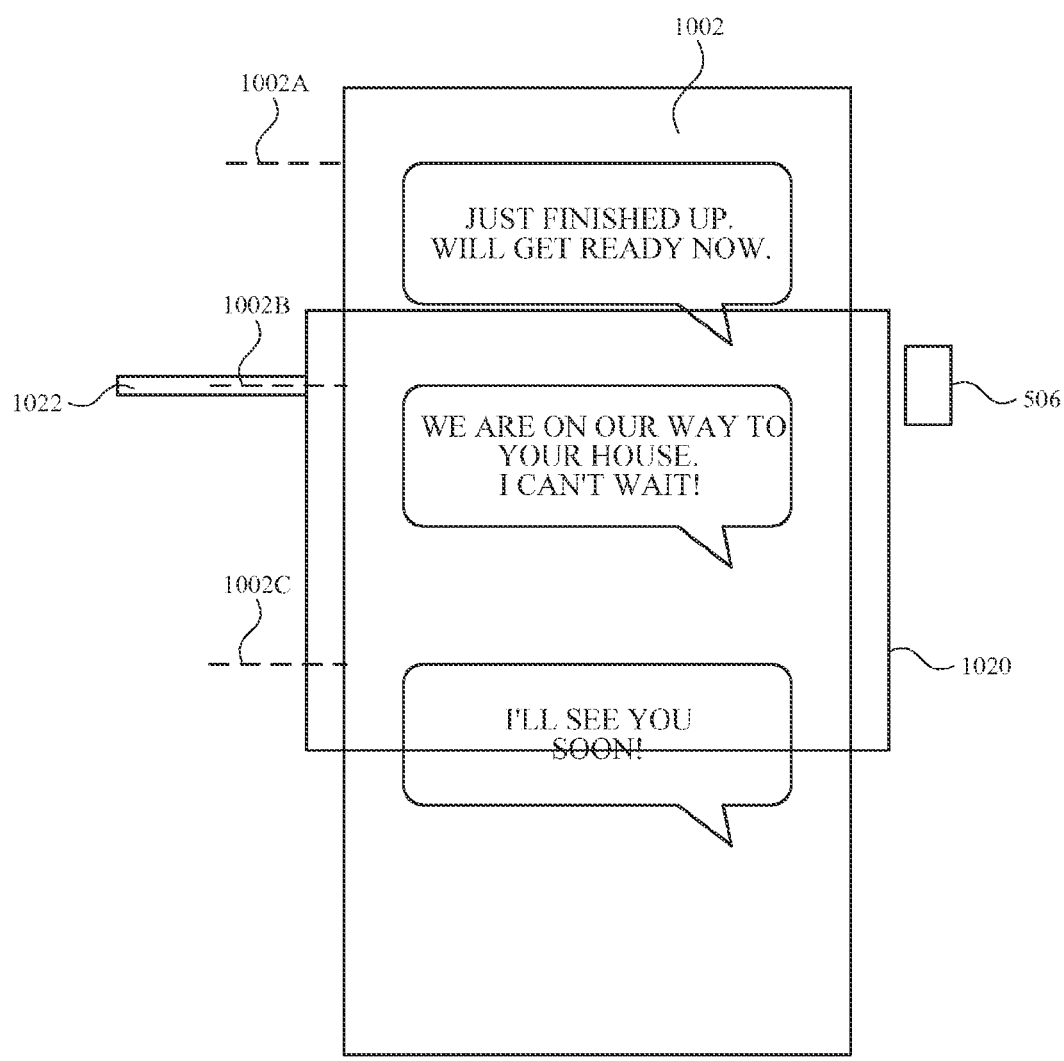

FIGS. 10A-10B illustrates an instant messaging conversation 1002, which is an example of user interface object. In some embodiments, the electronic device is configured to allow a user to scroll the object (e.g., 1002), such that only a portion of the object is visible on the display (e.g., 504) at a particular time. The scroll position of the object is a characteristic of the object. The value of the scroll position of the object changes as the object is scrolled.

The user interface figures described optionally include markers (e.g., 1002A, 1002B, 1002C). These markers are typically not part of the displayed user interface, but are provided to aid in the interpretation of the figures. In these examples, the markers illustrate scroll positions of the objects.

FIGS. 10A-10B also illustrate a viewable display area (1020) and a scroll value indicator (e.g., 1022). The viewable display area encompasses an exemplary area identifying the displayed user interface. For example, display area 1020 illustrates the portion of the conversation 1002 that is displayed on the display when the conversation 1002 is scrolled using the rotatable input mechanism (e.g., 506). The rotatable input mechanism 506 and the scroll value indicator (e.g., 1022) help in the interpretation of the figures and are typically not part of the displayed user interface.

FIG. 10A illustrates a viewable portion of conversation 1002, as illustrated by display area 1020. The device displays, on the display, the object (e.g., conversation 1002). The object is associated with a first marker having a first value (e.g. marker 1002A) and a second marker having a second value (e.g., marker 1002B). A value (e.g., scroll position value) of a characteristic (e.g., scroll position) of the object is based on the first value of the first marker.

The device receives user input representing rotation of the rotatable input mechanism. In response to receiving the user input representing rotation of the rotatable input mechanism, the device determines whether an attribute of the user input (e.g., the speed, acceleration, duration of the user input) exceeds a threshold value (e.g., user input is above a threshold speed or threshold acceleration). In accordance with a determination that the attribute of the user input exceeds the threshold value (e.g., the user input exceeds a threshold velocity or exceeds a threshold acceleration), the device updates the value of the characteristic of the object (e.g., 1002) based on the second value of the second marker. In some embodiments, the attribute is acceleration and the threshold is a threshold of acceleration of the rotatable input mechanism, wherein the input may be referred to as a "flicking" input. The device also updates display of the object in accordance with the updated value of the characteristic of the object. Thus, when the device determines that, for example, the user input on the rotatable input mechanism exceeds a threshold velocity, the device scrolls the document on the display to the next marker (e.g., from marker 1002A to marker 1002B). In some embodiments, the direction of the rotation of the input mechanism determines the direction of the scroll, and the second marker is the closest marker in the determined direction of the scroll.

In accordance with some embodiments, updating display of the object in accordance with the updated value of the characteristic of the object comprises animating the object to reflect the updated value of the characteristic of the object. For example, the device displays an animation of scrolling the conversation to the second marker. For another example, when the characteristic is a zoom size, the device displays an animation of zooming the object to the second marker.

In some embodiments, in accordance with a determination that the attribute of the user input is less than the threshold value (e.g., the user input does not exceed a threshold velocity or does not exceed a threshold acceleration), the device maintains display of the object in accordance with the value of the characteristic of the object based on the first value of the first marker (e.g., continue to display the object at the same position as before, or continue to display the object at the same zoom level as before).

In some embodiments, in accordance with a determination that the attribute of the user input does not exceed the threshold value (e.g., the user input does not exceed a threshold velocity or does not exceed a threshold acceleration), updating the value of the characteristic of the object to a third value, the third value based on the user input. Thus, if the input does not exceed the threshold value, the object is scrolled (or zoomed) to a location other than the second marker. Accordingly, when the user rotates the rotatable input mechanism without exceeding the threshold value, the device smoothly scrolls the object.

In accordance with some embodiments, the second marker is an anchor and the second value of the second marker is an intermediate value of the anchor.

In some embodiments, in accordance with a determination that the attribute of the user input exceeds the threshold value (e.g., the user input exceeds a threshold velocity or exceeds a threshold acceleration), the device performs a haptic alert (e.g., perform a mechanical or audible alert) at the electronic device.

In accordance with some embodiments, the object is a document. The device analyzes at least a portion of the document, wherein analyzing at least the portion of the document comprises identifying locations (e.g., locations to place markers) within the document.

In accordance with some embodiments, the locations within the document include one or more of: one or more page boundaries of at least the portion of the document, one or more paragraph boundaries of at least the portion of the document, and one or more keyword locations of at least the portion of the document. The device assigns markers to some or all of the identified page boundaries, paragraph boundaries, and keyword locations of the document.

In accordance with some embodiments, the device accesses a first set of markers of the object. The device detects a change in value of the characteristic of the object (e.g., the document has been scrolled). In response to detecting the change in the value of the characteristic of the object, the device associates a second set of markers to the object, wherein the first set and the second set are different.

In some embodiments, in accordance with a determination that the attribute of the user input does exceeds the threshold value (e.g., the user input exceeds a threshold velocity or exceeds a threshold acceleration), initiating a duration during which received user inputs representing rotation of the rotatable input mechanism do not affect the displayed characteristic of the object.

In accordance with some embodiments, the attribute of the user input is angular velocity of the rotatable input mechanism and the threshold value is a threshold angular velocity. In accordance with some embodiments, the attribute of the user input is a maximum angular velocity of the rotatable input mechanism and the threshold value is a threshold angular velocity. In accordance with some embodiments, the attribute of the user input is angular acceleration of the rotatable input mechanism and the threshold value is a threshold angular acceleration.

In accordance with some embodiments, the object is selected from the group consisting of a document and an image. Examples of a document include, but are not limited to: a message, a text message, a text message conversation, an email, a presentation, a spreadsheet, a user editable file (e.g., a word processing file), a user ineditable file (e.g., a PDF file), a webpage, a list of items (e.g., list of contacts, list of music, list of calendar events, list of messages, list of files, list of folders).

In accordance with some embodiments, the characteristic of the object is selected from the group consisting of scroll position (e.g., how far up/down is the object scrolled), zoom size (e.g., how large/small is the document zoomed), and degree of rotation (e.g., how many radians is the object rotated).

Figure 10C:
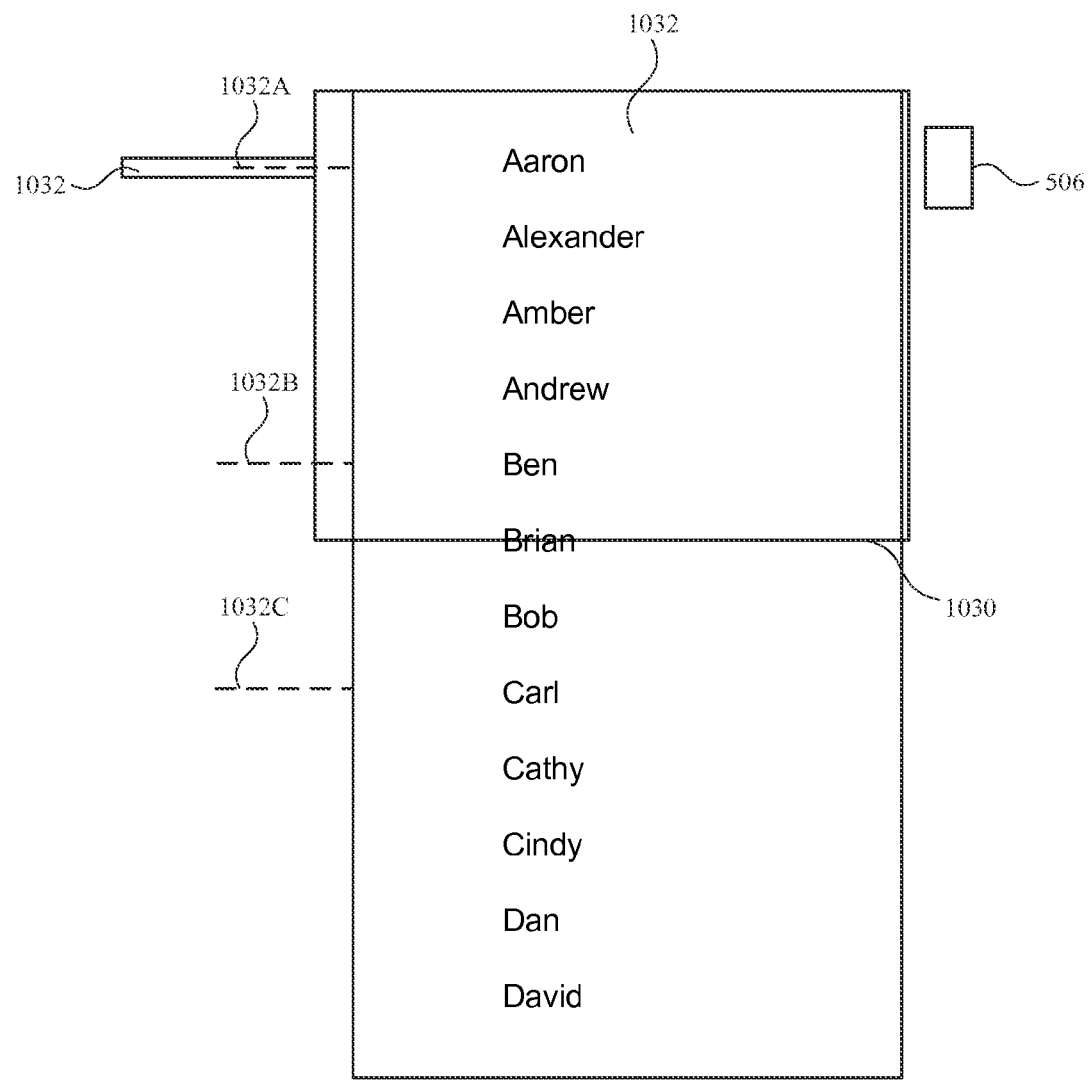
Figure 10D:
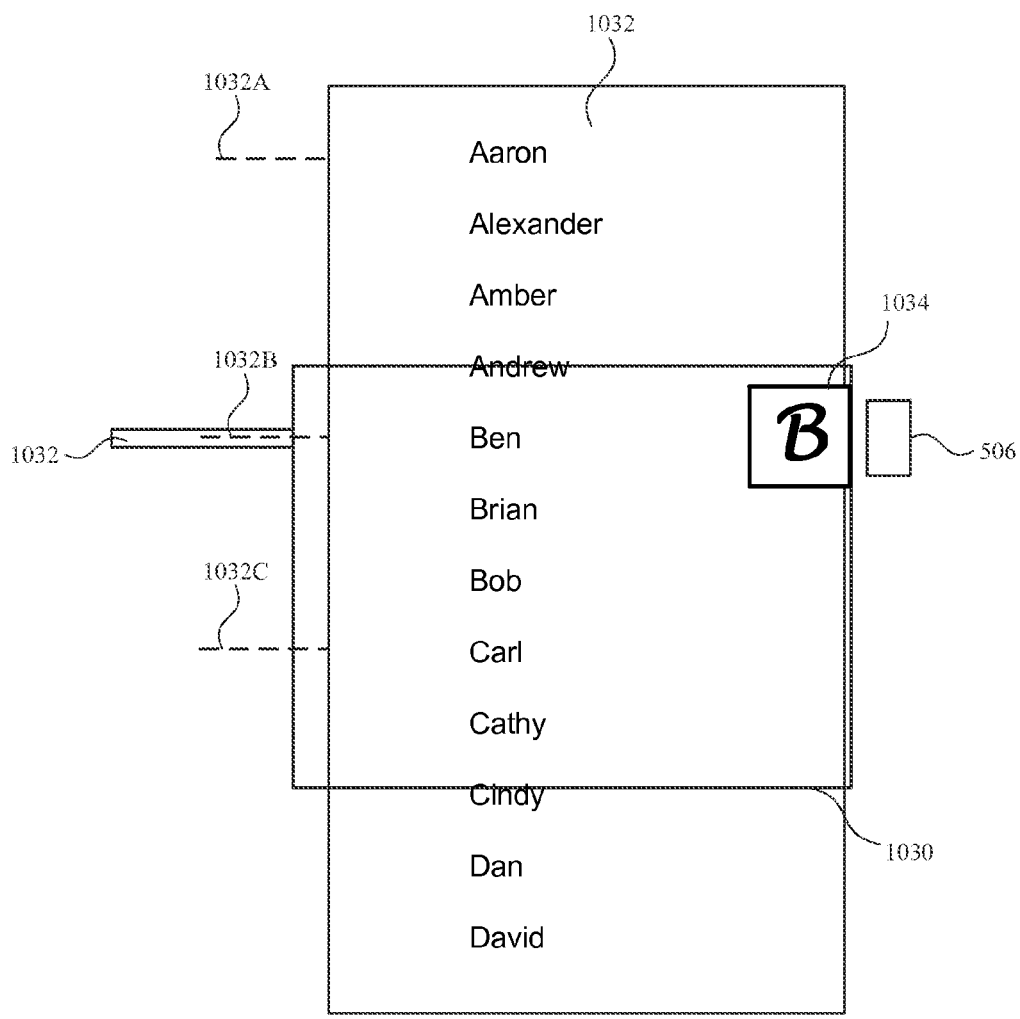
Figure 10E:
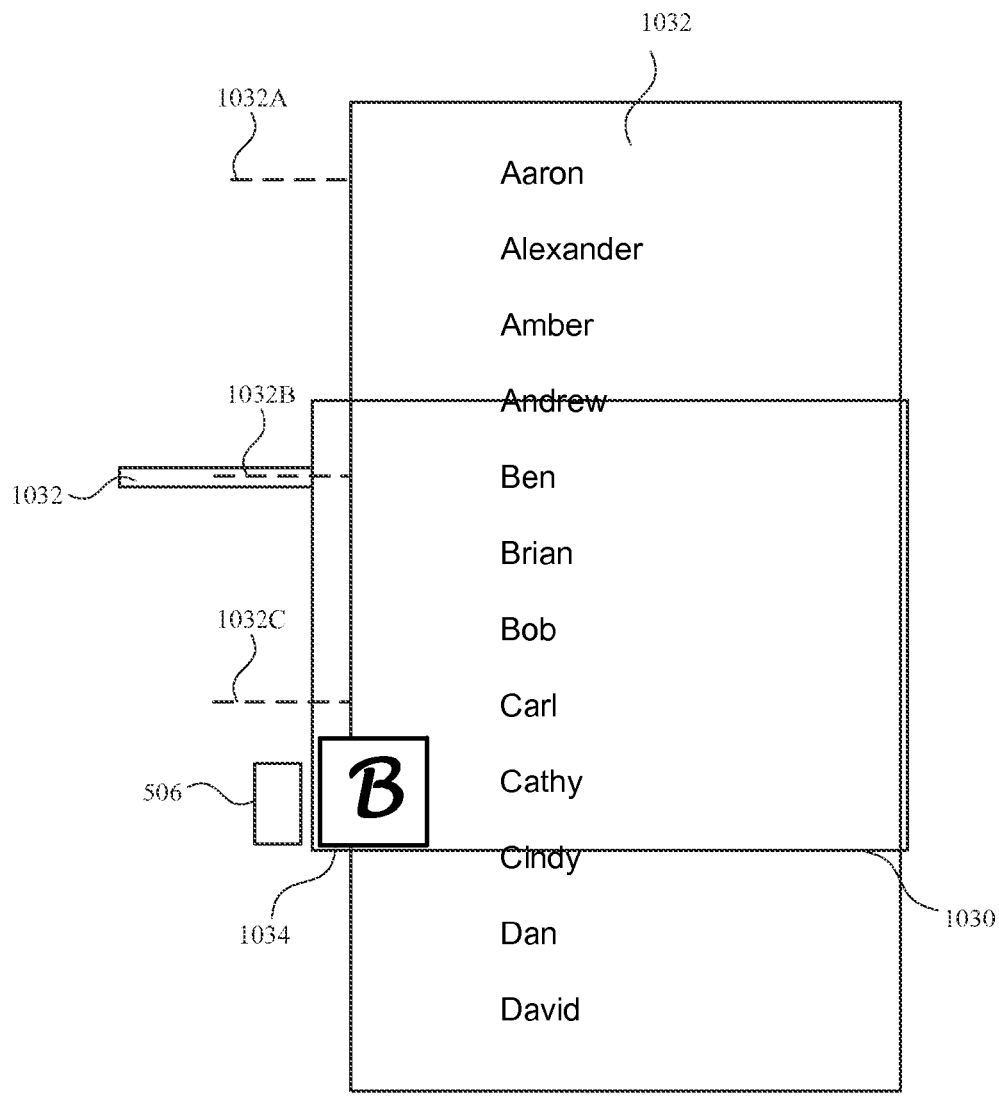

FIGS. 10C-10D illustrate a sequenced list 1032, which is an example of a user interface object. In some embodiments, the electronic device is configured to allow a user to scroll the object (e.g., 1032), such that only a portion of the object is visible on the display (e.g., 1030) at a particular time. The position of the object is a characteristic of the object. The value of the position of the object changes as the displayed portion of the object changes.

The user interface figures described optionally include markers (e.g., 1032A, 1032B, 1032C). These markers are typically not part of the displayed user interface, but are provided to aid in the interpretation of the figures. In these examples, the markers illustrate scroll positions of the object.

FIGS. 10C-10D also illustrate a viewable display area (1030) and a scroll value indicator (e.g., 1032). The viewable display area encompasses an exemplary area identifying the displayed user interface. For example, display area 1030 illustrates the portion of the sequenced list 1032 that is displayed on the display when the sequenced list 1032 is scrolled using the rotatable input mechanism (e.g., 506). The scroll value indicator (e.g., 1032) helps in the interpretation of the figures and is typically not part of the displayed user interface.

FIG. 10C illustrates a viewable portion of the sequenced list 1032, as illustrated by display area 1030. The device displays, on the display, the object (e.g., sequenced list 1032). A first subsection of the object is associated with a first marker having a first value (e.g. marker 1032A associated with the subsection of "A" names). A second subsection of the object is associated with a second marker having a second value (e.g., marker 1032B associated with the subsection of "B" names). In some examples, a third subsection of the object is associated with a third marker having a third value (e.g., marker 1032C associated with the subsection of "C" names). A value (e.g., position value) of a characteristic (e.g., position) of the object is based on the first value of the first marker.

The device receives user input representing rotation of the rotatable input mechanism. In response to receiving the user input representing rotation of the rotatable input mechanism, the device determines whether an attribute of the user input (e.g., the speed, acceleration, duration of the user input) exceeds a threshold value (e.g., user input is above a threshold speed or threshold acceleration). In some examples, in accordance with a determination that the attribute of the user input does not exceed the threshold value (e.g., the user input does not exceed a threshold velocity or does not exceed a threshold acceleration), the device scrolls the sequenced list. Thus, for example, the user can slowly turn the rotatable input mechanism to scroll through the individual items of the sequenced list 1032.

In some examples, in accordance with a determination that the attribute of the user input exceeds the threshold value (e.g., the user input exceeds a threshold velocity or exceeds a threshold acceleration), the device displays a visual indicator (e.g., 1034). The visual indicator is based on the value of the characteristic of the object (e.g., what portion of the sequenced list is being displayed). In some examples, the visual indicator 1034 is displayed at a location on the display such that the visual indicator is adjacent to the rotatable input mechanism 506. Thus, if the device has a different orientation or is reoriented (e.g., the user turns the device upside-down and the display rotates accordingly), as in FIG. 10E, when displayed, visual indicator is still displayed at a location on the display such that the visual indicator is adjacent to the rotatable input mechanism 506. For example, this allows a user of the device to better visually identify the visual indicator 1034.

In some embodiments, in accordance with the determination that the attribute of the user input exceeds the threshold value, the device updates the value of the characteristic of the object (e.g., 1032) based on the second value of the second marker. In some embodiments, the attribute is acceleration and the threshold is a threshold of acceleration of the rotatable input mechanism, wherein the input may be referred to as a "flicking" input. The device also updates display of the object in accordance with the updated value of the characteristic of the object.

Thus, when the device determines that, for example, the user input on the rotatable input mechanism exceeds a threshold velocity, the device jumps the sequenced list on the display to the next marker (e.g., from marker 1032A to marker 1032B) page-wise and displays a visual indication (e.g., 1034) of the current subsection. This allows the user to better understand which portion of the sequenced list is currently being accessed. In some embodiments, the direction of the rotation of the input mechanism determines the direction of the scroll, and the second marker is the closest marker in the determined direction of the scroll.

In some embodiments, when the user attempts to scroll past the end of the sequenced list, the visual indicator 1034 visually rubberbands in a first direction (e.g., moves and then returns to its original position). In some examples, the first direction is down. In other examples, the first direction is up. In some embodiment, the first direction is "in" or "out" in a z-space direction, such that the visual indicator appears to either shrink or grow in place before returning to its original size. This provides a visual indication to the user that the end of the list has been reached and indicates that the user input through the rotatable input mechanism or the touch screen is continuing to be received.

FIG. 11 is a flow diagram illustrating an exemplary process for manipulating user interface objects in accordance with some embodiments. In some embodiments, method 1100 may be performed at an electronic device with a display (e.g., 112, 340, 504) and a rotatable input mechanism (e.g., 506). Some operations in method 1100 may be combined, the order of some operations may be changed, and some operations may be omitted. Exemplary devices that may perform method 1100 include devices 100, 300, 500, and/or 550 (FIGS. 1A, 3, 5A, and 5C).

Method 1100 provides an intuitive way to manipulate user interface objects. The method reduces the cognitive burden on a user when using a device to manipulate a user interface object, such as scrolling, zooming, or rotating an object, thereby creating a more efficient human-machine interface. For battery-operated computing devices, enabling a user to manipulate user interface objects more efficiently conserves power and increases the time between battery charges.

At block 1102, an object (e.g., instant message conversation 1002) is displayed, wherein the object (e.g., conversation 1002) is associated with a first marker (e.g., 1002A) having a first value and a second marker (e.g., 1002B) having a second value, and wherein a value (e.g., scroll position value or zoom size value) of a characteristic (e.g., scroll position or zoom size) of the object (e.g., conversation 1002) is based on the first value of the first marker.

At block 1104, user input representing rotation of the rotatable input mechanism (e.g., 506) is received.

At block 1106, in response to receiving the user input representing rotation of the rotatable input mechanism, it is determined whether an attribute of the user input (e.g., the speed, acceleration, duration of the user input) exceeds a threshold value.

At block 1108, in accordance with a determination that the attribute of the user input exceeds the threshold value (e.g., the user input exceeds a threshold velocity or exceeds a threshold acceleration), the value of the characteristic of the object is updated based on the second value of the second marker.

At block 1110, display of the object is updated in accordance with the updated value of the characteristic of the object (e.g., the conversation is scrolled to the marker, as illustrated in FIG. 10B).

In accordance with some embodiments, updating display of the object (e.g., conversation 1002) in accordance with the updated value of the characteristic of the object comprises animating the object to reflect the updated value of the characteristic of the object.

In some embodiments, in accordance with a determination that the attribute of the user input is less than the threshold value, the device maintains display of the object in accordance with the value of the characteristic of the object based on the first value of the first marker (e.g., the conversation is not scrolled).

In some embodiments, in accordance with a determination that the attribute of the user input does not exceed the threshold value (e.g., the user input does not exceed a threshold velocity or does not exceed a threshold acceleration), updating the value of the characteristic of the object to a third value, the third value based on the user input. Thus, if the input does not exceed the threshold value, the object is scrolled (or zoomed) to a location other than the second marker.

In accordance with some embodiments, the second marker (e.g., 1002B) is an anchor and the second value of the second marker is an intermediate value of the anchor.

In some embodiments, in accordance with a determination that the attribute of the user input exceeds the threshold value (e.g., the user input exceeds a threshold velocity or exceeds a threshold acceleration), the device performs a haptic alert (e.g., perform a mechanical or audible alert) at the electronic device.

In accordance with some embodiments, the object is a document. The device analyzes at least a portion of the document, wherein analyzing at least the portion of the document comprises identifying locations (e.g., locations to place markers) within the document.

In accordance with some embodiments, the locations within the document include one or more of: one or more page boundaries of at least the portion of the document, one or more paragraph boundaries of at least the portion of the document, and one or more keyword locations of at least the portion of the document. The device assigns markers to some or all of the identified page boundaries, paragraph boundaries, and keyword locations of the document.

In accordance with some embodiments, the device accesses a first set of markers of the object. The device detects a change in value of the characteristic of the object (e.g., the document has been scrolled). In response to detecting the change in the value of the characteristic of the object, the device associates a second set of markers to the object, wherein the first set and the second set are different.

In some embodiments, in accordance with a determination that the attribute of the user input does exceeds the threshold value (e.g., the user input exceeds a threshold velocity or exceeds a threshold acceleration), initiating a duration during which received user inputs representing rotation of the rotatable input mechanism do not affect the displayed characteristic of the object.

In accordance with some embodiments, the attribute of the user input is angular velocity of the rotatable input mechanism and the threshold value is a threshold angular velocity. In accordance with some embodiments, the attribute of the user input is a maximum angular velocity of the rotatable input mechanism and the threshold value is a threshold angular velocity. In accordance with some embodiments, the attribute of the user input is angular acceleration of the rotatable input mechanism and the threshold value is a threshold angular acceleration.

In accordance with some embodiments, the object is selected from the group consisting of a document and an image. Examples of a document include, but are not limited to: a message, a text message, a text message conversation, an email, a presentation, a spreadsheet, a user editable file (e.g., a word processing file), a user ineditable file (e.g., a PDF file), a webpage, a list of items (e.g., list of contacts, list of music, list of calendar events, list of messages, list of files, list of folders).

In accordance with some embodiments, the characteristic of the object is selected from the group consisting of scroll position (e.g., how far up/down is the object scrolled), zoom size (e.g., how large/small is the document zoomed), and degree of rotation (e.g., how many radians is the object rotated).

In accordance with some embodiments, analysis of the object is not required to specify the markers. For example, the markers may be associated with the object (e.g., embedded in the document) prior to the object being accessed at the device. Such predefined markers may be manually specified by the author of the object.

The markers described in relation to FIGS. 10 and 11 (e.g., 1002A, 1002B, 1002C) have the technical advantage of allowing coarse input to be translated to precise control. Certain portions of documents (or certain zoom sizes, certain degrees of rotation) can be made easier or more difficult to move to, facilitating the process of directing the user's focus. Further, the markers of a particular object may have different properties, such as different thresholds to move to them. The markers can be used to direct the "flow" through a document to allow for curation.

Note that details of the processes described above with respect to method 1100 (FIG. 11) are also applicable in an analogous manner to the methods described above and below. For example, method 1100 may include one or more of the characteristics of the various methods described above with reference to the processes in FIGS. 7, 9A, 9B, 13K, 22, 31, 39, and 46. For brevity, these details are not repeated below.

It should be understood that the particular order in which the operations in FIG. 11 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of the methods and processes described throughout this description may be incorporated with one another.

Figure 12:
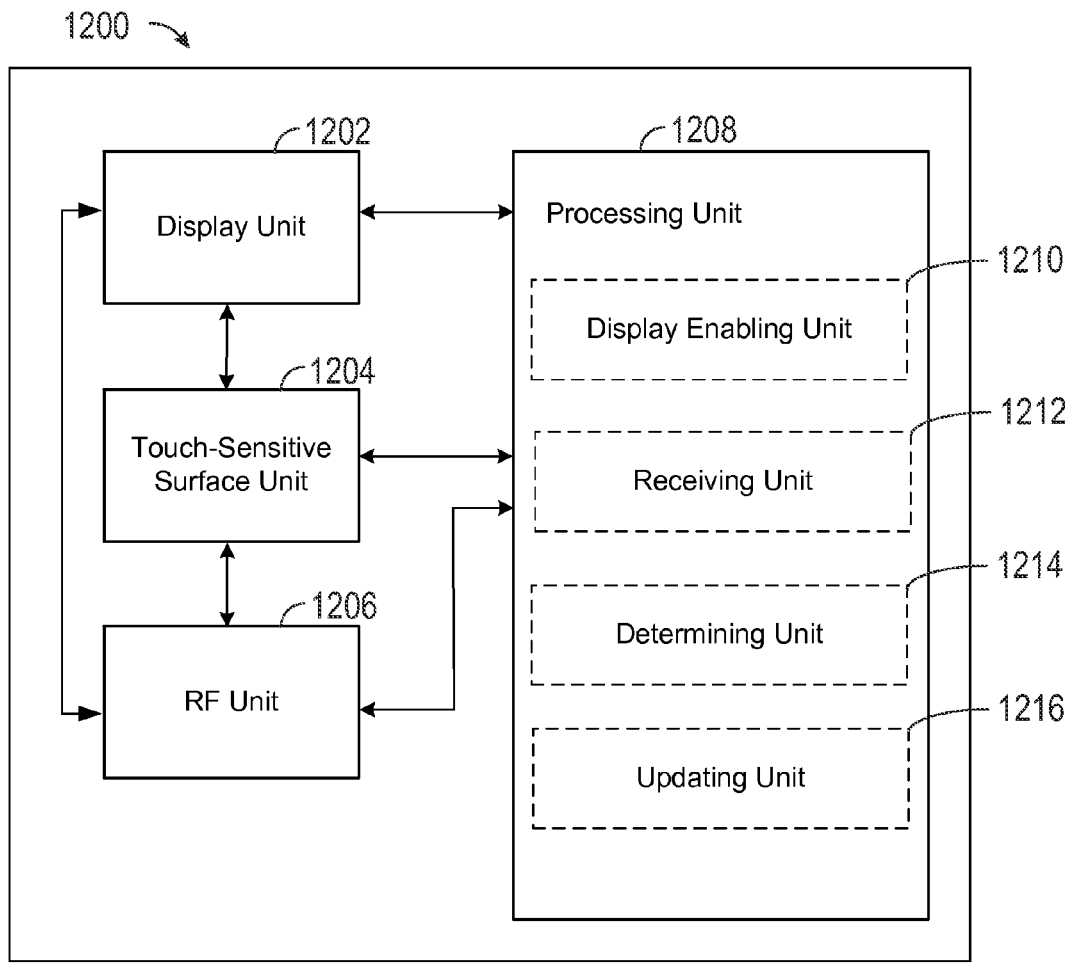
FIG. 12 illustrates a functional block diagram in accordance with some embodiments.

FIG. 12 shows exemplary functional blocks of an electronic device 1200 that, in some embodiments, perform the features described above and below. As shown in FIG. 12, an electronic device 1200 includes a display unit 1202 configured to display graphical objects; a touch-sensitive surface unit 1204 configured to receive user gestures (e.g., touches); one or more RF units 1206 configured to detect and communicate with external electronic devices; and a processing unit 1208 coupled to display unit 1202, touch-sensitive surface unit 1204, and RF units 1206. In some embodiments, the processing unit 1208 includes a display enabling unit 1210, a receiving unit 1212, and a determining unit 1214. The units of FIG. 12 may be used to implement the various techniques and methods described above and below.

For example, the display enabling unit 1210 can be used for: displaying, on the display, an object in accordance with a value of a characteristic of the object, the value being within a range of values of the characteristic; displaying, on the display, an object in accordance with a value of a characteristic of the object, the value being within a range of values of the characteristic; displaying, on the display, an object in accordance with a value of a characteristic of the object, the value being within a range of values of the characteristic; displaying, on the display, an object, wherein the object is associated with a first marker having a first value and a second marker having a second value.

For example, the receiving unit 1212 can be used for: receiving a user input request, the user input request representing rotation of the rotatable input mechanism; receiving a user input request, the user input request representing rotation of the rotatable input mechanism; receiving a user input request, the user input request representing rotation of the rotatable input mechanism; receiving user input representing rotation of the rotatable input mechanism.

For example, the determining unit 1214 can be used for: determining whether the value of the characteristic of the object is within a predetermined subset of the range of values of the characteristic; determining whether the user input request causes the value of the characteristic of the object to transition into range of a zone of an anchor, determining whether an attribute of the user input exceeds a threshold value;

For example, the updating unit 1216 can be used for: updating the value of the characteristic of the object within the range of values of the characteristic based on the user input request and in accordance with a first function; updating the value of the characteristic of the object within the range of values of the characteristic based on the user input request and in accordance with a second function, wherein the first function and the second function are different functions; updating display of the object in accordance with the updated value of the characteristic of the object; updating the value of the characteristic of the object based on the intermediate value of the anchor; updating display of the object in accordance with the updated value of the characteristic of the object; updating the value of the characteristic of the object within the range of values of the characteristic based on the user input request; updating display of the object in accordance with the updated value of the characteristic of the object; subsequently updating the value of the characteristic of the object based on the corresponding intermediate value of the identified closest anchor; updating display of the object in accordance with the subsequently updated value of the characteristic of the object; updating the value of the characteristic of the object based on the second value of the second marker; and updating display of the object in accordance with the updated value of the characteristic of the object.

The functional blocks of the device 1200 are, optionally, implemented by hardware, software, or a combination of hardware and software to carry out the principles of the various described examples. It is understood by persons of skill in the art that the functional blocks described in FIG. 12 are, optionally, combined or separated into sub-blocks to implement the principles of the various described examples. Therefore, the description herein optionally supports any possible combination or separation or further definition of the functional blocks described herein.

FIGS. 13A-13J illustrate an exemplary user interface 1300 displaying multiple user interface objects in the form of selectable elements 1302, 1304, 1306, 1308 and a focus selector 1310. A user can select a selection element from among the multiple selectable elements by using a physical crown of a wearable electronic device to move the focus selector 1310 to align with the desired selection element.

Crown 558 of device 550 is a user rotatable user interface input (e.g., a rotatable input mechanism). The crown 558 can be turned in two distinct directions: clockwise and counterclockwise. FIGS. 13-13J include rotation direction arrows illustrating the direction of crown rotation and movement direction arrows illustrating the direction of movement of one or more user interface objects, where applicable. The rotation direction arrows and movement direction arrows are typically not part of the displayed user interface, but are provided to aid in the interpretation of the figures. In this example, a clockwise direction rotation of crown 558 is illustrated by a rotation direction arrow pointing in the up direction. Similarly, a counterclockwise direction rotation of crown 558 is illustrated by a rotation direction arrow pointing in the down direction. The characteristics of the rotation direction arrow are not indicative of the distance, speed, or acceleration with which crown 558 is rotated by a user. Instead, the rotation direction arrow is indicative of the direction of rotation of crown 558 by the user.

FIGS. 13-13J illustrate an exemplary physics-based model that can be used to control a user's interactions with user interface objects in conjunction with a physical crown user input device. In this example, elements 1302, 1304, 1306, 1308 are stationary and the focus selector 1310 is movable via user input received from crown 558. Clockwise movement of crown 558 is associated with a force on the focus selector 1310 in the up movement direction and counterclockwise movement of crown 558 is associated with a force on the focus selector 1310 in the down movement direction. Accordingly, moving the focus selector 1310 from a position aligned with element 1306, as shown in FIG. 13A, to align with element 1304 located in the up direction, as shown in FIG. 13J, requires a user input on the crown 558 in the clockwise direction.

To facilitate a user's ability to control the movement of focus selector 1310 among the four user-selectable elements 1302, 1304, 1306, 1308, a "magnetic" relationship is associated between each user selectable element and the focus selector 1310. Each element 1302, 1304, 1306, 1308 is associated with a simulated magnetic value. In this example, the magnetic values of elements 1302, 1304, 1306, 1308 are equal. In other examples, the magnetic values of elements 1302, 1304, 1306, 1308 may not be equal.

Using the magnetic relationship between the elements 1302, 1304, 1306, 1308 and focus selector 1310, physics-based modeling can be used to simulate magnetic attraction between elements 1302, 1304, 1306, 1308 and focus selector 1310. As will be described in further detail below, user interface 1300 causes an attraction between elements 1302, 1304, 1306, 1308 and focus selector 1310. As a result, when user input is not received, focus selector 1310 ultimately reaches a steady state where it is aligned with one of elements 1302, 1304, 1306, 1308. An object is in a steady state when the object is not being translated, rotated, or scaled. The alignment of focus selector 1310 with the element allows the element to be activated using a user input. Even before any user input for activation, alignment of focus selector 1310 with the element is indicative of the selection of that element. This physics-based magnetic modeling results in the user interface exhibiting virtual detents.

In this example, physics-based magnetic modeling is achieved, for example, by modeling each element 1302, 1304, 1306, 1308 as an object made from a magnetized material that creates its own persistent magnetic field and modeling focus selector 1310 as a material that is attracted to a magnet, such as ferromagnetic materials including iron, cobalt, and nickel. In another example, the physics-based modeling can be achieved by modeling each element 1302, 1304, 1306, 1308 as an object made from a material that is attracted to a magnet and modeling focus selector 1310 as a material that creates its own persistent magnetic field. In another example, the physics-based modeling can be achieved by modeling each element 1302, 1304, 1306, 1308 as an object that creates its own persistent magnetic field and modeling focus selector 1310 as a material that also creates its own persistent magnetic field, such as two magnets that attract. Each of these physics-based models can be adapted to include magnetic fields that vary, rather than remain persistent, based on certain factors, such as the distance between the element and focus selector 1310, the speed of focus selector 1310, the acceleration of focus selector 1310, or based on a combination of two or more factors. For example, the varying magnetic field may be simulated through the use of an electromagnet which can be turned on and off and can have a varying strength.

Figure 13A:
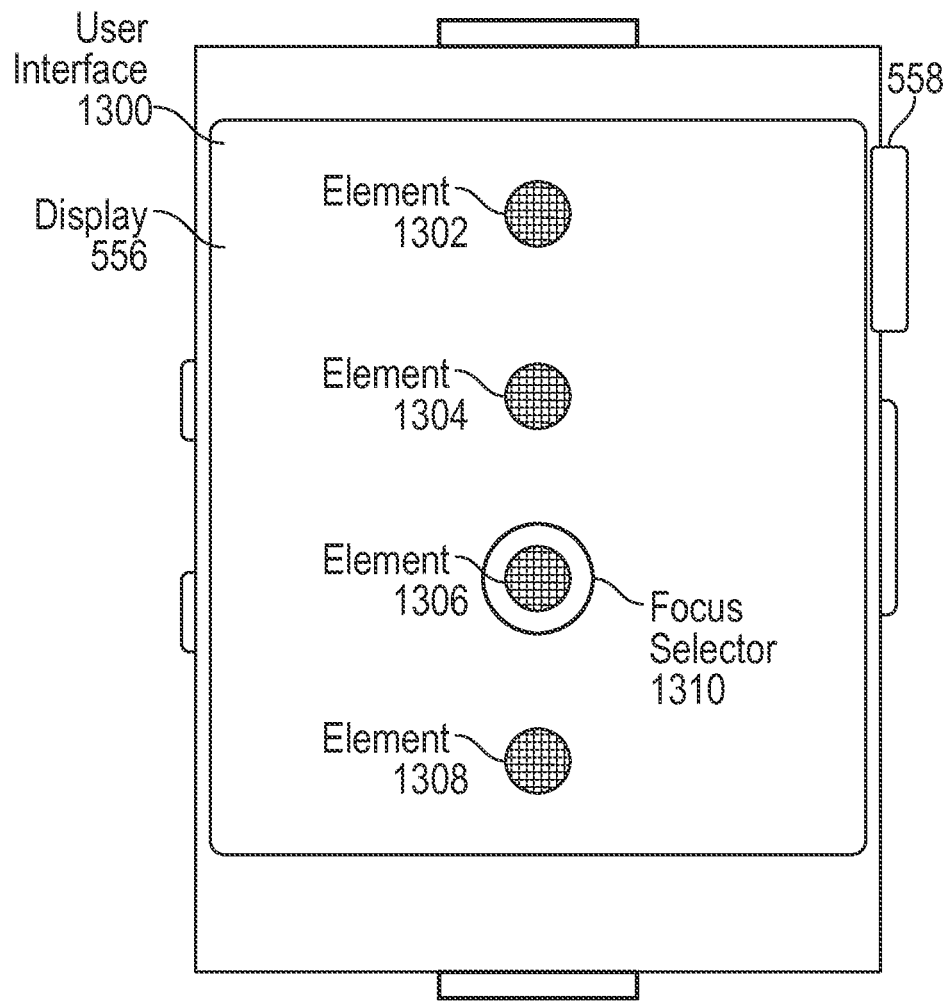
FIGS. 13A-13J illustrate exemplary graphical user interfaces for selecting an element using physics-based magnetic modeling in accordance with some embodiments.
Figure 13B:
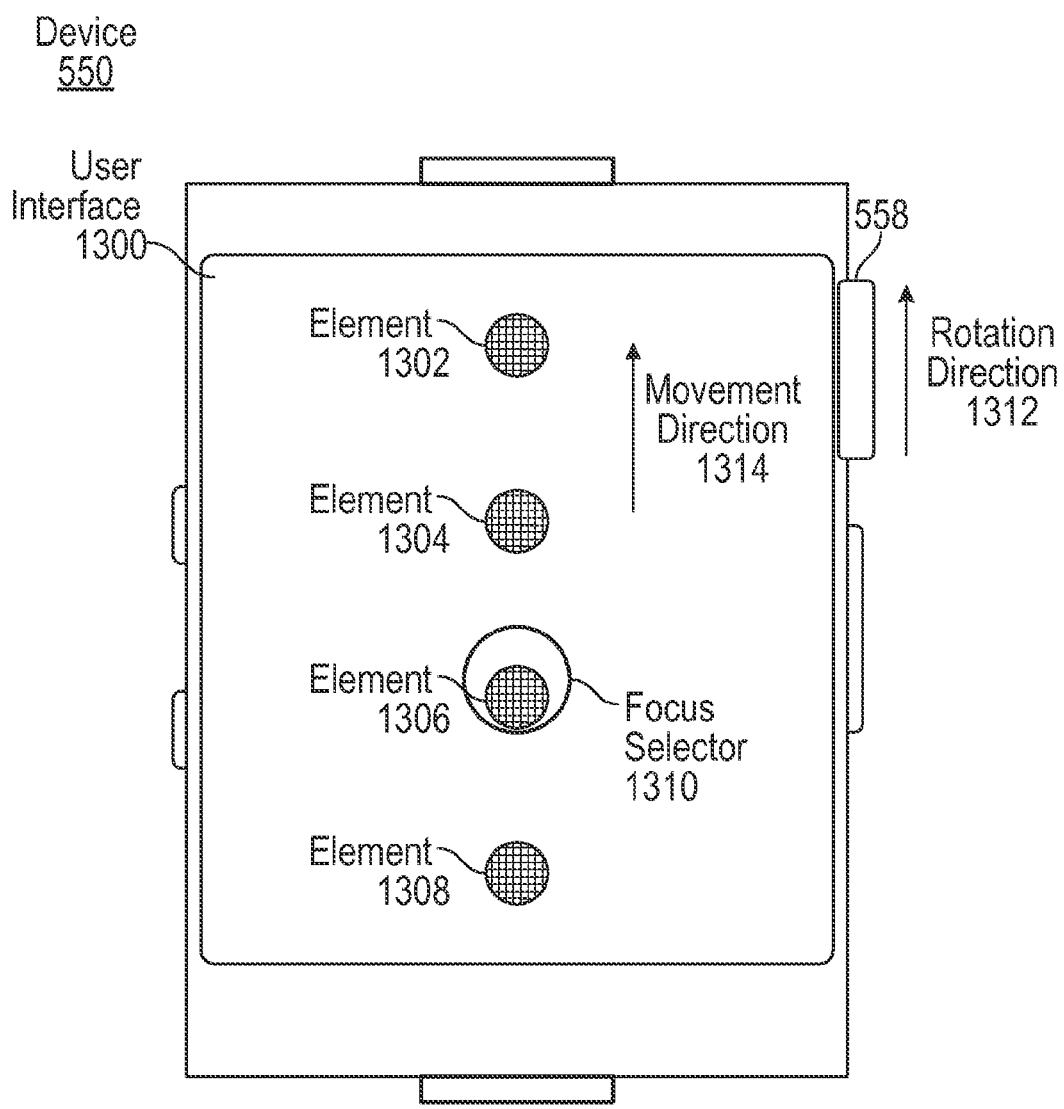

At FIG. 13A, focus selector 1310 is aligned with element 1306, indicating selection of element 1306. At FIG. 13B, device 550 determines a change in the position of crown 558 in the clockwise direction, as indicated by rotation direction arrow 1312. In response to determining the change in the position of the crown 558, the device increases the speed of focus selector 1310, moving focus selector 1310 in the up direction, as indicated by movement direction arrow 1314. In one example, focus selector 1310 may be associated with a mass or may have a calculated inertia.

Because element 1306 is modeled as a magnetic element and focus selector 1310 is modeled as a ferromagnetic material, there is a magnetic attraction between the two user interface objects. The physics-based model of user interface 1300 causes a resistance of the movement of focus selector 1310 away from element 1306 using this magnetic attraction. An element's magnetic value (e.g., the strength of an element's magnet attraction) may be modeled, for example, in terms of its pull force (the elements ability to move other objects). The pull force exerted may be based on the pull force of either an electromagnet or a permanent magnet as described by the Maxwell equation.

Figure 13C:
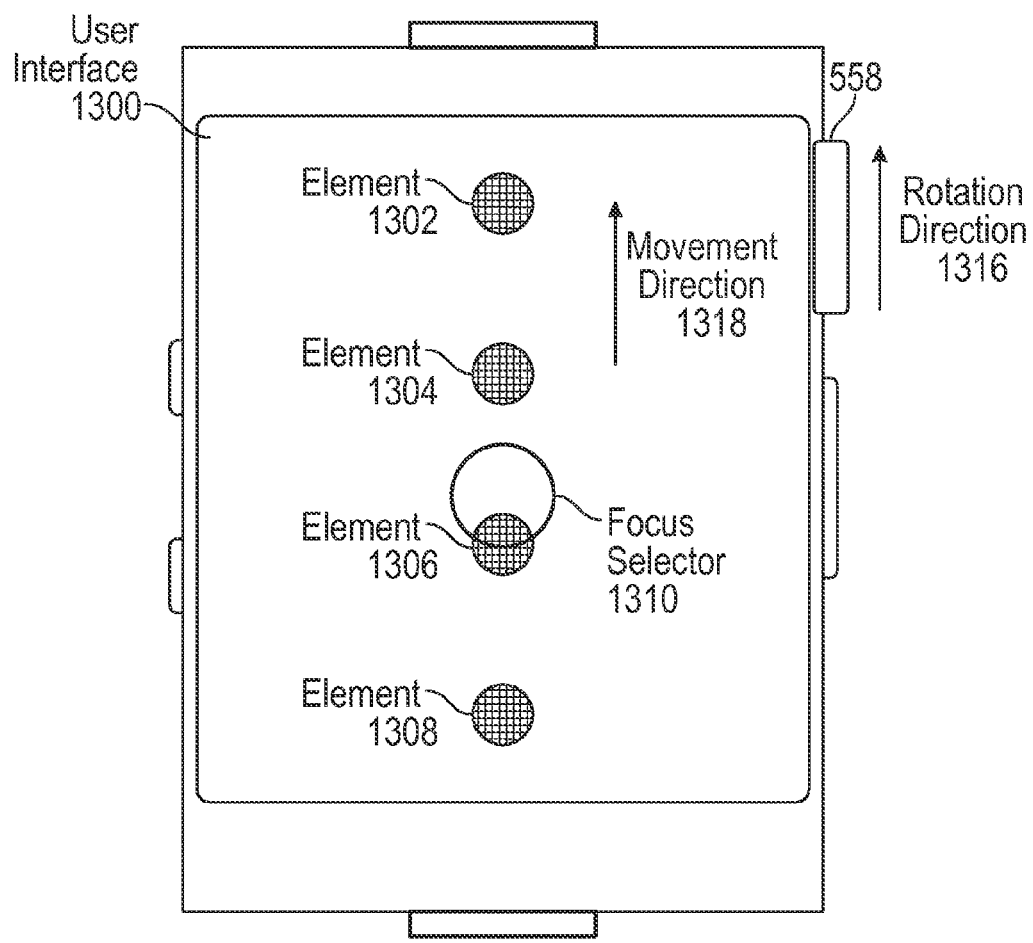
Figure 13D:
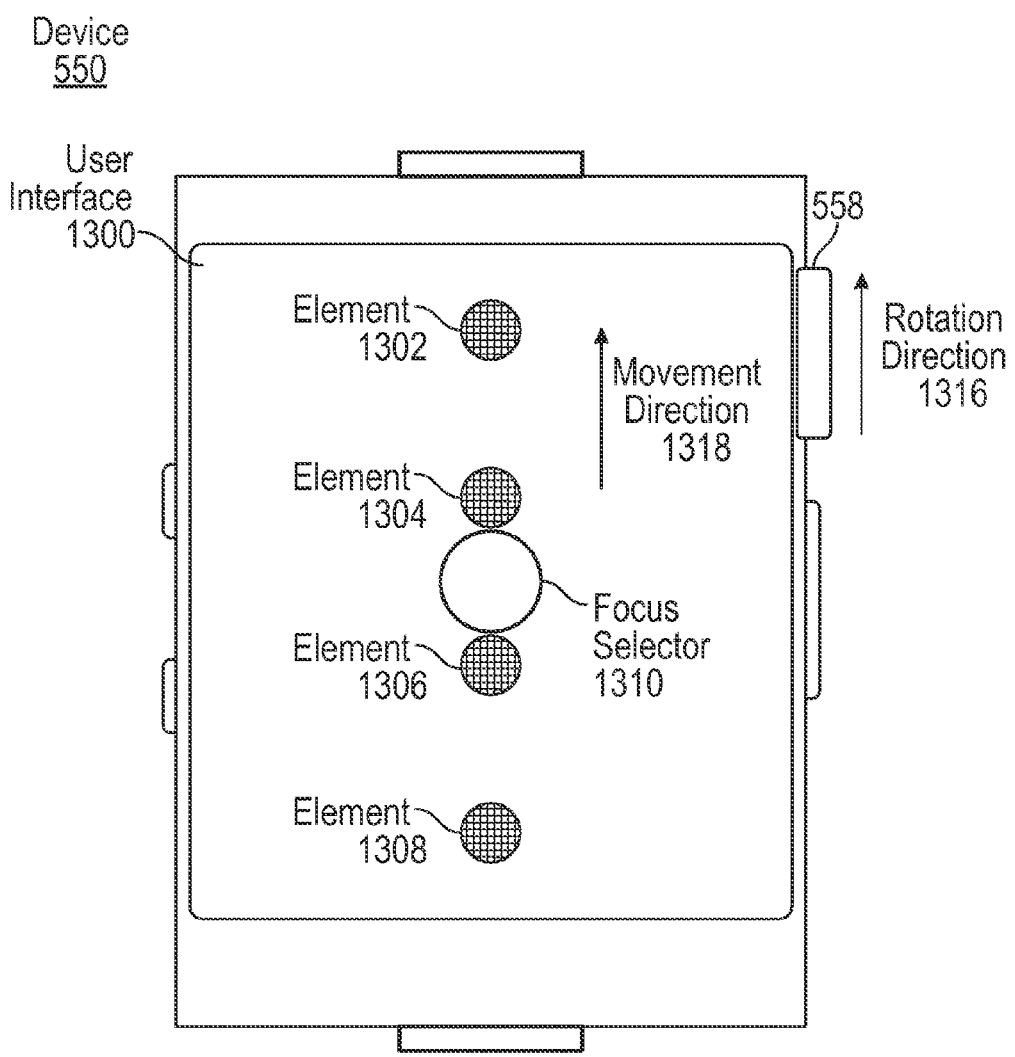

At FIGS. 13C-13D, device 550 continues to determine a change in the position of crown 558 in the clockwise direction, as indicated by rotation direction arrow 1316. In response to determining the change in the position of the crown 558, the device 550 adds additional speed to the focus selector 1310 in the up direction. At the same time, the magnetic attraction of elements 1302, 1304, 1306, and 1308 are acting on focus selector 1310. At FIG. 13C, elements 1306 and 1308 are applying a force to the focus selector 1310 in the down direction as a result of the physics-based magnetic modeling. Elements 1302 and 1304 are applying a force to focus selector 1310 in the up direction as a result of the physics-based magnetic modeling.

The distance between each element and focus selector 1310 also play a role in the amount of force the element applies to focus selector 1310. Generally, as the distance between the element and the focus selector 1310 increases, the intensity of the force between the element and the focus selector 1310 decreases. The rate of change in the intensity of the force can be modeled in many ways. For example, the inverse square law may apply the intensity of the force as a function of the distance. More specifically, $I=1/d^2$, where I is the intensity of the force and d is the distance. In other examples, the magnetic force can vary in direct inverse proportion to distance or can vary inversely with the third power of distance.

In some examples, the magnetic attraction between an element and a focus selector only exists while the focus selector is within an attraction area having an outer edge that is a predetermined distance from the element. This simplifies calculations because the magnetic force of elements with a distance from the focus selector that is greater than a predetermined distance are not considered in determining the forces applied to the focus selector.

In some examples, to add additional realism and provide further ease of usability to the user interface, the system may also employ a physics-based model of friction to reduce the speed of the focus selector while the focus selector is in motion. For example, the speed of the focus selector can be continuously (or repeatedly) decreased based on a friction coefficient value. This physics-based friction model may simulate kinetic friction, drag friction, or the like.

At FIG. 13D, focus selector 1310 is directly between elements 1302, 1304 and elements 1306, 1308. However, focus selector 1310 continues to move in the up direction based in part on the speed or inertia associated with focus selector 1310.

At FIGS. 13E-13J, device 550 determines that there is no change in the position of crown 558. As a result of this determination, no additional speed is added to the existing speed of focus selector 1310. However, the magnetic forces of elements 1302, 1304, 1306, 1308 continue to be applied, as well as the physics-based friction model. At FIGS. 13E-13J, element 1304 has the largest magnetic effect on focus selector 1310, as compared to elements 1302, 1306, 1308, because element 1304 is the closest to focus selector 1310. This physics-based magnetic modeling results in the user interface exhibiting virtual detents.

Figure 13E:
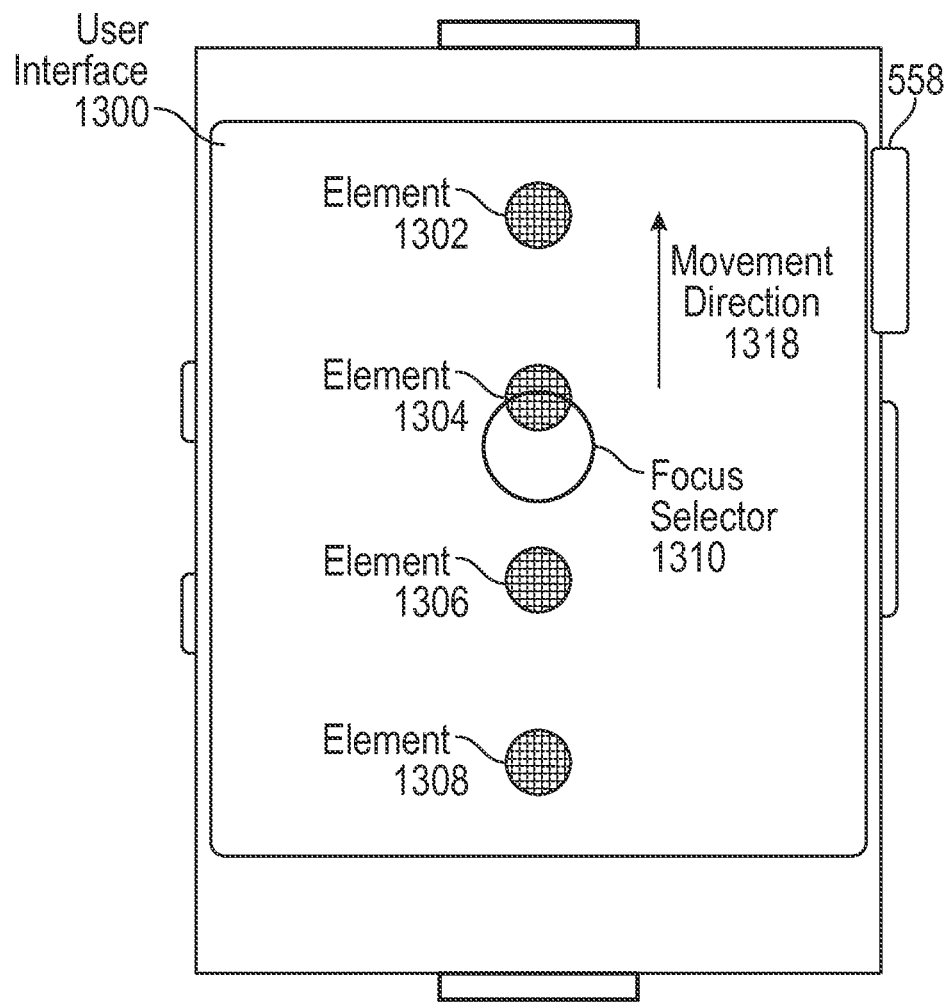
Figure 13F:
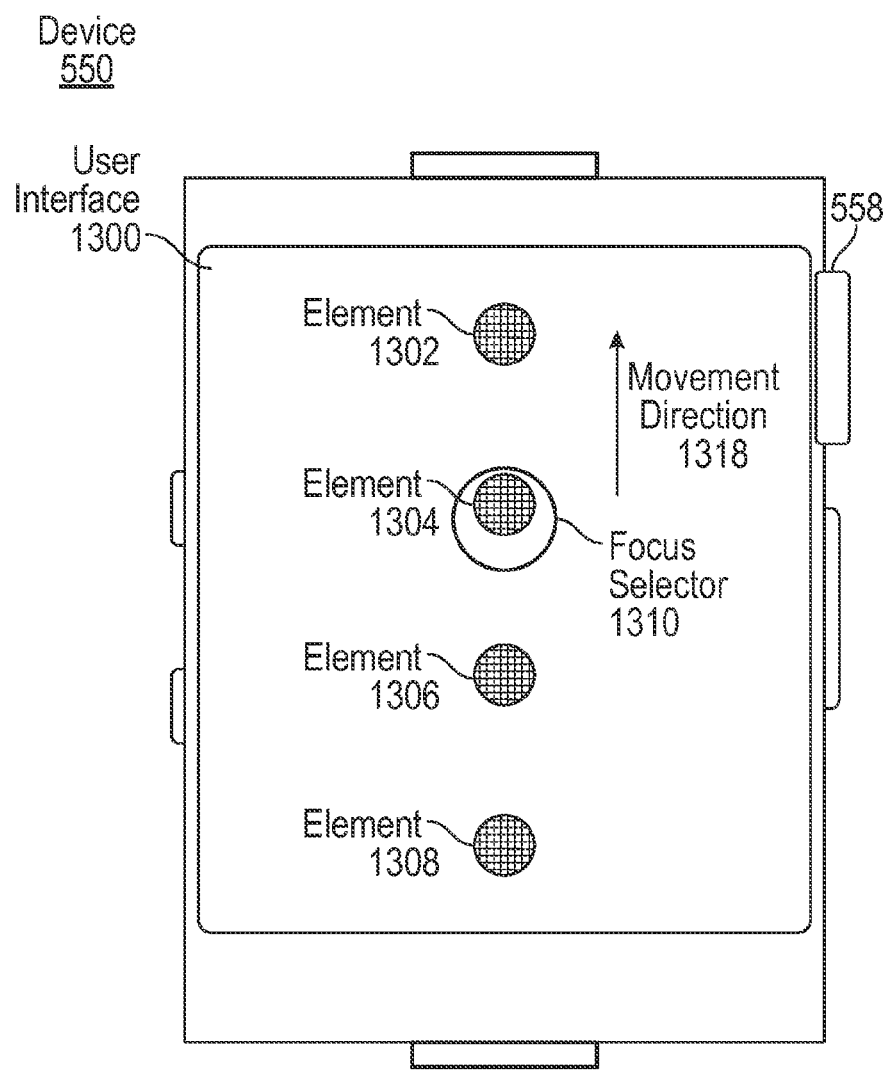
Figure 13G:
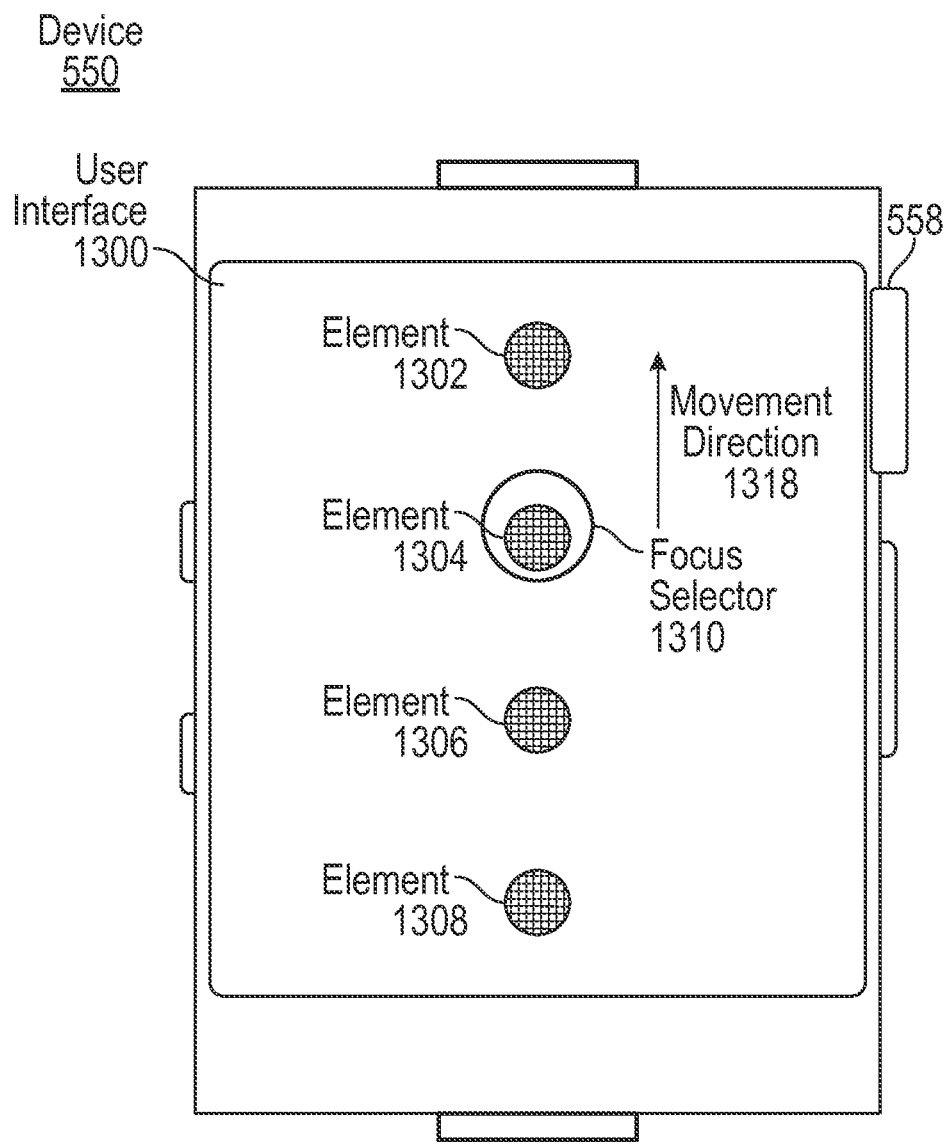
Figure 13H:
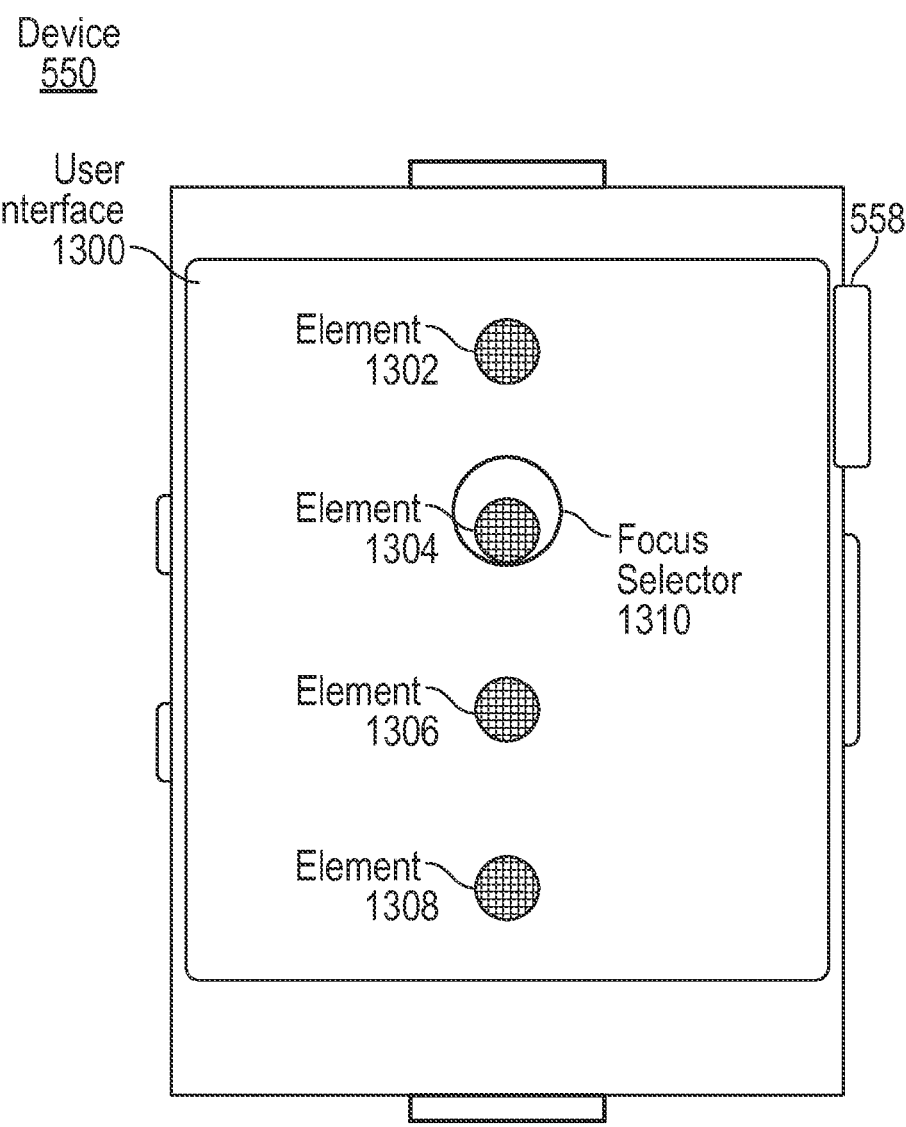
Figure 13I:
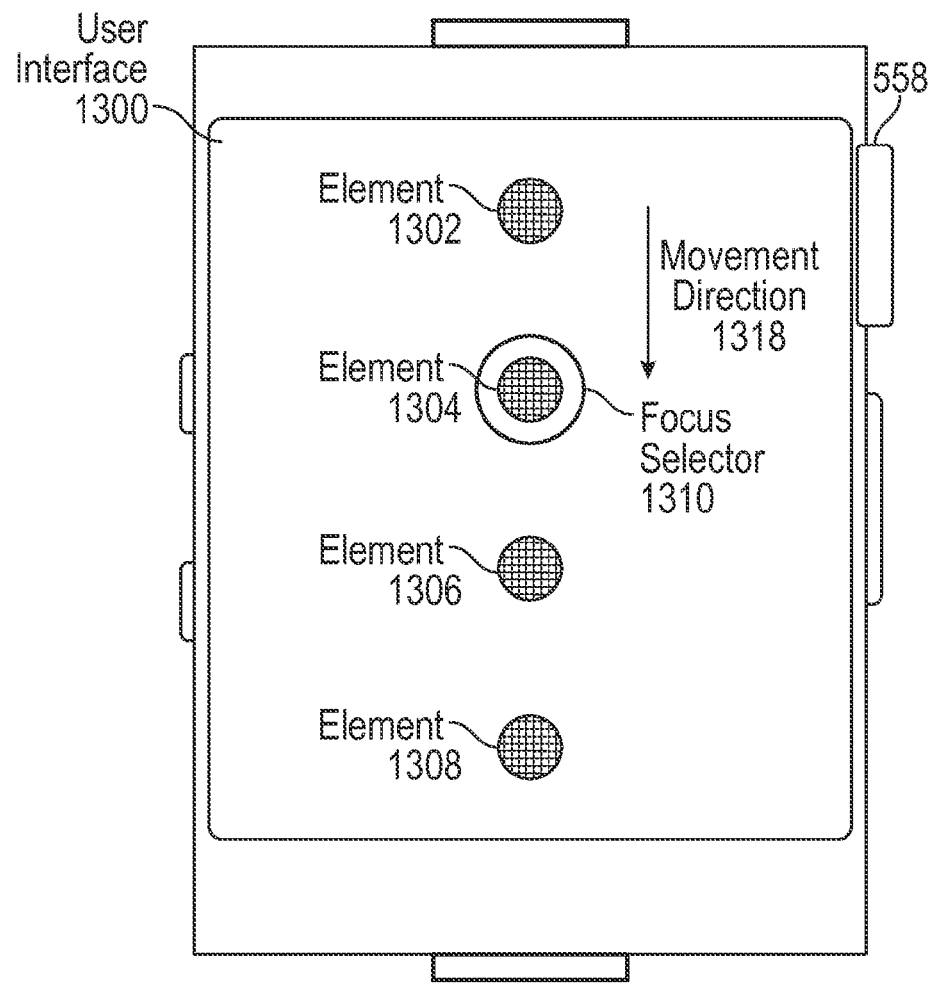
Figure 13J:
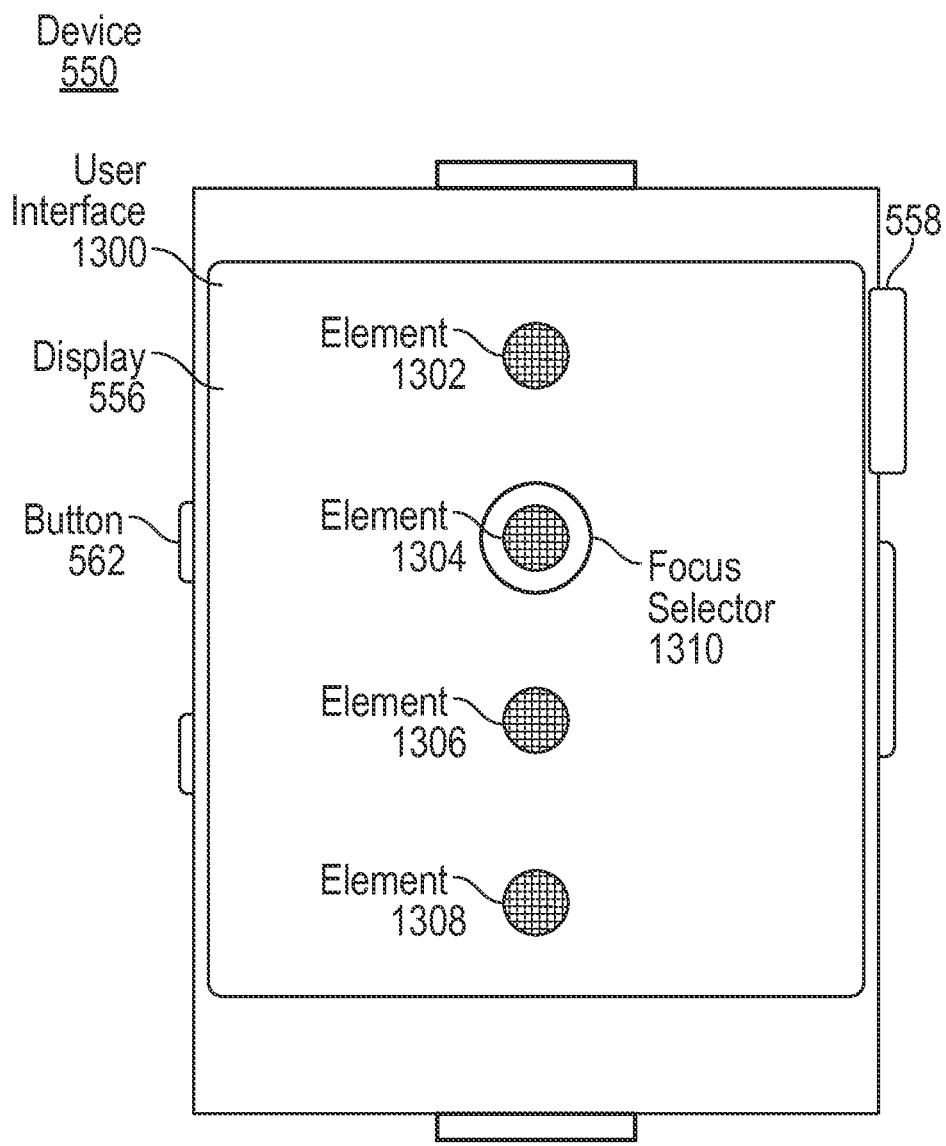

In FIGS. 13E-13F, element 1304 applies a magnetic force on focus selector 1310 in the up direction. At FIGS. 13G-13H, as focus selector 1310 overshoots element 1304, element 1304 applies a force on focus selector 1310 in the down direction, further reducing the speed of focus selector 1310 until focus selector 1310 reaches a momentary stop at FIG. 13H. At FIG. 13I, the magnetic force applied by element 1304 on focus selector 1310 in the down direction causes focus selector 1310 to move down and align with element 1304. At FIG. 13J, focus selector 1310 comes to rest while aligned with element 1304. The system interprets this alignment as a selection of element 1304, which is achieved by the user manipulating focus selector 1310 through the use of crown 558.

While element 1304 is selected, the user can activate element 1304 by one or more techniques. For example, the user may press on touch-sensitive display 556, press on the touch-sensitive display with force above a predetermined threshold, press button 562, or simply allow element 1304 to remain selected for a predetermined amount of time. In another example, aligning an element and a focus selector can be interpreted as both a selection and an activation of the element.

In this example, movement of focus selector 1310 is constrained along a predefined vertical path. In other examples, movement of the focus selector may be constrained along a different predefined path, or may not be constrained to a predefined path. In this example, alignment in only one axis (the vertical axis) is used to indicate selection of an element. In some examples, alignment in two, three, or more axes may be required between an element and a focus selector to indicate a selection.

Figure 13K:
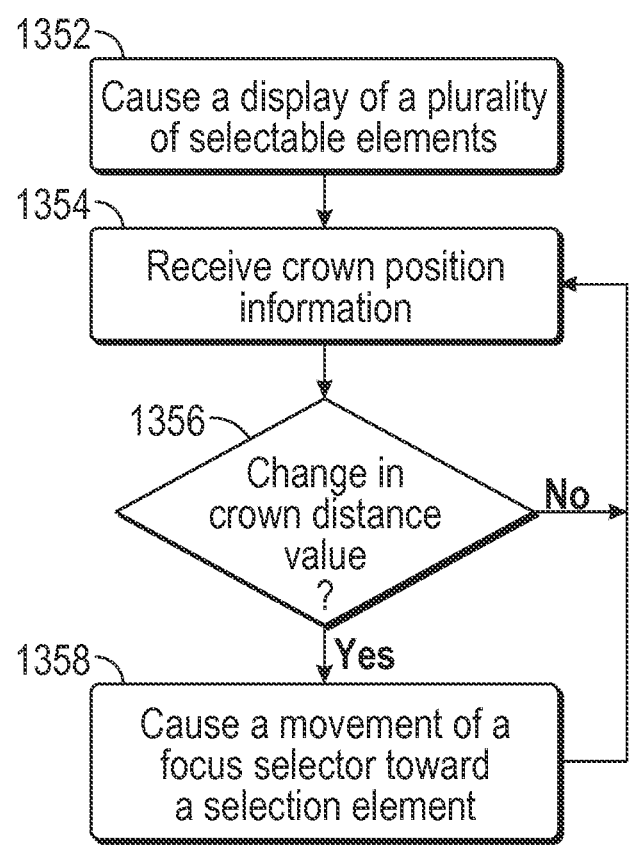
FIG. 13K is a flow diagram illustrating an exemplary process for selecting an element using physics-based magnetic modeling in accordance with some embodiments.

FIG. 13K is a flow diagram illustrating a process 1350 for selecting an element in a graphical user interface using a physical crown as an input device. Process 1350 is performed at a wearable electronic device (e.g., device 550 in FIG. 1) having a physical crown. In some examples, the electronic device also includes a touch-sensitive display. The process provides an efficient technique for selecting an element from among multiple elements in a graphical user interface.

At block 1352, the device causes a display of a plurality of selectable elements on a touch-sensitive display of a wearable electronic device. The device also causes a display of a focus selector. The device uses a physics-based model to simulate magnetic attraction between the selectable elements and the focus selector. Each selectable element of the plurality of selectable elements is associated with a corresponding magnetic value. The magnetic value can be the strength of an element's magnet attraction in terms of its pull force.

In some examples, the system causes the plurality of selectable elements to be displayed linearly and equidistantly. This configuration adds additional ease of selection of the elements by the user. This configuration is especially beneficial when the selectable elements have equal importance and are therefore weighted equally.

At block 1354, the device receives crown position information. The crown position information may be received as a series of pulse signals, real values, integer values, and the like.

At block 1356, the device determines whether a change has occurred in a crown distance value. The crown distance value is based on an angular displacement of the physical crown of the wearable electronic device. A change in the crown distance value is indicative of a user providing input to the wearable electronic device by, for example, turning the physical crown. If the device determines that a change in the crown distance value has not occurred, the system returns to block 1354 and continues receiving crown position information. If the device determines that a change in the crown distance value has occurred, the system continues to block 1358, though the system may continue to receive crown position information.

The device also determines a direction based on a direction of rotation of the physical crown of the wearable electronic device. For example, an up direction can be determined based on a clockwise rotation of the physical crown. Similarly, a down direction can be determined based on a counterclockwise rotation of the physical crown. In other examples, a down direction can be determined based on a clockwise rotation of the physical crown and an up direction can be determined based on a counterclockwise rotation of the physical crown.

At block 1358, in response to determining the change in the crown distance value, the devices causes a movement of the focus selector toward a selection element of the plurality of selectable elements. This movement changes the focus of the plurality of selectable elements. At least initially, the movement of the focus selector is in the determined direction. The movement of the focus selector may be animated. The movement has a rate of movement (speed). The system causes the rate of movement of the focus selector to change using the physics-based magnetic interaction of the focus selector with the selection element based at least on the magnetic value associated with the selection element. For example, the physics-based magnetic attraction of the selection element may cause the rate of movement of the focus selector to increase as the focus selector moves towards the selection element. Similarly, the physics-based magnetic attraction of the selection element may cause the rate of movement of the focus selector to decrease as the focus selector moves away from the selection element.

Similarly, the magnetic interaction of the focus selector with other selectable elements may cause a change in the rate of the movement of the focus selector. For example, the rate of the movement of the focus selector may change as it approaches and passes an element that remains unselected. The change in the rate of the movement of the focus selector resulting from this interaction with the unselected element is based at least in part on the magnetic value of the unselected element.

In some examples, the magnetic values associated with the selectable elements are virtual magnetic strengths based on a virtual pull force.

In some examples, to add additional realism and provide further ease of usability to the user interface, the system may employ a physics-based model of friction to reduce the rate of movement of the focus selector while it is in motion. For example, the rate of movement of the focus selector can be continuously (or repeatedly) decreased based on a friction coefficient value. This physics-based friction model may simulate kinetic friction, drag friction, or the like.

In some examples, the device receives an additional input through the rotation of the crown before the focus selector reaches a steady state. An object is in a steady state when the object is not being translated, rotated, or scaled. In this example, the system determines a second change in the crown distance value. The system also determines a second direction, which is based on the direction of rotation of the physical crown of the wearable electronic device. In response to determining the second change in the crown distance value, the system increases or decreases the rate of movement of the focus selector. The change in the rate of the movement of the focus selector is based on the second change in the crown distance value and the second direction.

In some examples, once the focus selector aligns with the selection element and is in a steady state, the system determines that the selection element has been selected.

FIGS. 14-21 illustrate an exemplary user interface 1400 displaying multiple user interface objects in the form of selectable elements 1402, 1404, 1406, 1408 and a focus selector 1410. A user can select a selection element from among the multiple selectable elements by using a physical crown of a wearable electronic device to move the focus selector 1410 to align with desired selection element. An additional input from the user can be used to activate the selection element that is selected.

Crown 558 of device 550 is a user rotatable user interface input (e.g., a rotatable input mechanism). Crown 558 can be turned in two distinct directions: clockwise and counterclockwise. FIGS. 14-20 include rotation direction arrows illustrating the direction of crown rotation and movement direction arrows illustrating the direction of movement of one or more user interface objects, where applicable. The rotation direction arrows and movement direction arrows are typically not part of the displayed user interface, but are provided to aid in the interpretation of the figures. In this example, a clockwise direction rotation of crown 558 is illustrated by a rotation direction arrow pointing in the up direction. Similarly, a counterclockwise direction rotation of crown 558 is illustrated by a rotation direction arrow pointing in the down direction. The characteristics of the rotation direction arrow are not indicative of the distance, speed, or acceleration with which crown 558 is rotated by a user. Instead, the rotation direction arrow is indicative of the direction of rotation of crown 558 by the user.

FIGS. 14-21 illustrate an exemplary physics-based model that can be used to control a user's interactions with user interface objects in conjunction with a physical crown user input device. In this example, the elements 1402, 1404, 1406, 1408 are stationary and the focus selector 1410 is movable via user input received from crown 558. Clockwise movement of crown 558 is associated with a force on the focus selector 1410 in the up movement direction and counterclockwise movement of crown 558 is associated with a force on the focus selector 1410 in the down movement direction.

To facilitate a user's ability to control the movement of focus selector 1410 among the four user-selectable elements 1402, 1404, 1406, 1408, a "magnetic" relationship is associated between each user selectable element and the focus selector 1410. Each element 1402, 1404, 1406, 1408 is associated with a magnetic value. In this example, the magnetic values of elements 1302, 1304, 1306, 1308 are not all equal. Unequal magnetic values may be helpful for allowing a user to more easily select particular options. For example, if the system expects that 90% of the time a user will select a particular option from among multiple options, the magnetic value of the particular option may be configured to be significantly higher than the magnetic value of the other multiple options. This allows the user to quickly and easily select the particular option, while requiring more precise navigation of the user interface by the user to select one of the other multiple options.

In this example, the magnetic value of element 1402 is equal to the magnetic value of element 1404. This is illustrated in FIGS. 14-21 by the equal size of elements 1402 and 1404. The magnetic value of element 1406 is less than the magnetic value of element 1404. This is illustrated in FIGS. 14-21 by the reduced size of element 1406. The magnetic value of element 1408 is larger than the magnetic value of element 1404. This is illustrated in FIGS. 14-21 by the larger size of element 1408. Thus, in this example, the magnetic strength of each of the elements 1402, 1404, 1406, 1408 is represented in FIGS. 14-21 by the relative size of the elements 1402, 1404, 1406, 1408.

Using the magnetic relationship between the elements 1402, 1404, 1406, 1408 and focus selector 1410, physics-based modeling can be used to simulate magnetic attraction between elements 1402, 1404, 1406, 1408 and focus selector 1410. As will be described in further detail below, user interface 1400 causes an attraction between elements 1402, 1404, 1406, 1408 and focus selector 1410. As a result, when user input is not received, focus selector 1410 ultimately reaches a steady state where it is aligned with one of elements 1402, 1404, 1406, 1408. An object is in a steady state when the object is not being translated, rotated, or scaled. The alignment of focus selector 1410 with the element is indicative of the selection of that element. In other examples, additional input, such as tapping, pressing the crown or another button may be required for selection. This physics-based magnetic modeling results in the user interface exhibiting virtual detents.

In this example, physics-based magnetic modeling is achieved by modeling each element 1402, 1404, 1406, 1408 as an object made from a magnetized material that creates its own persistent magnetic field and modeling focus selector 1410 as a material that is attracted to a magnet, such as ferromagnetic materials including iron, cobalt, and nickel. Other physics-based models can be used, such as those described above.

In this example, the magnetic strength of the elements 1402, 1404, 1406, 1408 are not all the same, as described above. Further, the magnetic strength of elements 1402, 1404, 1406, 1408 vary based on the speed of focus selector 1410. The higher the speed of focus selector 1410, the lower the magnetic strength of elements 1402, 1404, 1406, 1408. The lower the speed of focus selector 1410, the higher the magnetic strength of elements 1402, 1404, 1406, 1408. As a result, when focus selector 1410 is moving quickly, the elements 1402, 1404, 1406, 1408 play a reduced role in changing the speed of the focus selector as compared to when focus selector 1410 is moving slowly.

The technique of varying the magnetic strength of elements 1402, 1404, 1406, 1408 is illustrated in FIGS. 14-21. The magnetic strength (and in this example, the size) of elements 1402, 1404, 1406, 1408 is based on the speed of focus selector 1410. For example, the varying magnetic strengths may be simulated through the use of electromagnets which can have varying strengths.

Figure 14:
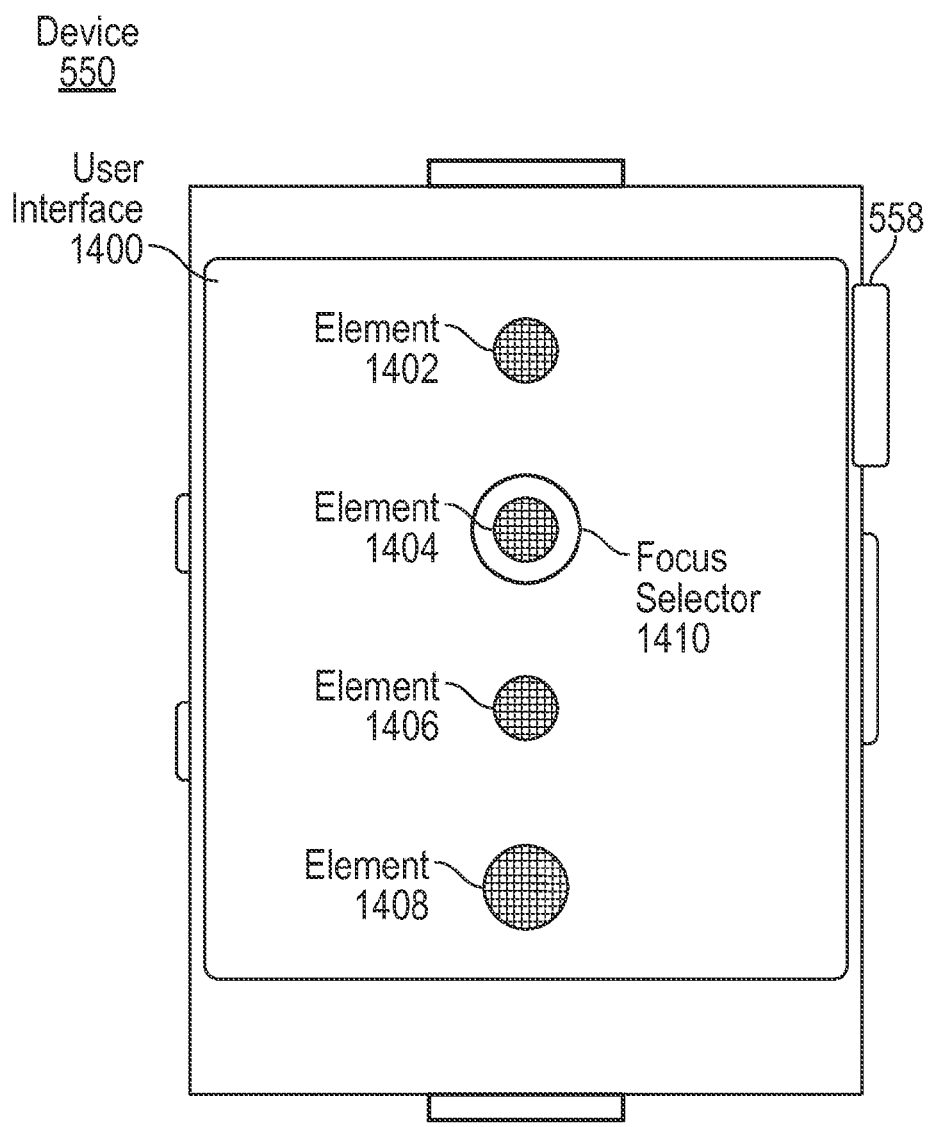
FIGS. 14-21 illustrate exemplary graphical user interfaces for selecting an element from among elements with varying magnetic values in accordance with some embodiments.

At FIG. 14, focus selector 1410 is aligned with element 1404, indicating selection of element 1404. In some examples, additional input, such as tapping, pressing the crown or another button may be required for selection. At FIG. 15, device 550 determines a change in the position of crown 558 in the counterclockwise direction, as indicated by rotation direction arrow 1430. In response to determining the change in the position of the crown 558, the device increases the speed of focus selector 1410, moving the focus selector 1410 in the down direction, as indicated by movement direction arrow 1420. In one example, the focus selector may be associated with a mass or may have a calculated inertia.

Because element 1406 is modeled as a magnetic element and focus selector 1410 is modeled as a ferromagnetic material, there is a magnetic attraction between the two user interface objects. An element's magnetic value (e.g., the strength of an element's magnet attraction) may be modeled, for example, in terms of its pull force (the elements ability to move other objects). The pull force exerted may be based on the pull force of either an electromagnet or a permanent magnet as described by the Maxwell equation.

Figure 15:
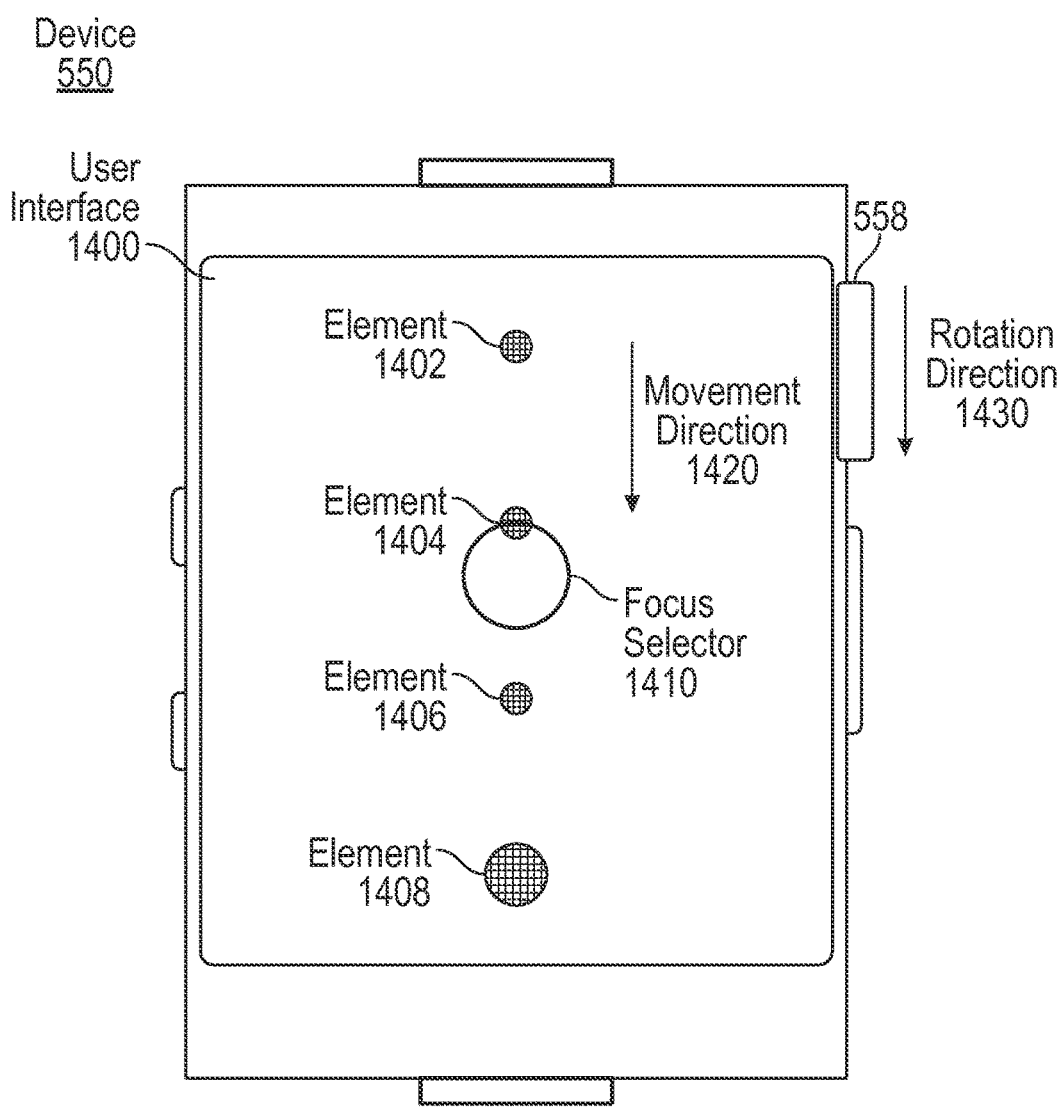
Figure 16:
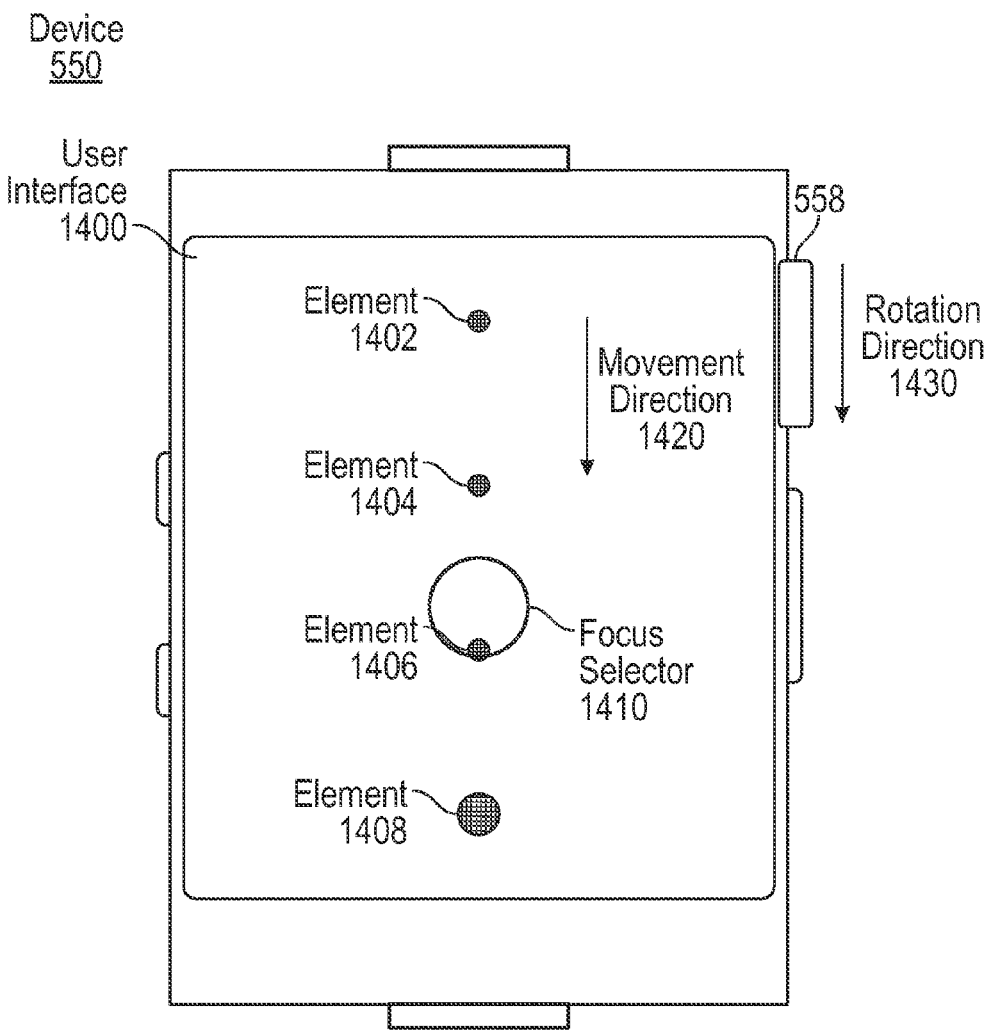
Figure 17:
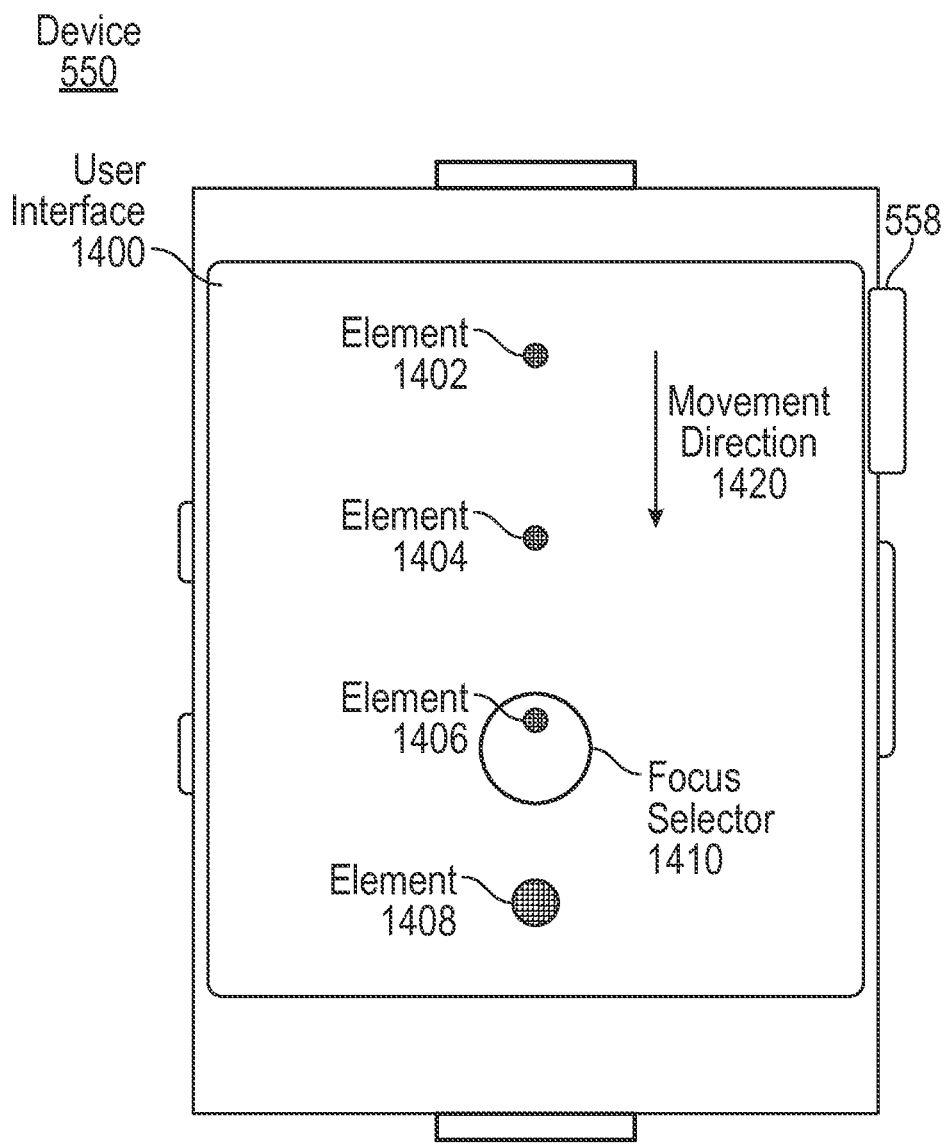

However, the magnetic strength of elements 1402, 1404, 1406, 1408 is based on the speed of the focus selector 1410. The faster the focus selector 1410 is moving, the smaller the magnetic strengths of elements 1402, 1404, 1406, 1408. This is illustrated in FIGS. 15-17. As the focus selector 1410 speeds up, elements 1402, 1404, 1406, 1408 lose their magnetic strength. This loss of magnetic strength is depicted in FIGS. 15-17 with the reduced size of elements 1402, 1404, 1406, 1408 for illustrative purposes. Generally, the size of elements and focus selectors do not visually change with changes to their magnetic strength.

Figure 18:
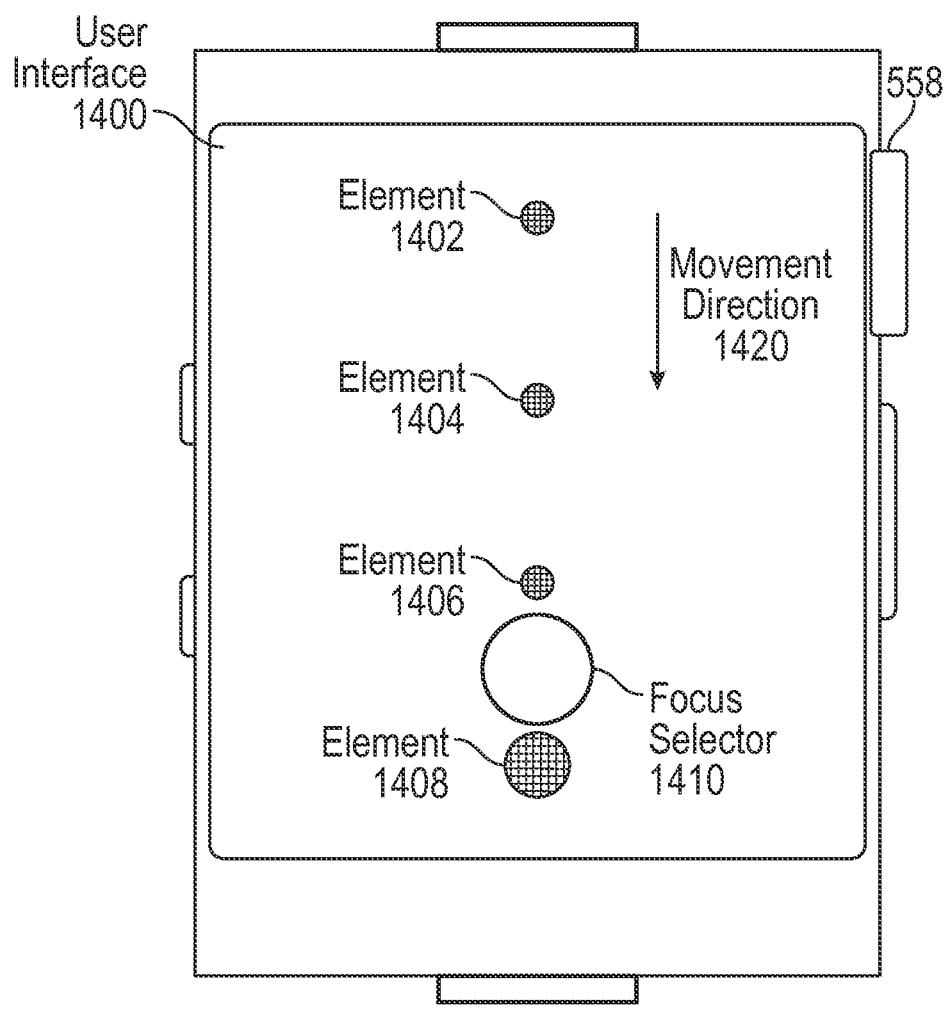
Figure 19:
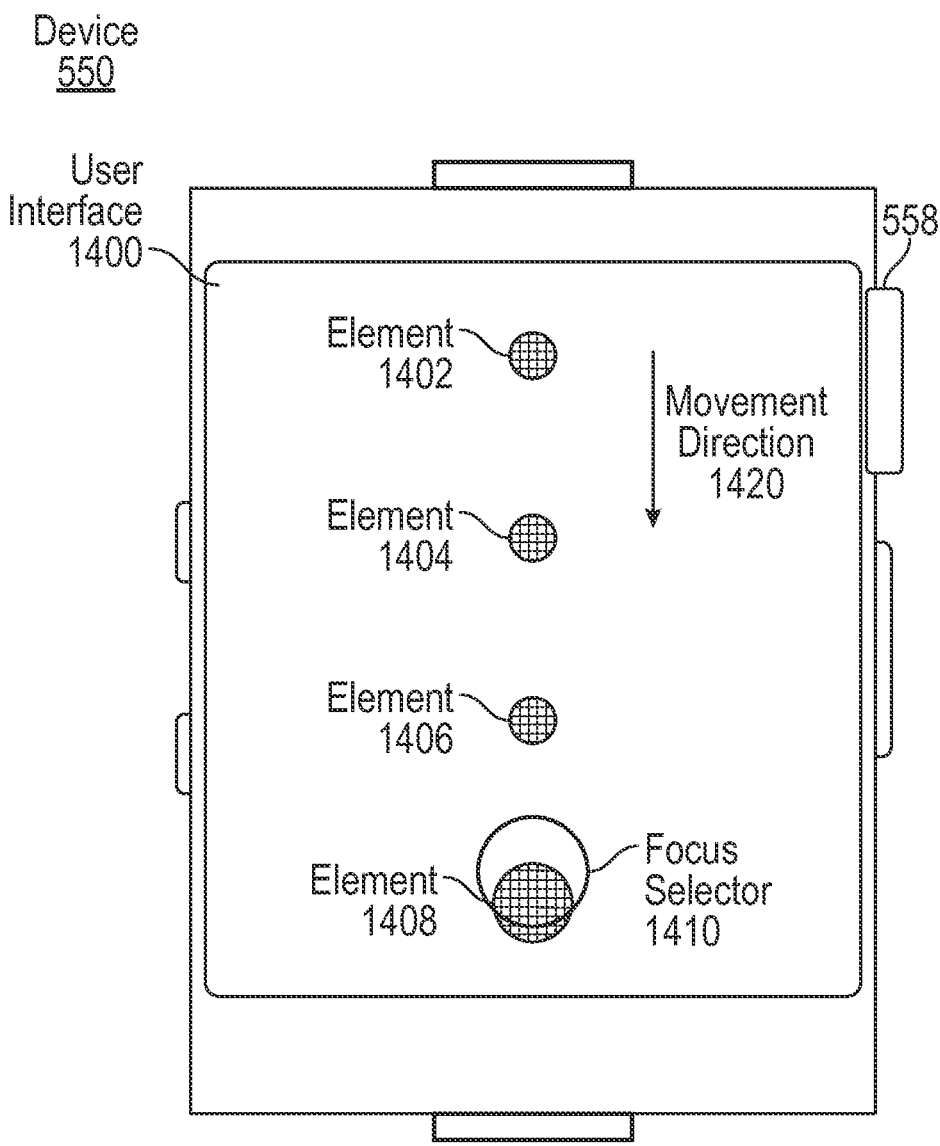
Figure 20:
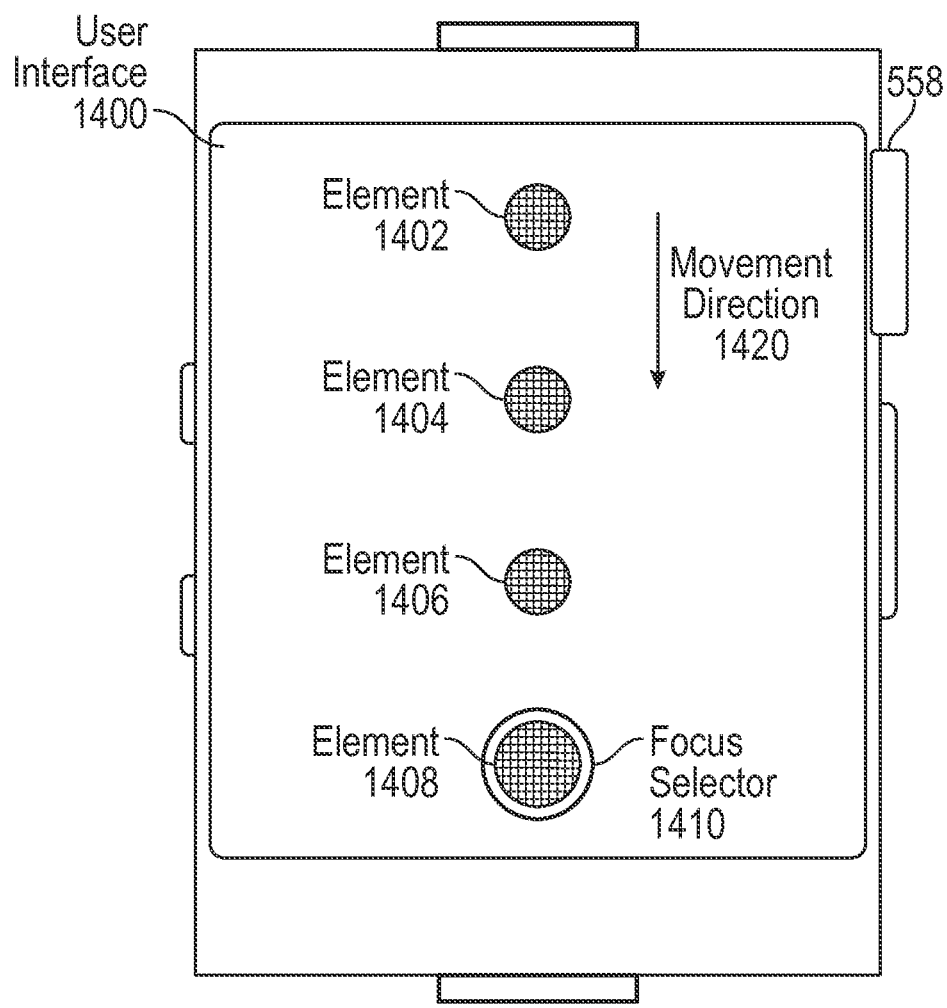
Figure 21:
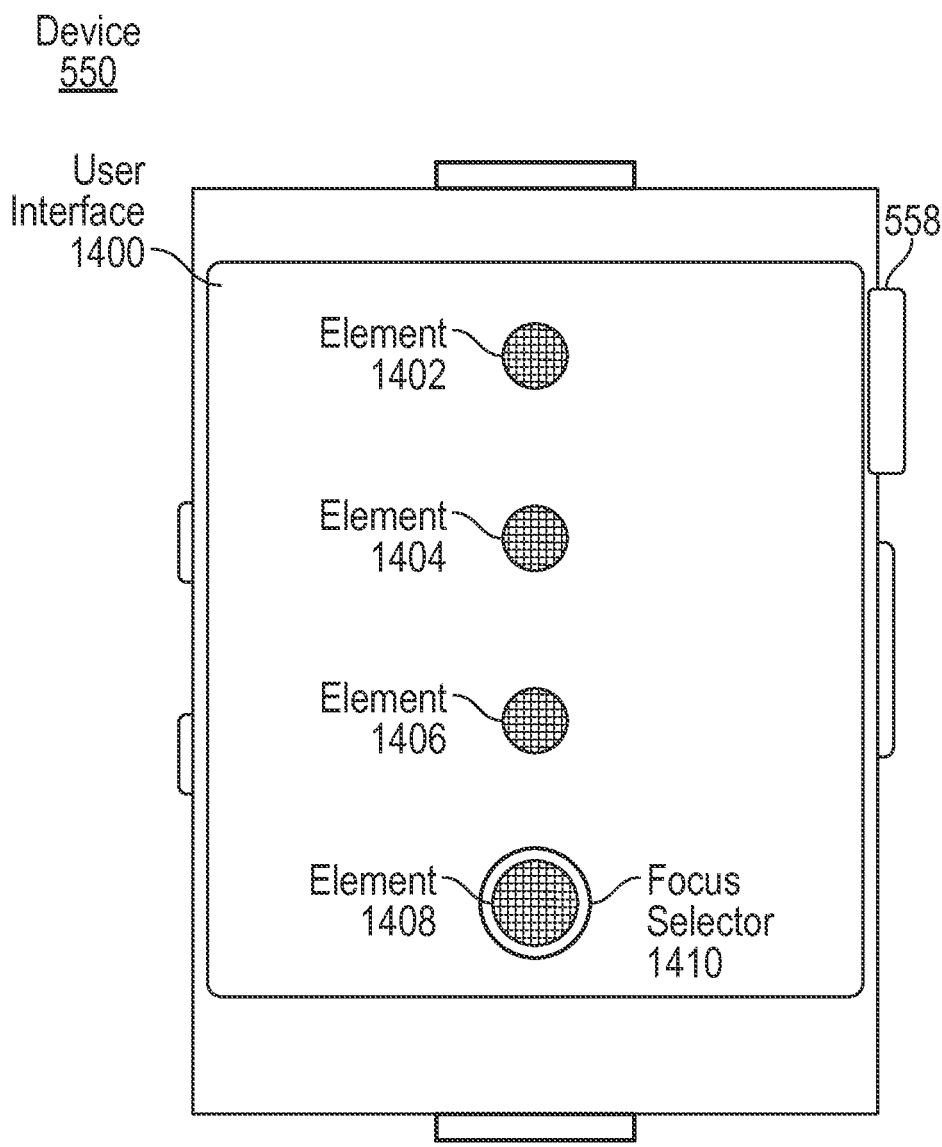

At FIGS. 18-20, focus selector 1410 slows down. The slower the focus selector 1410 is moving, the larger the magnetic strengths of elements 1402, 1404, 1406, 1408. This is illustrated in FIGS. 18-20. As the focus selector 1410 slows down, elements 1402, 1404, 1406, 1408 regain their magnetic strength. This regain of magnetic strength is depicted in FIGS. 18-20 with the increased size of elements 1402, 1404, 1406, 1408 for illustrative purposes. Generally, the size of elements and focus selectors do not visually change with changes to their magnetic strength. To summarize, the magnetic strength of the elements is inversely related to the speed of the focus selector.

As before, the distance between each element 1402, 1404, 1406, 1408 and focus selector 1410 also plays a role in the amount of force the elements apply to focus selector 1410.

In some examples, the magnetic attraction between an element and a focus selector only exists while the focus selector is within an attraction area having an outer edge that is a predetermined distance from the element. This simplifies calculations because the magnetic force of elements with a distance from the focus selector that is greater than a predetermined distance are not considered in determining the forces applied to the focus selector.

In some examples, to add additional realism and provide further ease of usability to the user interface, the system may also employ a physics-based model of friction to reduce the speed of the focus selector while it is in motion. For example, the speed of the focus selector can be continuously (or repeatedly) decreased based on a friction coefficient value. This physics-based friction model may simulate kinetic friction, drag friction, or the like.

At FIGS. 19-20, the magnetic force applied by element 1408 on focus selector 1410 in the down direction causes focus selector 1410 to move down and align with element 1408. At FIG. 21, focus selector 1410 comes to rest while aligned with element 1408. The system interprets this alignment as a selection of element 1408, which is achieved by the user manipulating focus selector 1410 through the use of crown 558. In some examples, additional input, such as tapping, pressing the crown or another button may be required for selection. Further user input can be used to activate the selection.

While element 1408 is selected, the user can activate element 1408 by one or more of many techniques. For example, the user may press on the touch-sensitive display of the device, press on the touch-sensitive display with force above a predetermined threshold, press a button, or simply allow element 1408 to remain selected for a predetermined amount of time. In another example, aligning an element and a focus selector can be interpreted as both a selection and an activation of the element.

In this example, movement of the focus selector is constrained along a predefined vertical path. In other examples, movement of the focus selector may be constrained along a different predefined path, or may not be constrained to a predefined path. In this example, alignment in only one axis (the vertical axis) is used to indicate selection of an element. In some examples, alignment in two, three, or more axes may be required between an element and a focus selector to indicate a selection. In some examples, additional input, such as tapping, pressing the crown or another button after the alignment may be required for selection.

Figure 22:
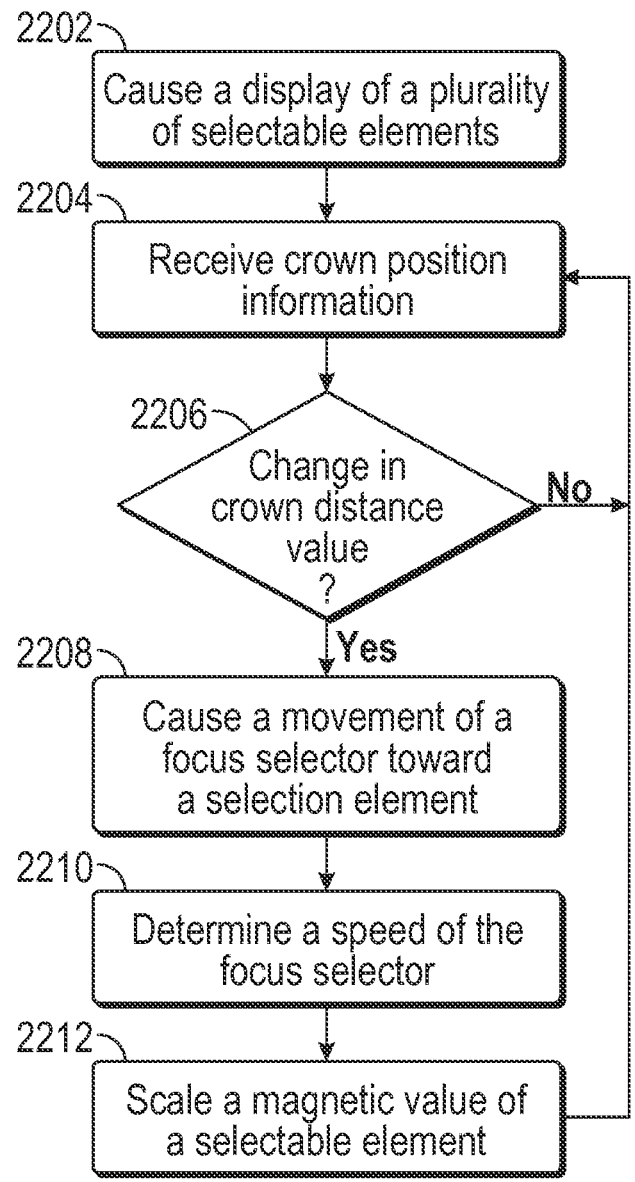
FIG. 22 is a flow diagram illustrating an exemplary process for selecting an element from among elements with varying magnetic values in accordance with some embodiments.

FIG. 22 is a flow diagram illustrating a process 2200 for selecting an element in a graphical user interface using a physical crown as an input device. Process 2200 is performed at a wearable electronic device (e.g., device 550 in FIG. 1) having a physical crown. In some examples, the electronic device also includes a touch-sensitive display. The process provides an efficient technique for selecting an element from among multiple elements in a graphical user interface.

At block 2202, the device causes a display of a plurality of selectable elements on a touch-sensitive display of a wearable electronic device. The device also causes a display of a focus selector. The device uses a physics-based model to simulate magnetic attraction between the selectable elements and the focus selector. Each selectable element of the plurality of selectable elements is associated with a corresponding magnetic value. The magnetic value can be the strength of an element's magnet attraction in terms of its pull force, and each element can have a different magnetic value.

At block 2204, the device receives crown position information. The position information may be received as a series of pulse signals, real values, integer values, and the like.

At block 2206, the device determines whether a change has occurred in a crown distance value. The crown distance value is based on an angular displacement of the physical crown of the wearable electronic device. A change in the crown distance value is indicative of a user providing input to the wearable electronic device by, for example, turning the physical crown. If the device determines that a change in the crown distance value has not occurred, the system returns to block 2204 and continues receiving crown position information. If the device determines that a change in the crown distance value has occurred, the system continues to block 2208, though the system may continue to receive crown position information.

The device also determines a direction based on a direction of rotation of the physical crown of the wearable electronic device. For example, an up direction can be determined based on a clockwise rotation of the physical crown. Similarly, a down direction can be determined based on a counterclockwise rotation of the physical crown. In other examples, a down direction can be determined based on a clockwise rotation of the physical crown and an up direction can be determined based on a counterclockwise rotation of the physical crown.

At block 2208, in response to determining the change in the crown distance value, the device causes a movement of the focus selector toward a selection element of the plurality of selectable elements. This movement changes the focus of the plurality of selectable elements. At least initially, the movement of the focus selector is in the determined direction. The movement of the focus selector may be animated. The movement has a rate of movement (speed).

In some examples, a minimum angular velocity of crown rotation that is necessary for the focus selector to reach an escape velocity corresponds directly to the instantaneous angular velocity of crown 558 (FIG. 1), meaning that the user interface of device 550, in essence, responds when crown 558 reaches a sufficient angular velocity. In some embodiments, the minimum angular velocity of crown rotation necessary for reaching the escape velocity is a calculated velocity that is based on, but not directly equal to, the instantaneous ("current") angular velocity of crown 558. In these examples, device 550 can maintain a calculated crown (angular) velocity V in discrete moments in time T according to equation 1:

$$VT = V(T-1) + \Delta V CROWN - \Delta V DRAG. \quad (EQ. 1)$$

In equation 1, VT represents a calculated crown velocity (speed and direction) at time T, V(T−1) represents the previous velocity (speed and direction) at time T−1, ΔVCROWN represents the change in velocity caused by the force being applied through the rotation of the crown at time T, and ΔVDRAG represents the change in velocity due to a drag force. The force being applied, which is reflected through ΔVCROWN, can depend on the current velocity of angular rotation of the crown. Thus, ΔVCROWN can also depend on the current angular velocity of the crown. In this way, device 550 can provide user interface interactions based not only on instantaneous crown velocity but also based on user input in the form of crown movement over multiple time intervals, even if those intervals are finely divided. Note, typically, in the absence of user input in the form of ΔVCROWN, VT will approach (and become) zero based on ΔVDRAG in accordance with EQ. 1, but VT would not change signs without user input in the form of crown rotation (ΔVCROWN).

Typically, the greater the velocity of angular rotation of the crown, the greater the value of ΔVCROWN will be. However, the actual mapping between the velocity of angular rotation of the crown and ΔVCROWN can be varied depending on the desired user interface effect. For example, various linear or non-linear mappings between the velocity of angular rotation of the crown and ΔVCROWN can be used.

Also, ΔVDRAG can take on various values. For example, ΔVDRAG can depend on the velocity of crown rotation such that at greater velocities, a greater opposing change in velocity (ΔVDRAG) can be produced. In another example, ΔVDRAG can have a constant value. It should be appreciated that the above-described requirements of ΔVCROWN and ΔVDRAG can be changed to produce desirable user interface effects.

As can be seen from EQ. 1, the maintained velocity (VT) can continue to increase as long as ΔVCROWN is greater than ΔVDRAG. Additionally, VT can have non-zero values even when no ΔVCROWN input is being received, meaning that user interface objects can continue to change without the user rotating the crown. When this occurs, objects can stop changing based on the maintained velocity at the time the user stops rotating the crown and the ΔVDRAG component.

In some examples, when the crown is rotated in a direction corresponding to a rotation direction that is opposite the current user interface changes, the V(T−1) component can be reset to a value of zero, allowing the user to quickly change the direction of the object without having to provide a force sufficient to offset the VT.

At block 2210, the system determines a speed of the focus selector. The speed of the focus selector may be determined based on crown velocity, as described above.

At block 2212, the magnetic values of one or more of the selectable elements are modified based on the speed of the focus selector. In one example, the magnetic values of one or more selectable elements are inversely related to the speed of the focus selector. For example, when the focus selector has a speed above a first threshold, the magnetic values of the selectable elements are reduced by a factor of 10 from their original values. When the focus selector has a speed below the first threshold and above a second threshold, the magnetic values of the selectable elements are reduced by a factor of 5 from their original values. When the focus selector further slows down and has a speed below the second threshold, the magnetic values of the selectable elements are returned to their original values.

In addition, the speed of the focus selector is changed because of the physics-based magnetic interaction of the focus selector with the selection element based at least on the magnetic value associated with the selection element. For example, the physics-based magnetic attraction of the selection element may cause the speed of the focus selector to increase as the focus selector moves towards the selection element. Similarly, the physics-based magnetic attraction of the selection element may cause the speed of the focus selector to decrease as the focus selector moves away from the selection element.

Similarly, the magnetic interaction of the focus selector with other selectable elements may cause a change in the speed of the focus selector. For example, the speed of the focus selector may change as it approaches and passes an element that remains unselected. The change in the speed of the focus selector resulting from this interaction with the unselected element is based at least in part on the magnetic value of the unselected element.

In some examples, the magnetic values associated with the selectable elements are virtual magnetic strengths based on a virtual pull force.

In some examples, to add additional realism and provide further ease of usability to the user interface, the system may employ a physics-based model of friction to reduce the speed of the focus selector while it is in motion. For example, the speed of the focus selector can be continuously (or repeatedly) decreased based on a friction coefficient value. This physics-based friction model may simulate kinetic friction, drag friction, or the like.

In some examples, the device receives an additional input through the rotation of the crown before the focus selector reaches a steady state. An object is in a steady state when the object is not being translated, rotated, or scaled. In this example, the system determines a second change in the crown distance value. The system also determines a second direction, which is based on the direction of rotation of the physical crown of the wearable electronic device. In response to determining the second change in the crown distance value, the system increases or decreases the speed of the focus selector by applying an additional force to the focus selector. The change in the rate of the movement of the focus selector is based on the second change in the crown distance value and the second direction.

In some examples, once the focus selector aligns with the selection element and is in a steady state, the system determines that the selection element has been selected.

FIGS. 23-30 illustrate an exemplary user interface 2300 displaying multiple user interface objects in the form of selectable elements 2302, 2304, 2306, 2308 and a focus selector 2310. A user can select a selection element from among the multiple selectable elements by using a physical crown of a wearable electronic device to move the focus selector 2310 to align with desired selection element. In some examples, additional input, such as tapping, pressing the crown or another button after the alignment may be required for the user to select the selection element.

Crown 558 of device 550 is a user rotatable user interface input (e.g., a rotatable input mechanism). The crown 558 can be turned in two distinct directions: clockwise and counter-clockwise. FIGS. 24-29 include rotation direction arrows illustrating the direction of crown rotation and movement direction arrows illustrating the direction of movement of one or more user interface objects, where applicable. The rotation direction arrows and movement direction arrows are typically not part of the displayed user interface, but are provided to aid in the interpretation of the figures. In this example, a counterclockwise direction rotation of the crown 558 is illustrated by a rotation direction arrow pointing in the down direction. The characteristics of the rotation direction arrow are not indicative of the distance, speed, or acceleration with which crown 558 is rotated by a user. Instead, the rotation direction arrow is indicative of the direction of rotation of crown 558 by the user.

FIGS. 23-30 illustrate an exemplary physics-based model that can be used to control a user's interactions with user interface objects in conjunction with a physical crown user input device. In this example, elements 2302, 2304, 2306, 2308 are stationary and focus selector 2310 is movable via user input received from crown 558. Counterclockwise movement of the crown 558 is associated with a force on the focus selector 2310 in the down movement direction.

As described above, using a magnetic relationship between elements 2302, 2304, 2306, 2308 and focus selector 2310, physics-based modeling can be used to simulate magnetic attraction between elements 1302, 1304, 1306, 1308 and focus selector 1310. In addition, the movement of focus selector 2310 can be further controlled using a physics-based spring model.

Physics-based modeling of a spring is achieved, for example, by modeling a spring attached to elements 2302 and 2308. As the focus selector 2310 moves beyond the limits of the plurality of selectable elements, a spring engages the focus selector 2310, causing the focus selector to "rubberband." For example, virtual springs 2312, 2314 may be modeled using Hook's law. Hook's law states that the force needed to extend or compress a spring by a distance is proportional to that distance. Phrased differently, F=kx, where F=force, k=spring coefficient, and x=distance. Springs 2312, 2314 are typically not part of the displayed user interface, but are provided to aid in the interpretation of the figures.

Figure 23:
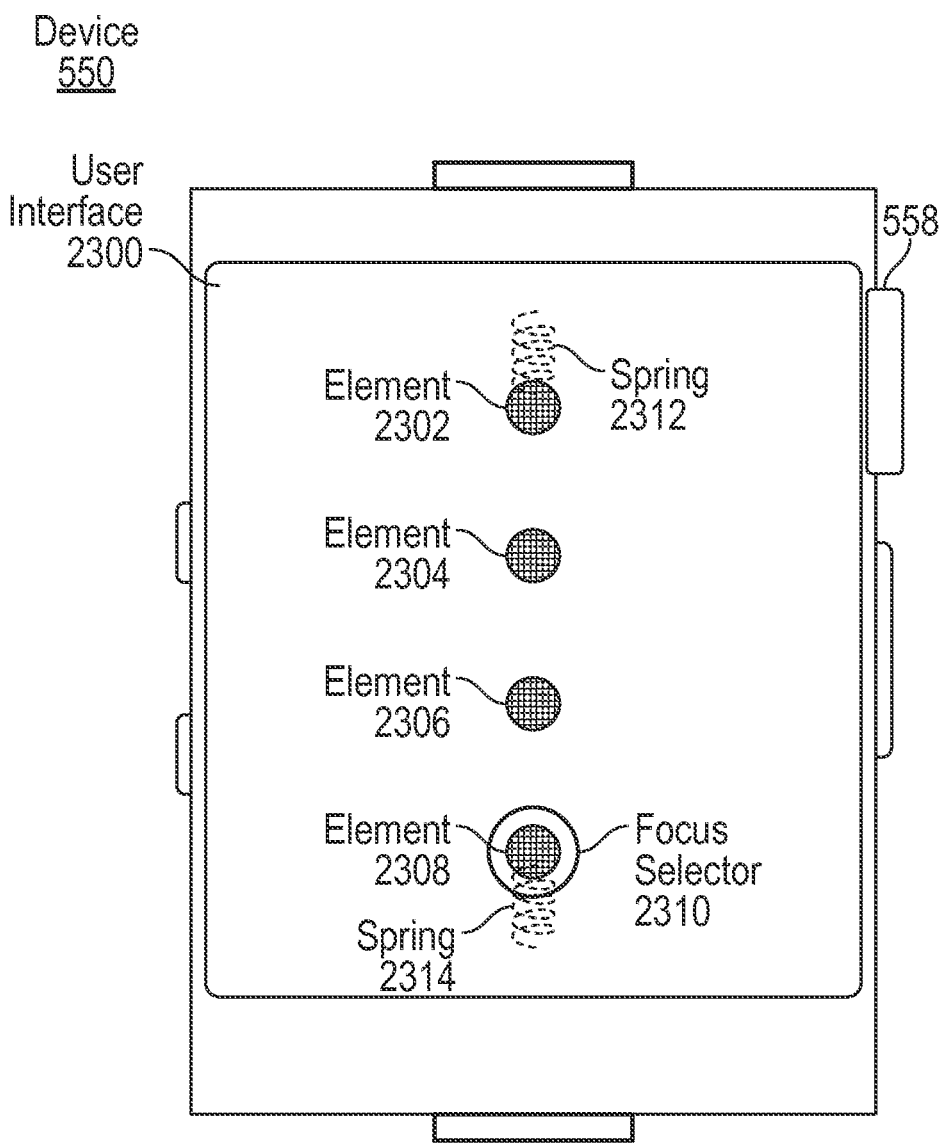
FIGS. 23-30 illustrate exemplary graphical user interfaces for selecting an element using physics-based magnetic and spring modeling in accordance with some embodiments.

At FIG. 23, focus selector 2310 is aligned with element 2308, indicating selection of element 2308. At FIG. 24, device 550 determines a change in the position of crown 558 in the counterclockwise direction, as indicated by rotation direction arrow 2330. In response to determining the change in the position of the crown 558, the device increases the speed of focus selector 2310, moving the focus selector 2310 in the down direction, as indicated by movement direction arrow 2320. In one example, the focus selector may be associated with a mass or may have a calculated inertia.

Because element 2308 is modeled as a magnetic element and focus selector 2310 is modeled as a ferromagnetic material, there is a magnetic attraction between the two user interface objects.

Figure 24:
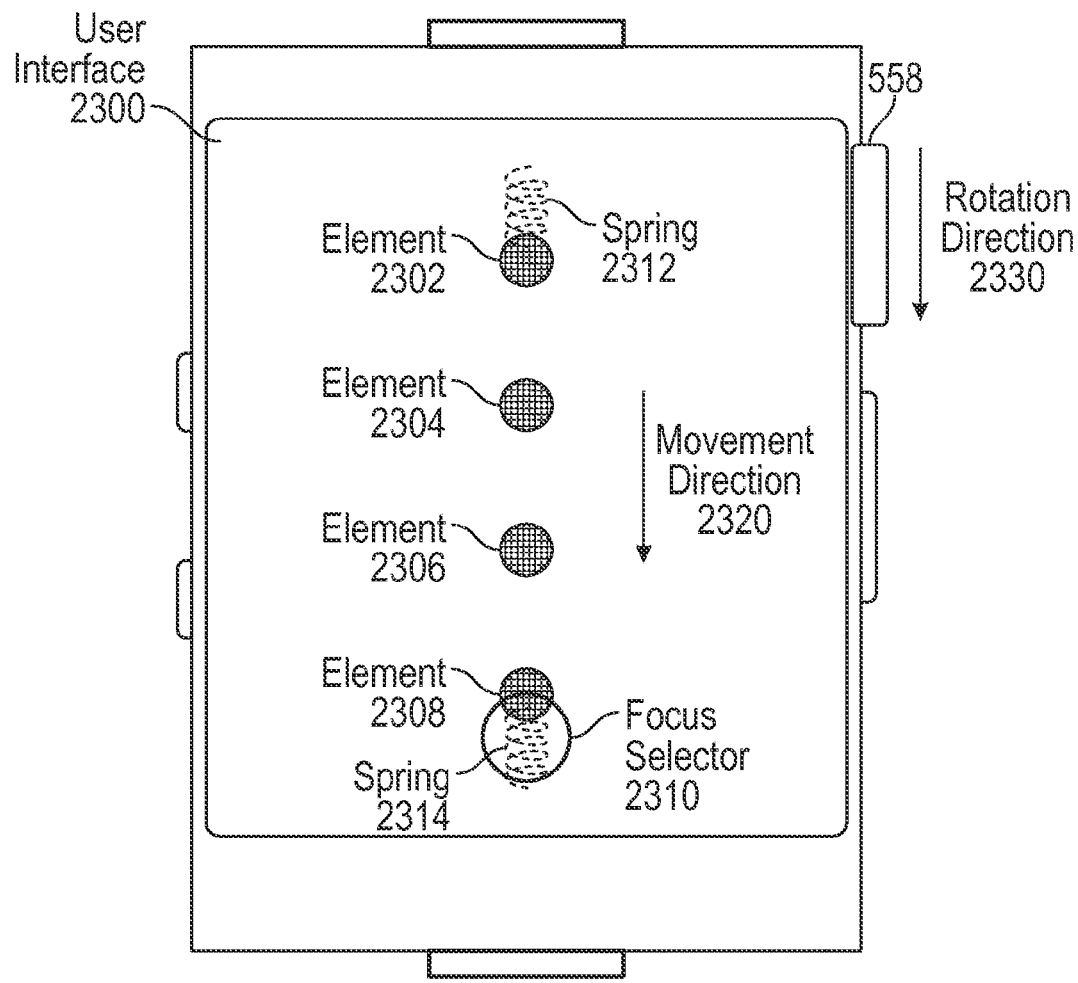
Figure 25:
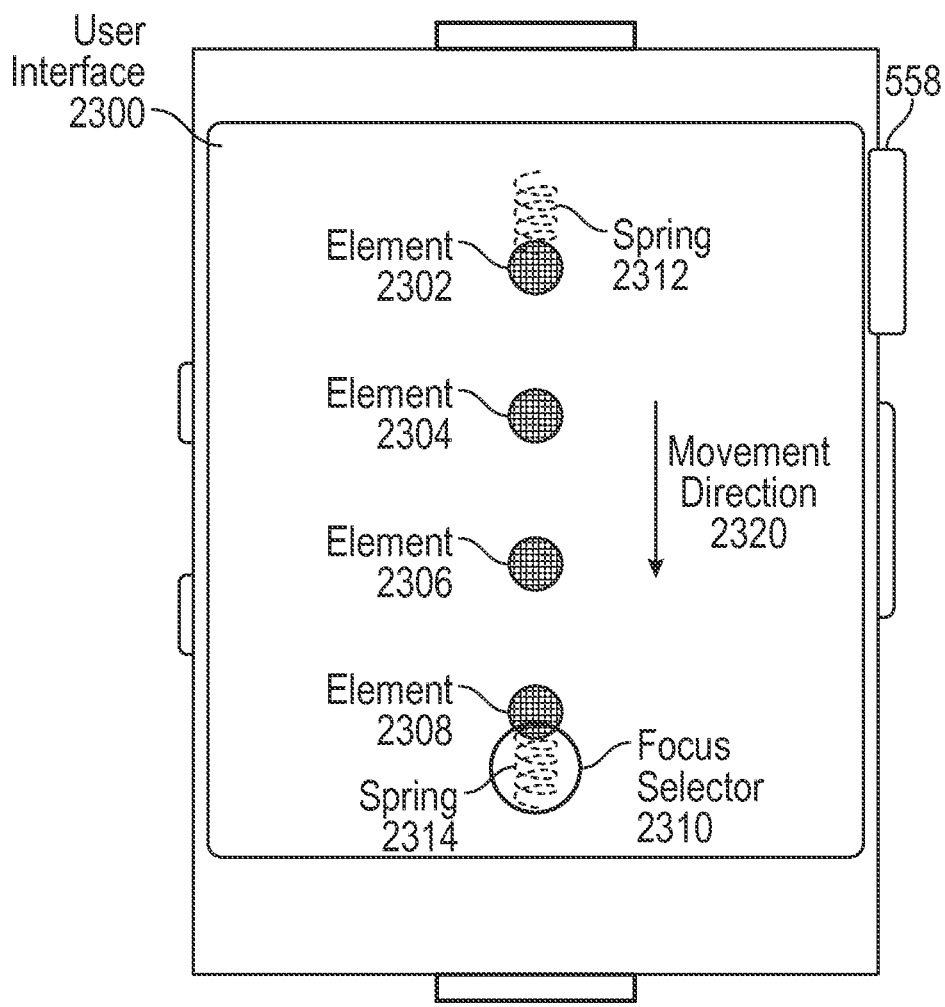
Figure 26:
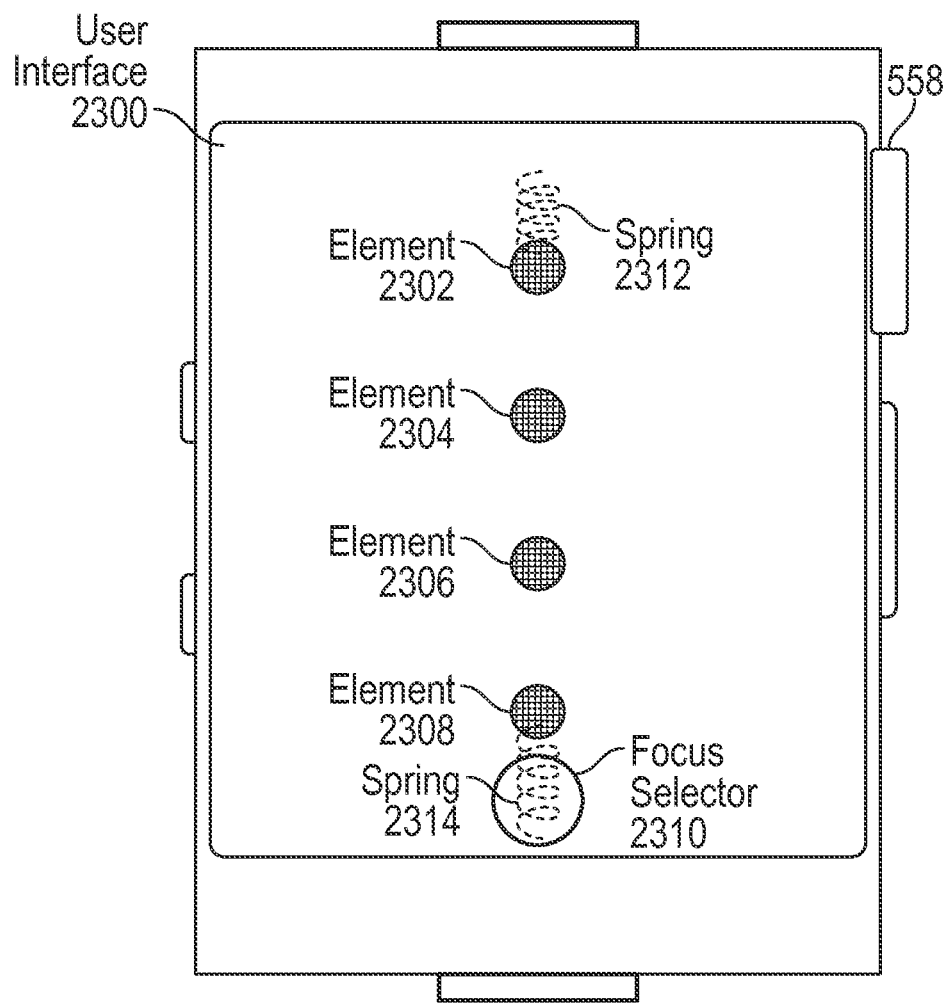
Figure 27:
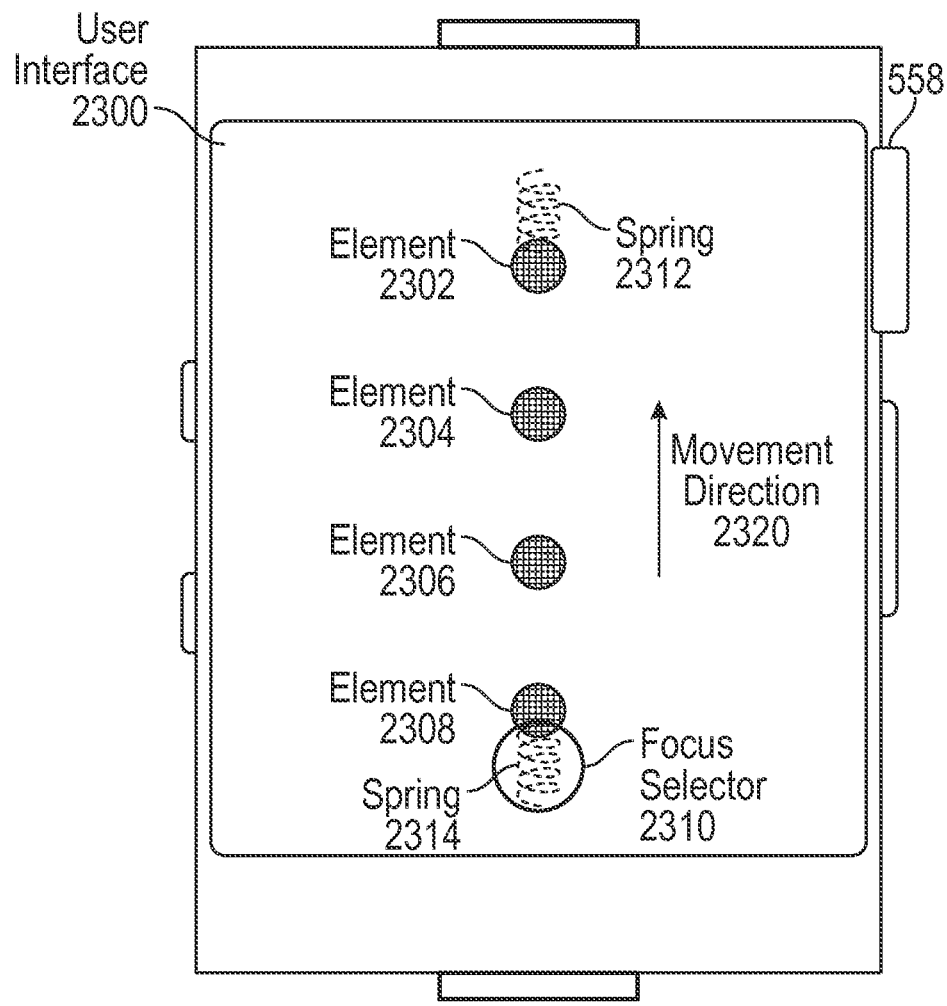
Figure 28:
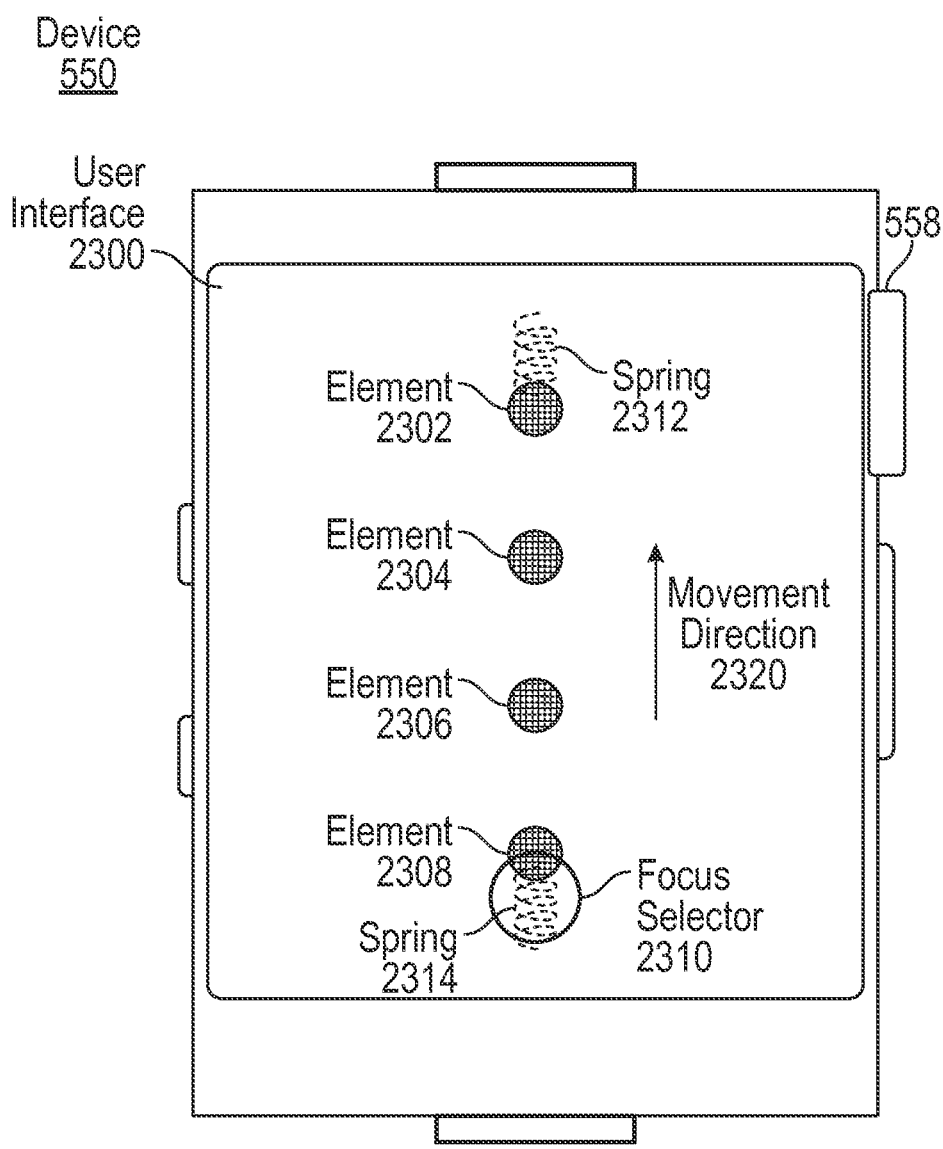
Figure 29:
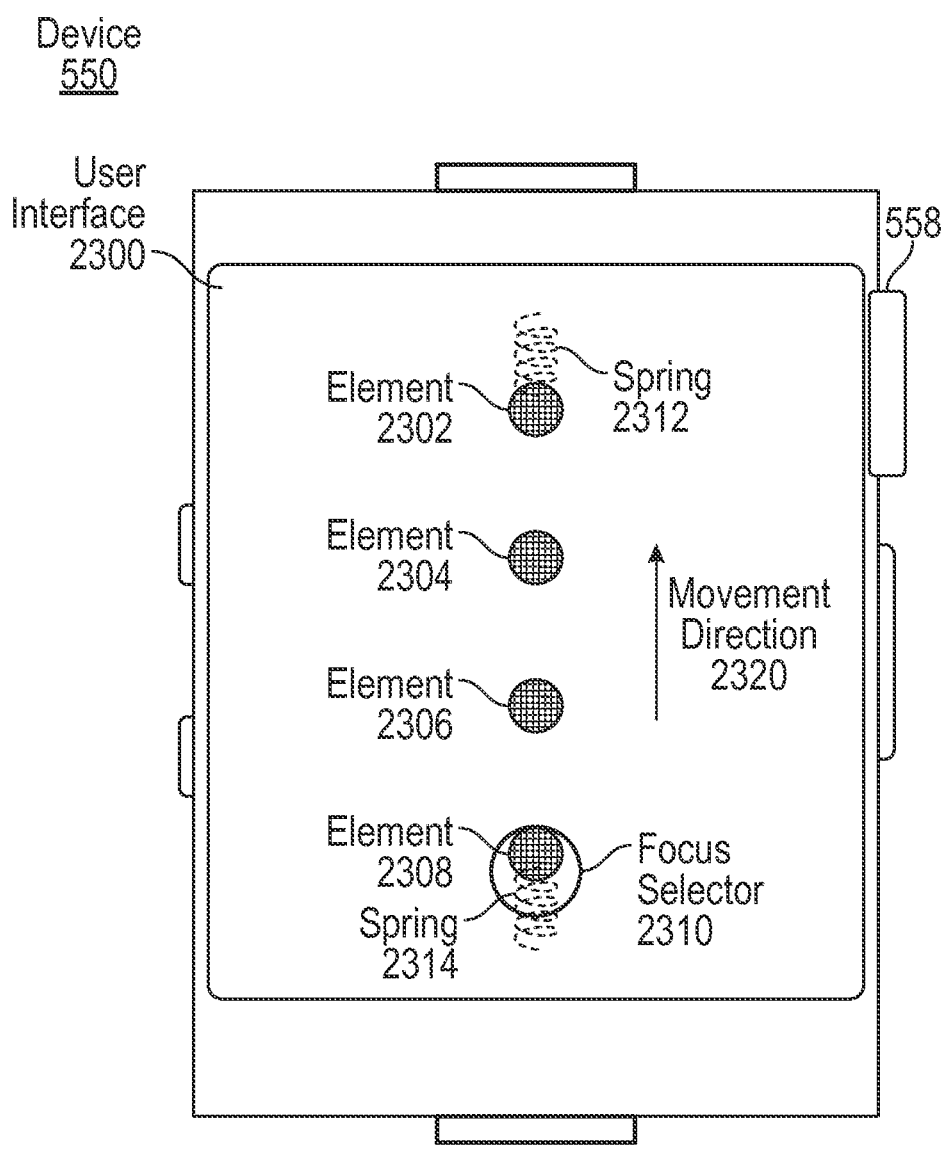

At FIGS. 24-26, focus selector 2310 extends beyond the range of the selectable elements. As a result, spring 2314 engages the focus selector 2310, causing focus selector 2310 to "rubberband" back, as illustrated in FIGS. 27-30. The spring coefficient of spring 2310 may be varied to produce results with different characteristics.

Figure 30:
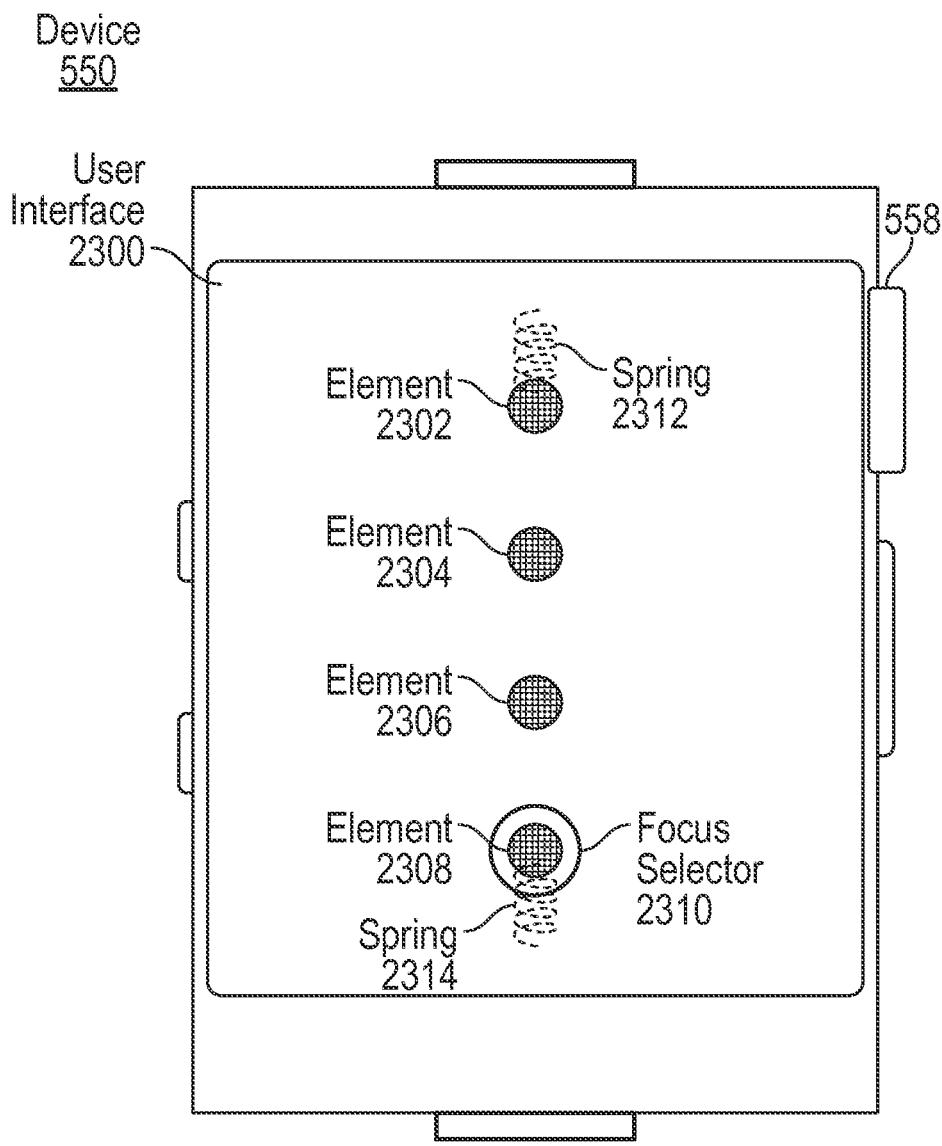

At FIG. 30, focus selector 2310 comes to rest while aligned with element 2308. The system interprets this alignment as a selection of element 2308, which is achieved by the user manipulating focus selector 2310 through the use of crown 558. In some examples, additional input, such as tapping, pressing the crown or another button after the alignment may be required for the user to select element 2308.

While element 2308 is selected, the user can activate element 2308 by one or more of many techniques. For example, the user may press on a touch-sensitive display, press on the touch-sensitive display with force above a predetermined threshold, press a button, or simply allow element 2308 to remain selected for a predetermined amount of time. In another example, aligning an element and a focus selector can be interpreted as both a selection and an activation of the element.

In this example, movement of the focus selector is constrained along a predefined vertical path. In other examples, movement of the focus selector may be constrained along a different predefined path, or may not be constrained to a predefined path. In this example, alignment in only one axis (the vertical axis) is used to indicate selection of an element. In some examples, alignment in two, three, or more axes may be required between an element and a focus selector to indicate a selection.

Figure 31:
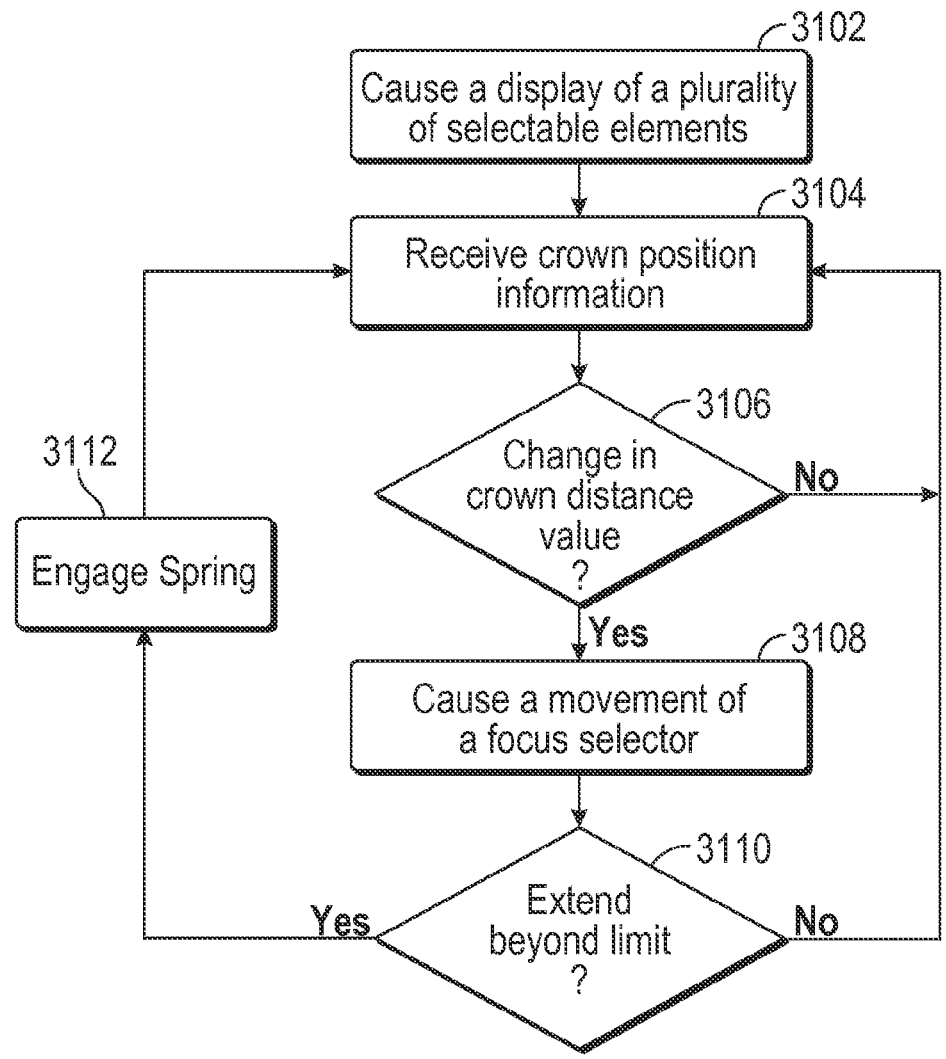
FIG. 31 is a flow diagram illustrating an exemplary process for selecting an element using physics-based magnetic and spring modeling in accordance with some embodiments.

FIG. 31 is a flow diagram illustrating a process 3100 for selecting an element in a graphical user interface using a physical crown as an input device. Process 3100 is performed at a wearable electronic device (e.g., device 550 in FIG. 1) having a physical crown. In some examples, the electronic device also includes a touch-sensitive display. The process provides an efficient technique for selecting an element from among multiple elements in a graphical user interface.

At block 3102, the device causes a display of a plurality of selectable elements on a touch-sensitive display of a wearable electronic device. The device also causes a display of a focus selector. The device uses a physics-based model to simulate magnetic attraction between the selectable elements and the focus selector. Each selectable element of the plurality of selectable elements is associated with a corresponding magnetic value. The magnetic value can be the strength of an element's magnet attraction in terms of its pull force, and each element can have a different magnetic value.

At block 3104, the device receives crown position information. The position information may be received as a series of pulse signals, real values, integer values, and the like.

At block 3106, the device determines whether a change has occurred in a crown distance value. The crown distance value is based on an angular displacement of the physical crown of the wearable electronic device. A change in the crown distance value is indicative of a user providing input to the wearable electronic device by, for example, turning the physical crown. If the device determines that a change in the crown distance value has not occurred, the system returns to block 3104 and continues receiving crown position information. If the device determines that a change in the crown distance value has occurred, the system continues to block 3108, though the system may continue to receive crown position information.

The device also determines a direction based on a direction of rotation of the physical crown of the wearable electronic device. For example, an up direction can be determined based on a clockwise rotation of the physical crown. Similarly, a down direction can be determined based on a counterclockwise rotation of the physical crown. In other examples, a down direction can be determined based on a clockwise rotation of the physical crown and an up direction can be determined based on a counterclockwise rotation of the physical crown.

At block 3108, in response to determining the change in the crown distance value, the device causes a movement of the focus selector. This movement changes the focus of the plurality of selectable elements. At least initially, the movement of the focus selector is in the determined direction. The movement of the focus selector may be animated. The movement has a rate of movement (speed). Additionally, the magnetic values of one or more of the selectable elements may be modified based on the speed of the focus selector.

At block 3110, the system determines whether the focus selector has extended beyond a predetermined limit. If the system determines that the focus selector has not extended beyond a predetermined limit, the system returns to block 3104. If the system determines that the focus selector has extended beyond a predetermined limit, the system engages a virtual spring at block 3112. The virtual spring causes the focus selector to slow down and rubberband back to within the predetermined limit. This mechanism will prevent a user from extending a focus selector too far beyond the scope of the selectable elements. At block 3104, the system continues to receive crown position information.

In some examples, to add additional realism and provide further ease of usability to the user interface, the system may employ a physics-based model of friction to reduce the speed of the focus selector while it is in motion. For example, the speed of the focus selector can be continuously (or repeatedly) decreased based on a friction coefficient value. This physics-based friction model may simulate kinetic friction, drag friction, or the like.

In some examples, the device receives an additional input through the rotation of the crown before the focus selector reaches a steady state. An object is in a steady state when the object is not being translated, rotated, or scaled. In this example, the system determines a second change in the crown distance value. The system also determines a second direction, which is based on the direction of rotation of the physical crown of the wearable electronic device. In response to determining the second change in the crown distance value, the system increases or decreases the speed of the focus selector by applying an additional force to the focus selector. The change in the rate of the movement of the focus selector is based on the second change in the crown distance value and the second direction.

In some examples, once the focus selector aligns with the selection element and is in a steady state, the system determines that the selection element has been selected. In other examples, additional input, such as tapping, pressing the crown or another button after the alignment may be required for the user to select the selection element that aligns with the focus selector and is in a steady state.

FIGS. 32-38 illustrate an exemplary user interface 3200 displaying multiple user interface objects in the form of selectable elements 3202, 3204, 3206, 3208, 3210, 3212 and focus area 3220. A user can select a selection element from among the multiple selectable elements by using a physical crown of a wearable electronic device to scroll the selectable elements 3202, 3204, 3206, 3208, 3210, 3212 to align the desired selection element with focus area 3220. Focus area 3220 is typically not part of the displayed user interface, but is provided to aid in the interpretation of the figures. In some examples, additional input, such as tapping, pressing the crown or another button after the alignment may be required for the user to select the selection element.

Crown 558 of device 550 is a user rotatable user interface input (e.g., a rotatable input mechanism). The crown 558 can be turned in two distinct directions: clockwise and counter-clockwise. FIGS. 32-38 include rotation direction arrows illustrating the direction of crown rotation and movement direction arrows illustrating the direction of movement of one or more user interface objects, where applicable. The rotation direction arrows and movement direction arrows are typically not part of the displayed user interface, but are provided to aid in the interpretation of the figures. In this example, a clockwise direction rotation of the crown 558 is illustrated by a rotation direction arrow pointing in the up direction. Similarly, a counterclockwise direction rotation of the crown 558 is illustrated by a rotation direction arrow pointing in the down direction. The characteristics of the rotation direction arrow are not indicative of the distance, speed, or acceleration with which the crown 558 is rotated by a user. Instead, the rotation direction arrow is indicative of the direction of rotation of crown 558 by the user.

FIGS. 32-38 illustrate an exemplary scrollable list of elements using a physics-based model that can be used to control a user's interactions with user interface objects in conjunction with a physical crown user input device. In this example, elements 3202, 3204, 3206, 3208, 3210, 3212 are scrollable via user input received from crown 558 and the focus area 3220 is stationary. Clockwise movement of crown 558 is associated with a force on elements 3202, 3204, 3206, 3208, 3210, 3212 in the up movement direction and counterclockwise movement of crown 558 is associated with a force on elements 3202, 3204, 3206, 3208, 3210, 3212 in the down movement direction. In this example, elements 3202, 3204, 3206, 3208, 3210, 3212 form a scrollable list of elements.

To facilitate a user's ability to control the movement of the scrollable list of elements, a "magnetic" relationship is associated between each user selectable element and the focus area 3220. In this example, the value of the magnetic relationship (also referred to as a magnetic value) between elements 3202, 3204, 3206, 3208, 3210, 3212 and focus area 3220 is uniform. In other examples, the magnetic value of elements 3202, 3204, 3206, 3208, 3210, 3212 can vary.

Using the magnetic relationship between elements 3202, 3204, 3206, 3208, 3210, 3212 and focus area 3220, physics-based modeling can be used to simulate magnetic attraction between elements 3202, 3204, 3206, 3208, 3210, 3212 and focus area 3220. As will be described in further detail below, user interface 3200 causes an attraction between elements 3202, 3204, 3206, 3208, 3210, 3212 and focus area 3220. As a result, when user input is not received, the multiple elements scroll to ultimately reach a steady state where one element is aligned with focus area 3220. An object is in a steady state when the object is not being translated, rotated, or scaled. The alignment of an element with focus area 3220 is indicative of the selection of that element. This physics-based magnetic modeling results in the user interface exhibiting virtual detents.

In this example, physics-based modeling is achieved, for example, by modeling each element 3202, 3204, 3206, 3208, 3210, 3212 as an object made from a magnetized material that creates its own persistent magnetic field and modeling focus area 3220 as a material that is attracted to a magnet, such as ferromagnetic materials including iron, cobalt, and nickel. In another example, the physics-based modeling can be achieved by modeling each element 3202, 3204, 3206, 3208, 3210, 3212 as an object made from a material that is attracted to a magnet and modeling focus area 3220 as a material that creates its own persistent magnetic field. In another example, the physics-based modeling can be achieved by modeling each element 3202, 3204, 3206, 3208, 3210, 3212 as an object that creates its own persistent magnetic field and modeling focus area 3220 as a material that also creates its own persistent magnetic field, such as two magnets that attract. Each of these physics-based models can be adapted to include magnetic fields that vary, rather than remain persistent, based on certain factors, such as the distance between the element and focus area 3220, the speed of the elements, the acceleration of the elements, or based on a combination of two or more factors. For example, the varying magnetic field may be simulated through the use of an electromagnet, which can be turned on and off and can have a varying strength.

In one example, the magnetic strengths of elements 3202, 3204, 3206, 3208, 3210, 3212 vary based on the speed of the scrollable list of elements. As the speed of the scrollable list of elements increases, the magnetic strength of elements 3202, 3204, 3206, 3208, 3210, 3212 are reduced. As the speed of the scrollable list of elements increases, the magnetic strength of elements 3202, 3204, 3206, 3208, 3210, 3212 is increased. As a result, when the scrollable list of elements is moving quickly, the elements 3202, 3204, 3206, 3208, 3210, 3212 play a reduced role in changing the speed of the focus area as compared to when the scrollable list of elements is moving slowly.

Figure 32:
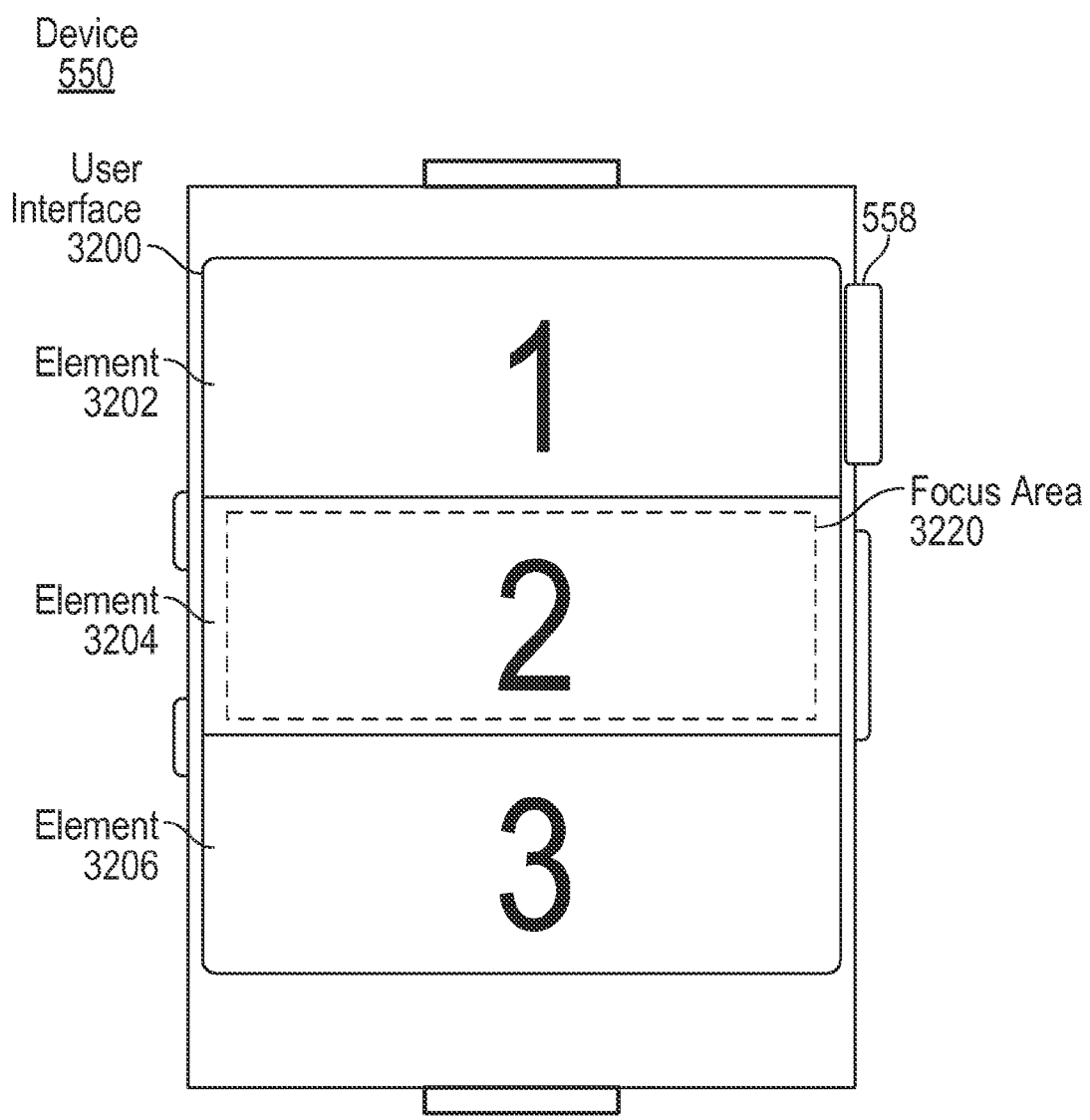
FIGS. 32-38 illustrate exemplary graphical user interfaces for selecting an element using a focus area and physics-based magnetic modeling.

At FIG. 32, element 3204 is aligned with focus area 3220, indicating selection of element 3204. At FIG. 33, device 550 determines a change in the position of crown 558 in the clockwise direction, as indicated by rotation direction arrow 3230. In response to determining the change in the position of the crown 558, the device increases the speed of the scrollable list of elements, moving the scrollable list of elements in the up direction, as indicated by movement direction arrow 3240. In one example, the scrollable list of elements may be associated with a mass or may have a calculated inertia.

Because element 3204 is modeled as a magnetic element and focus area 3220 is modeled as a ferromagnetic material, there is a magnetic attraction between the two user interface objects. The physics-based model of user interface 3200 causes a resistance of the movement of element 3204 away from focus area 3220 using this magnetic attraction. An element's magnetic value (e.g., the strength of an element's magnet attraction) may be modeled, for example, in terms of its pull force (the elements ability to move other objects). The pull force exerted may be based on the pull force of either an electromagnet or a permanent magnet as described by the Maxwell equation.

Figure 33:
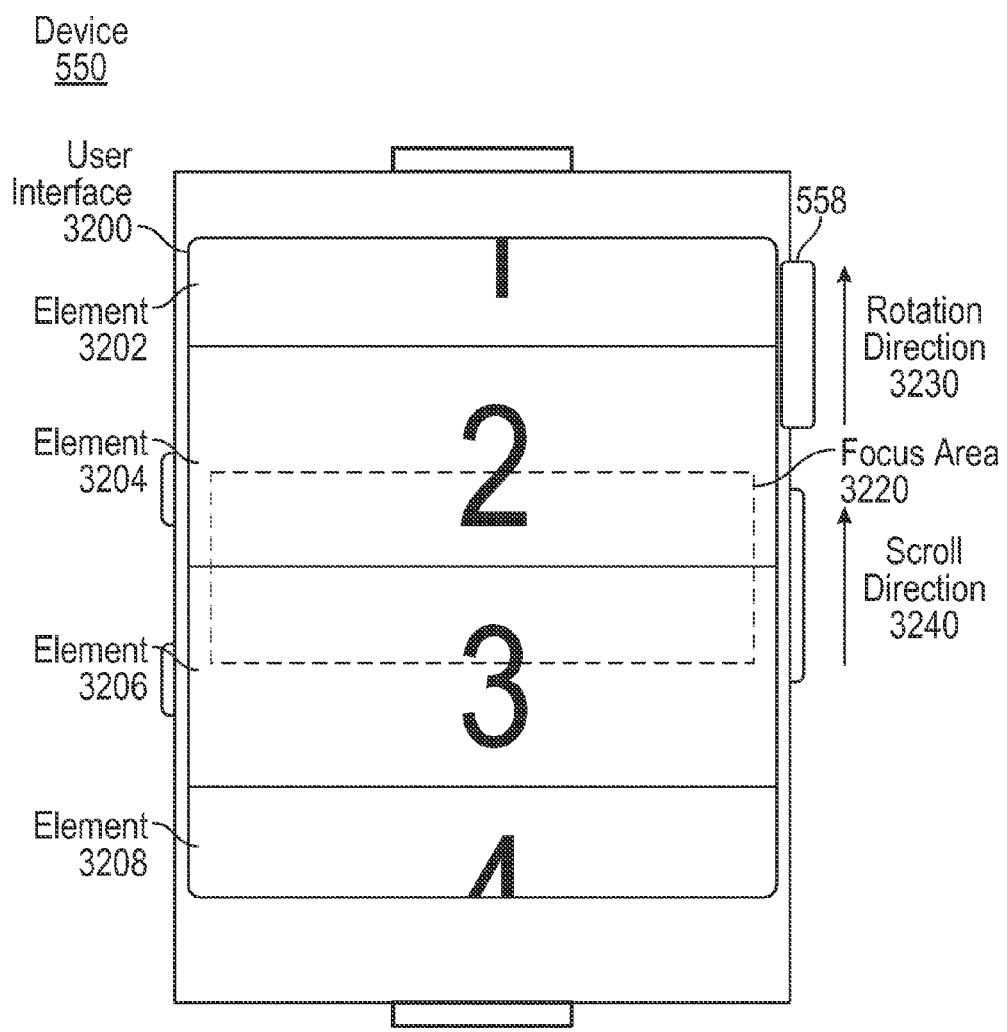
Figure 34:
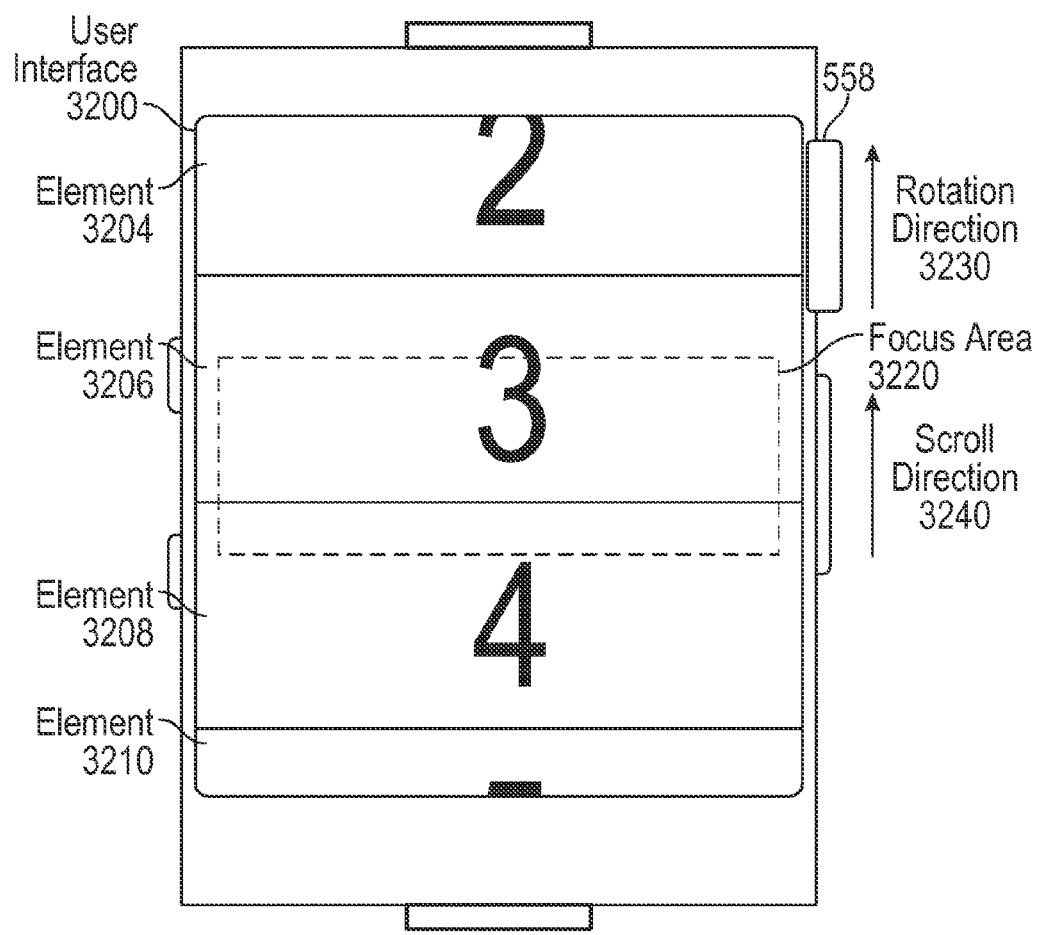
Figure 35:
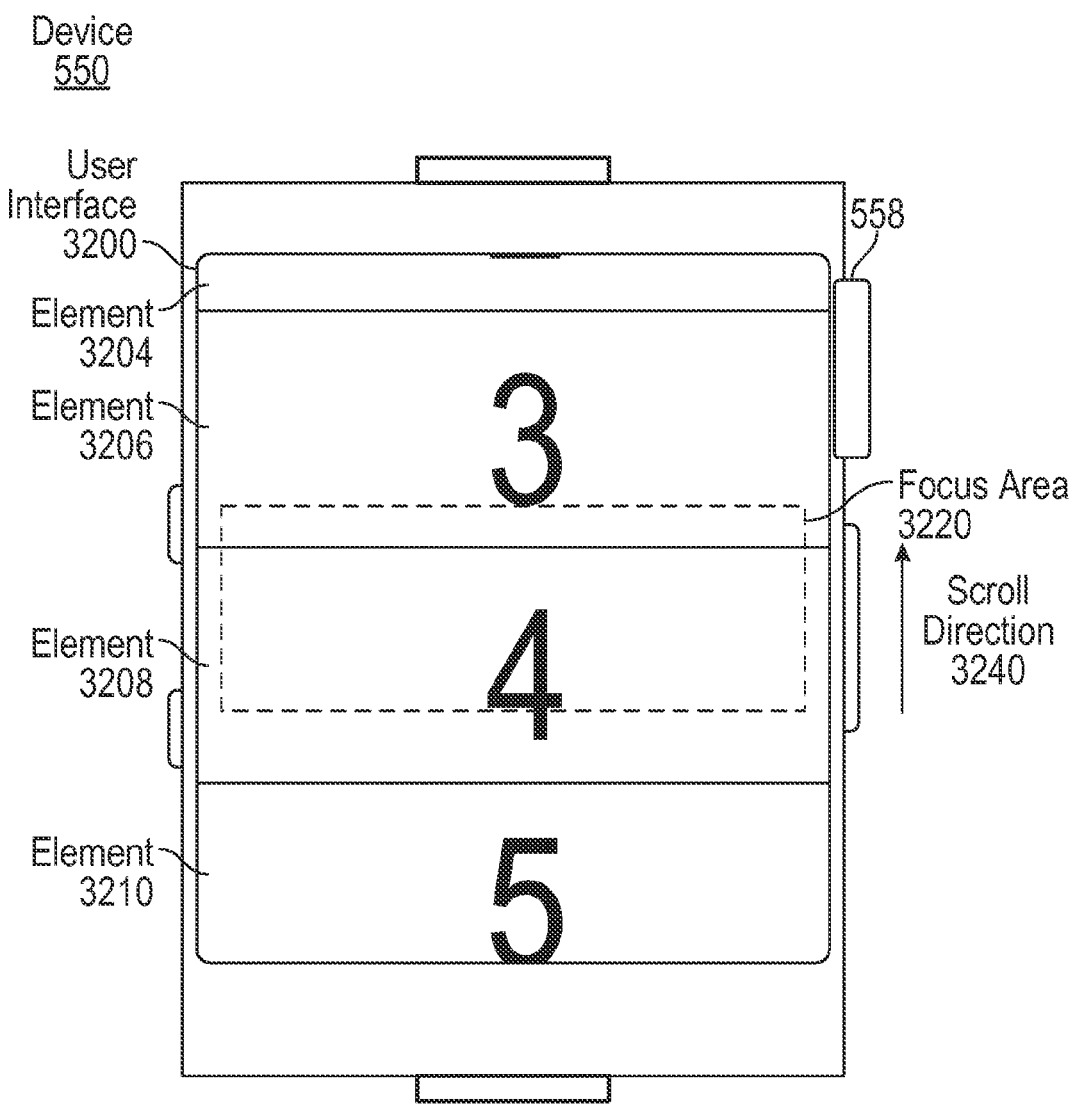

At FIGS. 33 and 34, device 550 continues to determine a change in the position of crown 558 in the clockwise direction, as indicated by rotation direction arrow 3220. In response to determining the changes in the position of the crown 558, the device 550 adds additional speed to the scrollable list of elements in the up direction. At the same time, the magnetic attraction of elements 3202, 3204, 3206, 3208, 3210, 3212 with focus area 3220 are acting on the scrollable list of elements. For example, at FIG. 34, at least elements 3204 and 3206 are applying a force to the scrollable list of elements in the down direction as a result of the magnetic physics-based modeling. This is because the elements 3204 and 3206 are attracted to the focus area 3220. Elements 3208 and 3210 are applying a force to the scrollable list of elements in the up direction as a result of the magnetic physics-based modeling. This is because the elements 3208 and 3210 are also attracted to the focus area 3220. In some examples, elements of the scrollable list of elements that are not displayed also apply a force to the scrollable list of elements.

The distance between the elements and focus area 3220 also play a role in the amount of force the elements apply to the scrollable list of elements. Generally, as the distance between the element and the focus area 3220 increases, the intensity of the force between the element and the focus area 3220 decreases. The rate of change in the intensity of the force can be modeled in many ways. For example, the inverse square law may apply the intensity of the force as a function of the distance. More specifically, $I=1/d^2$, where I is the intensity of the force and d is the distance. In other examples, the magnetic force can vary in direct inverse proportion to distance or can vary inversely with the third power of distance.

In some examples, the magnetic attraction between an element and a focus area only exists while the element is within a predetermined distance from focus area 3220. This simplifies calculations because the magnetic force of elements with a distance from focus area 3220 that is greater than the predetermined distance are not considered in determining the forces applied to the scrollable list of elements.

In some examples, to add additional realism and provide further ease of usability to the user interface, the system may also employ a physics-based model of friction to reduce the speed of the scrollable list of elements while it is in motion. For example, the speed of the scrollable list of elements can be continuously (or repeatedly) decreased based on a friction coefficient value. This physics-based friction model may simulate kinetic friction, drag friction, or the like.

At FIGS. 35-38, device 550 determines that there is no change in the position of crown 558. As a result of this determination, no additional speed is added to the existing speed of the scrollable list of elements. However, the magnetic forces of elements 3202, 3204, 3206, 3208, 3210, 3212 continue to be applied the scrollable list of elements. Similarly, the physics-based friction model continues to be applied to the scrollable list of elements. At FIGS. 35-38, element 3208 has the largest magnetic effect on the scrollable list of elements, as compared to the other elements of the scrollable list of elements because element 3208 is the closest to focus area 3220. This physics-based magnetic modeling results in the user interface exhibiting virtual detents.

Figure 36:
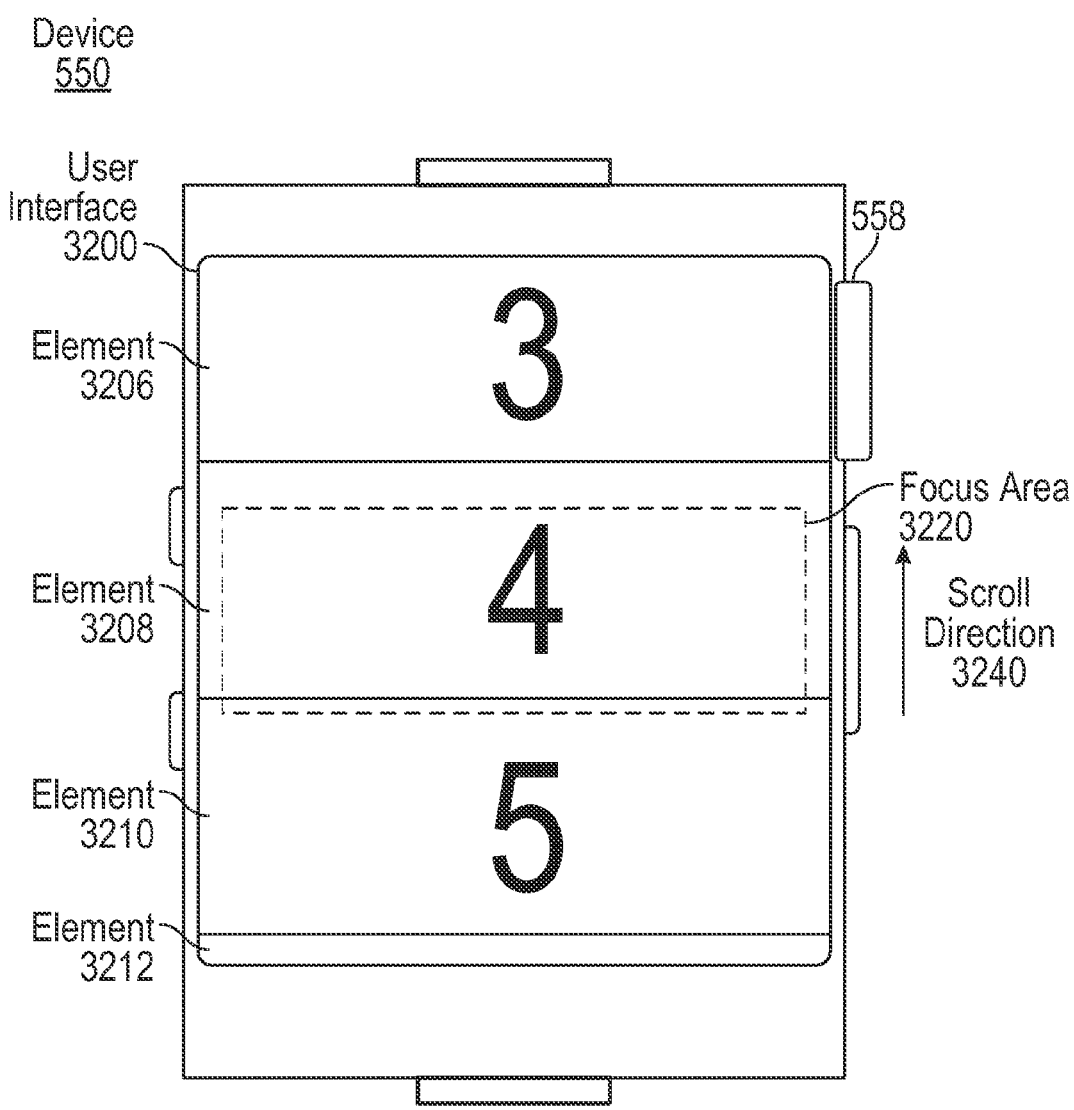
Figure 37:
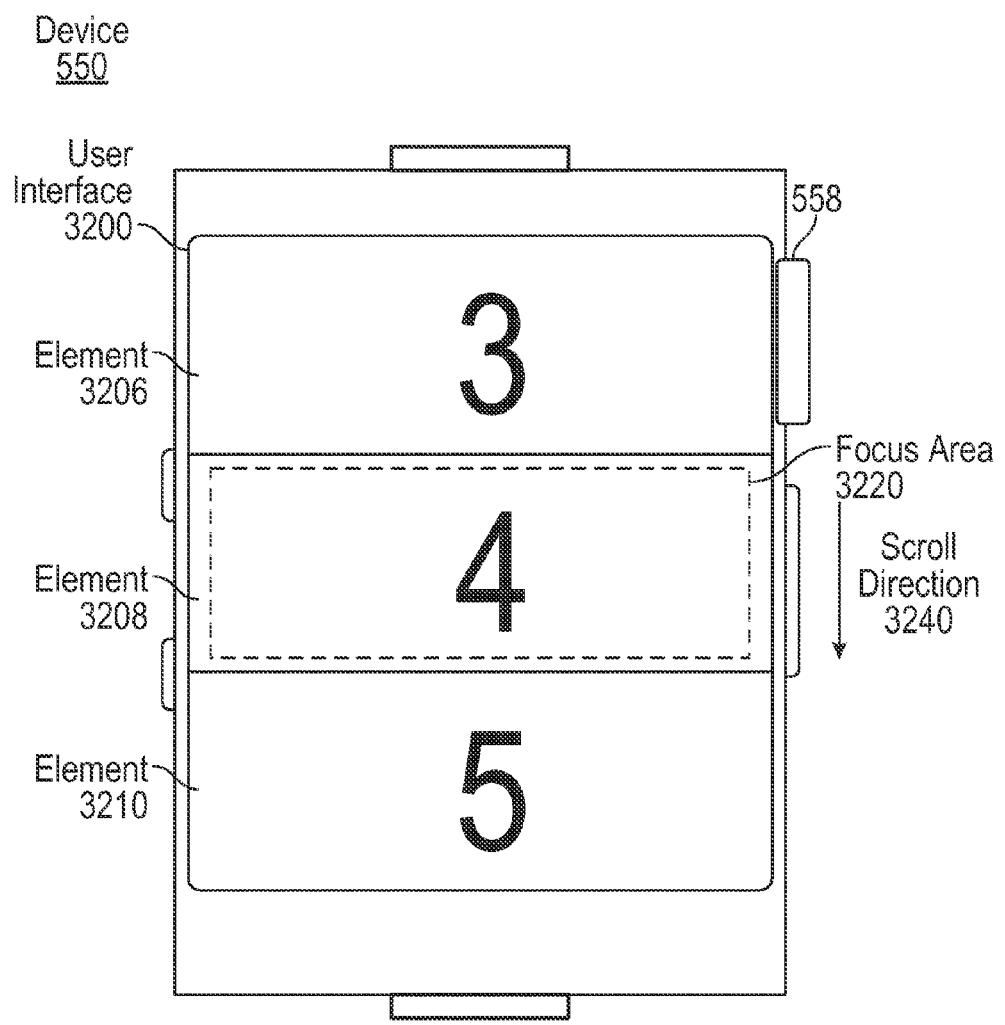
Figure 38:
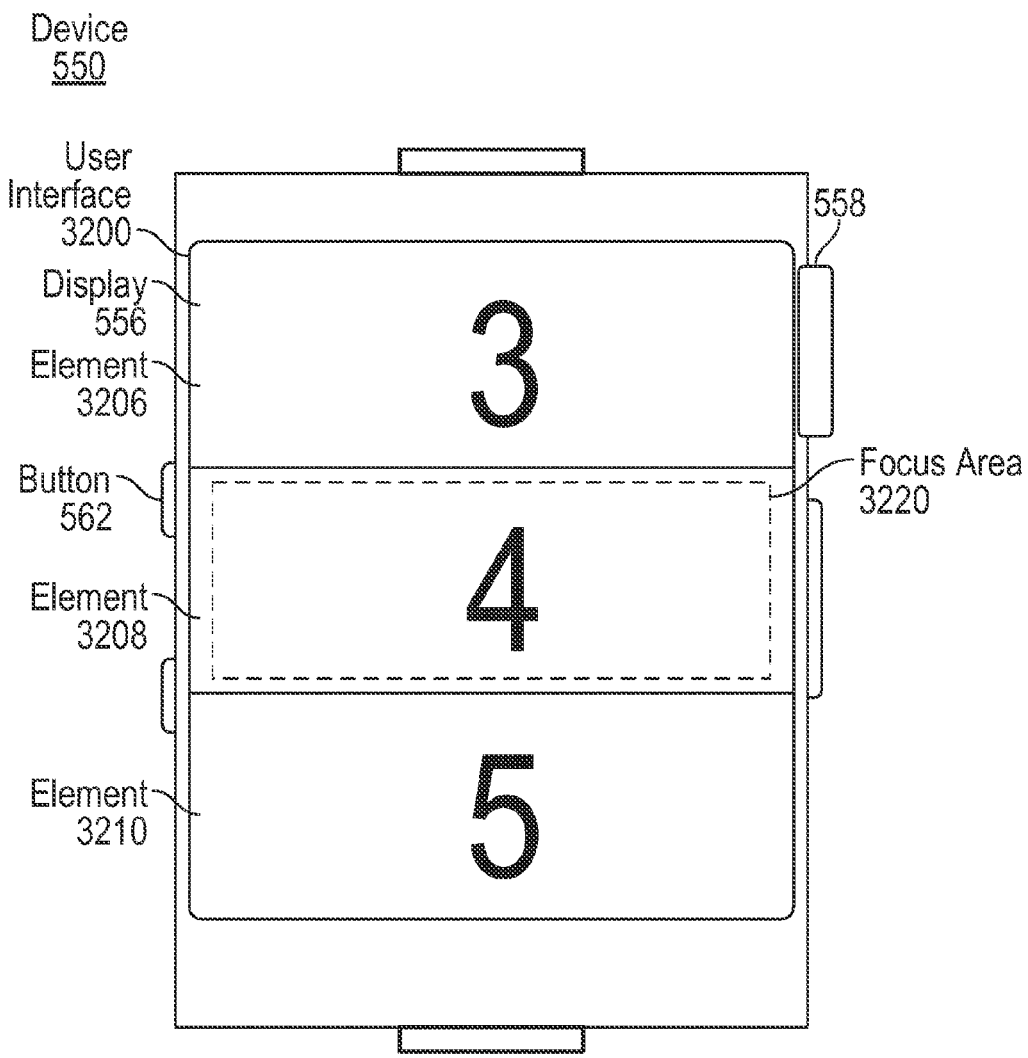

At FIG. 36, as element 3208 overshoots focus area 3220, element 3208 applies a force on the scrollable list of elements in the down direction, further reducing the speed of the scrollable list of elements. At FIG. 37, the magnetic force applied by element 3208 on the scrollable list of elements in the down direction causes the scrollable list of elements to move down, aligning element 3208 with focus area 3220. The scrollable list of elements comes to rest while element 3208 is aligned with focus area 3220. The system interprets this alignment as a selection of element 3208, which is achieved by the user manipulating the scrollable list of elements through the use of crown 558.

While element 3208 is selected, the user can activate element 3208 by one or more of many techniques. For example, the user may press on touch-sensitive display 556, press on the touch-sensitive display with force above a predetermined threshold, press button 562, or simply allow element 3208 to remain selected for a predetermined amount of time. In another example, aligning an element and a focus area can be interpreted as both a selection and an activation of the element. In some examples, additional input, such as tapping, pressing the crown or another button after the alignment may be required for the user to select the element.

User interface 3200 may be used, for example, for text entry on a device with a reduced-size display. Each element of the scrollable list of elements can correspond to a letter (such as a letter selected from A-Z), a word, a phrase, or a numeral (such as numeral selected from 0-9). A user can scroll through the alphanumeric elements, selecting and activating the desired elements sequentially to form a word, number, sentence, or the like. In examples where elements have various intensities of magnetic strength, the magnetic strength of an element associated with a letter of the alphabet may be based on the frequency of that letter's use. As a result, certain letters could be more magnetic than other letters, and therefore easier to select.

In this example, movement of the scrollable list of elements is constrained along a predefined vertical path. In other examples, movement of the scrollable list of elements may be constrained along a different predefined path, or may not be constrained to a predefined path. In this example, alignment in only one axis (the vertical axis) is used to indicate selection of an element. In some examples, alignment in two, three, or more axes may be required between an element and a focus area to indicate a selection.

Figure 39:
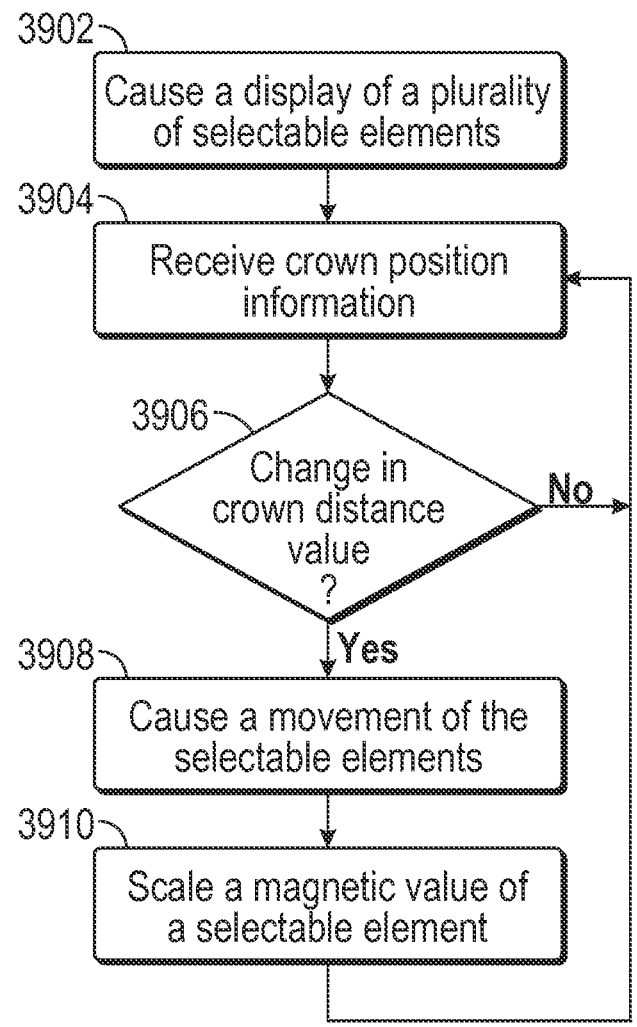
FIG. 39 is a flow diagram illustrating an exemplary process for selecting an element using a focus area and physics-based magnetic modeling.

FIG. 39 is a flow diagram illustrating a process 3900 for selecting an element in a graphical user interface using a physical crown as an input device. Process 3900 is performed at a wearable electronic device (e.g., device 550 in FIG. 1) having a physical crown. In some examples, the electronic device also includes a touch-sensitive display. The process provides an efficient technique for selecting an element from among multiple elements in a graphical user interface.

At block 3902, the device causes a display of a plurality of selectable elements on a touch-sensitive display of a wearable electronic device. The device also registers a focus area. The focus area may be, for example, an area, a line, or a point. The device uses a physics-based model to simulate magnetic attraction between the selectable elements and the focus area. Each selectable element of the plurality of selectable elements is associated with a corresponding magnetic value. The magnetic value can be the strength of an element's magnet attraction in terms of its pull force, and each element can have a different magnetic value.

At block 3904, the device receives crown position information. The position information may be received as a series of pulse signals, real values, integer values, and the like.

At block 3906, the device determines whether a change has occurred in a crown distance value. The crown distance value is based on an angular displacement of the physical crown of the wearable electronic device. A change in the crown distance value is indicative of a user providing input to the wearable electronic device by, for example, turning the physical crown. If the device determines that a change in the crown distance value has not occurred, the system returns to block 3904 and continues receiving crown position information. If the device determines that a change in the crown distance value has occurred, the system continues to block 3908, though the system may continue to receive crown position information.

The device also determines a direction based on a direction of rotation of the physical crown of the wearable electronic device. For example, an up direction can be determined based on a clockwise rotation of the physical crown. Similarly, a down direction can be determined based on a counterclockwise rotation of the physical crown. In other examples, a down direction can be determined based on a clockwise rotation of the physical crown and an up direction can be determined based on a counterclockwise rotation of the physical crown.

At block 3908, in response to determining the change in the crown distance value, the devices causes a movement of the plurality of selectable elements. The direction of the movement is such that a selection element of the plurality of selectable elements gets closer to the focus area than it was before the movement. This movement changes the focus of the plurality of selectable elements. At least initially, the movement of the plurality of selectable elements is in the determined direction. The movement of the plurality of selectable elements may be animated. The movement of the plurality of selectable elements has a rate of movement (speed).

At block 3910, the magnetic values of one or more of the selectable elements are modified based on the speed of the plurality of selectable elements. In one example, the magnetic values of one or more selectable elements are inversely related to the speed of the plurality of selectable elements. For example, when the plurality of selectable elements has a speed above a first threshold, the magnetic values of the selectable elements are reduced by a first factor (e.g. 10) from their original values. When the plurality of selectable elements has a speed below the first threshold and above a second threshold, the magnetic values of the selectable elements are reduced by a second factor (e.g. 5) from their original values. When the plurality of selectable elements further slows down and has a speed below the second threshold, the magnetic values of the selectable elements are returned to their original values. The first factor is larger than the second factor.

In addition, the speed of the plurality of selectable elements is changed because of the physics-based magnetic interaction of the plurality of selectable elements with the focus area based at least on the magnetic value associated with the selection element. For example, the physics-based magnetic attraction of the selection element to the focus area may cause the speed of the plurality of selectable elements to increase as the selection element moves towards the focus area. Similarly, the physics-based magnetic attraction of the selection element to the focus area may cause the speed of the plurality of selectable elements to decrease as the selection element moves away from the focus area. Similarly, the magnetic interaction of the focus area with other selectable elements of the plurality of selectable elements may cause a change in the speed of the plurality of selectable elements.

In some examples, the magnetic values associated with the selectable elements are virtual magnetic strengths based on a virtual pull force between the selectable element and the focus area.

In some examples, to add additional realism and provide further ease of usability to the user interface, the system may employ a physics-based model of friction to reduce the speed of the plurality of selectable elements while it is in motion. For example, the speed of the plurality of selectable elements can be continuously (or repeatedly) decreased based on a friction coefficient value. This physics-based friction model may simulate kinetic friction, drag friction, or the like.

In some examples, the device receives an additional input through the rotation of the crown before the plurality of selectable elements reach a steady state. An object is in a steady state when the object is not being translated, rotated, or scaled. In this example, the system determines a second change in the crown distance value. The system also determines a second direction, which is based on the direction of rotation of the physical crown of the wearable electronic device. In response to determining the second change in the crown distance value, the system increases or decreases the speed of the plurality of selectable elements by applying an additional force to the plurality of selectable elements. The change in the rate of the movement of the plurality of selectable elements is based on the second change in the crown distance value and the second direction.

In some examples, once the selection element aligns with the focus area and the plurality of selectable elements are in a steady state, the system determines that the selection element has been selected.

FIGS. 40-45 illustrate an exemplary user interface 4000 displaying multiple user interface objects in the form of selectable elements 4002, 4004 and a focus area 4006. A scrollable list of elements includes selectable elements 4002, 4004. A user can select a selection element from among the multiple selectable elements by using a physical crown of a wearable electronic device to move the scrollable list of elements to align a desired selection element with the focus area 4006.

Crown 558 of device 550 is a user rotatable user interface input. Crown 558 can be turned in two distinct directions: clockwise and counterclockwise. FIGS. 40-45 include rotation direction arrows illustrating the direction of crown rotation and movement direction arrows illustrating the direction of movement of the scrollable list of elements, where applicable. The rotation direction arrows and movement direction arrows are typically not part of the displayed user interface, but are provided to aid in the interpretation of the figures. In this example, a counterclockwise direction rotation of crown 558 is illustrated by a rotation direction arrow pointing in the down direction. The characteristics of the rotation direction arrow are not indicative of the distance, speed, or acceleration with which crown 558 is rotated by a user. Instead, the rotation direction arrow is indicative of the direction of rotation of crown 558 by the user.

FIGS. 40-45 illustrate an exemplary physics-based model that can be used to control a user's interactions with user interface objects in conjunction with a physical crown user input device. In this example, focus area 4006 is stationary and elements 4002, 4004 are movable via user input received from crown 558. Counterclockwise movement of crown 558 is associated with a force on the scrollable list of elements in the down movement direction.

As described above, using a magnetic relationship between focus area 4006 and elements 4002, 4004, physics-based modeling can be used to simulate magnetic attraction between elements focus area 4006 and elements 4002, 4004. In addition, the movement of the scrollable list of elements can be further controlled using a physics-based spring model.

Physics-based modeling of a spring is achieved, for example, by modeling a spring attached to one or more ends of the scrollable list of elements. As the scrollable list of elements moves beyond a predetermined limit, a spring engages the scrollable list of elements, causing the scrollable list of elements to "rubberband." For example, virtual spring 4008 in FIGS. 41-44 may be modeled using Hook's law. Hook's law states that the force needed to extend or compress a spring by a distance is proportional to that distance. Phrased differently, F=kx, where F=force, k=spring coefficient, and x=distance. Spring 4008 is typically not part of the displayed user interface, but is provided to aid in the interpretation of the figures.

Figure 40:
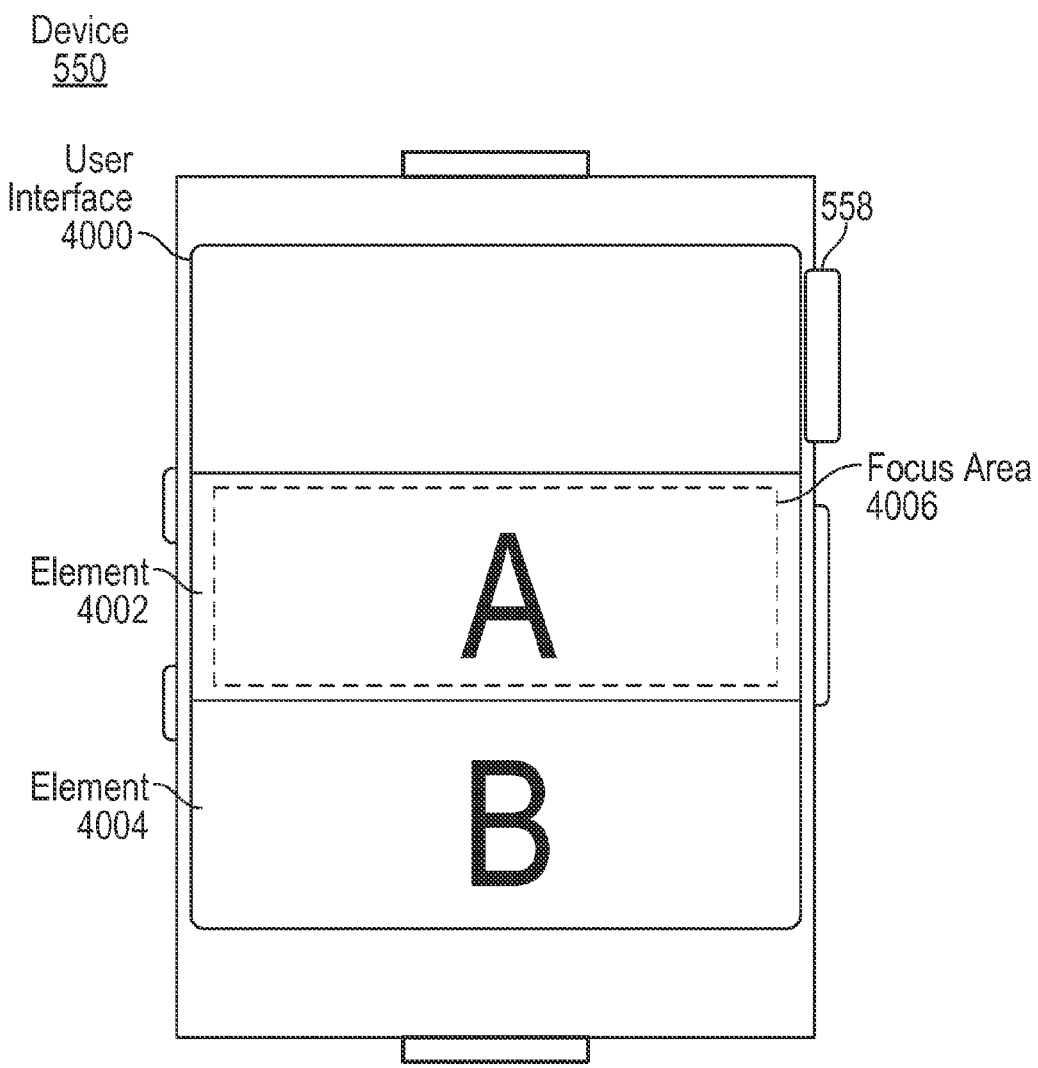
FIGS. 40-45 illustrate exemplary graphical user interfaces for selecting an element using a focus area and physics-based magnetic and spring modeling.

At FIG. 40, element 4002 is aligned with focus area 4006, indicating selection of element 4002. At FIG. 41, device 550 determines a change in the position of crown 558 in the counterclockwise direction, as indicated by rotation direction arrow 4010. In response to determining the change in the position of the crown 558, the device increases the speed of the scrollable list of elements, moving the elements 4002, 4004 in the down direction, as indicated by movement direction arrow 4012. In one example, the scrollable list of elements may be associated with a mass or may have a calculated inertia.

Because element 4002 is modeled as a magnetic element and focus area 4006 is modeled as a ferromagnetic material, there is a magnetic attraction between the two user interface objects.

Figure 41:
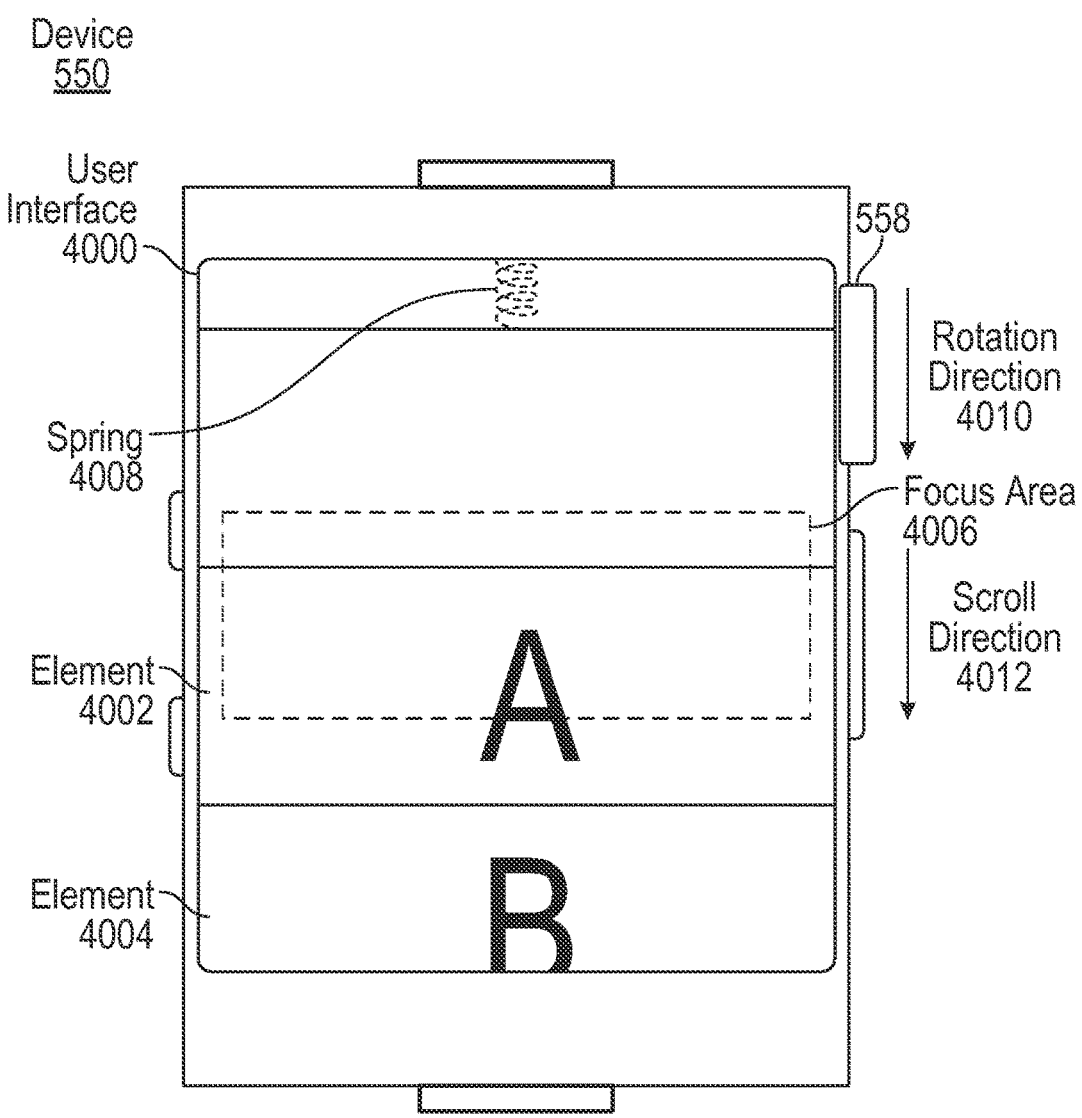
Figure 42:
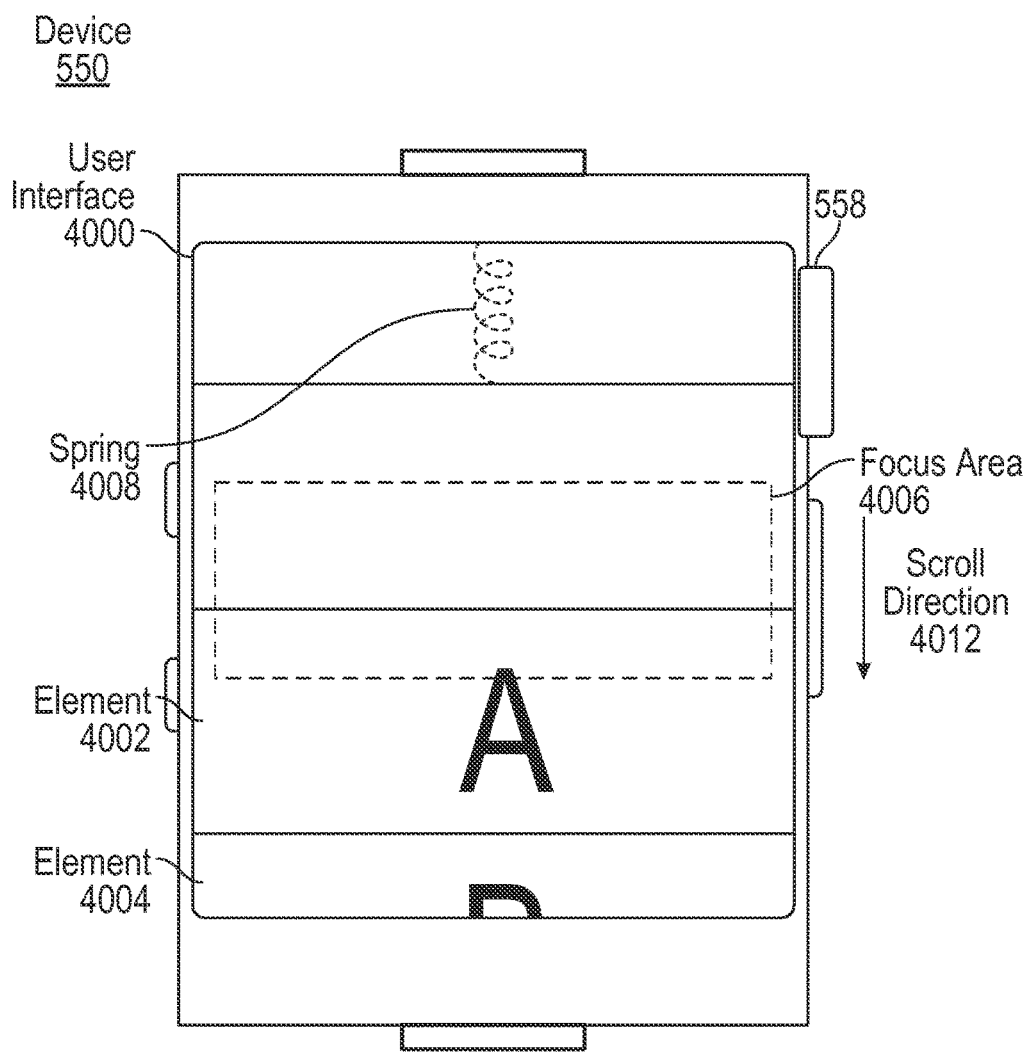
Figure 43:
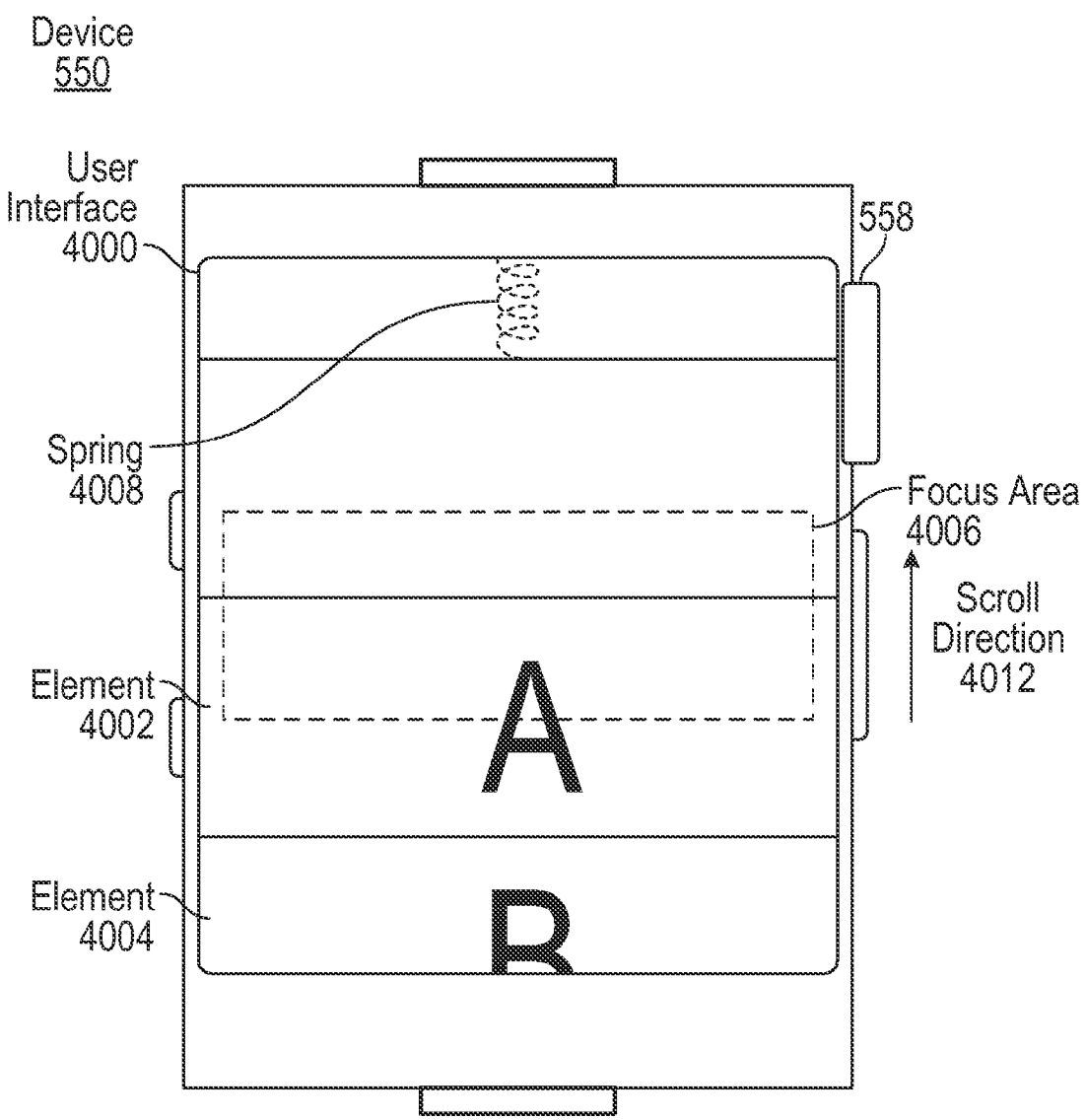
Figure 44:
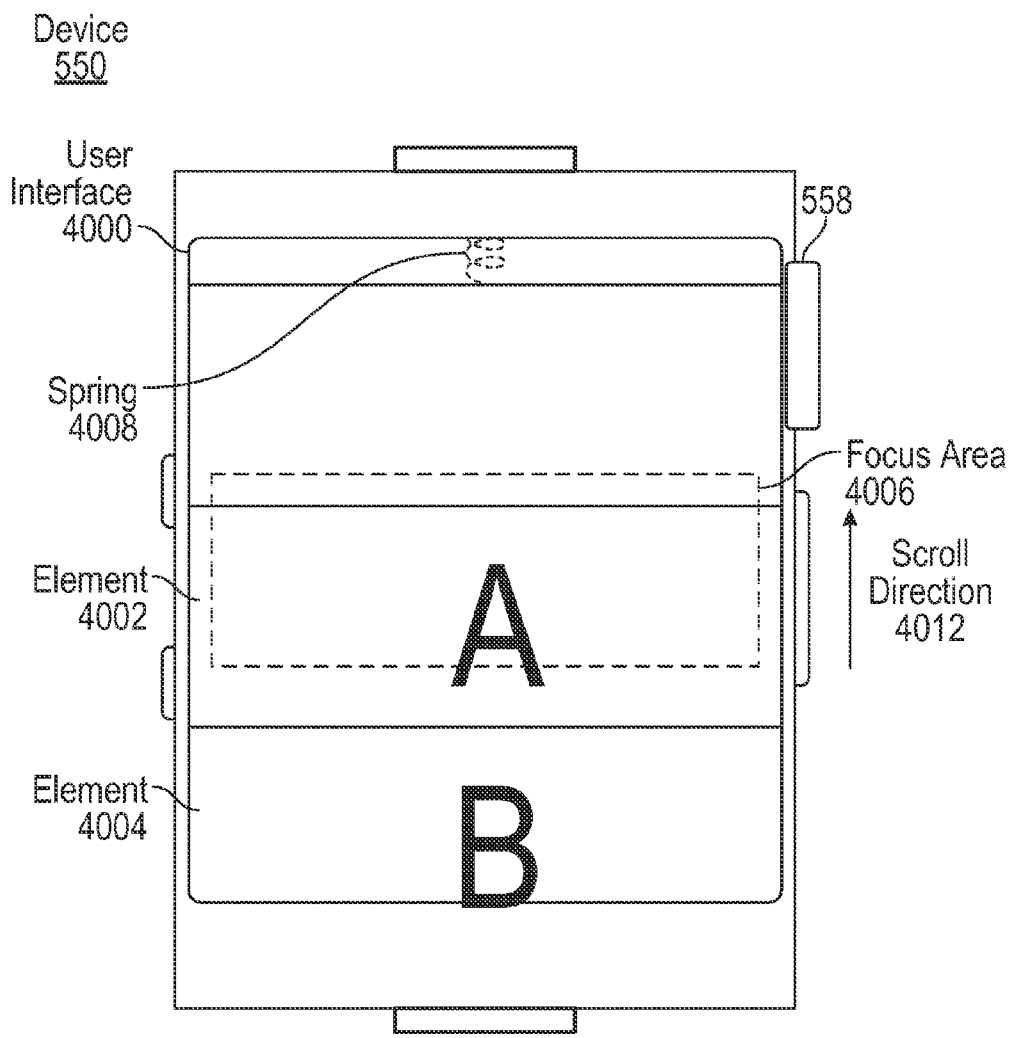
Figure 45:
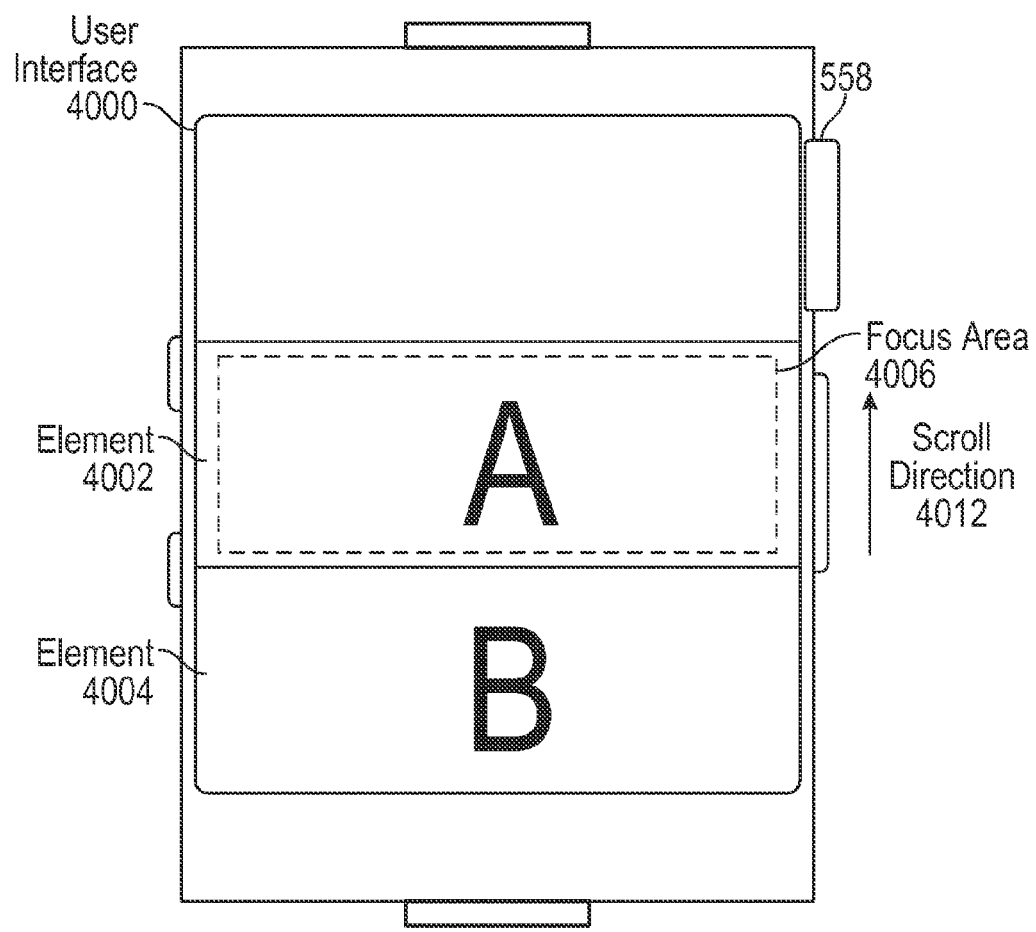

At FIGS. 41-42, the scrollable list of elements extends beyond the predetermined limit. As a result, spring 4008 engages the scrollable list of elements, causing the scrollable list of elements to "rubberband" back, as illustrated in FIGS. 43-45. The spring coefficient of spring 4008 may be varied to produce results with different characteristics.

At FIG. 45, element 4002 comes to rest while aligned with focus area 4006. The system interprets this alignment as a selection of element 4006, which is achieved by the user manipulating the scrollable list of elements through the use of crown 558. In some examples, additional input, such as tapping, pressing the crown or another button after the alignment may be required for the user to select element 4006.

While element 4002 is selected, the user can activate element 4002 by one or more of many techniques. For example, the user may press on a touch-sensitive display, press a button, or simply allow element 4002 to remain selected for a predetermined amount of time. In another example, aligning an element and a focus area can be interpreted as both a selection and an activation of the element.

In this example, movement of the scrollable list of elements is constrained along a predefined vertical path. In other examples, movement of the scrollable list of elements may be constrained along a different predefined path, or may not be constrained to a predefined path. In this example, alignment in only one axis (the vertical axis) is used to indicate selection of an element. In some examples, alignment in two, three, or more axes may be required between an element and a focus area to indicate a selection.

Figure 46:
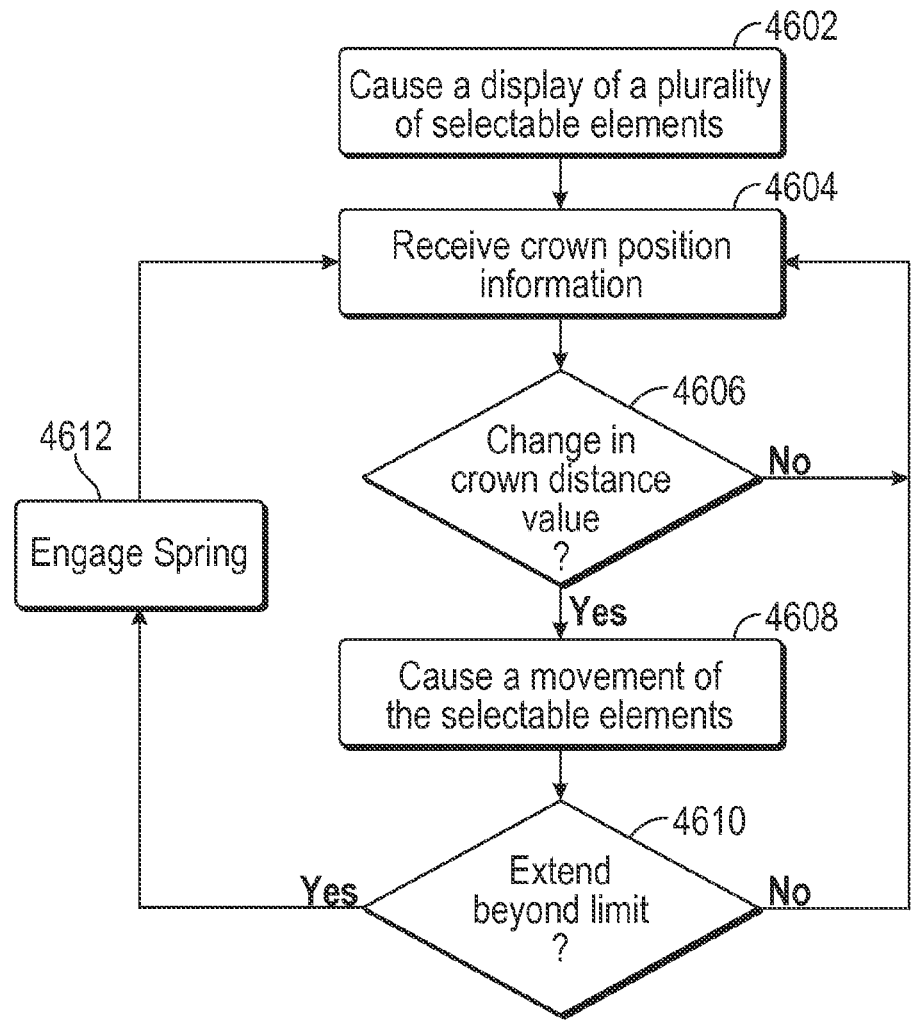
FIG. 46 is a flow diagram illustrating an exemplary process for selecting an element using a focus area and physics-based magnetic and spring modeling.

FIG. 46 is a flow diagram illustrating a process 4600 for selecting an element in a graphical user interface using a physical crown as an input device. Process 4600 is performed at a wearable electronic device (e.g., device 550 in FIG. 1) having a physical crown. In some examples, the electronic device also includes a touch-sensitive display. The process provides an efficient technique for selecting an element from among multiple elements in a graphical user interface.

At block 4602, the device causes a display of a plurality of selectable elements on a touch-sensitive display of a wearable electronic device. The device also registers a focus area. The device uses a physics-based model to simulate magnetic attraction between the selectable elements and the focus area. Each selectable element of the plurality of selectable elements is associated with a corresponding magnetic value. The magnetic value can be the strength of an element's magnet attraction in terms of its pull force, and each element can have a different magnetic value.

At block 4604, the device receives crown position information. The position information may be received as a series of pulse signals, real values, integer values, and the like.

At block 4606, the device determines whether a change has occurred in a crown distance value. The crown distance value is based on an angular displacement of the physical crown of the wearable electronic device. A change in the crown distance value is indicative of a user providing input to the wearable electronic device by, for example, turning the physical crown. If the device determines that a change in the crown distance value has not occurred, the system returns to block 4604 and continues receiving crown position information. If the device determines that a change in the crown distance value has occurred, the system continues to block 4608, though the system may continue to receive crown position information.

The device also determines a direction based on a direction of rotation of the physical crown of the wearable electronic device. For example, an up direction can be determined based on a clockwise rotation of the physical crown. Similarly, a down direction can be determined based on a counterclockwise rotation of the physical crown. In other examples, a down direction can be determined based on a clockwise rotation of the physical crown and an up direction can be determined based on a counterclockwise rotation of the physical crown.

At block 4608, in response to determining the change in the crown distance value, the device causes a movement of the plurality of selectable elements. This movement changes the focus of the plurality of selectable elements. At least initially, the movement of the plurality of selectable elements is in the determined direction. The movement of the plurality of selectable elements may be animated. The movement has a rate of movement (speed). Additionally, the magnetic values of one or more of the selectable elements may be modified based on the speed of the plurality of selectable elements.

At block 4610, the system determines whether the plurality of selectable elements has extended beyond a predetermined limit. If the system determines that the plurality of selectable elements has not extended beyond a predetermined limit, the system returns to block 4604. If the system determines that the plurality of selectable elements has extended beyond a predetermined limit, the system engages a virtual spring at block 4612. The virtual spring causes the plurality of selectable elements to slow down and rubberband back to within the predetermined limit. This mechanism will prevent a user from extending the plurality of selectable elements too far beyond the predetermined limit. At block 4604, the system continues to receive crown position information.

In some examples, to add additional realism and provide further ease of usability to the user interface, the system may employ a physics-based model of friction to reduce the speed of the plurality of selectable elements while it is in motion. For example, the speed of the plurality of selectable elements can be continuously (or repeatedly) decreased based on a friction coefficient value. This physics-based friction model may simulate kinetic friction, drag friction, or the like.

In some examples, the device receives an additional input through the rotation of the crown before the plurality of selectable elements reaches a steady state. An object is in a steady state when the object is not being translated, rotated, or scaled. In this example, the system determines a second change in the crown distance value. The system also determines a second direction, which is based on the direction of rotation of the physical crown of the wearable electronic device. In response to determining the second change in the crown distance value, the system increases or decreases the speed of the plurality of selectable elements by applying an additional force to the plurality of selectable elements. The change in the rate of the movement of the plurality of selectable elements is based on the second change in the crown distance value and the second direction.

In some examples, once the selection element of the plurality of selectable elements aligns with the focus area and the plurality of selectable elements is in a steady state, the system determines that the selection element has been selected. In some examples, additional input, such as tapping, pressing the crown or another button after the alignment may be required for the user to select the selection element.

In some examples, device 550 can provide haptic feedback based on the content displayed on the display 556. When a user interface object is displayed on the display 556, the device can modify the appearance of the object based on a change in a crown distance value received at the device 550 based on a rotation of crown 558. When a criterion is satisfied, a tactile output is output at the device 550.

In one example, the object is a scrollable list of elements, such as is described above. The criterion is satisfied when a beginning or an end of the scrollable list is reached. In another example, the object is a zoomable visual element. The criterion is satisfied when a maximum or minimum zoom level of the zoomable visual element is reached. In another example, the object is a scrollable list of selectable elements. The criterion is satisfied each time a selectable element of the scrollable list occupies a selection area.

Figure 47:
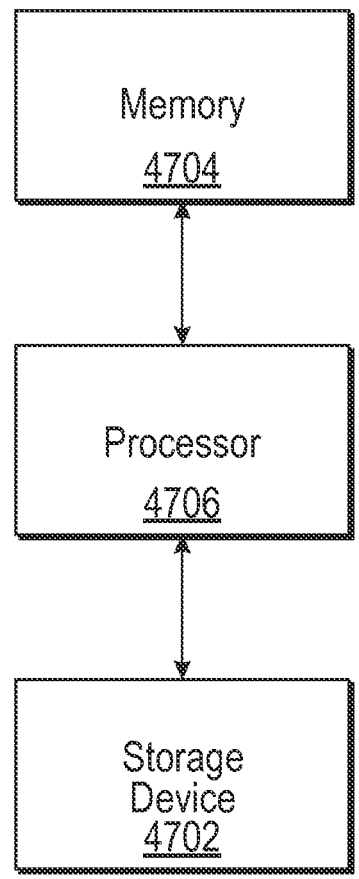
FIG. 47 illustrates an exemplary computing system for manipulating a user interface in response to a rotation of a crown according to various examples.

One or more of the functions relating to a user interface can be performed by a system similar or identical to system 4700 shown in FIG. 47. System 4700 can include instructions stored in a non-transitory computer readable storage medium, such as memory 4704 or storage device 4702, and executed by processor 4706. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM), a read-only memory (ROM), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

In some examples, system 4700 can be included within device 550. In these examples, processor 4706 can be the same or a different process than processor 570. Processor 4706 can be configured to receive the output from encoder 572, buttons 560, 562, and 564, and from touch-sensitive display 556. Processor 4706 can process these inputs as described above with respect to the processes described and illustrated. It is to be understood that the system is not limited to the components and configuration of FIG. 47, but can include other or additional components in multiple configurations according to various examples.

Figure 48A:
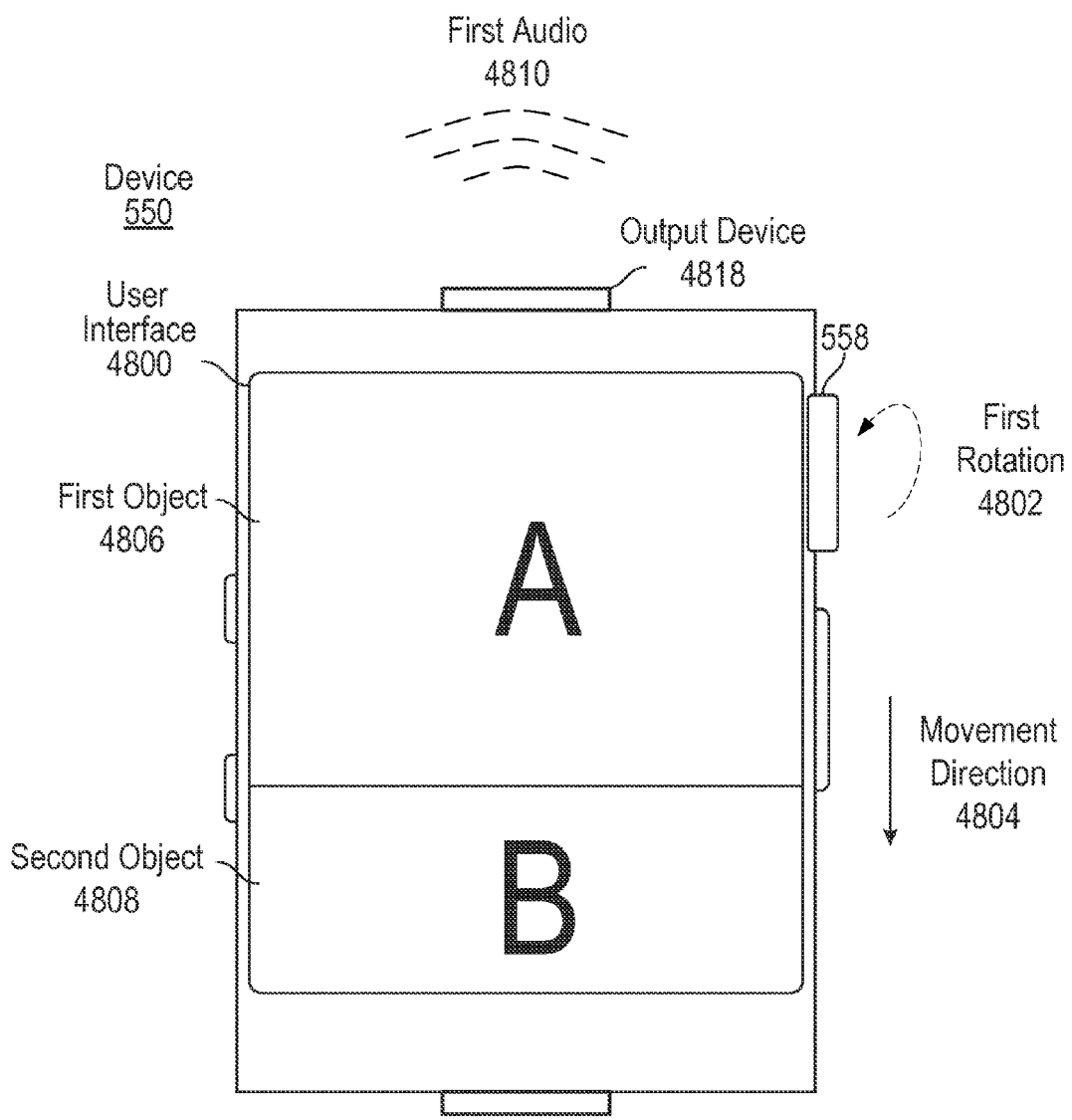
FIGS. 48A-48B illustrate an example electronic device for outputting audio and including a plurality of user interfaces in accordance with some embodiments.
Figure 48B:
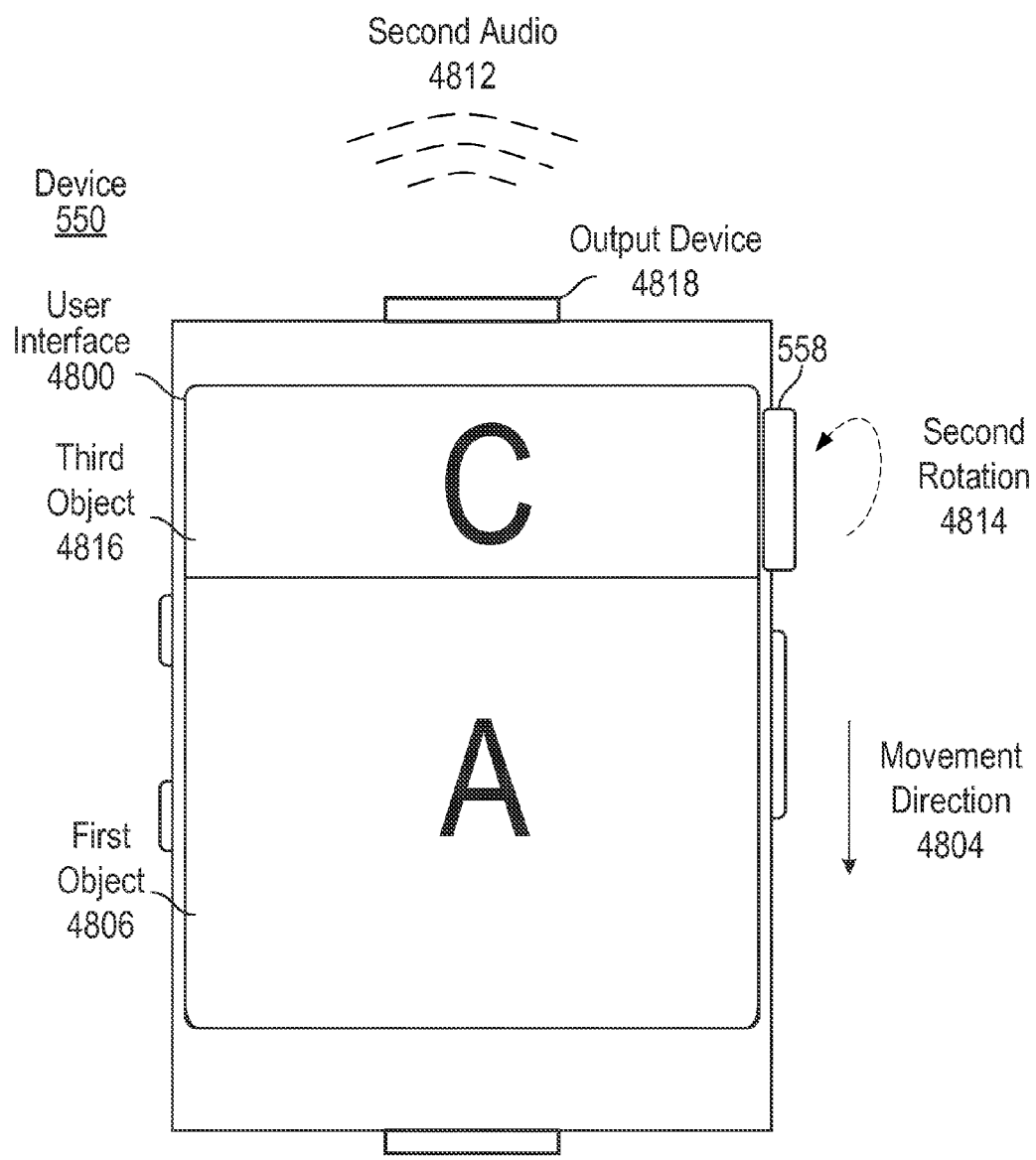

FIGS. 48A-48B illustrate an example electronic device 550 for outputting audio with varying audio characteristics. Specifically, rotation of the rotatable input mechanism 558 may cause or otherwise trigger output of an audio indicating successful rotation or input of the rotation. However, audio output having a constant or consistent audio characteristic may not be user friendly. That is, in one example, a user may rotate the rotatable input mechanism at a relatively high velocity, triggering output of audio having an audio characteristic (e.g., pitch and/or volume) that may be unpleasant and/or discomforting. Additionally, a consistent audio output does not convey to the user, via audio cues, characteristics of the input (e.g., velocity, acceleration) or of a corresponding visual output (e.g., displaying a next object). As such, the embodiments described herein with respect to FIGS. 48A-48B, and also with respect to FIGS. 49A-49C, as well as 50A-50C, address this problem by varying an audio characteristic of an audio output based on a rotational attribute.

The user interfaces in these figures may be used to illustrate the processes described below, including the process in FIG. 52. In some embodiments, FIGS. 48A-48B illustrates an electronic device 550 configured to output audio according to a received input representing a rotation of the rotatable input mechanism 558. In some embodiments, electronic device 550 may be the same as or similar to portable multifunction device 100 (FIG. 1A) and/or device 500 (FIGS. 5A-5B).

Electronic device 550 may include a touch-sensitive display including user interface 602, which may be the same as or similar to touch-sensitive display 112 (FIG. 1A) and/or display 504 (FIG. 5B), which may include touch-sensitive component 522 (FIG. 5B) and, optionally, touch-intensity sensitive component 524 (FIG. 5B). Touch-sensitive display may include user interface 4800, which may display, among other elements and/or affordances, one or more objects and/or graphical elements. Additionally, electronic device 550 may also include output device 4818 for outputting audio. In some embodiments, output device 4818 may be a speaker, jack, Wi-Fi transceiver, Bluetooth transceiver, and/or cellular transceiver.

For example, electronic device 550 may be configured to initially display, on user interface 4800, a first object 4806 (e.g., image A) and a second object (e.g., image B). It should be understood that first object 4806 and second object 4808 are not limited to images, and may be one or more elements capable of being displayed on user interface. For instance, first object 4806 and second object 4808 may be a series or sequence of images, pages, views, and/or object types. Additionally, in some embodiments, first object 4806 and second object 4808 may be sequential (e.g., series of pages in a book) or nonsequential (e.g., two different views of a webpage).

Electronic device 550 may receive an input representing a rotation of the rotatable input mechanism 558. For instance, a user of the electronic device may rotate the rotatable input mechanism to trigger or otherwise initiate a movement of one or more displayed objects in a desired direction on the user interface 4800. Specifically, in the embodiment of FIG. 48A, electronic device may receive an input representing a first rotation 4802 of rotatable input mechanism 558. Although FIG. 48A illustrates a particular rotation direction, it should be understood that rotatable input mechanism may be rotated in either direction (e.g., clockwise and/or counter-clockwise). Accordingly, electronic device 550 may display, on user interface 4800, a movement of first object 4806 and second object 4808 in a movement direction 4804 corresponding to the direction of the first rotation 4802.

In such embodiments, electronic device 550 may also output first audio 4810 via output device 4818 as the user performs first rotation 4802 of the rotatable input mechanism. In other words, electronic device may output first audio 4810 as electronic device 550 receives an input representing the first rotation 4802 of the rotatable input mechanism 558. Similarly, as the rotatable input mechanism experiences a second rotation 4814 (which may be a continuation of first rotation 4802), the user interface 4800 of electronic device 550 may display third object 4816, and correspondingly output second audio 4812 via output device 4818. That is, electronic device may output second audio 4812 as electronic device 550 receives an input representing the second rotation 4814 of the rotatable input mechanism 558. In some embodiments, second audio 4812 may be output sequentially after first audio output 4810.

To provide a friendly user interface experience, and to provide an audio cue corresponding to the displayed objects, the first audio 4810 and second audio 4812 may have or otherwise be outputted with varying or different audio characteristics. In particular, electronic device 550 may determine an audio characteristic for each of the first audio 4810 and second audio 4812 based on an identified rotational attribute of one or both of the first rotation 4802 or the second rotation 4814, respectively.

In some embodiments, electronic device 550 may determine one or more audio characteristics for each of first audio output 4810 and second audio output 4812 including, but not limited to, a volume, a pitch, a frequency, a change in volume, a change in pitch, and a change in frequency. In some embodiments, the first audio output 4810 and second audio output 4812 are members of a musical scale (e.g., the major scale). In additional embodiments, electronic device 550 may identify the rotational attribute of an input (e.g., first rotation 4802 and second rotation 4814) of rotatable input mechanism 558 based on one or more of a degree of angular rotation of the rotatable input mechanism, an angular velocity of the rotatable input mechanism, and an angular acceleration of the rotatable input mechanism.

In some embodiments, electronic device 550 may include a speaker as output device 4818. In such embodiment, outputting of the audio (e.g., first audio 4810 and/or second audio 4812) with the audio characteristic includes a speaker playback. In additional embodiments, the electronic device 550 may include a Bluetooth transceiver as output device 4818. As such, in such embodiment, outputting the audio (e.g., first audio 4810 and/or second audio 4812) with the audio characteristic includes sending audio data corresponding to the audio output via Bluetooth. In some embodiments, the electronic device 550 includes a Wi-Fi transceiver as output device 4818. In such embodiment, outputting the audio (e.g., first audio 4810 and/or second audio 4812) with the audio characteristic includes sending audio data corresponding to the audio output via Wi-Fi. In other embodiments, electronic device 550 may include a stereo mini-jack as output device 4818.

In the embodiment illustrated in FIGS. 48A-48B, movement or manipulation of the first object 4806, second object 4808, and third object 4816 on the user interface 4800 may be indicative of or include a scrolling action in a certain direction (e.g., movement direction 4804), and corresponding to a rotation of the rotatable input mechanism 558. Further, in such embodiment, a corresponding output of audio for at least each rotation (e.g., first rotation 4802 and second rotation 4814) may be provided. However, such embodiments are not limited to outputting audio during, for example, a scrolling action, and may extend to other contexts, as illustrated in FIGS. 49A-49C.

Figure 49A:
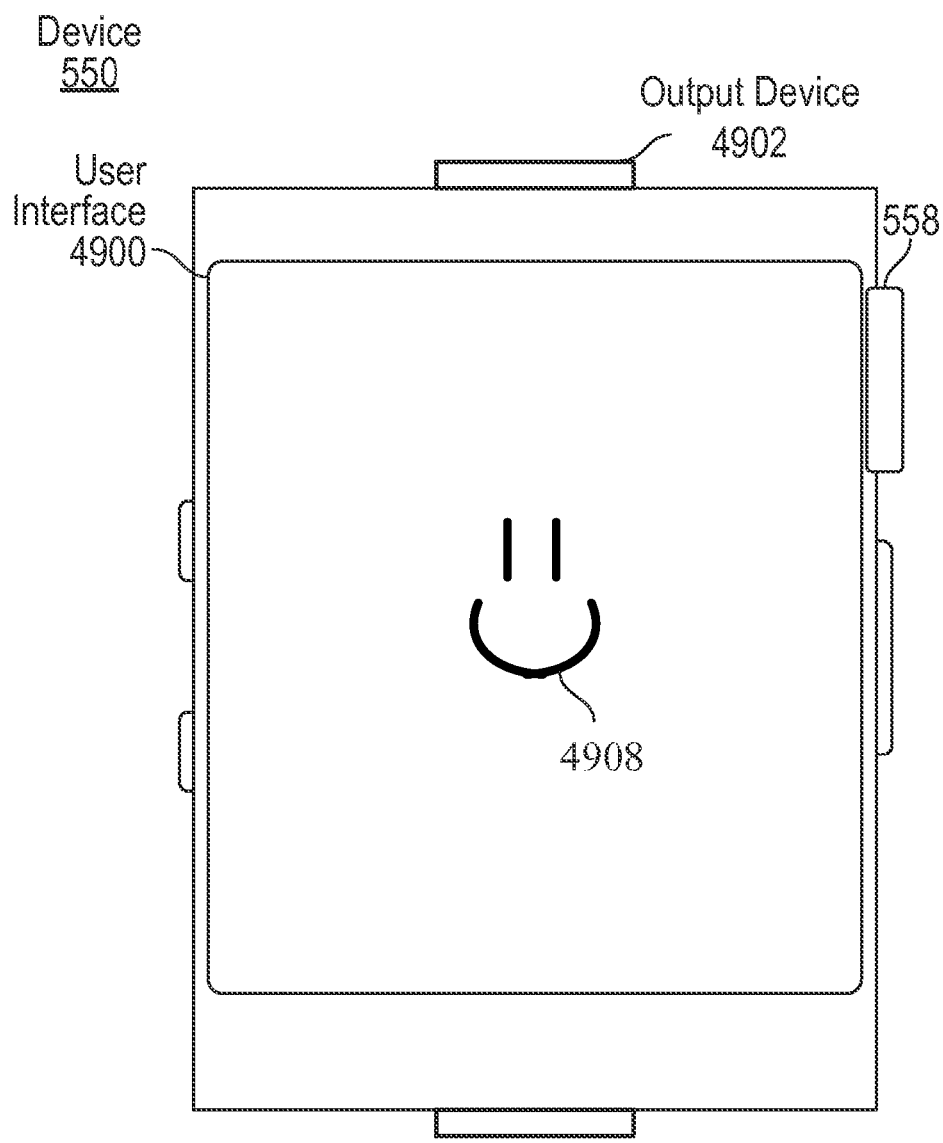
FIGS. 49A-49C illustrate an example electronic device for outputting audio and including a plurality of user interfaces in accordance with some embodiments.
Figure 49B:
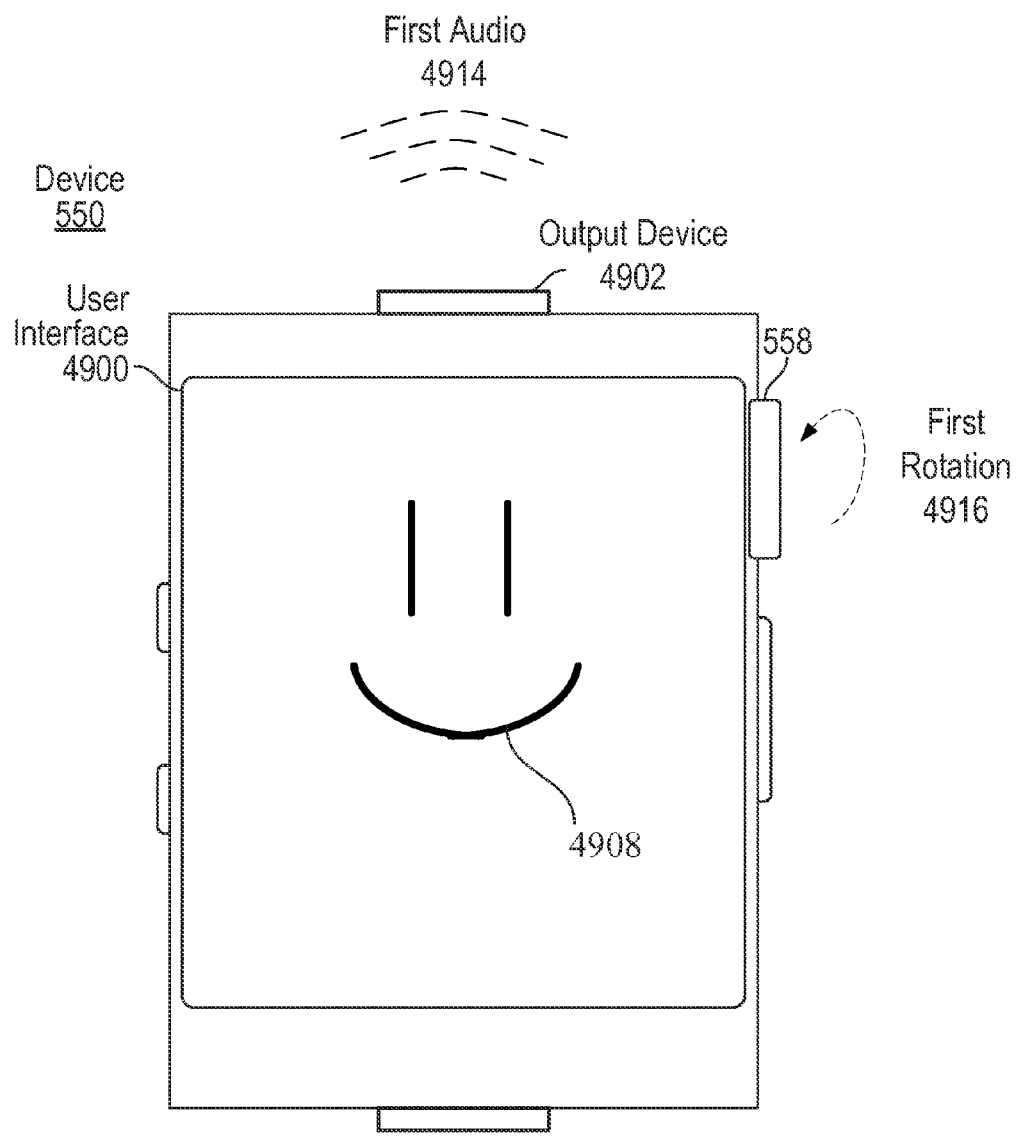
Figure 49C:
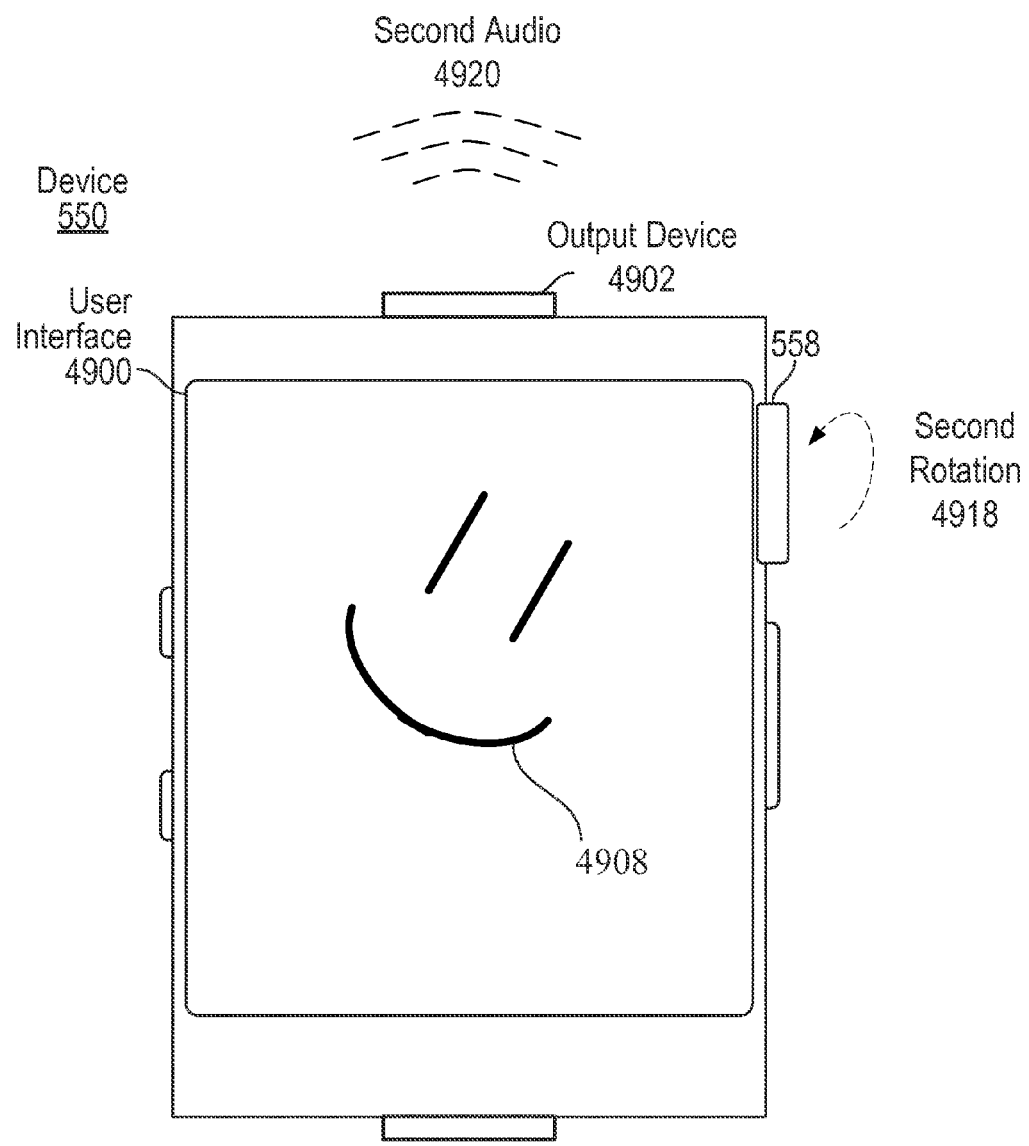

FIGS. 49A-49C illustrate a further example of electronic device 550 configured to output audio and including a plurality of user interfaces. The user interfaces in these figures may be used to illustrate the processes described below, including the process in FIG. 52. For example, FIG. 49A illustrates an embodiment similar to that illustrated in FIGS. 48A-48B. However, the embodiments of FIGS. 49A-49C illustrate an example of audio output in accordance with or corresponding to an object 4908 manipulation on user interface 4900. Specifically, object 4908 may initially be displayed on user interface 4900 at a first size. Turing to FIG. 49B, based on a first rotation 4916 of rotatable input mechanism 558, electronic device 550 may display, on user interface 4900, object 4908 having a second size. In some embodiments, the second size may be larger than the first size (as shown), or may be smaller than the first size.

Additionally, electronic device 550 may output first audio corresponding to receiving input representing the first rotation 4916 of rotatable input mechanism 558. In some embodiments, the first audio 4914 may be output (e.g., via output device 4902) with a default audio characteristic representing an initial and unvaried audio characteristic (e.g., no variation of pitch and/or volume), and based on a rotational attribute. In some embodiments, output device 4902 may be the same as or similar to output device 4818. Electronic device 550 may subsequently receive another input, or as part of the same input of the first rotation 4916, a second rotation 4918 of the rotatable input mechanism 558. In this embodiment, electronic device 550 may rotate (e.g., clockwise and/or counter clockwise) object 4908 having, for example, second size, in a rotational direction on user interface 4900.

Accordingly, electronic device 550 may output second audio 4920 (e.g., via output device 4902) with a second audio characteristic based on a rotational attribute. For example, an angular velocity of the rotatable input mechanism 558 may have increased between the first rotation 4916 and the second rotation 4918. That is, in the time domain, a time between an end of the first rotation 4916 and a beginning and/or end of the second rotation 4918 may result in an increase in the angular velocity of the rotatable input mechanism. As such, electronic device 550 may adjust an audio characteristic or otherwise determine a second audio characteristic (e.g., lower pitch/volume) for the second audio 4920 based on the identified rotational attribute (e.g., angular velocity).

In additional embodiments, electronic device 550 may be configured to display object 4908 in accordance with one or more values of a characteristic of the object 4908 prior to receiving the user input representing the rotation of the rotatable input mechanism 558 (e.g., at FIG. 49A). Electronic may be configured to update a value of the characteristic (e.g., first zoom level) of object 4908 based on the user input representing rotation of the rotatable input mechanism 558. Additionally, electronic device 550 may be configured to update display of object 4908 (e.g., at FIG. 49B) in accordance with the updated value (e.g., second zoom level) of the characteristic of the object 4908.

In some embodiments, electronic device 550 may be configured to update the value of the characteristic of the object 4908 based on the rotational attribute of the user input (e.g., rotation of rotatable input mechanism 558). Further, in some embodiments, the characteristic of the object 4908 may be selected from the group consisting of scroll position, zoom size, and degree of rotation. For example, when the characteristic of the object is a scroll position, a predetermined subset of the range of values of the characteristic may be a range of scroll positions. In other embodiments, when the characteristic of the object is a zoom size, the predetermined subset of the range of values of the characteristic may be a range of zoom sizes.

In addition, as illustrated in FIGS. 48A-48B, electronic device 550 may be configured to display one or more objects (e.g., first object 4806, second object 4808, and/or third object 4816) as a plurality of objects arranged in a sequence and the characteristic of the one or more objects may be a position in the sequence. Electronic device 550 may be configured to update the value of the characteristic based on the user input by determining an updated position in the sequence based on the user input. Additionally, Electronic device 550 may be configured to update display of the one or more objects in accordance with the updated value of the characteristic by updating to display the object of the plurality of objects corresponding to the updated position.

In some embodiments, the plurality of objects arranged in a sequence is a plurality of images arranged in a sequence. In some embodiments, the plurality of objects arranged in a sequence is a plurality of numeric, alphabetic, or alphanumeric characters arranged in a sequence. Moreover, electronic device 550 may be configured to update the value of the characteristic based on the user input via a first update based on the first rotational attribute and a second update different than the first update and based on the second rotational attribute.

Figure 50A:
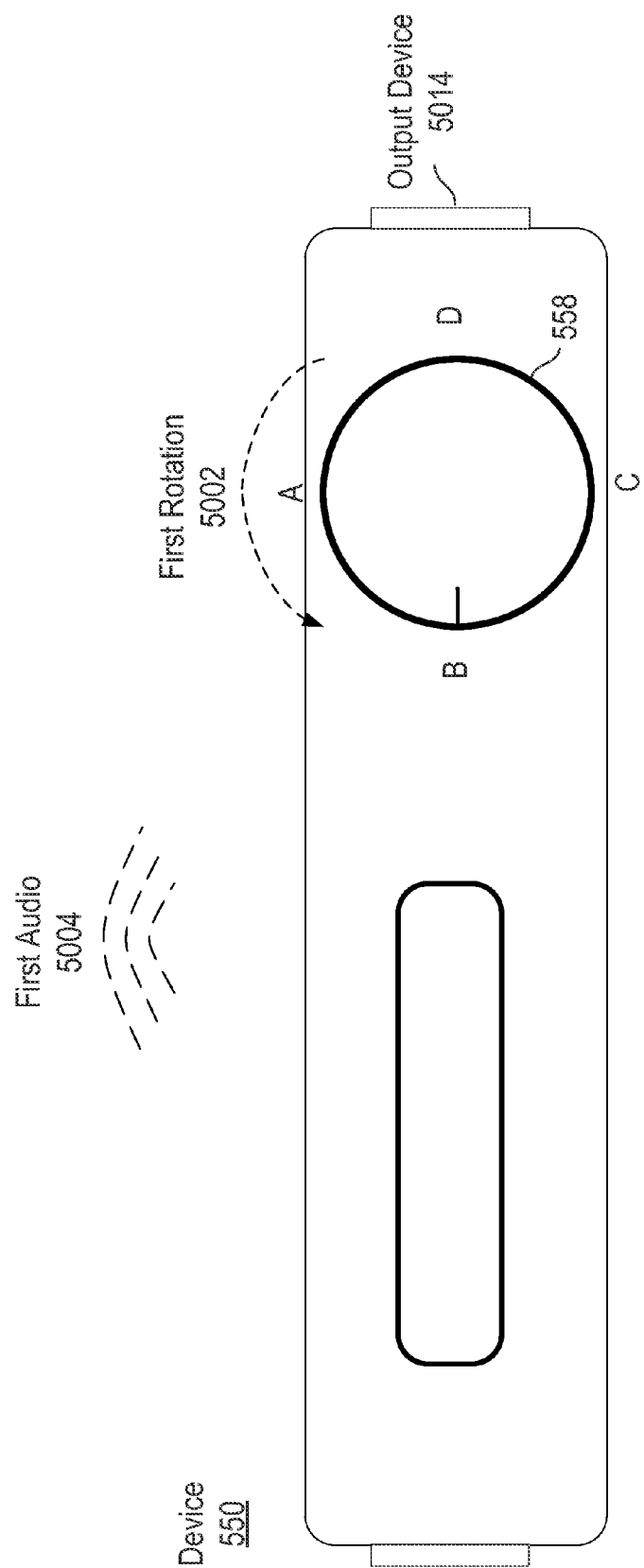
FIG. 50A-50C illustrate a side view of an example electronic device for outputting audio in accordance with some embodiments.
Figure 50B:
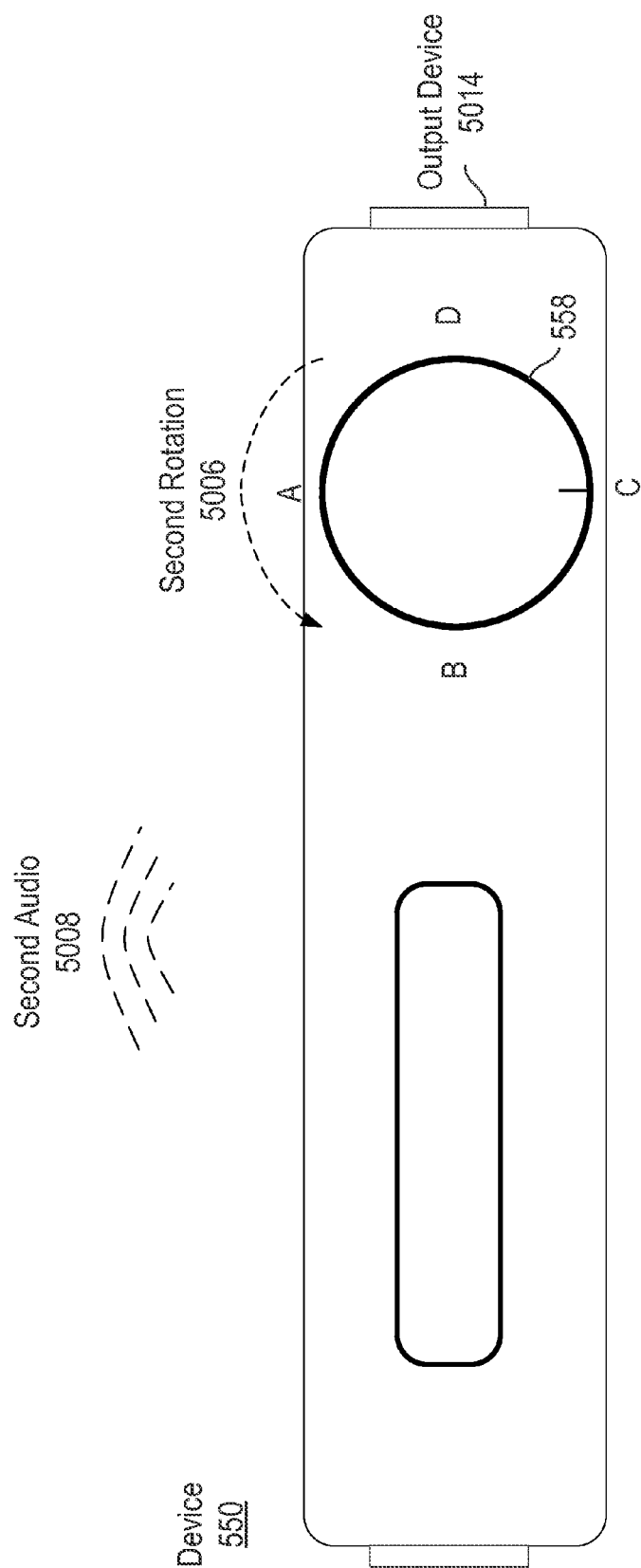
Figure 50C:
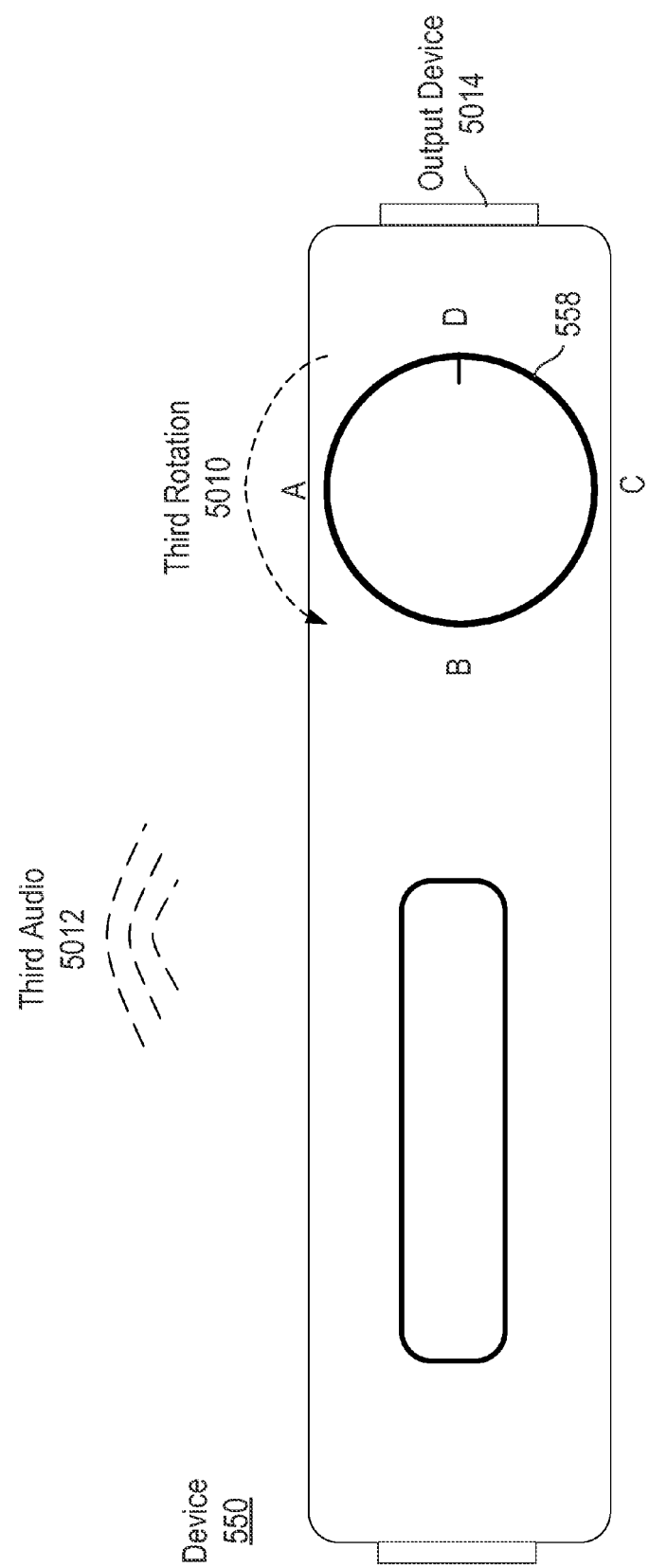

FIGS. 50A-50C illustrate a side view of an example electronic device for outputting audio in accordance with some embodiments. The electronic device in these figures may be used to illustrate the processes described below, including the process in FIG. 52.

FIGS. 50A-50C illustrate an example rotatable input mechanism rotation and audio output scheme. Specifically, electronic device 550 may receive an input representing a first rotation 5002 of rotatable input mechanism 558 from position A to position B (as shown in FIG. 50A). Accordingly, electronic device 550 may output a corresponding first audio 5004 via output device 5014 upon identifying a rotational attribute and determining an audio characteristic (e.g., pitch and/or volume). Electronic device 550 may receive another input (or may be part of the same input as first rotation 5002) representing a second rotation 5006 of rotatable input mechanism 558 from position B to position C (as shown in FIG. 50B).

Accordingly, electronic device 550 may output a second audio 5008 via output device 5014 different from the first audio 5002 (e.g., lower pitch and/or volume) upon identifying a corresponding rotational attribute (e.g., increase in velocity and determining an audio characteristic. Electronic device 550 may receive yet another input (or may be part of the same input as first rotation 5002 and second rotation 5006) representing a third rotation 5010 of rotatable input mechanism 558 from position C to position D (as shown in FIG. 50C). Accordingly, electronic device 550 may output third audio 5012 via output device 5014, which may be different from the first audio 5002 and second audio 5008 (e.g., lower pitch and/or volume than second audio 5008) upon identifying a corresponding rotational attribute and determining an audio characteristic.

In some embodiments, electronic device 550 may be configured to identify a rotational attribute of a given rotation or rotations of rotatable input mechanism 558 based on a number of rotational attributes. Specifically, a user input representing the rotation of the rotatable input mechanism 558 may include a first input segment and a second input segment. In some embodiments, an input segment may be a degree of rotation, a period of time (irrespectively of degree), and/or a degree of rotation over time (i.e., velocity) of the rotatable input mechanism 558.

For example, in one embodiment, a first input segment may be a rotation of rotatable input mechanism 558 from position A to position B (e.g., first rotation 5002). Further, a second input segment may be a rotation of rotatable input mechanism 558 from position B to position C (e.g., second rotation 5006). In another embodiment, a first input segment may be a first period of time from an end of first rotation 5002 (e.g., at position B) to a beginning of the second rotation 5006 at position B. Similarly, a second input segment may be a second period of time from an end of second rotation 5006 (e.g., position C) to a beginning of third rotation 5010 at position C. In yet another embodiment, a first input segment may be a velocity of the rotation from any two or more positions (e.g., positions A, B, and C) forming one or more rotations (e.g., first rotation 5002 and second rotation 5006).

As such, in each of the foregoing embodiments, electronic device 550 may be configured to identify a first rotational attribute based on the first input segment and a second rotational attribute based on the second input segment. Electronic device 550 may further be configured to determine a first audio characteristic based on the first rotational attribute a second audio characteristic based on the second rotational attribute. Additionally, electronic device 550 may be configured to output first audio with the first audio characteristic and output second audio with the second audio characteristic.

Figure 51A:
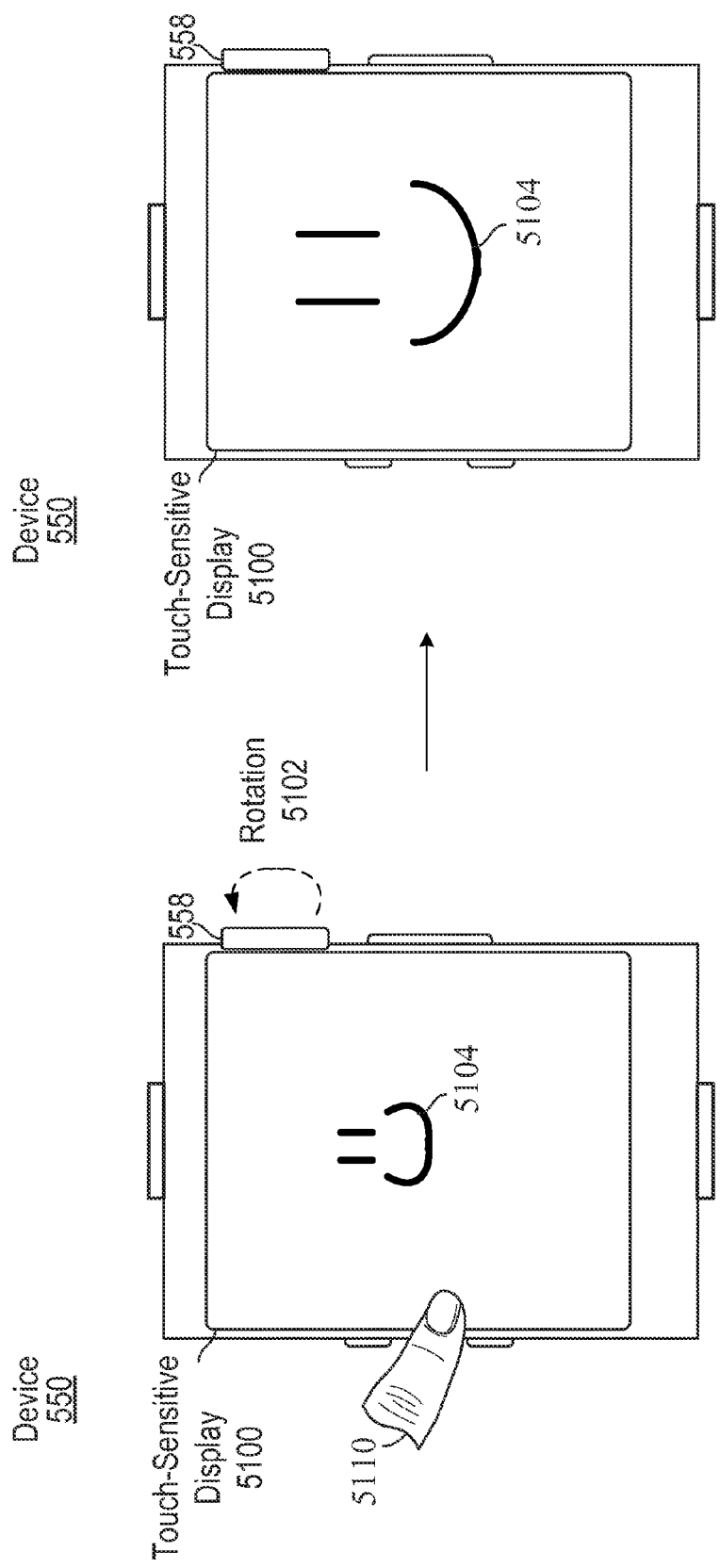
FIGS. 51A-51C illustrate an example electronic device for manipulating one or more objects on a user interface in accordance with some embodiments.
Figure 51B:
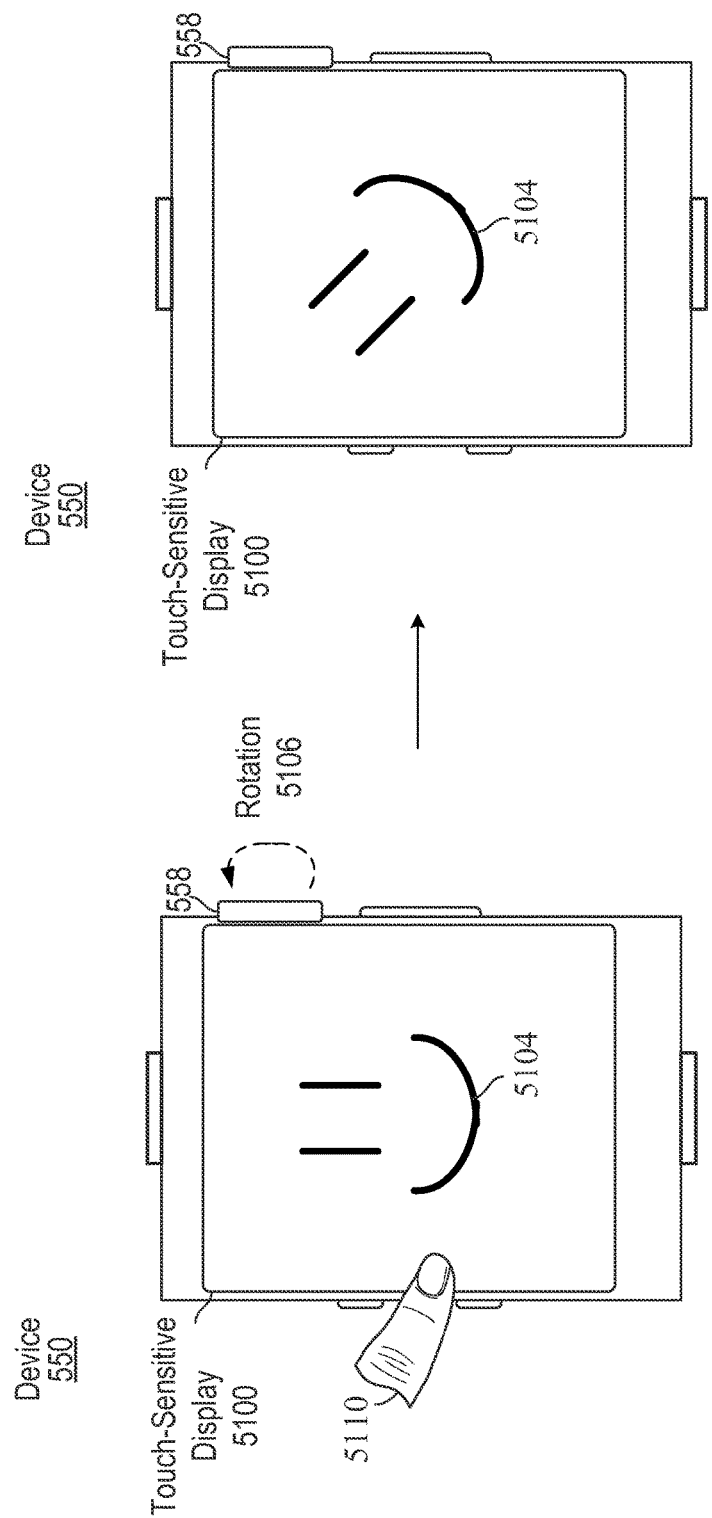

FIGS. 51A-51B illustrate an example electronic device for manipulating one or more objects on a user interface in accordance with some embodiments. In order to enhance the user experience using an electronic device such as electronic device 550, it may be desirable to enable manipulation and/or performance of one or more contextual actions on user interface 5100 based on receiving two concurrent, yet separate inputs. The user interfaces in these figures may be used to illustrate the processes described below, including the process in FIG. 53.

Figure 51C:
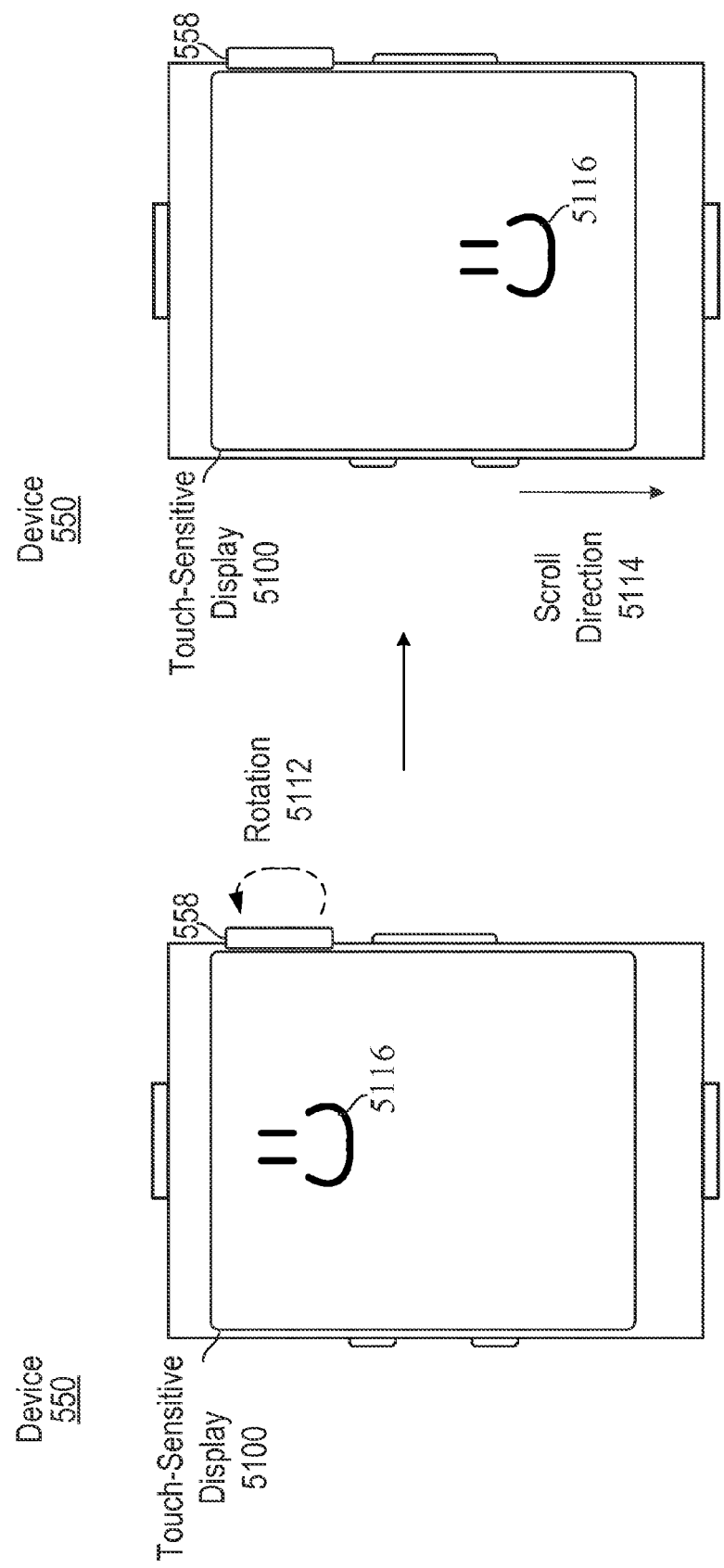

The embodiments shown in FIGS. 51A-51C enable a user to manipulate or otherwise cause electronic device 550 to perform contextual actions via a touch/contact (e.g., using finger 5110) of the touch-sensitive display 5100 and a concurrent rotation 5102 of the rotatable input mechanism 558. By way of example, FIG. 51A illustrates manipulation of object 5104. Specifically, a user may adjust a zoom level or otherwise adjust an object size based on touching/contacting the touch-sensitive display 510 while simultaneously rotation the rotatable input mechanism 558.

In the embodiment shown in FIG. 51A, the electronic device 550 may adjust a zoom level (e.g., increase) based receiving or detecting a rotation of rotatable input mechanism while receiving or detecting a concurrent touch/contact (e.g., via finger 5110). Although FIG. 51A illustrates an increase in the zoom level, it should be understood that electronic device 550 may also decrease a zoom level. Similarly, in the embodiment illustrated in FIG. 51B, electronic device may also adjust a position of object 5104 on the touch-sensitive display 5100 based on receiving or detecting a rotation 5106 of rotatable input mechanism while receiving or detecting a concurrent touch/contact (e.g., via finger 5110). In some embodiments, object 5104 may be any one of a document, a page, a view, or an image.

Specifically, in such embodiments, electronic device 550 may be configured to receive a first user input representing a rotation 5102 of the rotatable input mechanism 558. Electronic device 550 may be configured to determine whether a second user input representing a contact (e.g., touch via finger 5110) on the touch-sensitive display 5100 is received while receiving the first user input representing the rotation 5102 of the rotatable input mechanism 558. Electronic device 550 may perform a first contextual action (e.g., adjust zoom level or rotate the object) based on the rotation of the rotatable input mechanism 558 based on determining that the second user input representing the contact (e.g., via finger 5110) on the touch-sensitive display 5100 is received while receiving the first user input representing the rotation of the rotatable input mechanism 558.

However, as illustrated in FIG. 51C, electronic device 550 may be configured to perform a second action, such as scrolling through objects/pages, and different from the first contextual action based on the rotation of the rotatable input based on determining that the second user input representing the contact (e.g., via finger 5110) on the touch-sensitive display is not received while receiving the first user input representing the rotation of the rotatable input mechanism. For example, a rotation 5112 of the rotatable input mechanism 558 may result in a scroll (e.g., in scroll direction of object 5116 from one location on touch-sensitive display 5100 to another. In some embodiments, object 5116 may alternatively be scrolled in the opposite direction (e.g., upwards) on touch-sensitive display 5100. Although shown as a user finger 5110, it should be understood that the second user input may be received via an input device/mechanism (e.g., stylus).

In additional embodiments, object 5104 may be displayed on touch-sensitive display 5100 in accordance with a value of a first characteristic of the object. In some embodiments, the first characteristic of the object 5104 may be associated with the first contextual action (e.g., first zoom level or first rotation position) and different from a second characteristic (e.g., scroll position) of the object 5104 associated with the second action. Accordingly, electronic device 550 may be configured to, when performing the first contextual action, to determine an updated value of the first characteristic (e.g. second zoom level or second rotation position) of the object 5104 in response to receiving the first user input representing the rotation of the rotatable input mechanism while receiving the second user input representing the contact on the touch-sensitive display and displaying the object 5104 in accordance with the updated value. In some embodiments, the characteristic of the object is selected from the group consisting of scroll position, zoom size, and degree of rotation.

FIG. 52 is a flow diagram illustrating a method 5200 of outputting audio with an audio characteristic, in accordance with some embodiments. Method 5200 may be performed at a device (e.g., 100, 300, 500, and 550) with a display and a rotatable input mechanism. Some operations in method 5200 may be combined, the order of some operations may be changed, and some operations may be omitted.

In some embodiments, a rotatable input mechanism (e.g., rotatable input mechanism 506 and/or crown 558) may be configured to receive user input. In some embodiments, method 5200 may be performed at an electronic device with a touch-sensitive surface/display (e.g., 112, 355, and 504). Example devices that may perform method 5200 include devices 100, 300, 500, and 550 (FIGS. 1A, 3, 5A, 48A-48B, 49A-49C, and 50A-50C).

As described below, method 5200 provides an intuitive way for interacting with an electronic device by outputting audio with an audio characteristic. The method reduces the physical and/or cognitive burden on a user who may engage the rotatable input mechanism during various activities, thereby creating a more efficient human-machine interface.

At block 5202, method 5200 may receive a user input representing a rotation of the rotatable input mechanism. At block 5204, method 5200 may identify a rotational attribute of the user input. At block 5206, method 5200 may determine an audio characteristic based on the identified rotational attribute. At block 5208, method 5200 may output audio with the audio characteristic.

In accordance with some embodiments, the audio characteristic is selected from the group consisting of one or more of a volume, a pitch, a frequency, a change in volume, a change in pitch, and a change in frequency.

In accordance with some embodiments, the rotational attribute is one or more of: degree of angular rotation of the rotatable input mechanism, angular velocity of the rotatable input mechanism, and angular acceleration of the rotatable input mechanism.

In accordance with some embodiments, the user input representing the rotation of the rotatable input mechanism comprises a first input segment and a second input segment; wherein identifying the rotational attribute of the user input comprises: identifying a first rotational attribute based on the first input segment; identifying a second rotational attribute based on the second input segment; wherein determining an audio characteristic based on the identified rotational attribute comprises: determining a first audio characteristic based on the first rotational attribute; determining a second audio characteristic based on the second rotational attribute; wherein enabling output of the audio output comprises: outputting first audio with the first audio characteristic; and outputting second audio with the second audio characteristic.

In accordance with some embodiments, the first audio characteristic includes a first pitch and the second audio characteristic includes a second pitch different from the first pitch.

In accordance with some embodiments, the first audio characteristic includes a first frequency and the second audio characteristic includes a second frequency different from the first frequency.

In accordance with some embodiments, the first audio characteristic includes a first volume and the second audio characteristic includes a second volume different from the first volume.

In accordance with some embodiments, the electronic device includes a speaker, and wherein outputting the audio with the audio characteristic includes speaker playback.

In accordance with some embodiments, the electronic device includes a Bluetooth transceiver, and wherein outputting the audio with the audio characteristic includes sending audio data corresponding to the audio output via Bluetooth.

In accordance with some embodiments, the electronic device includes a Wi-Fi transceiver, and wherein outputting the audio with the audio characteristic includes sending audio data corresponding to the audio output via Wi-Fi.

In accordance with some embodiments, prior to receiving the user input representing the rotation of the rotatable input mechanism, displaying, on the display, one or more objects in accordance with one or more values of a characteristic of the one or more objects; in response to receiving the user input representing the rotation of the rotatable input mechanism, updating a value of the characteristic of an object from the one or more objects based on the user input; updating display of the one or more objects in accordance with the updated value of the characteristic of the object.

In accordance with some embodiments, updating the value of the characteristic of the object based on the user input comprises updating the value of the characteristic of the object based on the rotational attribute of the user input.

In accordance with some embodiments, wherein the one or more objects are a plurality of objects arranged in a sequence and the characteristic of the one or more objects is a position in the sequence, wherein updating the value of the characteristic based on the user input comprises determining an updated position in the sequence based on the user input, and wherein updating display of the one or more objects in accordance with the updated value of the characteristic comprises updating to display the object of the plurality of objects corresponding to the updated position.

In accordance with some embodiments, the plurality of objects arranged in a sequence is a plurality of images arranged in a sequence.

In accordance with some embodiments, the plurality of objects arranged in a sequence is a plurality of numeric, alphabetic, or alphanumeric characters arranged in a sequence.

In accordance with some embodiments, updating display of the object in accordance with the updated value of the characteristic of the object comprises animating the object to reflect the updated value of the characteristic of the object.

In accordance with some embodiments, updating the value of the characteristic based on the user input comprises a first update based on the first rotational attribute and a second update different than the first update and based on the second rotational attribute.

In accordance with some embodiments, the characteristic of the object is selected from the group consisting of scroll position, zoom size, and degree of rotation.

In accordance with some embodiments, the characteristic of the object is scroll position and the predetermined subset of the range of values of the characteristic is a range of scroll positions.

In accordance with some embodiments, the characteristic of the object is zoom size and the predetermined subset of the range of values of the characteristic is a range of zoom sizes.

Figure 53:
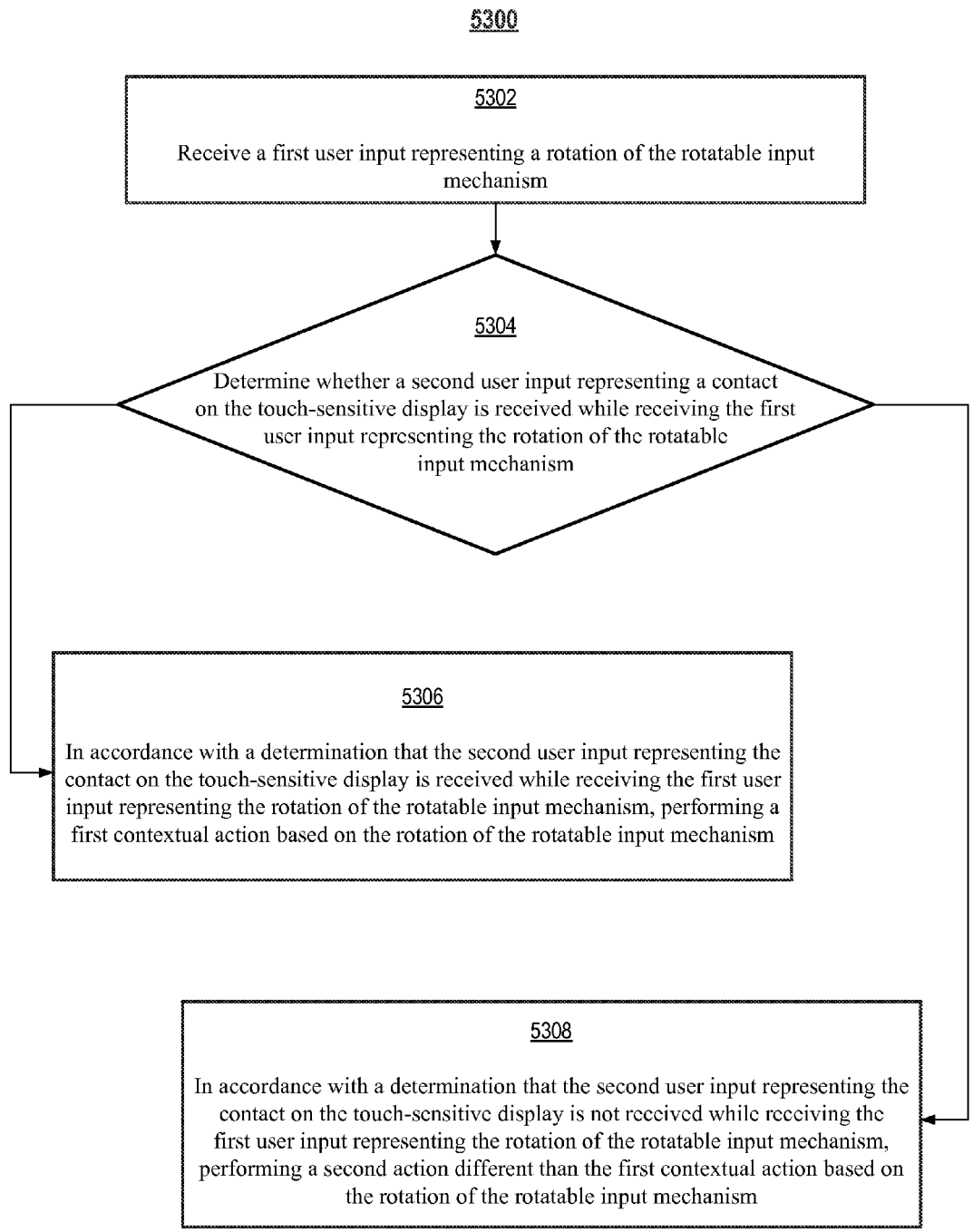
FIG. 53 is a flow diagram of an example process for manipulating an object in accordance with some embodiments.

FIG. 53 is a flow diagram illustrating a method 5300 of performing an action, in accordance with some embodiments. Method 5300 may be performed at a device (e.g., 100, 300, 500, and 550) with a touch-sensitive display (e.g., 112, 355, and 504) and a rotatable input mechanism (e.g., 506, 558). Some operations in method 5300 may be combined, the order of some operations may be changed, and some operations may be omitted.

In some embodiments, a rotatable input mechanism (e.g., rotatable input mechanism 506 and/or crown 558) may be configured to receive user input. In some embodiments, method 5300 may be performed at an electronic device with a touch-sensitive surface/display (e.g., 112, 355, and 504). Example devices that may perform method 5200 include devices 100, 300, 500, and 550 (FIGS. 1A, 3, 5A, 48A-48B, 49A-49C, and 50A-50C).

As described below, method 5300 provides an intuitive way for interacting with an electronic device by performing an action an object. The method reduces the physical and/or cognitive burden on a user who may engage the rotatable input mechanism during various activities, thereby creating a more efficient human-machine interface.

At block 5302, method 5300 may receive a first user input representing a rotation of the rotatable input mechanism. At block 5304, method 5300 may determine whether a second user input representing a contact on the touch-sensitive display is received while receiving the first user input representing the rotation of the rotatable input mechanism. At block 5306, method 5300 may in accordance with a determination that the second user input representing the contact on the touch-sensitive display is received while receiving the first user input representing the rotation of the rotatable input mechanism, performing a first contextual action based on the rotation of the rotatable input mechanism. At block 5308, method 5300 may in accordance with a determination that the second user input representing the contact on the touch-sensitive display is not received while receiving the first user input representing the rotation of the rotatable input mechanism, performing a second action different than the first contextual action based on the rotation of the rotatable input mechanism.

In accordance with some embodiments, method 5300 may include displaying, on the touch-sensitive display, an object in accordance with a value of a first characteristic of the object associated with the first contextual action and different from a second characteristic of the object associated with the second action, wherein performing the first contextual action includes: in response to receiving the first user input representing the rotation of the rotatable input mechanism while receiving the second user input representing the contact on the touch-sensitive display, determining an updated value of the first characteristic of the object; and in accordance with a determination of the updated value of the first characteristic of the object, displaying the object in accordance with the updated value.

In accordance with some embodiments, determining the updated value of the characteristic of the object includes updating the value of the characteristic of the object based on a rotational attribute of the first user input.

In accordance with some embodiments, displaying the object in accordance with the updated value of the characteristic of the object includes animating the object to reflect the updated value of the characteristic of the object.

In accordance with some embodiments, the characteristic of the object is selected from the group consisting of scroll position, zoom size, and degree of rotation.

In accordance with some embodiments, method 5300 may include determining whether the updated value is within a range of values of the characteristic; in accordance with a determination that the updated value is within a range of values of the characteristic, updating the display of the object in accordance with the updated value of the characteristic of the object; and in accordance with a determination that the updated value is not within a range of values of the characteristic, updating the display to one of a minimum value or a maximum value of the characteristic.

In accordance with some embodiments, the object is one of a document, a page, a view, or an image.

Figure 54:
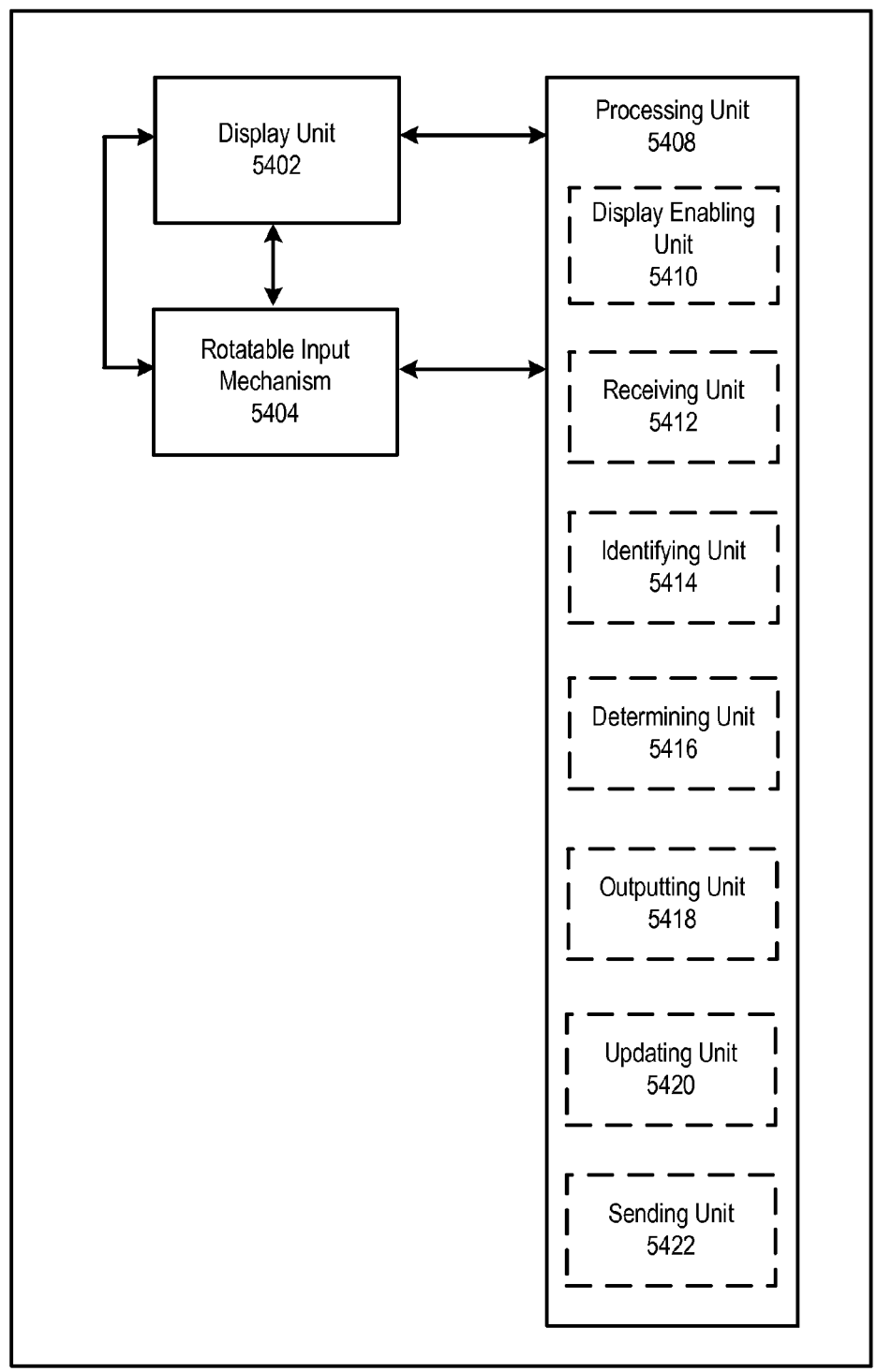
FIG. 54 is a functional block diagram in accordance with some embodiments.

In accordance with some embodiments, FIG. 54 shows an exemplary functional block diagram of an electronic device 5400 configured in accordance with the principles of the various described embodiments. In accordance with some embodiments, the functional blocks of electronic device 5400 are configured to perform the techniques described above. The functional blocks of the device 5400 are, optionally, implemented by hardware, software, or a combination of hardware and software to carry out the principles of the various described examples. It is understood by persons of skill in the art that the functional blocks described in FIG. 54 are, optionally, combined or separated into sub-blocks to implement the principles of the various described examples. Therefore, the description herein optionally supports any possible combination or separation or further definition of the functional blocks described herein.

As shown in FIG. 54, an electronic device 5400 includes a display unit 5402, a rotatable input mechanism 5404, and a processing unit 5408 coupled to the display unit 5402 and the rotatable input mechanism 5404. In some embodiments, the processing unit 5408 includes display enabling unit 5410, receiving unit 5412, identifying unit 5414, determining unit 5416, outputting unit 5418, and updating unit 5420.

The processing unit 5408 is configured to: receive (e.g., using receiving unit 5412) a user input representing a rotation of the rotatable input mechanism 5508; identify (e.g., using identifying unit 5414) a rotational attribute of the user input; determine (e.g., using determining unit 5416) an audio characteristic based on the identified rotational attribute; and output (e.g., using outputting unit 5418) audio with the audio characteristic.

In accordance with some embodiments, the audio characteristic is selected from the group consisting of one or more of a volume, a pitch, a frequency, a change in volume, a change in pitch, and a change in frequency.

In accordance with some embodiments, wherein the rotational attribute is one or more of: degree of angular rotation of the rotatable input mechanism, angular velocity of the rotatable input mechanism, and angular acceleration of the rotatable input mechanism.

In accordance with some embodiments, wherein the user input representing the rotation of the rotatable input mechanism comprises a first input segment and a second input segment; wherein to identify the rotational attribute of the user input, the processing unit 5408 is further configured to: identify (e.g., using identifying unit 5414) a first rotational attribute based on the first input segment; identify (e.g., using identifying unit 5414) a second rotational attribute based on the second input segment; wherein to determine an audio characteristic based on the identified rotational attribute, the processing unit 5408 is further configured to: determine (e.g., using determining unit 5416) a first audio characteristic based on the first rotational attribute; determine (e.g., using determining unit 5416) a second audio characteristic based on the second rotational attribute; wherein to output the audio, the processing unit 5408 is further configured to: output (e.g., using outputting unit 5418) first audio with the first audio characteristic; and output (e.g., using outputting unit 5418) second audio with the second audio characteristic.

In accordance with some embodiments, the first audio characteristic includes a first pitch and the second audio characteristic includes a second pitch different from the first pitch.

In accordance with some embodiments, the first audio characteristic includes a first frequency and the second audio characteristic includes a second frequency different from the first frequency.

In accordance with some embodiments, the first audio characteristic includes a first volume and the second audio characteristic includes a second volume different from the first volume.

In accordance with some embodiments, the electronic device includes a speaker, and wherein to output the audio with the audio characteristic, the processing unit 5408 is further configured to output (e.g., using outputting unit 5418) the audio with the audio characteristic via speaker playback.

In accordance with some embodiments, the electronic device includes a Bluetooth transceiver, and wherein to output the audio with the audio characteristic, the processing unit 5408 is further configured to send (e.g., using sending unit 5422) audio data corresponding to the audio output via Bluetooth.

In accordance with some embodiments, the electronic device includes a Wi-Fi transceiver, and wherein to output the audio with the audio characteristic, the processing unit 5408 is further configured to send (e.g., using sending unit 5422) audio data corresponding to the audio output via Wi-Fi.

In accordance with some embodiments, the processing unit 5408 is further configured to: prior to receiving the user input representing the rotation of the rotatable input mechanism, display (e.g., using display enabling unit 5410), on the display unit 5402, one or more objects in accordance with one or more values of a characteristic of the one or more objects; in response to receiving the user input representing the rotation of the rotatable input mechanism, update (e.g., using updating unit 5420) a value of the characteristic of an object from the one or more objects based on the user input; update (e.g., using updating unit 5420) display of the one or more objects in accordance with the updated value of the characteristic of the object.

In accordance with some embodiments, to update the value of the characteristic of the object based on the user input, the processing unit 5408 is further configured to update (e.g., using updating unit 5420) the value of the characteristic of the object based on the rotational attribute of the user input.

In accordance with some embodiments, the one or more objects are a plurality of objects arranged in a sequence and the characteristic of the one or more objects is a position in the sequence, wherein to update the value of the characteristic based on the user input, the processing unit 5408 is further configured to determine (e.g., using determining unit 5416) an updated position in the sequence based on the user input, and wherein to update display of the one or more objects in accordance with the updated value of the characteristic, the processing unit 5408 is further configured to update (e.g., using updating unit 5420) the display of the object of the plurality of objects corresponding to the updated position.

In accordance with some embodiments, the plurality of objects arranged in a sequence is a plurality of images arranged in a sequence.

In accordance with some embodiments, the plurality of objects arranged in a sequence is a plurality of numeric, alphabetic, or alphanumeric characters arranged in a sequence.

In accordance with some embodiments, to update display of the object in accordance with the updated value of the characteristic of the object, the processing unit 5408 is further configured to animate (e.g., using display enabling unit 5410) the object to reflect the updated value of the characteristic of the object.

In accordance with some embodiments, updating the value of the characteristic based on the user input comprises a first update based on the first rotational attribute and a second update different than the first update and based on the second rotational attribute.

In accordance with some embodiments, the characteristic of the object is selected from the group consisting of scroll position, zoom size, and degree of rotation.

In accordance with some embodiments, the characteristic of the object is scroll position and the predetermined subset of the range of values of the characteristic is a range of scroll positions.

In accordance with some embodiments, the characteristic of the object is zoom size and the predetermined subset of the range of values of the characteristic is a range of zoom sizes.

The operations described above with reference to FIG. 54 are, optionally, implemented by components depicted in FIGS. 1A-1B or FIG. 54. For example, receiving operation 5202 (FIG. 52), identifying operation 5204 (FIG. 52), determining operation 5206 (FIG. 52), and outputting operation 5208 (FIG. 52) may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 55:
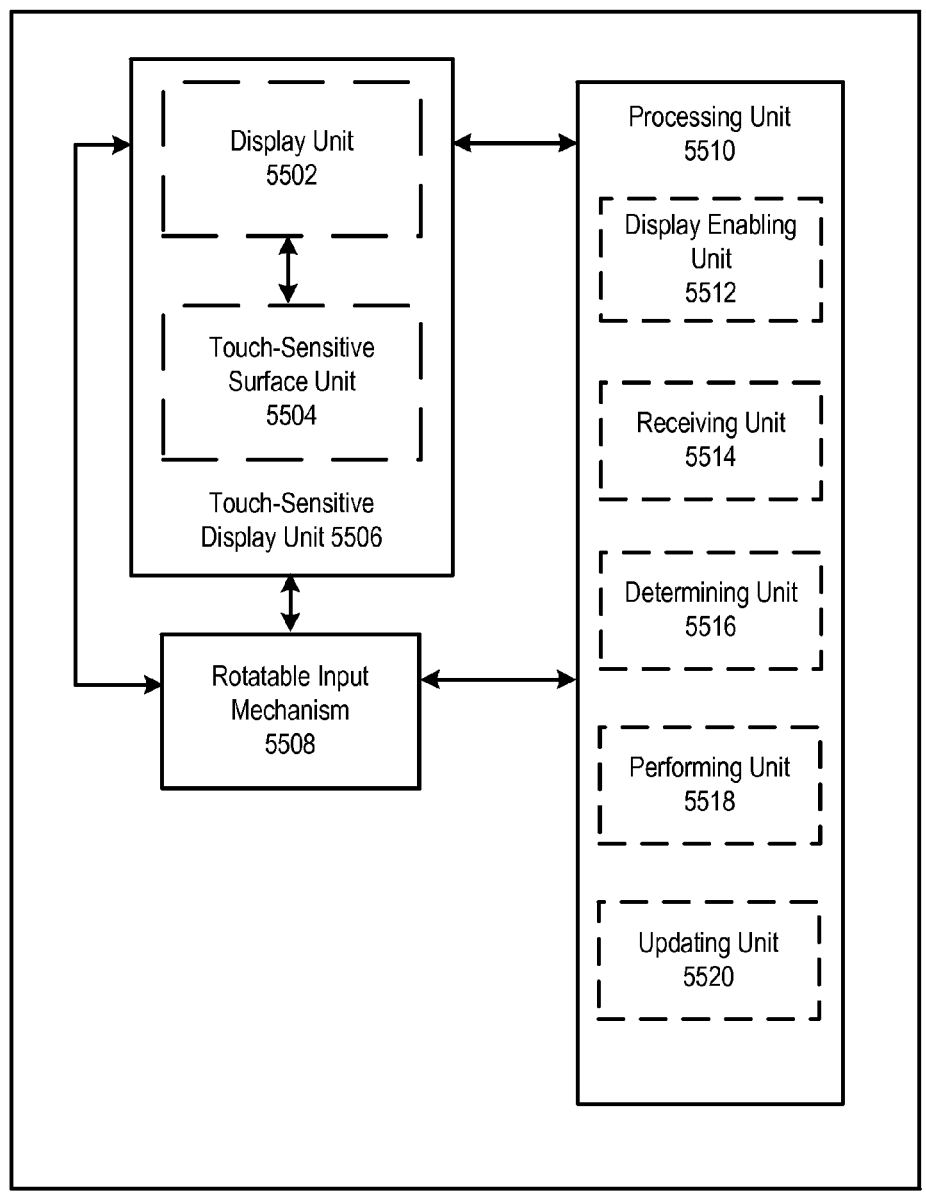
FIG. 55 a functional block diagram in accordance with some embodiments.

In accordance with some embodiments, FIG. 55 shows an exemplary functional block diagram of an electronic device 5500 configured in accordance with the principles of the various described embodiments. In accordance with some embodiments, the functional blocks of electronic device 5500 are configured to perform the techniques described above. The functional blocks of the device 5500 are, optionally, implemented by hardware, software, or a combination of hardware and software to carry out the principles of the various described examples. It is understood by persons of skill in the art that the functional blocks described in FIG. 55 are, optionally, combined or separated into sub-blocks to implement the principles of the various described examples. Therefore, the description herein optionally supports any possible combination or separation or further definition of the functional blocks described herein.

As shown in FIG. 55, an electronic device 5500 includes a touch-sensitive display unit 5508, which may include display unit 5502 and touch-sensitive surface unit 5504, a rotatable input mechanism 5508, and a processing unit 5510 coupled to the touch-sensitive display unit 5506, and the rotatable input mechanism 5508. In some embodiments, the processing unit 5510 includes display enabling unit 5512, receiving unit 5514, determining unit 5516, performing unit 5518, and updating unit 5520.

The processing unit 5510 is configured to: receive (e.g., using receiving unit 5514) a first user input representing a rotation of the rotatable input mechanism 5508; determine (e.g., using determining unit 5516) whether a second user input representing a contact on the touch-sensitive display unit 5506 is received while receiving the second user input representing the rotation of the rotatable input mechanism 5508; in accordance with a determination that the second user input representing the contact on the touch-sensitive display unit 5506 is received while receiving the second user input representing the rotation of the rotatable input mechanism 5508, perform (e.g., using performing unit 5518) a first contextual action based on the rotation of the rotatable input mechanism 5508; and in accordance with a determination that the second user input representing the contact on the touch-sensitive display unit 5506 is not received while receiving the second user input representing the rotation of the rotatable input mechanism 5508, perform (e.g., using performing unit 5518) a second action different than the first contextual action based on the rotation of the rotatable input mechanism.

In accordance with some embodiments, the processing unit 5510 is further configured to: display (e.g., using display enabling unit 5512), on the touch-sensitive display unit 5506, an object in accordance with a value of a first characteristic of the object associated with the first contextual action and different from a second characteristic of the object associated with the second action, wherein to perform the first contextual action, the processing unit is further configured to: in response to receiving the first user input representing the rotation of the rotatable input mechanism 5508 while receiving the second user input representing the contact on the touch-sensitive display unit 5506, determine (e.g., using determining unit 5516) an updated value of the first characteristic of the object; and in accordance with a determination of the updated value of the first characteristic of the object, display (e.g., using display enabling unit 5512) the object in accordance with the updated value.

In accordance with some embodiments, to determine the updated value of the characteristic of the object, the processing unit 5510 is further configured to update (e.g., using updating unit 5520) the value of the characteristic of the object based on a rotational attribute of the first user input.

In accordance with some embodiments, to display the object in accordance with the updated value of the characteristic of the object, the processing unit 5510 is further configured to animate (e.g., using display enabling unit 5512) the object to reflect the updated value of the characteristic of the object.

In accordance with some embodiments, the characteristic of the object is selected from the group consisting of scroll position, zoom size, and degree of rotation.

In accordance with some embodiments, the processing unit 5510 is further configured to: determine (e.g., using determining unit 5516) whether the updated value is within a range of values of the characteristic; in accordance with a determination that the updated value is within a range of values of the characteristic, update (e.g., using updating unit 5520) the display of the object in accordance with the updated value of the characteristic of the object; and in accordance with a determination that the updated value is not within a range of values of the characteristic, update (e.g., using updating unit 5520) the display to one of a minimum value or a maximum value of the characteristic.

In accordance with some embodiments, the object is one of a document, a page, a view, or an image.

The operations described above with reference to FIG. 55 are, optionally, implemented by components depicted in FIGS. 1A-1B or FIG. 55. For example, receiving operation 5302 (FIG. 53), determining operation 5304 (FIG. 53), and performing operation 5306, 5308 (FIG. 53) may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated claims.

What is claimed is:

1. A non-transitory computer-readable storage medium comprising one or more programs for execution by one or more processors of an electronic device with a rotatable input mechanism and an audio output device, the one or more programs including instructions which, when executed by the one or more processors, cause the electronic device to:
   receive a user input representing a rotation of the rotatable input mechanism;
   identify a rotational attribute of the user input, wherein the rotational attribute includes an angular velocity of the rotatable input mechanism;
   determine an audio characteristic based on the identified rotational attribute, wherein the audio characteristic includes a frequency determined based on the angular velocity of the rotatable input mechanism, and wherein a change in angular velocity causes a corresponding change in frequency and a change in pitch; and
   output, using the audio output device, audio with the audio characteristic.

2. The non-transitory computer-readable storage medium of claim 1, wherein the audio characteristic further includes a volume.

3. The non-transitory computer-readable storage medium of claim 1, wherein the rotational attribute is one or more of:
   degree of angular rotation of the rotatable input mechanism,
   angular velocity of the rotatable input mechanism, and
   angular acceleration of the rotatable input mechanism.

4. The non-transitory computer-readable storage medium of claim 1,
   wherein the user input representing the rotation of the rotatable input mechanism comprises a first input segment and a second input segment;
   wherein to identify the rotational attribute of the user input, the one or more programs include instructions which cause the electronic device to:
      identify a first rotational attribute based on the first input segment; and
      identify a second rotational attribute based on the second input segment;
   wherein to determine an audio characteristic based on the identified rotational attribute, the one or more programs include instructions which cause the electronic device to:
      determine a first audio characteristic based on the first rotational attribute; and
      determine a second audio characteristic based on the second rotational attribute; and
   wherein to output, using the audio output device, the audio with the audio characteristic, the one or more programs include instructions which cause the electronic device to:
      output first audio with the first audio characteristic; and
      output second audio with the second audio characteristic.

5. The non-transitory computer-readable storage medium of claim 4, wherein the first audio characteristic includes a first pitch and the second audio characteristic includes a second pitch different from the first pitch.

6. The non-transitory computer-readable storage medium of claim 4, wherein the first audio characteristic includes a first frequency and the second audio characteristic includes a second frequency different from the first frequency.

7. The non-transitory computer-readable storage medium of claim 4, wherein the first audio characteristic includes a first volume and the second audio characteristic includes a second volume different from the first volume.

8. The non-transitory computer-readable storage medium of claim 1, wherein the audio output device includes a speaker, and wherein outputting, using the audio output device, the audio with the audio characteristic includes speaker playback.

9. The non-transitory computer-readable storage medium of claim 1, wherein the audio output device includes a Bluetooth transceiver, and wherein to output, using the audio output device, the audio with the audio characteristic, the one or more programs include instructions which cause the electronic device to send audio data corresponding to the audio output via Bluetooth.

10. The non-transitory computer-readable storage medium of claim 1, wherein the audio output device includes a Wi-Fi transceiver, and wherein to output, using the audio output device, the audio with the audio characteristic, the one or more programs include instructions which cause the electronic device to send audio data corresponding to the audio output via Wi-Fi.

11. The non-transitory computer-readable storage medium of claim 1, wherein the electronic device further includes a display, and wherein the one or more programs include instructions which cause the electronic device to:
   prior to receiving the user input representing the rotation of the rotatable input mechanism, display, using the display, one or more objects in accordance with one or more values of a characteristic of the one or more objects;
   in response to receiving the user input representing the rotation of the rotatable input mechanism, update a value of the characteristic of an object from the one or more objects based on the user input; and
   update display of the one or more objects in accordance with the updated value of the characteristic of the object.

12. The non-transitory computer-readable storage medium of claim 11, wherein to update the value of the characteristic of the object based on the user input, the one or more programs include instructions which cause the electronic device to update the value of the characteristic of the object based on the rotational attribute of the user input.

13. The non-transitory computer-readable storage medium of claim 12,
   wherein the one or more objects are a plurality of objects arranged in a sequence and the characteristic of the one or more objects is a position in the sequence, wherein to update the value of the characteristic based on the user input, the one or more programs include instructions which cause the electronic device to determine an updated position in the sequence based on the user input, and wherein to update display of the one or more objects in accordance with the updated value of the characteristic, the one or more programs include instructions which cause the electronic device to update display of the object of the plurality of objects corresponding to the updated position.

14. The non-transitory computer-readable storage medium of claim 13, wherein the plurality of objects arranged in a sequence is a plurality of images arranged in a sequence.

15. The non-transitory computer-readable storage medium of claim 13, wherein the plurality of objects arranged in a sequence is a plurality of numeric, alphabetic, or alphanumeric characters arranged in a sequence.

16. The non-transitory computer-readable storage medium of claim 12, wherein to update display of the object in accordance with the updated value of the characteristic of the object, the one or more programs include instructions which cause the electronic device to animate the object to reflect the updated value of the characteristic of the object.

17. The non-transitory computer-readable storage medium of claim 12, wherein updating the value of the characteristic based on the user input comprises a first update based on a first rotational attribute and a second update different than the first update and based on a second rotational attribute.

18. The non-transitory computer-readable storage medium of claim 11, wherein the characteristic of the object is selected from a group consisting of scroll position, zoom size, and degree of rotation.

19. The non-transitory computer-readable storage medium of claim 11, wherein the characteristic of the object is scroll position and a predetermined subset of the range of values of the characteristic is a range of scroll positions.

20. The non-transitory computer-readable storage medium of claim 11, wherein the characteristic of the object is zoom size and a predetermined subset of the range of values of the characteristic is a range of zoom sizes.

21. A method comprising:
at an electronic device with a rotatable input mechanism and an audio output device:
receiving a user input representing a rotation of the rotatable input mechanism;
identifying a rotational attribute of the user input, wherein the rotational attribute includes an angular velocity of the rotatable input mechanism;
determining an audio characteristic based on the identified rotational attribute, wherein the audio characteristic includes a frequency determined based on the angular velocity of the rotatable input mechanism, and wherein a change in angular velocity causes a corresponding change in frequency and a change in pitch; and
outputting, using the audio output device, audio with the audio characteristic.

22. An electronic device comprising:
one or more processors;
memory;
a rotatable input mechanism each coupled to the one or more processors and memory;
an audio output device; and
one or more programs stored in memory, the one or more programs including instructions for:
receiving a user input representing a rotation of the rotatable input mechanism;
identifying a rotational attribute of the user input, wherein the rotational attribute includes an angular velocity of the rotatable input mechanism;
determining an audio characteristic based on the identified rotational attribute, wherein the audio characteristic includes a frequency determined based on the angular velocity of the rotatable input mechanism, and wherein a change in angular velocity causes a corresponding change in frequency and a change in pitch; and
outputting, using the audio output device, audio with the audio characteristic.

23. The method of claim 21, wherein the audio characteristic of further includes a volume.

24. The method of claim 21, wherein the rotational attribute is one or more of:
degree of angular rotation of the rotatable input mechanism,
angular velocity of the rotatable input mechanism, and
angular acceleration of the rotatable input mechanism.

25. The method of claim 21,
wherein the user input representing the rotation of the rotatable input mechanism comprises a first input segment and a second input segment;
wherein to identify the rotational attribute of the user input, the one or more programs include instructions which cause the electronic device to:
identify a first rotational attribute based on the first input segment; and
identify a second rotational attribute based on the second input segment;
wherein to determine an audio characteristic based on the identified rotational attribute, the one or more programs include instructions which cause the electronic device to:
determine a first audio characteristic based on the first rotational attribute; and
determine a second audio characteristic based on the second rotational attribute; and
wherein to output the audio with the audio characteristic, the one or more programs include instructions which cause the electronic device to:
output first audio with the first audio characteristic; and
output second audio with the second audio characteristic.

26. The method of claim 25, wherein the first audio characteristic includes a first pitch and the second audio characteristic includes a second pitch different from the first pitch.

27. The method of claim 25, wherein the first audio characteristic includes a first frequency and the second audio characteristic includes a second frequency different from the first frequency.

28. The method of claim 25, wherein the first audio characteristic includes a first volume and the second audio characteristic includes a second volume different from the first volume.

29. The method of claim 21, wherein the electronic device includes a speaker, and wherein outputting the audio with the audio characteristic includes speaker playback.

30. The method of claim 21, wherein the electronic device includes a Bluetooth transceiver, and wherein to output the audio with the audio characteristic, the one or more programs include instructions which cause the electronic device to send audio data corresponding to the audio output via Bluetooth.

31. The method of claim 21, wherein the electronic device includes a Wi-Fi transceiver, and wherein to output the audio with the audio characteristic, the one or more programs include instructions which cause the electronic device to send audio data corresponding to the audio output via Wi-Fi.

32. The method of claim 21, wherein the one or more programs include instructions which cause the electronic device to:
prior to receiving the user input representing the rotation of the rotatable input mechanism, display one or more objects in accordance with one or more values of a characteristic of the one or more objects;
in response to receiving the user input representing the rotation of the rotatable input mechanism, update a value of the characteristic of an object from the one or more objects based on the user input; and
update display of the one or more objects in accordance with the updated value of the characteristic of the object.

33. The method of claim 32, wherein to update the value of the characteristic of the object based on the user input, the one or more programs include instructions which cause the electronic device to update the value of the characteristic of the object based on the rotational attribute of the user input.

34. The method of claim 33,
wherein the one or more objects are a plurality of objects arranged in a sequence and the characteristic of the one or more objects is a position in the sequence,
wherein to update the value of the characteristic based on the user input, the one or more programs include instructions which cause the electronic device to determine an updated position in the sequence based on the user input, and
wherein to update display of the one or more objects in accordance with the updated value of the characteristic, the one or more programs include instructions which cause the electronic device to update display of the object of the plurality of objects corresponding to the updated position.

35. The method of claim 33, wherein to update display of the object in accordance with the updated value of the characteristic of the object, the one or more programs include instructions which cause the electronic device to animate the object to reflect the updated value of the characteristic of the object.

36. The method of claim 33, wherein updating the value of the characteristic based on the user input comprises a first update based on a first rotational attribute and a second update different than the first update and based on a second rotational attribute.

37. The electronic device of claim 22, wherein the audio characteristic further includes a volume.

38. The electronic device of claim 22, wherein the rotational attribute is one or more of:
degree of angular rotation of the rotatable input mechanism,
angular velocity of the rotatable input mechanism, and
angular acceleration of the rotatable input mechanism.

39. The electronic device of claim 22,
wherein the user input representing the rotation of the rotatable input mechanism comprises a first input segment and a second input segment;
wherein to identify the rotational attribute of the user input, the one or more programs include instructions which cause the electronic device to:
identify a first rotational attribute based on the first input segment; and
identify a second rotational attribute based on the second input segment;
wherein to determine an audio characteristic based on the identified rotational attribute, the one or more programs include instructions which cause the electronic device to:
determine a first audio characteristic based on the first rotational attribute; and
determine a second audio characteristic based on the second rotational attribute; and
wherein to output the audio with the audio characteristic, the one or more programs include instructions which cause the electronic device to:
output first audio with the first audio characteristic; and
output second audio with the second audio characteristic.

40. The electronic device of claim 39, wherein the first audio characteristic includes a first pitch and the second audio characteristic includes a second pitch different from the first pitch.

41. The electronic device of claim 39, wherein the first audio characteristic includes a first frequency and the second audio characteristic includes a second frequency different from the first frequency.

42. The electronic device of claim 39, wherein the first audio characteristic includes a first volume and the second audio characteristic includes a second volume different from the first volume.

43. The electronic device of claim 22, wherein the electronic device includes a speaker, and wherein outputting the audio with the audio characteristic includes speaker playback.

44. The electronic device of claim 22, wherein the electronic device includes a Bluetooth transceiver, and wherein to output the audio with the audio characteristic, the one or more programs include instructions which cause the electronic device to send audio data corresponding to the audio output via Bluetooth.

45. The electronic device of claim 22, wherein the electronic device includes a Wi-Fi transceiver, and wherein to output the audio with the audio characteristic, the one or more programs include instructions which cause the electronic device to send audio data corresponding to the audio output via Wi-Fi.

46. The electronic device of claim 22, wherein the one or more programs include instructions which cause the electronic device to:
prior to receiving the user input representing the rotation of the rotatable input mechanism, display one or more objects in accordance with one or more values of a characteristic of the one or more objects;
in response to receiving the user input representing the rotation of the rotatable input mechanism, update a value of the characteristic of an object from the one or more objects based on the user input; and
update display of the one or more objects in accordance with the updated value of the characteristic of the object.

47. The electronic device of claim 46, wherein to update the value of the characteristic of the object based on the user input, the one or more programs include instructions which cause the electronic device to update the value of the characteristic of the object based on the rotational attribute of the user input.

48. The electronic device of claim 47,
wherein the one or more objects are a plurality of objects arranged in a sequence and the characteristic of the one or more objects is a position in the sequence,
wherein to update the value of the characteristic based on the user input, the one or more programs include instructions which cause the electronic device to determine an updated position in the sequence based on the user input, and
wherein to update display of the one or more objects in accordance with the updated value of the characteristic, the one or more programs include instructions which cause the electronic device to update display of the object of the plurality of objects corresponding to the updated position.

49. The electronic device of claim 47, wherein to update display of the object in accordance with the updated value of the characteristic of the object, the one or more programs include instructions which cause the electronic device to animate the object to reflect the updated value of the characteristic of the object.

50. The electronic device of claim 47, wherein updating the value of the characteristic based on the user input comprises a first update based on a first rotational attribute and a second update different than the first update and based on a second rotational attribute.

* * * * *

UNITED STATES PATENT AND TRADEMARK OFFICE
CERTIFICATE OF CORRECTION

PATENT NO. : 10,001,817 B2
APPLICATION NO. : 14/841656
DATED : June 19, 2018
INVENTOR(S) : Nicholas Zambetti et al.

Page 1 of 1

It is certified that error appears in the above-identified patent and that said Letters Patent is hereby corrected as shown below:

On the Title Page

Page 2, Column 1, under "Related U.S. Application Data", Line 2, delete "61/873,956" and insert -- 61/873,356 --.

Signed and Sealed this
Eleventh Day of December, 2018

Andrei Iancu
*Director of the United States Patent and Trademark Office*